US011945695B2

(12) United States Patent
Niedzwiecki et al.

(10) Patent No.: US 11,945,695 B2
(45) Date of Patent: Apr. 2, 2024

(54) APPARATUS, SYSTEM AND METHOD FOR THE DELIVERY OF ITEMS ONTO SURFACES INCLUDING ELEVATED SURFACES

(71) Applicant: NILEC SOLUTIONS, LLC, Houston, TX (US)

(72) Inventors: Timothy Allen Niedzwiecki, Atlantic Mine, MI (US); Scott David Compton, Houston, TX (US)

(73) Assignee: NILEC SOLUTIONS, LLC, Houston, TX (US)

( * ) Notice: Subject to any disclaimer, the term of this patent is extended or adjusted under 35 U.S.C. 154(b) by 1049 days.

(21) Appl. No.: 16/826,099

(22) Filed: Mar. 20, 2020

(65) Prior Publication Data

US 2020/0299109 A1 Sep. 24, 2020

Related U.S. Application Data

(60) Provisional application No. 62/964,064, filed on Jan. 21, 2020, provisional application No. 62/822,946, filed on Mar. 24, 2019.

(51) Int. Cl.
*B66C 13/08* (2006.01)
*B66C 1/22* (2006.01)
*B66C 1/26* (2006.01)
*B66C 13/48* (2006.01)
*E04D 15/02* (2006.01)

(52) U.S. Cl.
CPC ................ *B66C 1/26* (2013.01); *E04D 15/02* (2013.01)

(58) Field of Classification Search
CPC .. B66C 1/26; B66C 13/48; B66C 1/22; B66C 13/08; E04D 15/02
USPC .............................................. 294/67.21, 81.4
See application file for complete search history.

(56) References Cited

U.S. PATENT DOCUMENTS 2,388,458 A 11/1945 Alfonte
2,495,658 A * 1/1950 Moseley .................. B66C 1/26 414/509
2,639,051 A 5/1953 Thomas
(Continued)

FOREIGN PATENT DOCUMENTS

FR 2628089 3/1988
GB 2380513 A 4/2003
(Continued)

*Primary Examiner* — Paul T Chin
(74) *Attorney, Agent, or Firm* — The Compton Law Firm, P.C.; Scott D. Compton

(57) ABSTRACT

The present disclosure is directed to an apparatus, system and method for the delivery of one or more items onto one or more target surfaces including elevated surfaces and inclined surfaces. An apparatus of this disclosure is operationally configured to be moved in space via lifting equipment while carrying one or more items. An apparatus of this disclosure is also operationally configured to direct one or more items onto one or more target surfaces without manual assistance for removing the one or more items off from the apparatus onto one or more target surfaces. Removal of one or more items off from the apparatus may be performed in a controlled and/or programmed manner. The present disclosure includes maintaining one or more items on or more target surfaces once the one or more items are removed from the apparatus.

18 Claims, 73 Drawing Sheets

(56) References Cited

U.S. PATENT DOCUMENTS

| | | | | | |
|---|---|---|---|---|---|
| 2,670,867 | A | | 3/1954 | Thompson | |
| 2,690,926 | A | * | 10/1954 | Betz | B66C 1/24 294/67.21 |
| 2,993,610 | A | | 7/1961 | Kughler | |
| 3,058,542 | A | | 10/1962 | Rogalla | |
| 3,165,344 | A | * | 1/1965 | Holder | B66C 1/26 294/63.1 |
| 3,640,414 | A | * | 2/1972 | Brudi | B66F 9/195 414/661 |
| 3,709,547 | A | * | 1/1973 | Nutter | B66C 1/26 294/67.21 |
| 3,872,582 | A | * | 3/1975 | Matsuoka | H01C 17/02 29/610.1 |
| 4,522,544 | A | * | 6/1985 | Shah | B65G 49/068 414/739 |
| 4,722,106 | A | * | 2/1988 | Scegiel | A01K 55/00 D34/33 |
| 4,752,179 | A | | 6/1988 | Seaberg | |
| 4,832,562 | A | * | 5/1989 | Johnson | B66F 9/195 414/676 |
| 4,946,331 | A | | 8/1990 | Johnson | |
| 8,857,080 | B1 | | 10/2014 | Sutter | |
| 9,701,466 | B1 | | 7/2017 | Horton | |
| 2002/0195532 | A1 | | 12/2002 | Macri et al. | |
| 2004/0022606 | A1 | | 2/2004 | Coblentz | |
| 2004/0217610 | A1 | * | 11/2004 | Hollman | B66C 1/22 294/67.22 |
| 2005/0207873 | A1 | | 9/2005 | Endrud | |
| 2013/0195592 | A1 | | 8/2013 | Meijer | |
| 2018/0043811 | A1 | | 2/2018 | Beiler et al. | |
| 2019/0062124 | A1 | | 2/2019 | Sedlock | |
| 2019/0078339 | A1 | | 3/2019 | Robinson | |
| 2019/0218800 | A1 | | 7/2019 | Bendall et al. | |
| 2019/0233255 | A1 | | 8/2019 | Sedlock | |
| 2019/0366902 | A1 | | 12/2019 | Bacon-Maldonado, III et al. | |

FOREIGN PATENT DOCUMENTS

| | | |
|---|---|---|
| WO | WO2011123965 | 10/2011 |
| WO | WO2015020817 | 2/2015 |

* cited by examiner

APPARATUS, SYSTEM AND METHOD FOR THE DELIVERY OF ITEMS ONTO SURFACES INCLUDING ELEVATED SURFACES

CROSS-REFERENCE TO RELATED APPLICATIONS

The application is entitled to the benefit of the filing date of the prior-filed U.S. Provisional Patent Application Ser. No. 62/822,946, filed on Mar. 24, 2019, which is herein incorporated by reference in its entirety. The application is also entitled to the benefit of the filing date of the prior-filed U.S. Provisional Patent Application Ser. No. 62/964,064, filed on Jan. 21, 2020, which is herein incorporated by reference in its entirety.

STATEMENT REGARDING FEDERALLY SPONSORED RESEARCH OR DEVELOPMENT

Not applicable.

BACKGROUND OF THE DISCLOSURE

1. Field of the Disclosure

The disclosure is directed to the delivery of items onto one or more target surfaces including elevated surfaces.

2. Background Art

In many working conditions, various items must be transported to one or more locations such as elevated surface locations requiring the assistance of conveyors and/or lifts in addition to manual labor in order to place items at one or more desired locations. For example, at loading docks various items are lifted to a platform of a ship or other vessel. In construction type operations, building materials and other items are delivered to construction floors via lift equipment or elevators. In home construction type operations, building materials and other items are typically delivered to rooftops and decks via manual labor or in combination with lift equipment or a conveyor lift. For example, bundles of shingles are typically transported to a house or other structure on pallets and either manually placed atop the rooftop of the house or other structure by hand or the bundles of shingles are lifted to the rooftop via lift equipment or a conveyor lift where persons manually place or set the bundle shingles at one or more desired locations along the rooftop. Such operations often take place on rooftops having sloping surfaces requiring the shingle bundles to be manually placed atop a rooftop in a secure manner in an attempt to keep the shingle bundles from sliding of the rooftop. Such operations also often take place at elevations requiring persons to wear safety equipment such as safety belts or safety harnesses to protect against slips and falls. In addition, many building materials are quite heavy exposing persons to bodily injury as a result of physically handling the building materials. Not only are persons subject to physical harm during such operations, but it can also be quite time consuming for personnel to get to an elevated location and/or tie down their safety equipment prior to manually moving any building materials.

Overcoming the above shortcomings is desired.

SUMMARY OF THE DISCLOSURE

The present disclosure is directed to an apparatus for delivering one or more items onto one or more target surfaces, the apparatus being operationally configured to (1) carry one or more items on one or more first surfaces of the apparatus, (2) direct one or more items off from the one or more first surfaces onto one or more second surfaces of the apparatus, the one or more second surfaces being operationally configured to direct the one or more items off from the apparatus, and (3) communicate with lifting equipment in a manner effective to maintain the apparatus in a vertical alignment during operation of the apparatus.

The present disclosure is also directed to an apparatus for delivering one or more items onto one or more target surfaces, including (1) one or more supports attached to a frame of the apparatus, the one or more supports being operationally configured to carry one or more items; (2) an adjustable assembly moveable along part of the frame and operationally configured to direct one or more items off from the apparatus onto one or more target surfaces; (3) a mover assembly in communication with the adjustable assembly and operationally configured to direct one or more items off from the one or more supports; and (4) a leveling assembly operationally configured to communicate the apparatus with lifting equipment and maintain the apparatus in a vertical alignment during operation of the apparatus.

The present disclosure is also directed to a system for delivering one or more items onto one or more target surfaces, including (1) one or more portable supports operationally configured to be installed on one or more target surfaces and capture one or more items; and (2) an apparatus operationally configured to carry one or more items and remove one or more items from the apparatus onto one or more target surfaces in a manner effective to be captured by the one or more supports, the apparatus being operationally configured to communicate with lifting equipment.

The present disclosure is also directed to a system for delivering one or more items onto one or more target surfaces, including (1) one or more portable platforms operationally configured to be installed on one or more target surfaces; and (2) an apparatus operationally configured to carry one or more items and remove one or more items from the apparatus onto one or more portable platforms, the apparatus being operationally configured to communicate with lifting equipment. One or more portable platforms may include support surfaces with one or more barriers disposed along at least part of the perimeter of the support surfaces operationally configured to maintain one or more items on the one or more portable platforms.

The present disclosure is also directed to a portable support to be installed onto a target surface, including a main section and a first raised member at a first end of the main section and a second raised member at a second end of the main section, wherein the first raised member and the second raised member are operationally configured to capture items placed onto the target surface and/or at least part of the main section of the portable support.

The present disclosure is also directed to a portable support to be installed onto a target surface defined by a ridge, the portable support comprising (1) one or more catch members operationally configured to engage the ridge and/or the target surface; (2) opposing stop members on either side of the one or more catch members secured to the one or more catch members via one or more attachment lines; (3) wherein the portable support is operationally configured to self-install to an operable position once the one or more catch members engage the ridge and/or the target surface.

The present disclosure is also directed to a method of delivering one or more items to an elevated surface without persons being located at the elevated surface, including (1)

providing one or more portable supports for installation on the elevated surface, the one or more portable supports being operationally configured to hold one or more items in a fixed position on the elevated surface; (2) installing the one or more portable supports on the elevated surface; and (3) delivering one or more items to the elevated surface in a manner effective to be held in a fixed position by the one or more portable supports.

The present disclosure is also directed to a method for delivering one or more items onto one or more target surfaces, including (1) providing (a) one or more portable supports operationally configured to be installed on one or more target surfaces and capture one or more items and (b) an apparatus operationally configured to carry one or more items and remove one or more items from the apparatus onto one or more target surfaces in a manner effective to be captured by the one or more portable supports, (2) installing one or more portable supports onto one or more target surfaces, (3) deliver one or more items to one or more target surfaces via the apparatus in a manner effective to be captured by the one or more portable supports.

The present disclosure is also directed to a system for delivering bundles of shingles to one or more roofs of one or more structures, including (1) one or more pallets holding one or more rows of bundles of shingles thereon, (2) an apparatus operationally configured to be lifted and operationally configured to carry the one or more pallets and remove one or more rows of bundles of shingles from the one or more pallets onto one or more roofs in a programmed manner or via manual control as desired.

The present disclosure is also directed to a person free method of delivery bundles of shingles to a pitched roof, including: (1) providing (a) one or more portable supports for installation on the pitched roof, the one or more portable supports being operationally configured to stop and hold bundles of shingles in a fixed position on the pitched roof, (b) an apparatus operationally configured to carry one or more bundles of shingles and direct the one or more bundles of shingles off from the apparatus in a manner effective for the one or more bundles of shingles to be stopped and held by the one or more portable supports, (c) lifting equipment in electric and fluid communication with the apparatus, the lifting equipment being operationally configured to lift the apparatus and transport the apparatus to one or more locations near the pitched roof effective for the apparatus to direct the one or more bundles of shingles off from the apparatus in a manner effective for the one or more bundles of shingles to be stopped and held by the one or more portable supports; and (2) install the one or more portable supports; (3) deliver one or more bundles of shingles to the pitched roof in a manner effective for the one or more bundles of shingles to be stopped and held by the one or more portable supports. Once, a desire number of bundles of shingles are delivered to the pitched roof, the apparatus may be loaded onto the lifting equipment and transport to another destination.

DEFINITIONS USED IN THE DISCLOSURE

Figure 2:
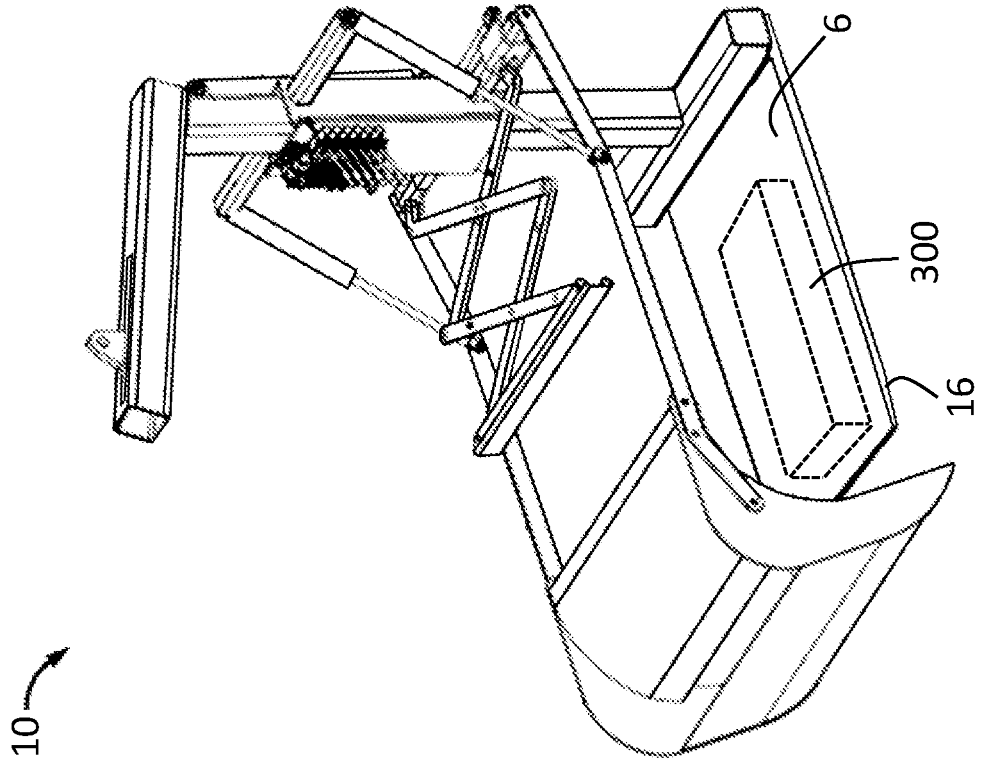
FIG. 2 is another front perspective view of the apparatus of FIG. 1.

The term "at least one", "one or more", and "one or a plurality" mean one thing or more than one thing with no limit on the exact number; these three terms may be used interchangeably within this disclosure. For example, at least one device means one or more devices or one device and a plurality of devices.

The term "about" means that a value of a given quantity is within ±20% of the stated value. In other embodiments, the value is within ±15% of the stated value. In other embodiments, the value is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value.

The term "substantially" or "essentially" means that a value of a given quantity is within ±10% of the stated value. In other embodiments, the value is within ±7.5% of the stated value. In other embodiments, the value is within ±5% of the stated value. In other embodiments, the value is within ±2.5% of the stated value. In other embodiments, the value is within ±1% of the stated value. In other embodiments, the value is within ±0.5% of the stated value. In other embodiments, the value is within ±0.1% of the stated value.

DETAILED DESCRIPTION OF THE DISCLOSURE

For the purposes of promoting an understanding of the principles of the disclosure, reference is now made to the embodiments illustrated in the drawings and particular language will be used to describe the same. It is understood that no limitation of the scope of the claimed subject matter is intended by way of the disclosure. It is to be understood that the present disclosure is not limited to particular embodiments. It is also to be understood that the terminology used herein is for the purpose of describing particular embodiments only, and is not intended to be limiting. As understood by one skilled in the art to which the present disclosure relates, various changes and modifications of the principles as described and illustrated are herein contemplated.

As used in this specification and the appended claims, the term "unit load" refers to one or more items that may be carried by an apparatus of the present disclosure and placed onto one or more target surfaces by the apparatus regardless of size and/or shape of the one or more items. In one embodiment, a unit load may be supported atop a support surface including a portable platform regardless of the size and/or shape of the one or more items. Herein, a unit load may include one or more items that are stackable atop a support surface. In one embodiment, one or more stackable items may be stacked in identifiable rows including, but not necessarily limited to rows of a measurable and/or known size. A unit load may also include one or more naked items and/or one or more items housed within packaging such as plastic bags, paper bags, wooden boxes, cardboard boxes, wrapping material, shrink wrap, and the like. A unit load may also include one or more loose items as described herein. The term "elevated surface" may refer to one or more natural or man-made surfaces located at a higher altitude than a surface location of one or more items to be carried up to the one or more higher altitude surfaces. In reference to an apparatus of the present disclosure carrying one or more items, the term "carry" means to hold and transport one or more items. The terms "building materials" and "construction materials" may be used interchangeably. Herein, a category of building materials includes, but is not necessarily limited to "roofing materials" as the term is understood by the skilled artisan in the field of building construction. In reference to roofs of buildings and houses, the terms "peak" and "ridge" may be used interchangeably. Herein, the phrases "bundles of roof shingles," "bundles of shingles," and "shingle bundles" may be used interchangeably.

In one embodiment, the present disclosure is directed to an automated apparatus operationally configured to (1) carry one or more items to one or more target surface locations and (2) remove at least one item from the apparatus for placement onto a target surface location.

In another embodiment, the present disclosure is directed to a portable apparatus operationally configured to carry a portable platform to one or more target locations and automatically remove one or more items from the portable platform onto one or more surfaces at one or more target locations. The portable apparatus is operationally configured to remove one or more items from a portable platform including, but not necessarily limited to a unit load without manual assistance.

In another embodiment, the present disclosure is directed to a system for carrying pallet loaded building materials to one or more target surfaces including one or more roof surfaces of one or more structures and other elevated surfaces, the system including a lifting member and an apparatus in communication with the lifting member, the lifting member being operationally configured to move or otherwise direct the apparatus in space to one or more target locations including one or more elevated locations, the apparatus being operationally configured to engage or otherwise secure a pallet to the apparatus and remove at least part of a unit load from the pallet onto one or more target surfaces without the presence of persons at the one or more target surfaces.

In another embodiment, the present disclosure is directed to a method for the automated placement of building materials including, but not necessarily limited to bundles of shingles onto target surfaces including roofs and/or other elevated surfaces.

In another embodiment, the present disclosure is directed to an apparatus operationally configured to carry a unit load to one or more target locations including, but not necessarily limited to one or more elevated surfaces; wherein the apparatus is operationally configured to remove all or part of the unit load from the apparatus onto one or more surfaces at one or more target locations with or without the apparatus contacting the one or more surfaces.

In another embodiment, the present disclosure is directed to an apparatus operationally configured to carry a portable platform to one or more target locations including, but not necessarily limited to one or more elevated surfaces; wherein the apparatus is operationally configured to remove all or part of a unit load from the portable platform onto one or more surfaces at one or more target locations with or without the apparatus contacting the surface.

In another embodiment, the present disclosure is directed to an apparatus in the form of a portable fork carriage operationally configured to carry a portable platform to one or more target locations and remove all or part of a unit load from the portable platform onto one or more surfaces of the one or more target locations with or without the fork carriage making contact with the one or more surfaces.

In another embodiment, the present disclosure is directed to an apparatus comprised of an assembly of parts operationally configured to carry one or more items to one or more target locations and automatically remove at least one item from the apparatus onto one or more surfaces of the one or more target locations.

In another embodiment, the present disclosure is directed to an apparatus comprised of an assembly of parts. In one embodiment, the apparatus is operationally configured to engage a portable platform in a manner effective to carry the portable platform and its contents to one or more target locations and automatically remove all or a portion of the contents from the portable platform onto one or more surfaces of one or more target locations.

In another embodiment, the present disclosure is directed to an apparatus operationally configured to (1) carry one or more items to one or more target surface locations and (2) remove at least one item from the apparatus in a manner effective for one or more persons to catch or otherwise control items removed from the apparatus for manual placement of the removed items upon one or more surfaces at one or more target surface locations.

In another embodiment, the present disclosure is directed to an apparatus operationally configured to carry one or more items and dispense of one or more items off from the apparatus.

In another embodiment, the present disclosure is directed to an apparatus operationally configured for use in the roofing industry for carrying dispensing bundles of shingles off from the apparatus.

In another embodiment, the present disclosure is directed to an apparatus, system and method for carrying one or more bundles of shingles to one or more elevated locations and automatically unloading one or more bundles of shingles at the one or more elevated locations. The one or more bundles of shingles may be automatically unloaded off from an apparatus of this disclosure directly onto a roof surface and/or automatically unloaded directly onto a temporary support surface located on a roof surface.

In another embodiment including house roofing operations, the present disclosure is directed to an apparatus, system and method for the carrying and automated placement of bundles of shingles onto roof surfaces including, but not necessarily limited to flat roofs, inclined roofs, and combinations thereof.

In another embodiment including building construction and/or house roofing type operations, the present disclosure is directed to an apparatus, system and method for the delivery of one or more bundles of shingles onto target roof surfaces and/or other elevated surfaces without any persons being located on the target roof surface and/or other elevated surfaces, which may be referred to herein as "automated shingle delivery" and/or "person free shingle delivery."

In another embodiment, the present disclosure is directed to a system and method for delivering one or more building materials and/or other items, including but not necessarily limited to bundles of shingles, to one or more target surfaces including one or more elevated target surfaces without any persons being located on or near the one or more target surfaces. The system and method may be referred to as a person free system for delivery one or more building materials and/or other items and a person free method of delivery one or more building materials and/or other items.

In another embodiment, the present disclosure is directed to a portable support for stopping, holding or otherwise retaining (collectively "capture") building materials and/or other items on one or more target surfaces. Exemplary target surfaces may include, but are not necessarily limited to one or more elevated surfaces such as roofs, bridges, overpasses, building ledges, construction floors of structures, tower platforms, ship decks including barge and boat decks, balconies, shipping containers, train flatcars, warehouse storage surfaces and loading docks, and combinations thereof. A portable support of this disclosure may be built to scale.

In another embodiment, the present disclosure is directed to one or more portable supports operationally configured to be installed on one or more target surfaces without the use or need for persons to be located at or on the one or more target surfaces to assist with installation of the one or more portable supports on the one or more target surfaces. In other words, the one or more portable supports of this disclosure may be introduced onto one or more target surfaces via one or more fully automated modes of installation without the need for fasteners, clamps, adhesives, tie downs, and combinations thereof. Likewise, building materials and/or other items may be delivered to the one or more portable supports in one or more fully automated modes of delivery and/or manually as may be desired or otherwise required.

In another embodiment, the present disclosure is directed to a portable support for stopping, holding or otherwise retaining building materials and/or other items on one or more target surfaces, the portable support being operationally configured to accommodate a plurality of roof pitches and roof ridges with or without ride vents, e.g., shingle-over vents and aluminum vents.

In another embodiment, the present disclosure is directed to a portable support for stopping, holding or otherwise retaining building materials and/or other items on one or more target surfaces, the portable support being operationally configured to (1) accommodate dissimilar roof pitches on either side of a roof's peak and/or (2) accommodate roofs with different surface areas on either side of a roof's peak.

In another embodiment, the present disclosure is directed to a portable support for stopping, holding or otherwise retaining building materials and/or other items on one or both sides of a roof's peak at a first location along a roof. The portable support may be moved to a second location of the roof for further operation even in instances including the pitch of the roof at the second location being different from the pitch of the roof at the first location.

In another embodiment, the present disclosure is directed to a portable support for stopping, holding or otherwise retaining building materials and/or other items on one or more target surfaces including, but not necessarily limited to one or more inclined surfaces. In an embodiment of an inclined surface such as a pitched roof, the portable support is operationally configured to prevent items from moving, e.g., rolling, sliding, down the inclined surface passed the portable support.

In another embodiment, the present disclosure is directed to a lightweight and portable support for stopping, holding or otherwise retaining building materials and/or other items on one or more target surfaces, wherein the portable support may be transported to a target surface in a first orientation or arrangement and installed on the target surface in a different orientation or arrangement, e.g., a portable support may be transported in a folded or wound type arrangement and unfolded or unwound for installation on the target surface.

In another embodiment, the present disclosure is directed to a portable support provided as an assembly operationally configured as a support for stopping, holding or otherwise retaining building materials and/or other items on a target surface. In one embodiment, the portable support may be assembled and then transported to a location of a target surface. In another embodiment, the portable support may be assembled on location, i.e., at a location of a target surface prior to use.

In another embodiment, the present disclosure is directed to a portable support operationally configured to engage one or more pitched roof surfaces at the peak of the roof and stop, hold or otherwise retain one or more building materials and/or other items on one or both sides of the roof.

In another embodiment, the present disclosure is directed to a portable support operationally configured to engage a roof at its ridge or ridge vent and hold or retain one or more building materials and/or other items on one or both sides of the roof.

In another embodiment, the present disclosure is directed to a portable support operationally configured to engage a roof in a manner effective to hold the portable support in a fixed position on the roof.

In another embodiment, the present disclosure is directed to a portable support including one or more catch members operationally configured to engagement a roof at its ridge or ridge vent in a manner effective to hold the portable support in a fixed position on the roof.

In another embodiment, the present disclosure is directed to a portable support for stopping, holding or otherwise retaining building materials and/or other items on a plurality of roof types including, but not necessarily limited to flat roofs, lean-to roofs, shed roofs, open gable roofs, box gable roofs, dutch gable roofs, clerestory roofs, hip roofs, cross-gable roofs, cross-hipped roofs, gambrel roofs, mansard roofs, saltbox roofs, and pyramid hip roofs regardless the length of a target roof ridge for installing the portable support.

In another embodiment, the present disclosure is directed to a system for delivering one or more building materials to one or more elevated target surfaces, including (1) one or more portable supports operationally configured for installation on the one or more elevated target surfaces to hold or retain building materials and/or other items thereon and (2) one or more automated apparatuses operationally configured to lift one or building materials and unload the one or more building materials onto the one or more elevated target surfaces in a manner effective to be held or retained by the one or more portable supports.

In another embodiment, the present disclosure is directed to a portable support for stopping, holding or otherwise retaining building materials and/or other items on a pitched roof at varying distances from the ridge of the roof.

In another embodiment, the present disclosure is directed to a portable support for stopping, holding or otherwise retaining building materials and/or other items on one or more non-planar surfaces. Non-planar surfaces may include, but are not necessarily limited to curved surfaces, surfaces defined by angles, irregular shaped surface defined by dimples and/or protuberances.

In another embodiment, the present disclosure is directed to a system and method for delivering one or more building materials and/or other items to one or more target surfaces including elevated surfaces without the use of working personnel at the one or more target surfaces. The system includes one or more portable supports operationally configured to be installed on one or more target surfaces without working personnel and/or other individuals being located on the one or more target surfaces for installation purposes. The system also includes an apparatus operationally configured to hold, carry and transport one or more building materials and/or other items to one or more target surfaces and remove the one or more building materials and/or other items from the apparatus onto one or more portable supports or part thereof without working personnel and/or other individuals being located on the one or more target surfaces for delivery of the one or more building materials and/or other items. In an embodiment where the one or more target surfaces include one or more elevated surfaces, the one or more portable supports may be installed and the one or more building materials and/or other items may be delivered to the one or more elevated surfaces without any persons being located at or on the one or more elevated surfaces. In one mode of operation, the apparatus may deliver a first portable support to one or more target surfaces where the first portable support may be operationally configured to self-install atop one or more target surfaces or the apparatus may be operationally configured to direct the first portable support to an installed orientation on a target surface. Once the first portable support is installed, the apparatus may deliver one or more building materials and/or other items to the one or more target surfaces in a manner effective for the first portable support to hold and/or retain the one or more building materials and/or other items on the one or more target surfaces. The apparatus may also be used to install one or more additional portable supports to the one or more target surfaces. The size and/or shape of one or more portable supports may be configured as desired for operation with one or more building materials and/or other items and configured as desired for operation with one or more particular support surfaces.

In another embodiment, the present disclosure is directed to a system and method for delivering one or more bundles of shingles to one or more target roofs of varying pitch without the use of working personnel at the one or more target surfaces. The system and method may include providing one or more portable supports to be installed on one or more target roofs and an apparatus operationally configured carry one or more bundles of shingles and remove one or more bundles of shingles from the apparatus onto one or more target roofs in a manner effective to be held by one or more portable supports installed on the one or more target roofs.

In another embodiment, the present disclosure is directed to a system and method for delivering one or more bundles of shingles to one or more target roofs of varying pitch without the use of working personnel at the one or more target surfaces. The system and method may include providing one or more portable platforms to be installed on one or more target roofs and an apparatus operationally configured carry one or more bundles of shingles and remove one or more bundles of shingles from the apparatus onto the one or more portable platforms.

As discussed herein, the present disclosure is directed to an apparatus operationally configured to carry one or more items such as a unit load and remove the unit load or part thereof from the apparatus onto one or more surfaces at one or more target locations in an automated manner, i.e., without manual assistance. The apparatus may include one or more support members providing one or more support surfaces operationally configured to carry a unit load and/or one or more other items. The apparatus may also include one or more support members operationally configured to hold, grab, clamp, engage, hoist, carry, couple or mate with a portable platform and remove one or more items such as a unit load or part of a unit load from the portable platform onto one or more surfaces at one or more target locations in an automated manner. In building construction and/or remodeling and/or repair type operations, an apparatus of the present disclosure may be lifted and directed to one or more target locations near a roof or other elevated surface whereby the apparatus is operationally configured to remove one or more items from the apparatus and/or a portable platform on the apparatus. The one or more items to be carried by and removed from the apparatus are not limited to any particular type, size or shape of item. In building or construction type operations, items to be carried by and removed from the apparatus may include stackable items and/or non-stackable items. Examples of stackable items include, but are not necessarily limited to boxed items and other packaged items, bundles of shingles or shingle bundles, solar panels, wall panels, masonry bricks, ice blocks, tiles, lumber wood, drywall sheets, bagged sand, bagged mulch, bagged gravel, pipe, rolled materials, e.g., rolled felt, rolled flashing, rolled coverstrip, and combinations thereof. Examples of non-stackable items include, but are not necessarily limited to food items, loose items such as rocks/stones, sand, mulch, gravel, dirt, garbage type items, and the like. In one non-limiting example including bundles of shingles stacked in rows atop a portable platform, an apparatus of the present disclosure may be employed to carry the portable platform and bundles of shingles to one or more target locations near a roof or other elevated surface whereby the apparatus is operationally configured to remove the bundles of shingles from the portable platform in a non-destructive automated manner onto the roof or other elevated surface without requiring any manual assistance or other mechanical assistance to remove the bundles of shingles from the portable platform.

Figure 1:
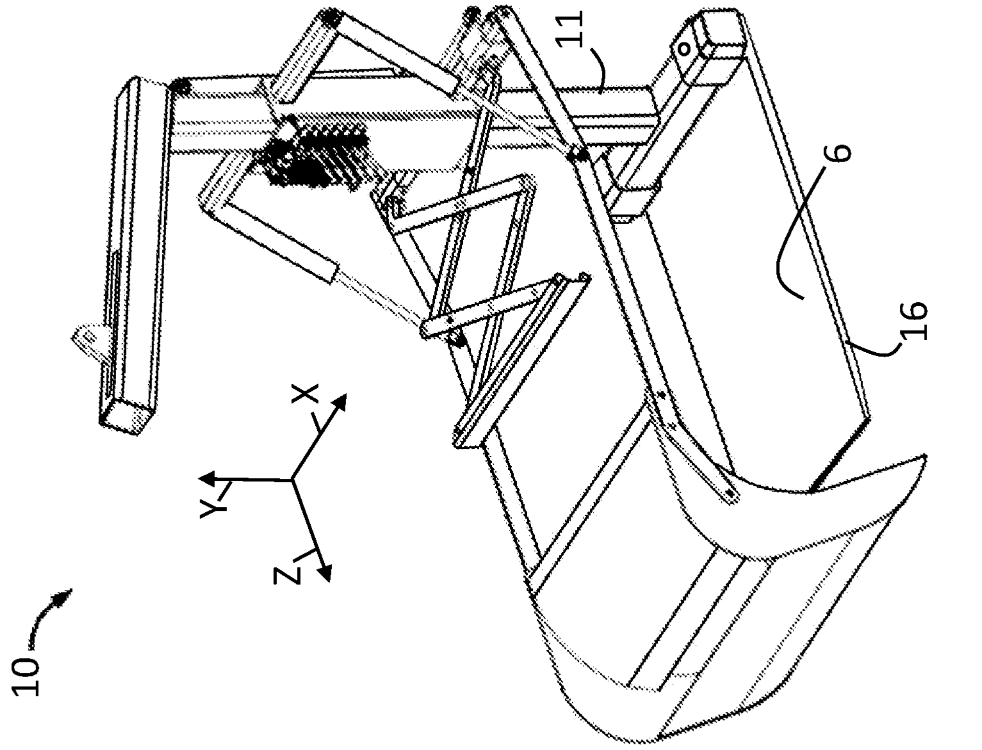
FIG. 1 is a front perspective view of an embodiment of an apparatus of the present disclosure.

One embodiment of an apparatus 10 of the present disclosure is provided in FIGS. 1-17. As shown, the apparatus 10 includes a frame 11 or frame assembly operationally configured to provide structural strength to the apparatus 10, provide one or more surfaces for attachment and/or operation of other apparatus 10 components and parts, and communicate the apparatus 10 with lifting equipment as described below. In this embodiment, the frame of the apparatus 10 includes at least an elongated horizontal base section (hereafter "first frame section 15") defined by a longitudinal center line, an elongated vertical intermediate section (hereafter "second frame section 20") defined by a longitudinal center line including a proximal end 32 attached to the first frame section 15 in a fixed position, and an elongated upper section defined by a longitudinal center line extending out from a distal end 36 of the second frame section 20 in a fixed forward position of the apparatus 10 (hereafter "third frame section 25"). As depicted in FIGS. 1 and 2, the apparatus 10 may include one or more support members ("one or more supports") in the form of a platform or platform type support 16 (hereafter "platform support 16") attached to and extending out from the first frame section 15 including an upper support surface 6 operationally configured to carry a unit load 300 and/or other items thereon. The platform support 16 may be provided as a planar type member as shown or as a non-planar member. In one embodiment, the platform support 16 may be releasably attachable to the first frame section 15 (see FIG. 1). In another embodiment, the platform support 16 may be provided as part of the first frame section 15 (see FIG. 2).

Figure 3:
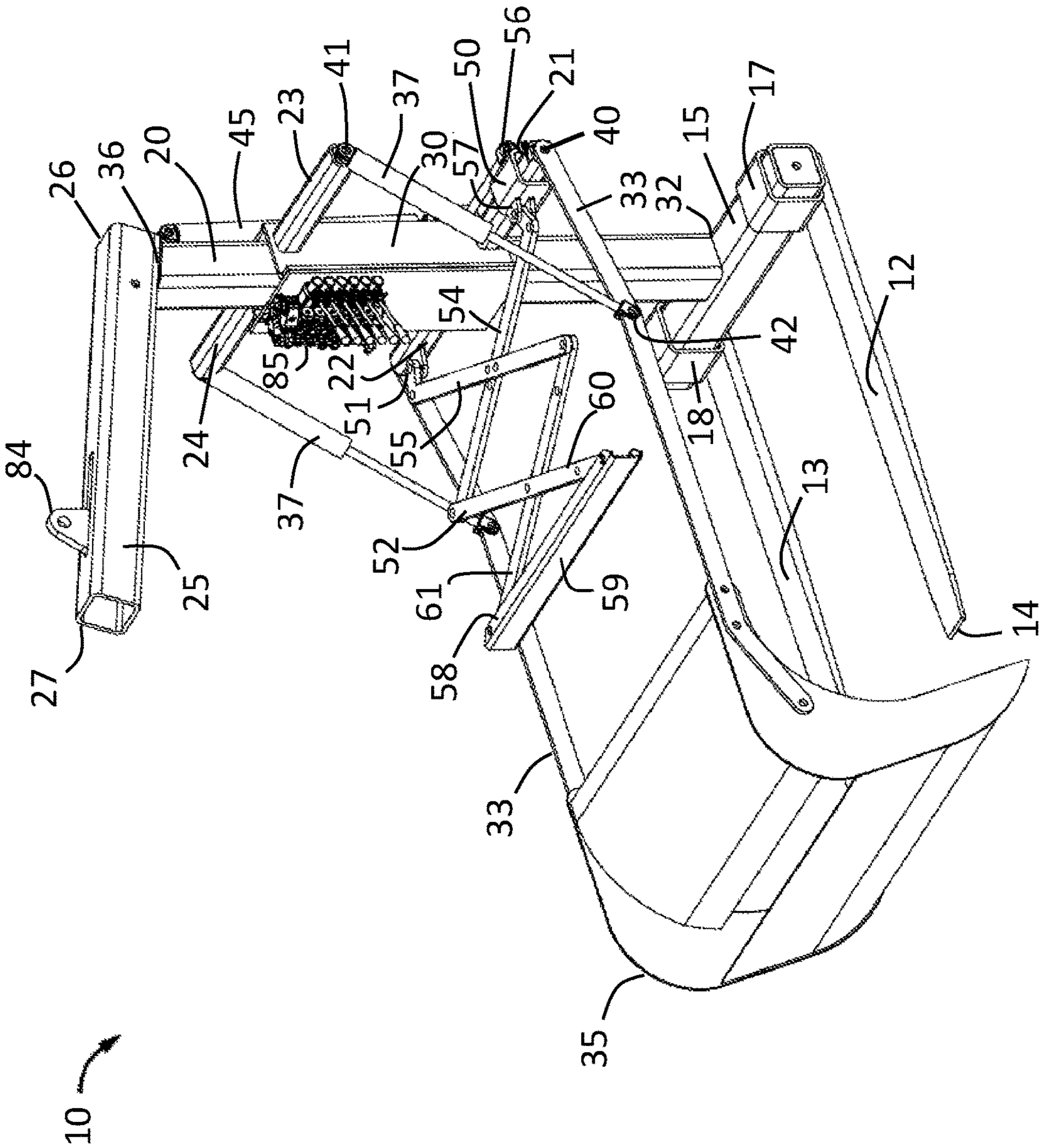
FIG. 3 is a front perspective view of an embodiment of an apparatus of the present disclosure.
Figure 4:
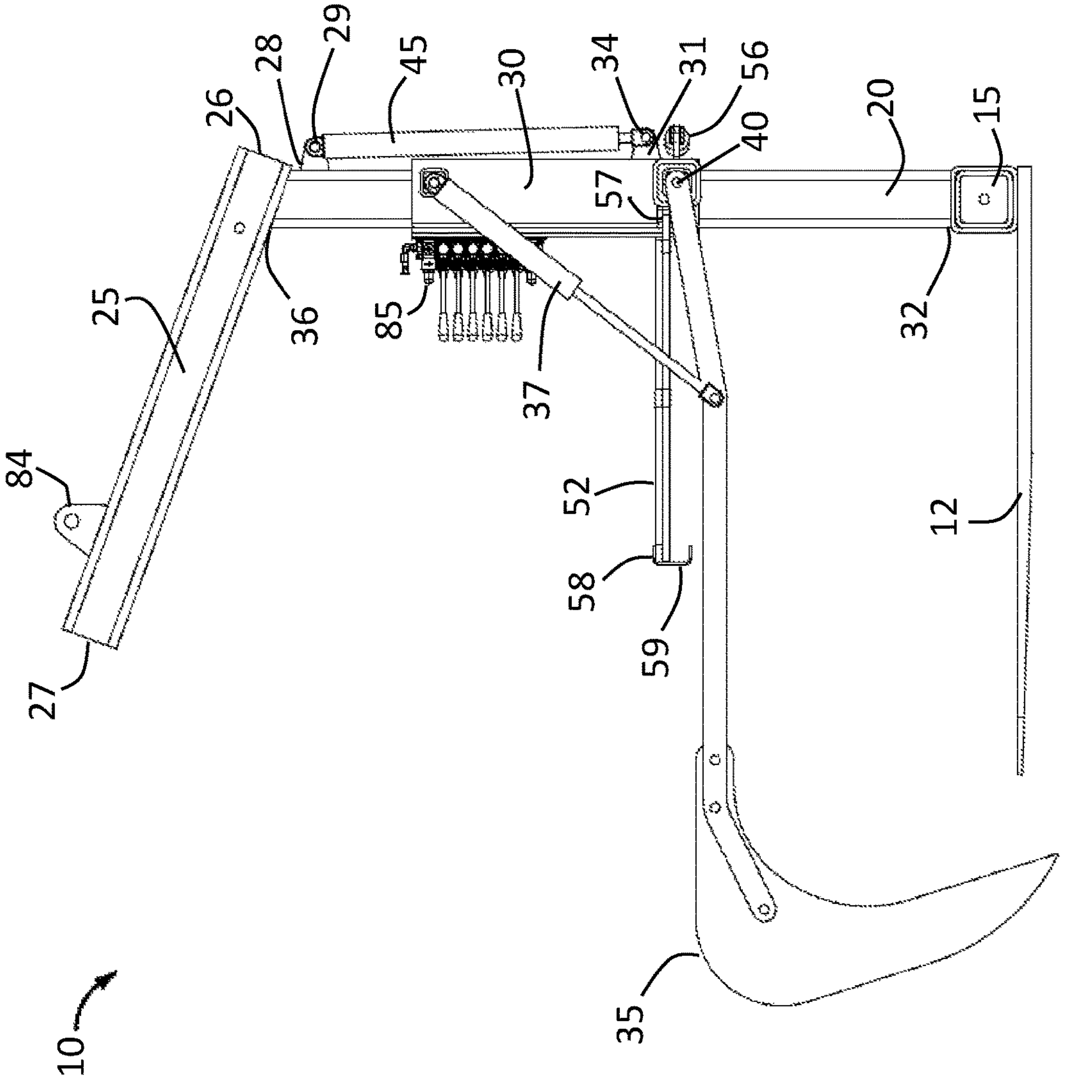
FIG. 4 is a side view of the apparatus of FIG. 3.
Figure 5:
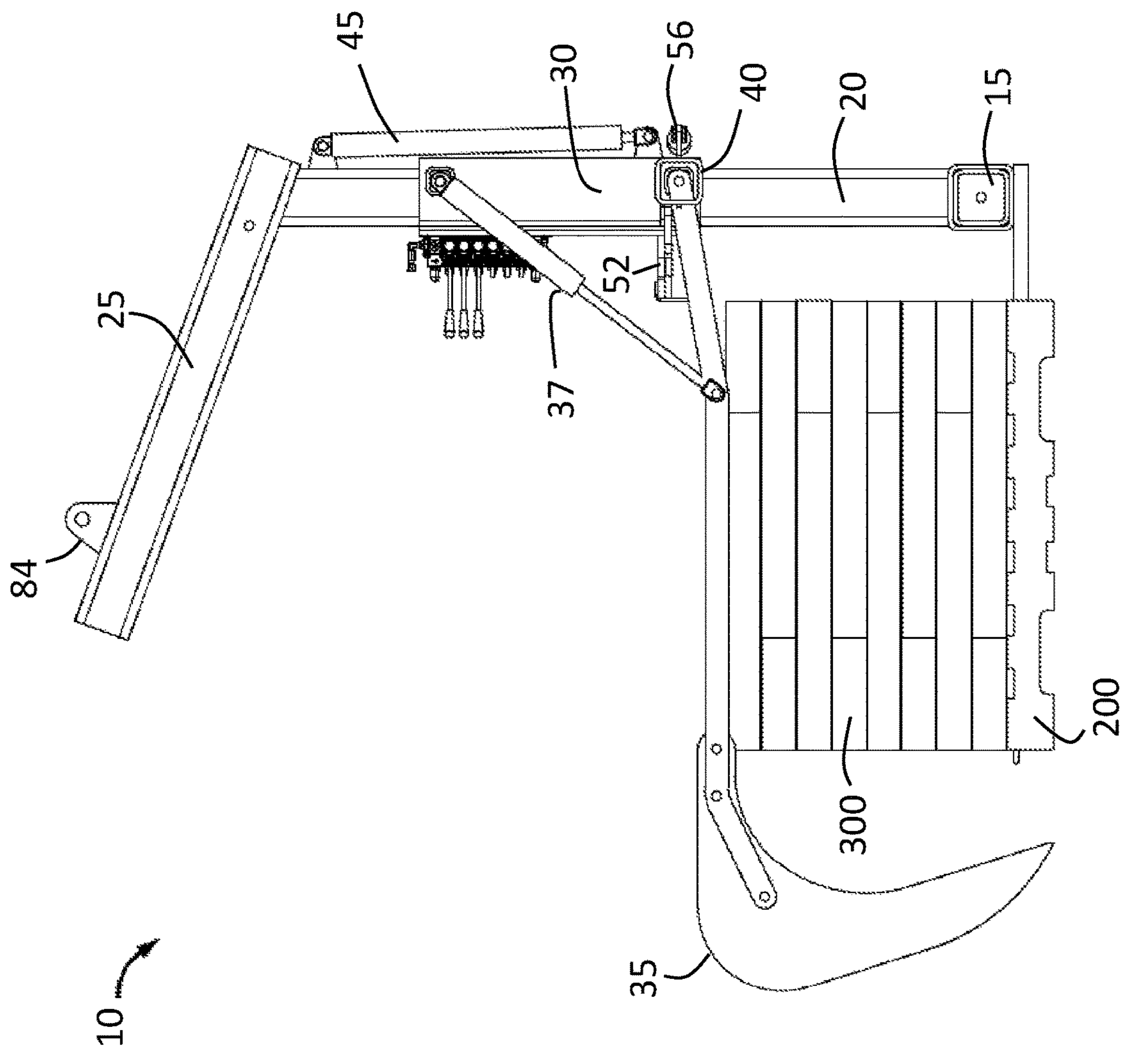
FIG. 5 is a side view of the apparatus of FIG. 3 including a portable platform and a unit load in communication with the apparatus.

As depicted in FIGS. 3-5, in another implementation the apparatus 10 may include one or more support members with one or more support surfaces in the form of fork tines 12 and 13 attached to and extending out from opposing ends of the first frame section 15 in parallel or substantially parallel. Suitably, the one or more support members are operationally configured to hold one or more items thereon in a manner effective to transport and remove one or more items off from the apparatus 10. In addition, the one or more support members may also be operationally configured to engage and/or hold and/or carry a portable support platform or "portable platform 200" and its contents, e.g., a unit load 300, during operation of the apparatus 10. In addition, the types of one or more support members may be interchangeable for use according to one or more particular apparatus 10 operations. In another embodiment, fork tine type support members may be provided having widths effective for the fork tines to abut near or at the middle of the first frame section providing a two part platform type support similar in operation as the platform support 16 as shown in FIGS. 1 and 2. For purposes of discussion, the apparatus 10 of this embodiment will be discussed in terms of having fork tines 12 and 13 operable with one or more portable platforms 200.

For purposes of the present disclosure, a portable platform 200 may include, but is not necessarily limited to one or more pallets, skids, crates, cartons, baskets, racks, trays, boxes, and the like. As understood by the skilled artisan, a pallet is characterized by a top deck platform portion and a bottom deck for structural support and a skid is characterized by a single-deck without a bottom deck. Non-limiting examples of pallets may include two-way pallets and four-way pallets as such terms are known in the art. Exemplary two-way pallet styles may include (1) reversible pallets, (2) closed boarded, no base board pallets, and (3) wing type pallets. Exemplary four-way pallets may include (1) close boarded, three base pallets, (2) perimeter base pallets, (3) wing type pallets, (4) close boarded, perimeter base pallets, and (5) open boarded, three base pallets. Another exemplary pallet may include a EUR pallet as such term is understood by the skilled artisan. Commercially available pallets and skids may be constructed from materials including, but not necessarily limited to one or more woods, one or more pressed woods, one or more plastics, one or more rubbers, one or more metals, one or more cardboard materials, one or more composite materials, and combinations thereof. Without limiting the disclosure and for purposes of explanation, the apparatus 10 of this embodiment will be discussed in terms of carrying a pallet 200 with a planar horizontal support surface for receiving and carrying a unit load 300 thereon, e.g., a stack of bundles of shingles, and removing the unit load 300 from pallet 200 onto a roof and/or elevated surface of a commercial or residential structure.

Suitably, the first frame section 15 is disposed along an X-axis, the second frame section 20 is disposed along a Y-axis and the third frame section 25 is disposed along a Z-axis (see FIG. 1). In this embodiment, the third frame section 25 extends out from its attachment point with the distal end 36 of the second frame section 20 forming an angle whereby a distal end 27 of the third frame section 25 terminates at a point higher in elevation than its proximal end 26 attached to the second frame section 20. In this embodiment, the distal end 36 of the second frame section 20 acts as a support surface or seat for the third frame section 25 wherein the surface configuration of the distal end 36 establishes the angle of the third frame section 25 in relation to the second frame section 20. For example, in an embodiment where the distal end 36 of the second frame section 20 includes a flat horizontal surface configuration, a four sided third frame section 25 extends out from the second frame section 20 horizontally forming a right angle with the second frame section 20. In this embodiment, each of the first frame section 15, the second frame section 20 and the third frame section 25 are provided as elongated four sided members. Each of the first frame section 15, the second frame section 20 and the third frame section 25 may be provided as solid members, hollow members, or a combination thereof. In an embodiment configured to minimize the total weight of the apparatus 10, the first frame section 15, the second frame section 20 and the third frame section 25 may be provided as hollow members. In another embodiment, the first frame section 15, the second frame section 20 and third frame section 25 may be provided in one or more different surface shapes or surface configurations, e.g., solid and/or hollow cylindrical members, three-sided member, hexagonal member, oval shaped tubular members, and combinations thereof. In one embodiment, the first frame section 15, the second frame section 20 and the third frame section 25 may be provided as independent members, e.g., first frame member, second frame member, and third frame member, releasably assembled or permanently assembled. In one embodiment, the first frame section 15, the second frame section 20 and the third frame section 25 may be releasably secured together via fasteners such as nut/bolt type fasteners and/or other threaded fasteners. In another embodiment, the first frame section 15, the second frame section 20 and the third frame section 25 may be secured together via welds providing a fixed frame of the apparatus 10. In another embodiment, the first frame section 15, the second frame section 20 and the third frame section 25 may be provided as a one-piece construction.

For purposes of operation with unit loads 300 of varying heights, the apparatus 10 includes an adjustable assembly secured to the frame. As shown, the adjustable assembly includes a slide member 30 secured to the second frame section 20 in a manner effective for the slide member 30 to travel along the second frame section 20 a distance equal to or less than the length of the second frame section 20. In this embodiment, the slide member 30 is provided as a vertically oriented sleeve enclosing part of the second frame section 20, the total surface of the second frame section 20 enclosed being dictated according to the length of the slide member 30. In one embodiment, the inner surface of the slide member 30 may include the same or substantially similar shape and inner dimensions as the shape and outer dimensions of the second frame section 20 providing a form fit of the slide member 30 with the second frame section 20. In another embodiment, the inner dimensions of the slide member 30 may be greater than the outer dimensions of the second frame section 20 providing spacing for one or more materials to be fitted there between for purposes of wear protection, e.g., wear pads (also referred to as "slide pads") and the like. Also, in another embodiment the slide member 30 may be provided in a configuration to minimize material usage, e.g., a slide member 30 with one or more apertures there through or a frame type slide member 30.

As shown, the slide member 30 includes linear attachments, namely, (1) a first horizontal attachment surface 21 extending out perpendicular from a first side of the slide member 30 at a first elevation along the slide member 30, (2) a second horizontal attachment surface 22 extending out perpendicular from an opposite second side of the slide member 30 at the first elevation, (3) a third horizontal attachment surface 23 extending out perpendicular from the first side of the slide member 30 at a second elevation along the slide member 30, and (4) a fourth horizontal attachment surface 24 extending out perpendicular from the second side of the slide member 30 at the second elevation. In another embodiment, the first and second horizontal attachment surfaces 21, 22 may be provided as a single elongated member attached to the front side or back side of the slide member 30. Likewise, the third and fourth horizontal attachment surfaces 23, 24 may be provided as a single elongated member attached to the front side or back side of the slide member 30. In another embodiment, the first and second horizontal attachment surfaces 21, 22 and/or the third and fourth horizontal attachment surfaces 23, 24 may extend out from the slide member 30 in a non-perpendicular configuration.

The adjustable assembly further includes a guide assembly operationally configured to direct one or more items off from the apparatus 10 to one or more locations. The guide assembly of this embodiment includes (1) one or more arm members 33 pivotally attached to the first and second horizontal attachment surfaces, 21 and 22; (2) a non-planar guide member 35 attached at the distal end(s) of the one or more arm members 33 and (3) one or more first linear actuators 37 attached to the third and fourth horizontal attachment surfaces 23 and 24 as shown. Suitably, the one or more arm members 33 are pivotally attached at the distal ends of the first and second horizontal attachment surfaces 21 and 22 (see pivot point 40). In this embodiment, a first end of the one or more first linear actuators 37 are pivotally attached at the distal ends of the third and fourth horizontal attachment surfaces 23 and 24 (see pivot point 41) and a second end of the one or more first linear actuators 37 are pivotally attached to the one or more arm members 33 at pivot point 42. In one embodiment, the one or more linear actuators 37 may be provided as double acting hydraulic cylinders including a bore at a tail end for pivotal attachment to the distal ends of the third and fourth horizontal attachment surfaces 23, 24 and a drive rod having a distal end pivotally attached to the one or more arm members 33. In another embodiment, the one or more hydraulic cylinders 37, and other cylinders described herein, may be provided as single acting cylinders. In another embodiment, the one or more hydraulic cylinders 37 may be pivotally attached to the third and fourth horizontal attachment surfaces 23, 24 and one or more arm members 33 in a reverse arrangement. In another embodiment, the one or more linear actuators 37 may be provided as one or more pneumatic cylinders. In another embodiment, the one or more linear actuators 37 may be provided as mechanical actuators, e.g., screw jacks. In one suitable embodiment, the one or more hydraulic cylinders 37 may be pivotally attached to the third and fourth horizontal attachment surfaces 23, 24 and one or more arm members 33 via pivot pins, fasteners such as hex bolts and hex nuts, clips, e.g., spring clips or other clips, pins, socket head screws, flange nuts, flange bolts, bearings such as flange bearings or two or more piece split bearings commonly referred to as "trunnion mounts."

As shown in FIGS. 3 and 4, the one or more arm members 33 may be provided as flat bar members. In another embodiment, the one or more arm members 33 may be provided as rectangular members. In another embodiment, the one or more arm members 33 may be provided as tubular members. In still another embodiment, the one or more arm members 33 may be provided as angled or L-shaped members. In still another embodiment, the one or more are members 33 may be provided wider than shown in FIGS. 3 and 4 providing side wall or plate type members on either side a unit load 300 on a portable platform 200.

The adjustable assembly also includes one or more second linear actuators 45 having a first end attached to the second frame section 20 and a second end attached to the slide member 30. In this embodiment, the second frame section 20 and slide member 30 each have an attachment surface or mounting surface as understood by persons of ordinary skill in the art of cylinder connections (see attachment surfaces 28 and 31 in FIG. 4) providing attachment points 29 and 34 for the one or more second linear actuators 45. In one embodiment, the one or more second linear actuators 45 may include at least one double acting hydraulic cylinder as described above wherein the bore at a tail end of the hydraulic cylinder 45 is attached to attachment surface 28 and the distal end of the drive rod is attached to attachment surface 31. Without limiting the disclosure, suitable attachment surfaces 28, 31 may be provided as planar type projections with apertures there through. In one suitable embodiment, the one or more hydraulic cylinders 45 may be attached to attachment surfaces 28 and 31 via fasteners such as hex bolts and hex nuts, clips, e.g., spring clips or other clips, pins, socket head screws, flange nuts, flange bolts, bearings such as flange bearings or two or more piece split bearings. In another embodiment, the one or more second linear actuators 45 may be provided as one or more pneumatic cylinders. In another embodiment, the one or more second linear actuators 45 may be provided as mechanical actuators, e.g., screw jacks.

As stated above, the apparatus 10 may include one or more support members provided as fork tines 12, 13 attached to and extending out from opposing ends of the first frame section 15 in a parallel arrangement. Although the apparatus 10 may be built to scale, in one suitable embodiment for use in the construction industry, the fork tines 12, 13 are operationally configured for use with portable platforms 200 having maximum dimensions as described in Table 1.

TABLE 1

| | |
|---|---|
| Length: | 121.9 cm (48.0 inches); |
| Width: | 121.9 cm (48.0 inches). |

As shown in FIGS. 3 and 4, each of the fork tines 12, 13 includes an adjustable collar 17, 18 mated with opposite ends of the first frame section 15, wherein the fork tines 12, 13 comprise part of its corresponding collar 17, 18, e.g., a bottom portion of each collar 17, 18 as shown. In another embodiment, the fork tines 12, 13 may be provided as part of the first frame section 15 in a fixed one-piece construction.

Without limiting the disclosure, suitable fork tines 12, 13 for use with portable platforms 200 having the maximum dimensions of Table 1 may each include maximum dimensions as described in Table 2.

TABLE 2

| | |
|---|---|
| Length: | 152.4 cm (60.0 inches); |
| Width: | 15.2 cm (6.0 inches); |
| Thickness: | 3.81 cm (1.5 inches). |

Figure 39:
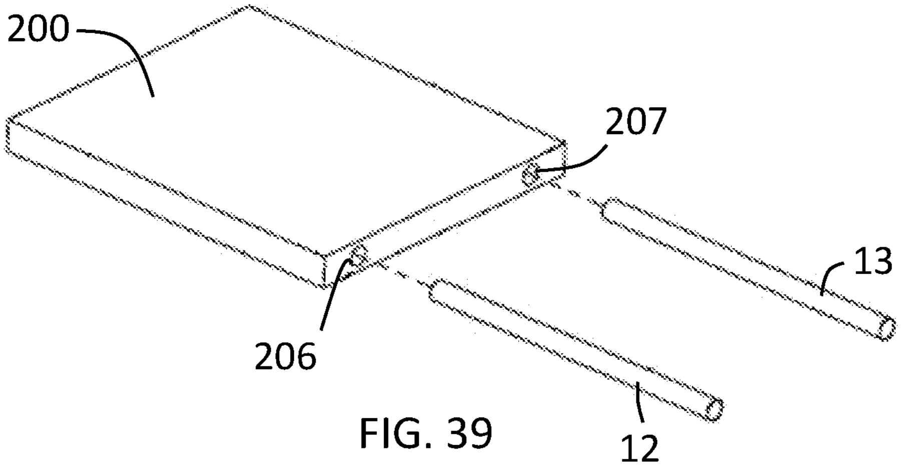
FIG. 39 is a simplified perspective view of a portable platform and corresponding support members of the present disclosure.
Figure 40:
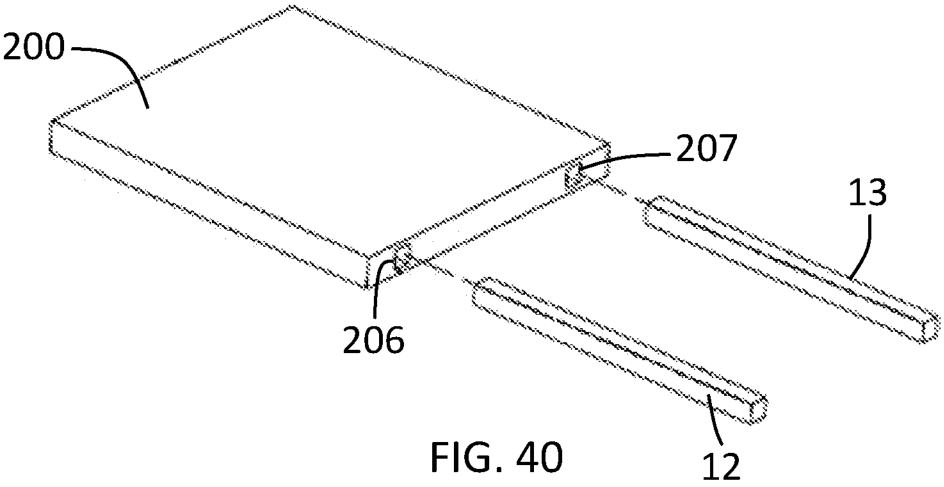
FIG. 40 is a simplified perspective view of a portable platform and corresponding support members of the present disclosure.
Figure 41:
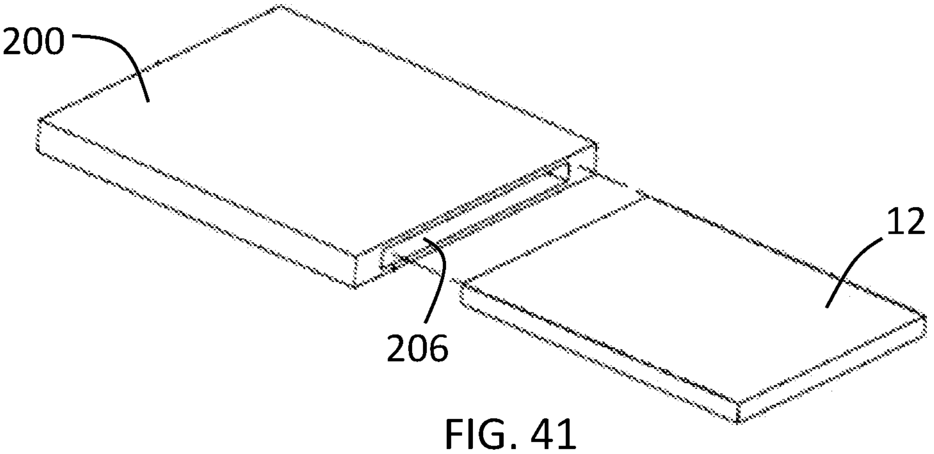
FIG. 41 is a simplified perspective view of a portable platform and corresponding support member of the present disclosure.

As understood by persons of ordinary skill in the art of fork tines, the fork tines 12, 13 of this disclosure may include a planar surface or the fork tines 12, 13 may taper out toward their distal ends as shown (see distal end 14 in FIGS. 3 and 4). Also, the distance between the fork tines 12, 13 may vary as desired or as otherwise required for operation of the apparatus 10 with one or more particular configurations of portable platforms 200. To this end, the apparatus 10 may be provided as part of a system including a particular portable platform 200 having a certain structural configuration and fork tines 12, 13 sized and spaced to interact with a particular portable platform 200 of the system. For example, in one embodiment the fork tines 12, 13 may be provided as cylindrical or tubular members for specific operation with portable platforms 200 having female cylindrical mating surfaces 206, 207 for receiving each of the tubular fork tines 12, 13 (see FIG. 39). In another embodiment, fork tines 12, 13 may be provided in one or more different sizes and shapes as desired—see FIGS. 40 and 41. In such type of system, a portable platform 200 may be provided in a design or configuration specific for a particular apparatus 10, which may influence use and/or reuse of such a particular portable platform 200 and/or serve as a possible deterrent to theft due to the specificity in the design of such a particular portable platform 200. In another embodiment as shown in FIG. 42, a portable platform 200 may include a contact surface 219 operationally configured to engage a target surface of a particular shape as desired, e.g., a portable platform 200 with a wedge shape bottom surface operationally configured to engage a pitched roof.

Figure 43:
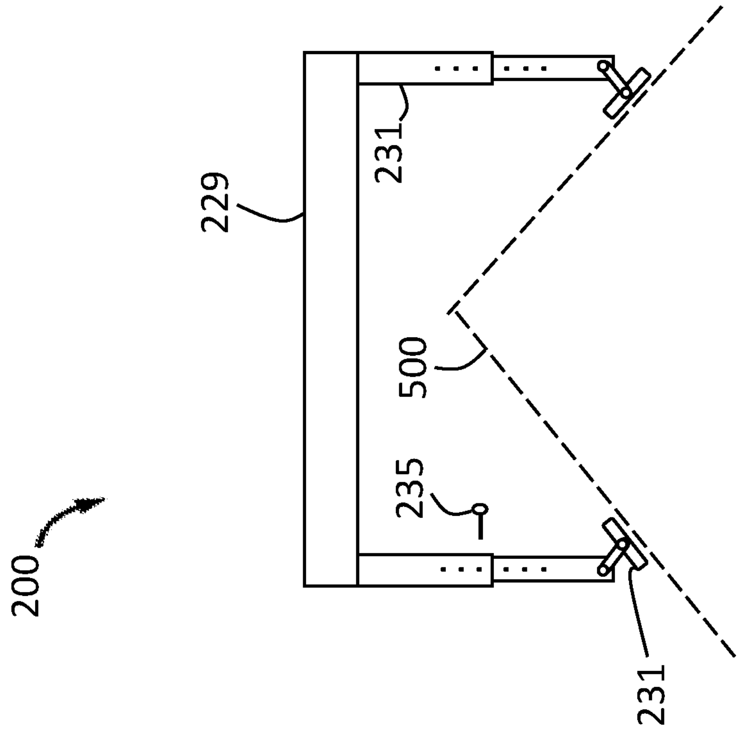
FIG. 43 is a side view of an embodiment of a portable platform of the present disclosure shown positioned over a ridge of a roof.

As shown in FIG. 43, in another embodiment a portable platform 200 may include a support surface 229 and a plurality of adjustable support members 231 and pivotal base members 233 operationally configured to engage a target surface such as a plurality of pitched roofs of varying pitch. In one embodiment, the plurality of support members 231 may include a plurality of holes and fastening pins 235 as understood by the skilled artisan. In another embodiment, the plurality of support members 231 may include threaded members turnable to change the overall length of each support member 231.

Figure 42:
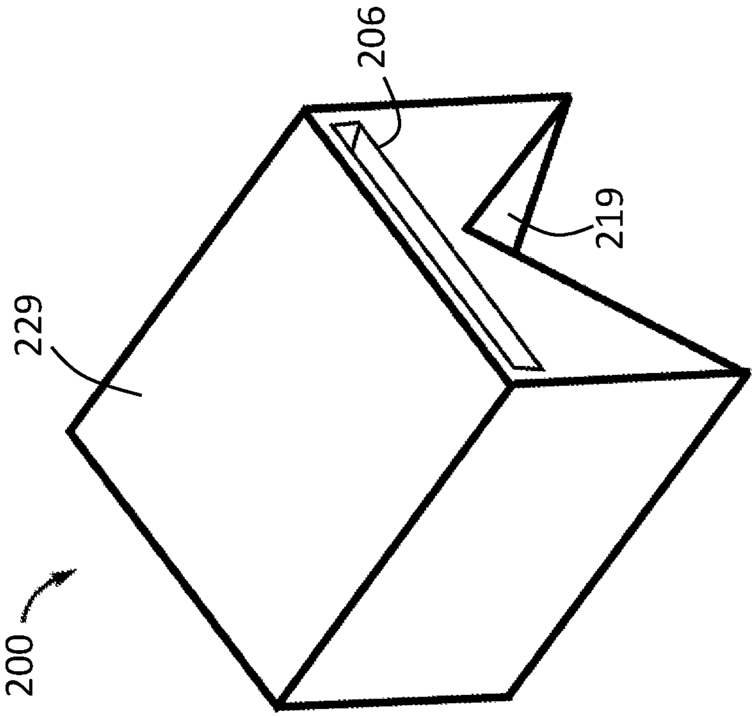
FIG. 42 is a perspective view of an embodiment of a portable platform of the present disclosure.
Figure 44:
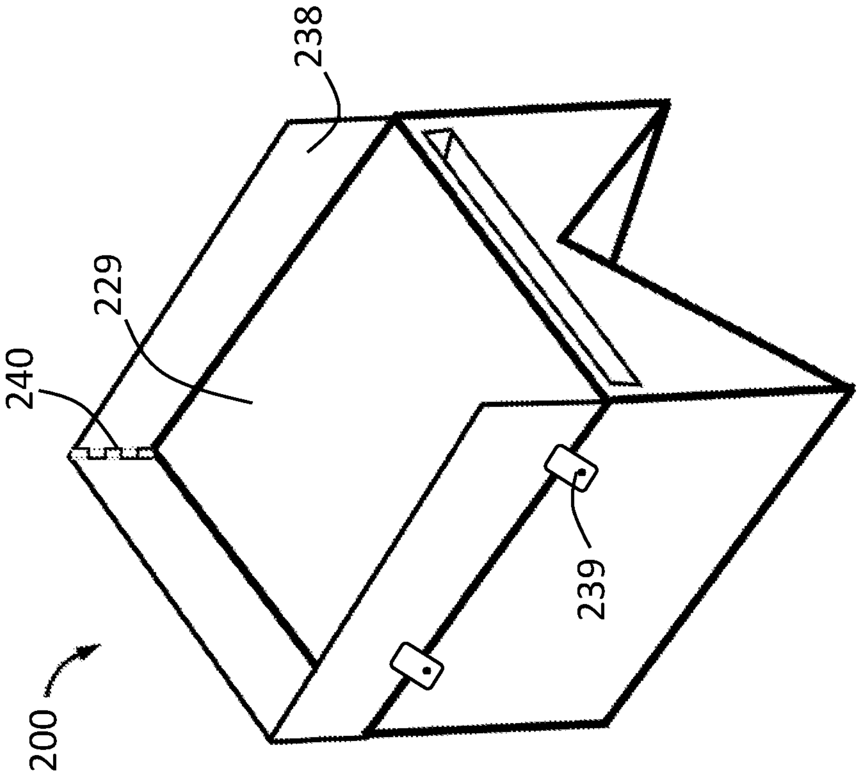
FIG. 44 is a perspective view of an embodiment of a portable platform of the present disclosure.

With reference to FIG. 44, a portable platform 200 as shown in FIGS. 42 and 43 may include one or more raised side walls 238 whereby one or more items of a unit load 300 may be removed from an apparatus 10 onto the support surface 229 and maintained thereon by way of the one or more raised side walls 238 acting as a barrier along at least part of the perimeter of the support surface 229. In one embodiment, the portable platform 200 and the raised side walls 238 may be provided as a one-piece construction. In another embodiment, the raised side walls 238 may be releasably attached to the portable platform via one or more fasteners 239 as shown, one or more male/female fittings, one or more clamps, one or more pins, and combinations thereof. In one embodiment, the raised side walls 238 may be provided as a one-piece member in a fixed configuration. In another embodiment, one or more raised side walls 238 may be provided as individual separate members. In another embodiment, one or more raised side walls 238 may be hingedly attached (see hinge 240) whereby the one or more raised side walls 238 may be folded for storage and/or transport during nonuse. Removable type raised side walls 238 may also be operationally configured for use with a system as described in U.S. Patent Application Publication Number 2015/0021452, titled "System for Adjusting a Pallet for Delivery on a Rooftop," published Jan. 22, 2015; a system as described in U.S. Patent Application Publication Number 2009/0249740, titled "Roofing Shingle Support System," published Oct. 8, 2009; a table as described in U.S. Pat. No. 5,960,904, titled "Work Table for Use on a Peaked Roof," published Oct. 5, 1999; and a pallet as described in U.S. Publication No. 2019/0217989, titled "Peaked Roofing Pallets," published Jul. 18, 2019, each of which is herein incorporated by reference in its entirety.

Figure 112:
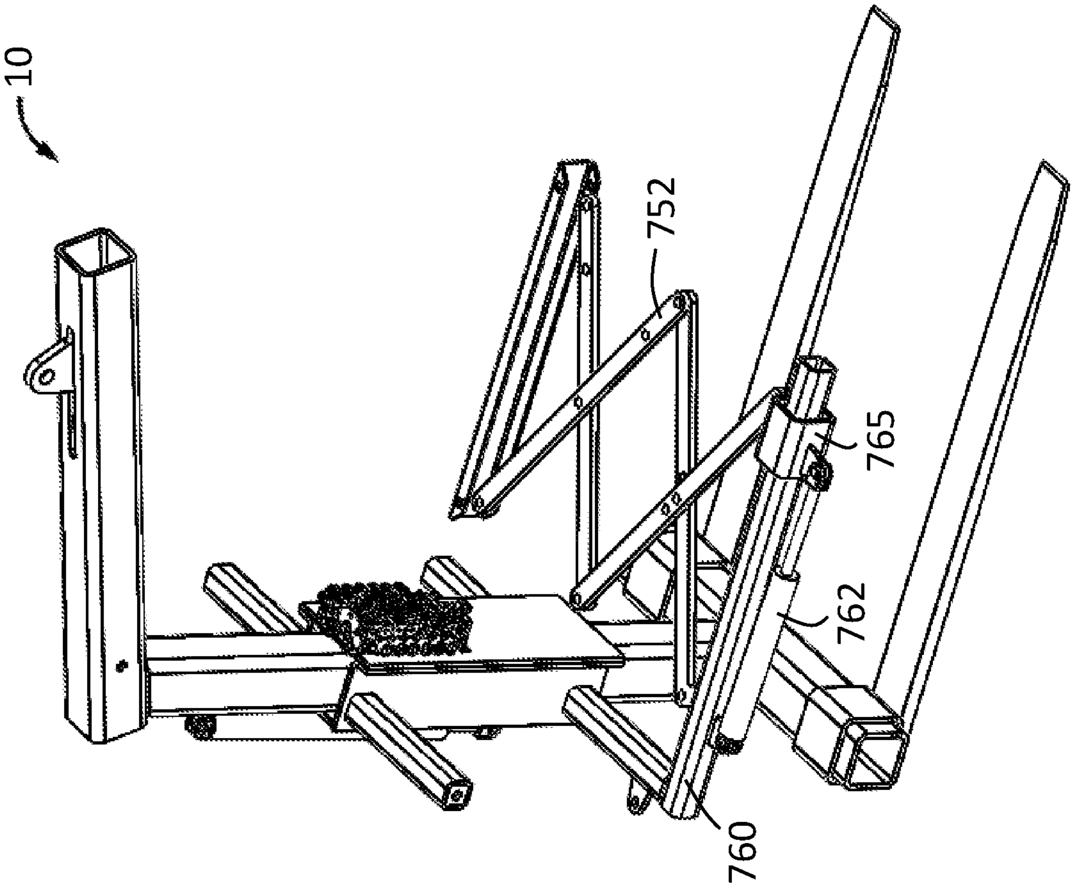
FIG. 112 is a front perspective view of an embodiment of an apparatus of the present disclosure.
Figure 113:
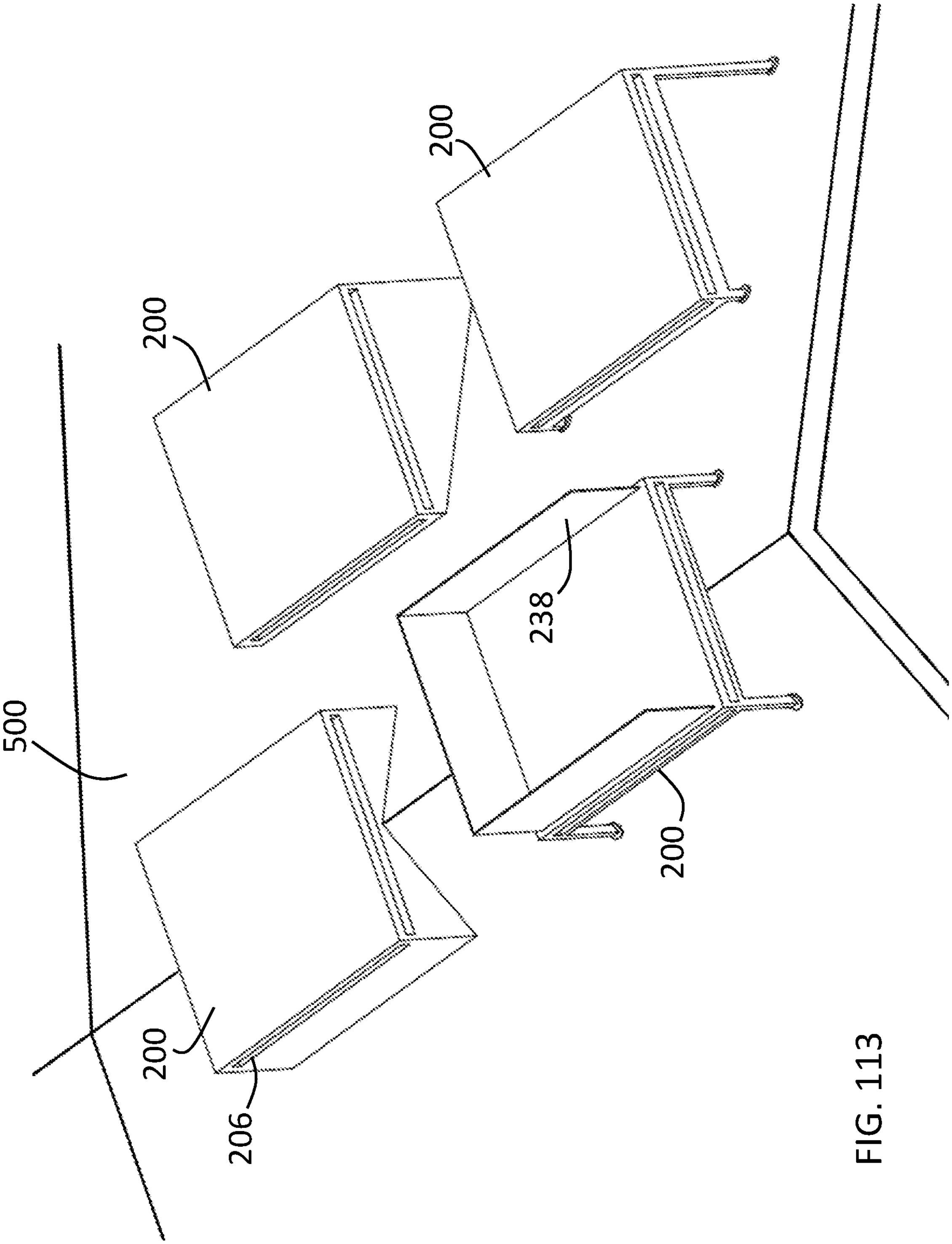
FIG. 113 is a perspective view depicting a roof surface including embodiments of portable platforms thereon.

Other exemplary portable platforms 200 of the present disclosure are depicted in FIG. 112. A portable platform 200 as described in FIGS. 42-44, and 112 may be constructed from one or more materials including, but not necessarily limited to, those materials resistant to chipping, cracking, excessive bending and reshaping as a result of weathering, heat, moisture, other outside mechanical and chemical influences, as well as impacts to the portable platform 200. Particular materials of construction may include, but are not necessarily limited to one or more metals, plastics, rubbers, filled composite materials, woods, and combinations thereof depending on the performance requirements for one or more particular operations of the apparatus 10. Suitable metals include steel, stainless steel, aluminum, and combinations thereof. Suitable plastics include thermoplastics such as polyvinyl chloride ("PVC"), chlorinated polyvinyl chloride ("CPVC"), UHMW polyethylene, high density polyethylene ("HDPE"), low density polyethylene ("LDPE"), polypropylene, and combinations thereof. The one or more raised side walls 238 may be constructed from one more materials effective for use as a barrier operationally configured to maintain one or more items of a unit load 300 on a support surface 229 of a portable platform 200. Suitable materials of construction include, but are not necessarily limited to one or more woods, one or more pressed woods, one or more plastics, one or more rubbers, one or more metals, one or more cardboard materials, one or more composite materials, and combinations thereof. In another embodiment, the one or more raised side walls 238 may include one or more perimeter frame type members with netting, wire, plastic mesh, fencing material, and the like disposed between the one or more perimeter frame type members operable as a barrier for the portable platform 200.

Referring to FIGS. 3 and 4, in one embodiment, the collars 17, 18 may be adjustable along the first frame section 15 from the outer edges of the first frame section 15 inward to a contact position with second frame section 20. In an embodiment of the apparatus 10 for use in the construction industry, the fork tines 12, 13 are suitably spaced apart from each other at a distance of or about 81.3 cm (32.0 inches). In one embodiment, the collars 17, 18 may simply fit over the first frame section 15. In another embodiment, the first frame section 15 may include a row of apertures and each of the collars 17, 18 may include an aperture for receiving a locking pin or the like there through for setting each of the collars 17, 18 in a locked position with the first frame section 15. In still another embodiment, each of the collars 17, 18 may include a threaded aperture for receiving a threaded locking pin there through for applying a force to the outer surface of the first frame section 15 for tightening and holding the collars 17, 18 in a fixed position during operation of the apparatus 10.

Still referring to FIGS. 3 and 4, the apparatus 10 also includes a mover assembly operationally configured to direct a unit load 300 or part of a unit load from a portable platform 200. As discussed below, in one embodiment the mover assembly and adjustable assembly may be operationally configured to remove a unit load 300 comprising one or more rows of stackable items from a portable platform 200 by removing at least each uppermost row of a unit load 300 from its stack until each row of stacked items has been removed from the portable platform 200. In another embodiment, the mover assembly and adjustable assembly may be operationally configured to remove a plurality of uppermost rows of stackable items simultaneously. As shown in FIG. 3, the mover assembly includes (1) an actuation assembly including a horizontal slide member 50 in communication with the first horizontal attachment surface 21 and a (2) push member or push assembly 52 operationally configured to be directed along a plane perpendicular or substantially perpendicular to the longitudinal center line of the second frame section 20 toward and apart from the second frame section 20. In this embodiment, the first horizontal attachment surface 21 is provided as an elongated member defined by a longitudinal axis having a square or other rectangular shape. In another embodiment, the first horizontal attachment surface 21 may be provided as a cylindrical member or other multi-sided member, e.g., three-sided, hexagonal, octagonal, and the like. Suitably, the inner surface of the slide member 50 includes the same or substantially similar shape and inner dimensions as the shape and outer dimensions of the first horizontal attachment surface 21 providing a form fit of the slide member 50 with the first horizontal attachment surface 21. As discussed below, the inner dimensions of the slide member 50 may be greater than the outer dimensions of the first horizontal attachment surface 21 providing spacing for one or more materials to be fitted there between for purposes of wear protection similar as described above.

In this embodiment, the push assembly 52 is provided as a horizontally oriented scissor linkage or lazy-tong configuration as such terms are understood by the skilled artisan including pivot fasteners, e.g., shoulder bolts, hex bolts, pins, bearings, or custom machined shoulder screws or shoulder bolts, linking multiple arms comprising the scissor linkage. As depicted in FIGS. 3 and 4, the push assembly 52 includes a first arm member 54 pivotally attached to the slide member 50 via one or more mounting surfaces or attachment surfaces 57 via a pivot fastener including, but not necessarily limited to a shoulder bolt, hex bolt, pivot pin, bearing, custom machined shoulder screw or shoulder bolt. The push assembly 52 also includes a second arm member 55 pivotally attached to the second horizontal attachment surface 22 at pivot point 51 via a pivot fastener including, but not necessarily limited to a shoulder bolt, hex bolt, pivot pin, bearing, custom machined shoulder screw or shoulder bolt.

The actuation assembly of the mover assembly includes one or more third linear actuators 56 operationally configured to direct the slide member 50 along the first horizontal attachment surface 21 in either direction up to the length of the first horizontal attachment surface 21. One suitable third linear actuator 56 may include a double acting hydraulic cylinder as described above wherein the bore at a tail end of the hydraulic cylinder 56 is attached to the second horizontal attachment surface 22 and the distal end of the drive rod is attached to the slide member 50. In one embodiment, the second horizontal attachment surface 22 and the slide member 50 may be provided with mounting surfaces or attachment surfaces (see attachment surfaces 47 and 48 in FIG. 6) for a hydraulic cylinder 56 similar as attachment surfaces 28 and 31 described above. Also similar as described above, in another embodiment a third linear actuator 56 may be provided as a pneumatic cylinder. In yet another embodiment, a third linear actuator 56 may be provided as a mechanical actuator, e.g., a screw jack.

With particular reference to FIGS. 3-6, the distal end of the push assembly 52 includes a faceplate 58 with a forward facing pushing surface 59 operationally configured to engage one or more items located on a portable platform 200. As shown, two distal arms 60, 61 of the scissor linkage push assembly 52 are pivotally attached to a back side of the face plate 58 (see pivot point 63 in FIG. 6). In this embodiment, the forward pushing surface 59 is provided as a planar type surface disposed along a vertical plane having a width defining the width of the push assembly 52. In another embodiment, the forward pushing surface 59 may include a non-planar surface. The forward pushing surface 59 may also include a surface configuration for use with one or more particular target items to be carried by a portable platform 200. For example, the forward pushing surface 59 may include a curved surface defined by a radius for engaging cylindrical items of a certain outer diameter such as barrels, drums, buckets, and other cylindrical boxes and storage containers. The height of the forward pushing surface 59 may also vary as desired or as otherwise required for a particular operation of the apparatus 10.

Figure 6:
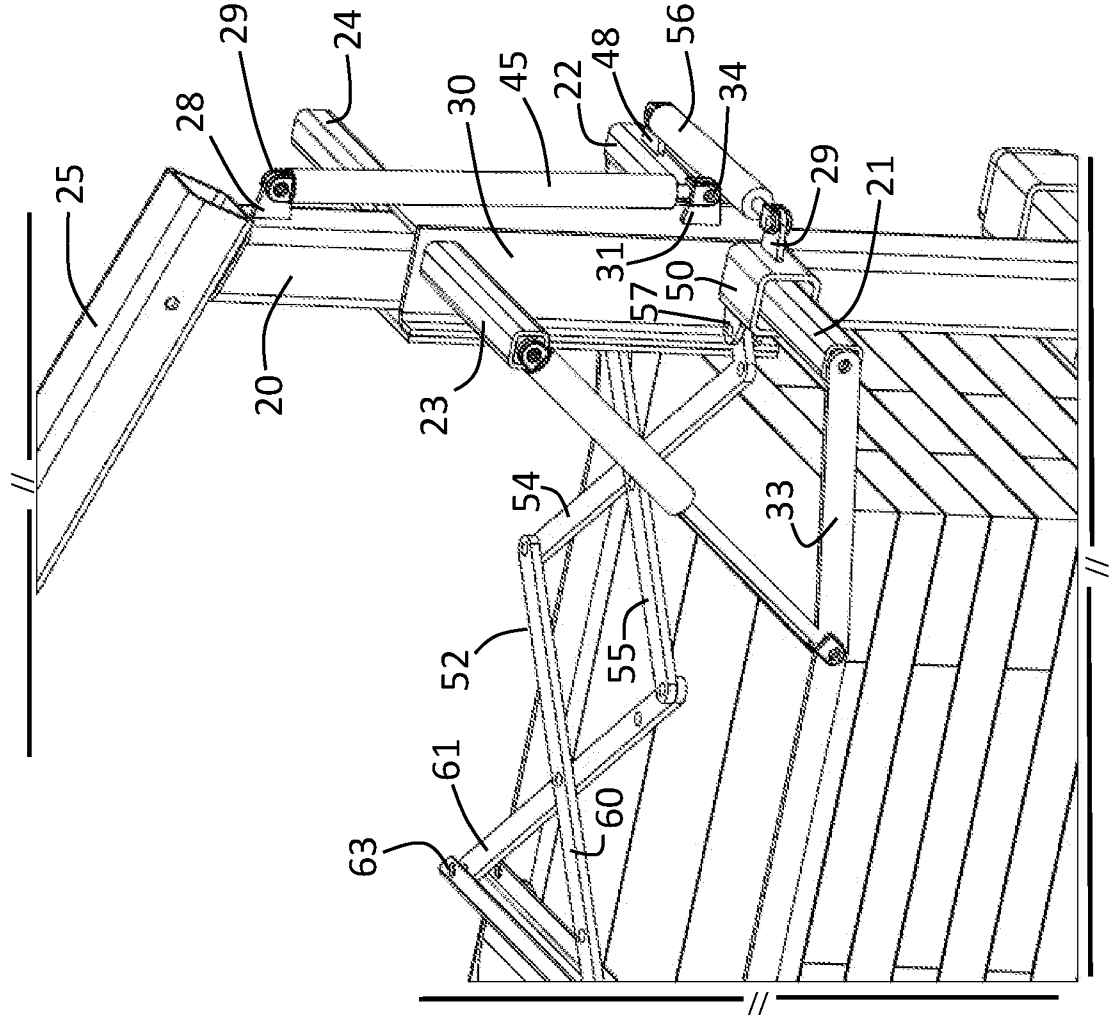
FIG. 6 is a rear perspective view of a portion of the apparatus of FIG. 3.

In operation, the hydraulic cylinder 56 is operationally configured to direct the slide member 50 along the first horizontal attachment surface 21, which dictates the retraction and extension of the push assembly 52 according to its scissor linkage configuration. In particular, as the slide member 50 is directed toward the second frame section 20 the push assembly 52 is directed along a horizontal plane to an extended position as shown in FIGS. 3, 4 and 6. As the slide member 50 is directed away from the second frame section 20, the push assembly 52 is directed horizontally to a retracted position as shown in FIG. 5.

Figure 7:
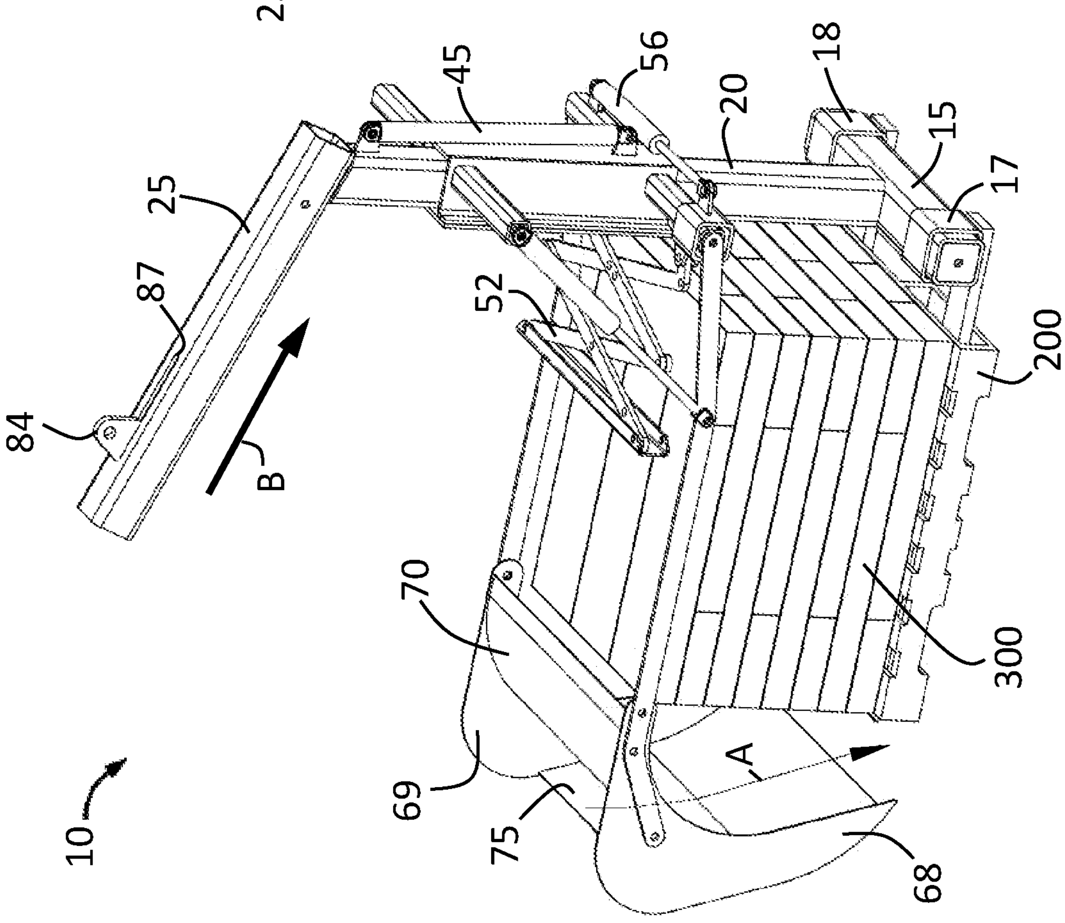
FIG. 7 is a rear perspective view of the apparatus of FIG. 3 including a portable platform and a unit load in communication with the apparatus.

Referring now to FIG. 7, one suitable guide member 35 may include opposing side supports 68, 69 with a non-planar first guide surface 70 disposed there between at a first location and a non-planar second guide surface 75 disposed between the side supports 68, 69 at a second location and spaced apart from the first guide surface 70 defining an opening between the first guide surface 70 and the second guide surface 75 as shown. Suitably, the opening between the guide surfaces 70 and 75 is large enough to receive items of a unit load 300 there through (see directional arrow A). For example, in an embodiment where a unit load 300 includes stacked rows of bundles of shingles as illustrated in FIG. 7, the opening between the guide surfaces 70 and 75 is suitably large enough for each individual bundle of shingles of a unit load 300 to be directed through the opening between the guide surfaces 70 and 75 regardless of its lengthwise orientation as stacked on a portable platform 200. As such, one suitable opening between guide surfaces 70, 75 may include a width at least equal to or greater than the length of each individual bundle of shingles of a unit load 300. As understood by the skilled artisan, as of the time of this application a commercially available single bundle of shingles may be provided in packaging of various dimensions. One commercially available single bundle of shingles may be provided having dimensions as listed in Table 3.

TABLE 3

| | |
|---|---|
| Length: | 91.44 cm (36.0 inches); |
| Width: | 30.48 cm (12.0 inches); |
| Height: | 6.98 cm (2.75 inches). |

Another commercially available single bundle of shingles may be provided having dimensions as listed in Table 4.

TABLE 4

| | |
|---|---|
| Length: | 100.0 cm (39.4 inches); |
| Width: | 33.02 cm (13.0 inches); |
| Height: | 6.98 cm (2.75 inches). |

Bundles of shingles are not limited to any particular commercial source. Exemplary commercial sources of bundles of shingles for use herein include, but are not necessarily limited to Owens Corning Intellectual Capital, LLC, Toledo, Ohio, U.S.A.; BMC Stock Holdings, Inc., Raleigh, North Carolina, U.S.A.; GAF Materials Corporation, Parsippany-Troy Hills, New Jersey, U.S.A.; CertainTeed Corporation, Valley Forge, Pennsylvania, U.S.A.; Atlas Roofing Corporation, Meridian, Mississippi, U.S.A.; TAMKO Building Products LLC, Galena, Kansas, U.S.A.; BP Canada Energy Group ULC, Calgary, Alberta, Canada; IKO Industries Ltd., Toronto, Ontario, Canada.

As shown in FIG. 7, each of the guide surfaces 70 and 75 may include a curved sliding surface to assist in directing items such as bundles of shingles of a unit load 300 (herein bundles of shingles may be referred to as "bundles of shingles 300") there between. In another embodiment, one or more of the guide surfaces 70 and 75 may include multiple planar surfaces angularly aligned to operate cooperatively in a manner similar as a single or continuous curved surface configuration. In yet another embodiment, one or more of the guide surfaces 70 and 75 may include a different shape from that as shown in FIG. 7 for maximizing the passage of one or more particular items of unit load 300 through the guide surfaces 70 and 75, e.g., irregular shaped item(s) requiring guide surfaces 70 and 75 mirroring the shape of irregular shaped item(s).

Figure 8:
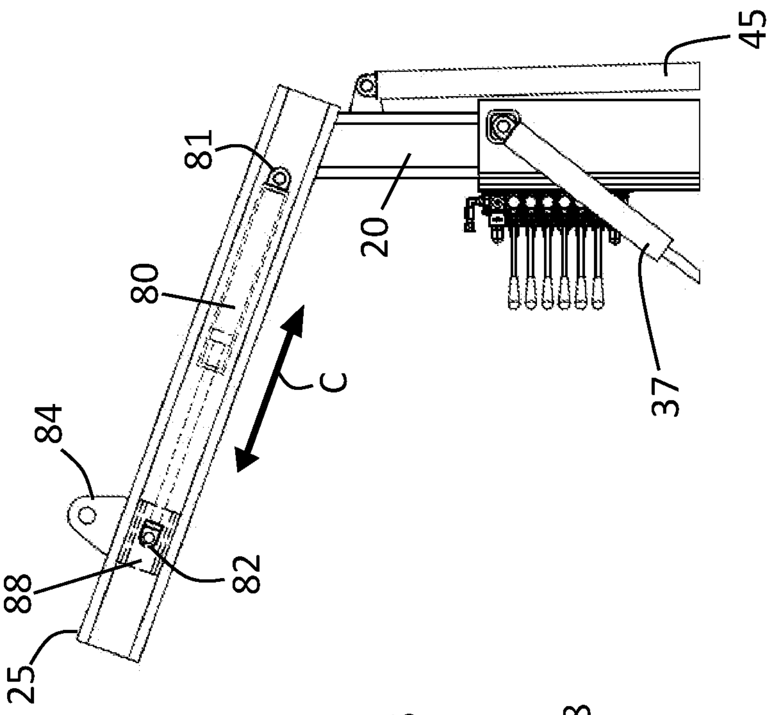
FIG. 8 is a side partial phantom view of a portion of the apparatus of FIG. 3.

Referring again to FIGS. 3 and 4, the third frame section 25 may be referred to as a leveling member or leveling assembly, wherein the third frame section 25 is (1) operationally configured as a connector to communicate the apparatus 10 with lifting equipment, e.g., a crane, hoist, wench, or other lifting device for moving the apparatus 10 in space as desired to one or more locations and (2) operationally configured to maintain the apparatus 10 in a vertical or substantially vertical alignment, i.e., maintain the second frame section 20 in a vertical or substantially vertical alignment with the earth's gravitational vector during operation of the apparatus 10 (herein referred to as "vertical alignment" of the apparatus 10). With reference to FIGS. 7 and 8, the third frame section 25 of the frame may be provided as a hollow or partially hollow member including one or more fourth linear actuators 80 housed therein. In one suitable embodiment, the third frame section 25 may include a double acting hydraulic cylinder as described above wherein the bore at a tail end of the hydraulic cylinder is secured to an inner surface of the third frame section 25 at attachment point 81 and the distal end of the drive rod is attached to a lift or hoist attachment member 84 at attachment point 82. As shown in FIG. 7, the third frame section 25 of this embodiment suitably includes an opening in the form of an elongated slot 87 operationally configured for the lift or hoist attachment member 84 (hereafter "lift attachment member 84") to be directed linearly in either direction along the length of the slot 87 according to the stroke of the hydraulic cylinder 80 (see directional arrow C in FIG. 8). The length of the slot 87 is not limited but may vary as desired, which in turn may dictate the size and/or stroke of the hydraulic cylinder 80.

In this embodiment, the lift attachment member 84 is provided in the form of a lift eye operationally configured to partially extend out through the slot 87 providing an attachment surface for a lift line 5 or other lifting or hoisting attachment or assembly of lifting equipment, for example, a hook, clevis fastener, or other rigging equipment. The lift attachment member 84 is affixed to a slide member 88 that resides inside the third frame section 25 and slides along the inside of the third frame section 25. The slide member 88 is smaller than the inside of the third frame section 25 such that it can be fitted with wear protection devices such as wear pads and the like. In another embodiment, the lift attachment member 84 may be provided as a handle, hook, eye bolt, clevis fastener, or hydraulic rotating unit. Hydraulic rotating units as understood by the skilled artisan, can also be mounted to the lift attachment member 84 via a clevis fastener, hook, pin, bolts/fasteners and other rigging equipment. A hydraulic rotation device suitably allows a user to rotate the apparatus 10, and a unit load 300 carried by the apparatus 10, to a desired orientation according to a roof or other surface where a unit load 300 or part thereof is to be placed. In another embodiment, the third frame section 25 may itself operate as an attachment surface, for example, tying off the apparatus 10 via the third frame section 25 with rope, strapping, cable, chain, wire, and combinations thereof and/or hooking or latching the third frame section 25 with a hook or sling hook as known in the art of lifting equipment.

Figure 9:
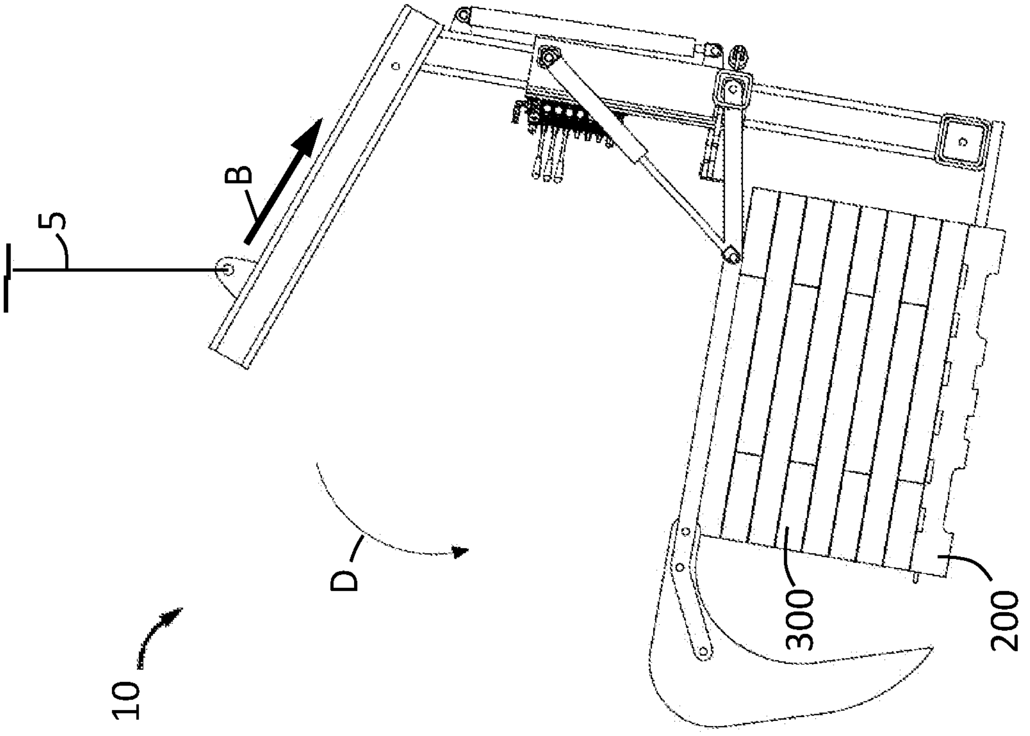
FIG. 9 is a side view of the apparatus of FIG. 3 in a lifted orientation carrying a portable platform and a unit load thereon.
Figure 10:
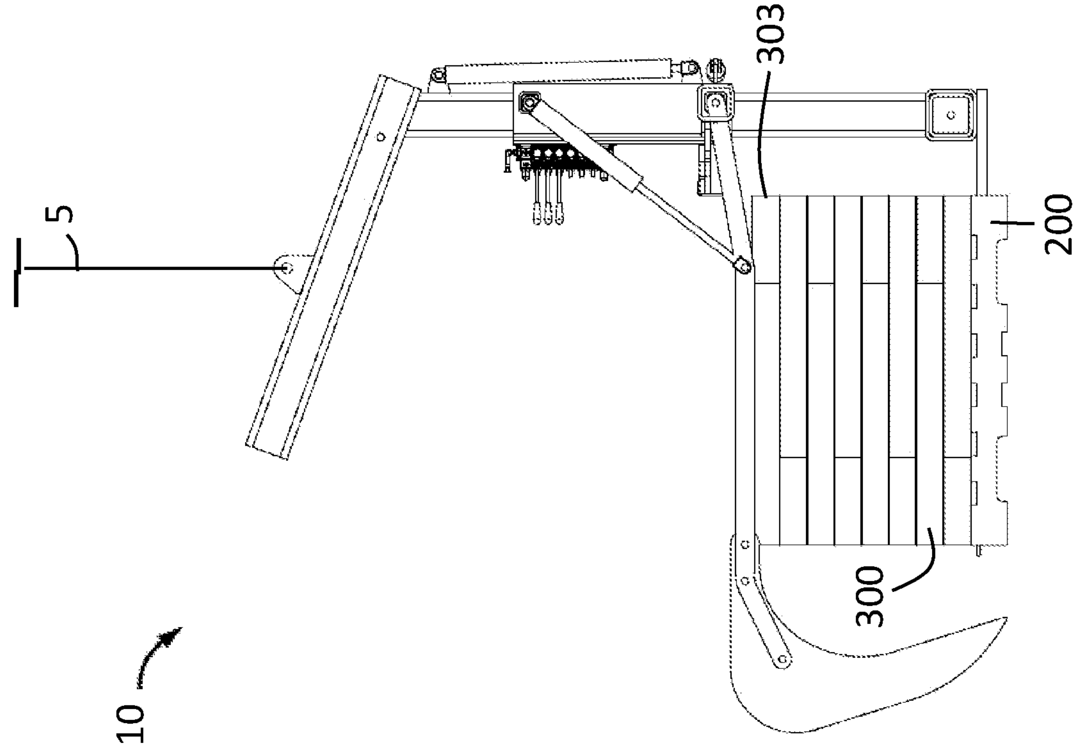
FIG. 10 is a side view of the apparatus of FIG. 9 in a lifted orientation.

In operation, the hydraulic cylinder 80 located inside the third frame section 25 may be powered to change the location of the lift attachment member 84 along the length of the slot 87 thereby changing the center of gravity of the apparatus 10 to maintain a horizontal or substantially horizontal or level orientation of the apparatus 10 and any portable platform 200 and any unit load 300 carried by the apparatus 10 when the apparatus 10 is lifted to a suspended elevated position relative the ground or other floor type surface during transport. For example, in a scenario where the apparatus 10 is in a suspended elevated position or lifted position off the ground or other floor type surface with a lift attachment member 84 positioned as depicted in FIG. 9, if the apparatus 10 is leaning backward in an un-level position with the distal ends of the fork tines 12 and 13 pointing upward as depicted in FIG. 9, the hydraulic cylinder 80 may be powered to direct the lift attachment member 84 rearward (see directional arrow B in FIG. 7 and FIG. 9) directing the apparatus 10 to a level or substantially level position as shown in FIG. 10 (see directional arrow D) safe for transport of the portable platform 200 and unit load 300 carried by the apparatus 10. In this embodiment, (1) the angle of the third frame section 25 relative the second frame section 20, (2) the location of the lift attachment member 84 along the length of the third frame section 25 and (3) the position of the center of gravity of a unit load 300 in relation to the position of the center of gravity of the apparatus 10 dictate the orientation of the apparatus 10 in space during transport at any moment in time.

In an embodiment of the apparatus 10 provided with hydraulic cylinders as described above, the apparatus 10 may also include a hydraulic control valve 85 (see FIGS. 3 and 4) operationally configured to provide and regulate hydraulic power to each of the hydraulic cylinders 37, 45, 56, 80 of the apparatus 10. In an embodiment where the apparatus 10 is lifted by a lifting member 400 (see FIG. 18) including lifting equipment, e.g., a crane, hoist, and other lifting device, commercially available and equipped with one or more hydraulic supply lines, e.g., hydraulic hoses, the one or more hydraulic supply lines of the lifting member 400 may be fluidly communicated with the hydraulic control valve 85 whereby pressurized fluid may be conveyed to one or more of the hydraulic cylinders 37, 45, 56, 80 as desired during operation of the apparatus 10.

One suitable hydraulic control valve 85 may include one or more hydraulic fluid inlet ports or fluid connections for receiving one or more hydraulic fluid lines, e.g., a flexible hydraulic hose or combination of flexible hose and non-flexible hydraulic tubing, typically associated with an auxiliary function of a lifting member 400. For example, commercially available lifting members 400 such as hydraulic cranes are typically equipped with one or more auxiliary hydraulic systems including control circuitry, a main control valve, and hydraulic fluid lines fluidly communicating the main control valve with a hydraulic rotator unit hanging from or otherwise attached at a distal end of a boom of a crane type lifting member 400. A typical auxiliary hydraulic system includes a supply line, e.g., a pressure hose, conveying pressurized fluid to a hydraulic rotator unit and a return line, e.g., a pressure hose, for conveying the hydraulic fluid back to the main control valve of the lifting member 400. For purposes of the present disclosure, the supply line may be disconnected from the hydraulic rotator unit and connected, possibly with extension hoses, to an inlet or pressure port located on the hydraulic control valve 85. Likewise, the return line may be disconnected from the hydraulic rotator unit and connected to a return port of the hydraulic control valve 85 of the apparatus 10.

Suitably, the apparatus 10 includes individual hydraulic fluid lines (not shown) fluidly communicating the hydraulic control valve 85 with each of the hydraulic cylinders 37, 45, 56, 80. In one embodiment, the hydraulic control valve 85 may include individual fluid ports corresponding to each of the hydraulic cylinders 37, 45, 56, 80 wherein a first end of each hydraulic fluid line is fluidly connected to a particular fluid port of the hydraulic control valve 85 and a second end of each hydraulic fluid line is fluidly connected to a port on a particular hydraulic cylinder 37, 45, 56, or 80. Exemplary hydraulic fluid lines include, but are not necessarily limited to hydraulic hoses, hydraulic tubes, and combinations thereof.

In one suitable embodiment, each hydraulic fluid line may include first and second ends with connectors operationally configured to provide sealed fluid connections between the hydraulic fluid lines and the ports of the hydraulic control valve 85 and the hydraulic cylinders 37, 45, 56, 80. Suitable connectors include, but are not necessarily limited to thirty-seven degree flare fittings, O-ring straight thread fittings, pipe thread fittings, split flange fittings, crimps, clamps, or other connectors operationally configured for high pressure hydraulic and/or pneumatic use.

In one suitable embodiment of the apparatus 10, each of the hydraulic cylinders 37, 45, 56, 80 has a first connection port allowing pressurized fluid to be supplied to the rod side of each of the hydraulic cylinders 37, 45, 56, 80 and a second connection port allowing pressurized fluid to be supplied to the base side of each cylinder 37, 45, 56, 80. In particular, the hydraulic control valve 85 may be provided with independently operated circuits, known to the skilled artisan as "work sections." Each work section may have two connection ports, commonly referred to by the skilled artisan as an "A" port and "B" port. In one embodiment of the hydraulic control valve 85, the "A" port is operationally configured to supply fluid to a hydraulic cylinder and the "B" port is operationally configured to provide a path for the return of hydraulic fluid from the hydraulic cylinder. The hydraulic control valve 85 may also be operationally configured to provide fluid pressure to the "B" port and return fluid flow via the "A" port. When not in use, the hydraulic control valve 85 may be configured or set to provide zero fluid flow to or from the "A" and "B" ports, commonly referred to by the skilled artisan as a "center position" or "neutral position" of the hydraulic control valve 85.

In the embodiment of FIGS. 3 and 4, the hydraulic control valve 85 has five work sections. The inlet, outlet, and work sections of the hydraulic control valve 85 may be configured for operation as follows:

(1) Fluid Inlet of the hydraulic control valve 85: The supply line of the lifting member 400 is fluidly connected to a pressure port of the hydraulic control valve 85. The pressure port may include a pressure relief valve effective as a circuit protection feature of the hydraulic control valve 85. When circuit pressure exceeds the pressure relief setting of the pressure relief valve, the pressure relief valve suitably diverts pressure to the return line via the return port of the hydraulic control valve 85 preventing damage to the hydraulic control valve 85.

(2) Work section 1: Port A (the "A" port) is connected to port A on the hydraulic rotator unit. Port B (the "B" port) is connected to port B on the hydraulic rotator unit.

(3) Work section 2: Port A is connected to port A on the hydraulic cylinder 45 and Port B is connected to port B on the hydraulic cylinder 45 for controlling the slide member 30.

(4) Work section 3: Port A is connected to port A on the hydraulic cylinder 80 and Port B is connected to port B on the hydraulic cylinder 80 for controlling the center of gravity adjustment of the apparatus 10.

(5) Work section 4: Port A is connected to port A on the hydraulic cylinders 37 and Port B is connected to port B on the hydraulic cylinders 37 for controlling the position of the guide member 35.

(6) Work section 5: Port A is connected to port A on the hydraulic cylinder 56 and Port B is connected to port B on the hydraulic cylinder 56 for controlling extension and retraction of the push assembly 52.

(7) Outlet Section: A return line connected to the return port of the hydraulic control valve 85 provides a fluid return for conveying hydraulic fluid from the apparatus 10 back to a hydraulic tank or other container on the lifting member 400.

(8) Actuation of the work sections: A spool inside the hydraulic control valve 85 suitably shifts by way of an electrical signal. The electrical signal originates from the lifting member 400 via remote control. Some lifting member 400 remote controls (e.g., Hiab XS Drive) may be operationally configured to control additional functions beyond just the lifting member 400 itself. In one embodiment, remote control of the lifting member 400 may be set to a secondary control mode, whereby an operator may use the lifting member 400 remote control to remotely control the apparatus 10. For example, a wireless signal may be sent from the lifting member 400 remote control (e.g., a transmitter) to a receiver located on the apparatus 10. The receiver (not shown) sends the received signals to a valve driver or valve control module, i.e., an electronic device that sends control signals to each work section of hydraulic control valve 85. In operation, the hydraulic control valve 85 receives an electrical signal and shifts the spool to deliver fluid pressure to the appropriate work port, which in turn translates to motion in the associated member of the apparatus 10.

In this embodiment, the hydraulic control valve 85 is located on a front side of the slide member 30. In another embodiment, the hydraulic control valve 85 may be located on the third frame section 25 apart from the slot 87 and lift attachment member 84. One suitable hydraulic control valve 85 may include an L90LS mobile valve commercially available from Parker Hannifin Corporation, Cleveland, Ohio, U.S.A. In an embodiment of the apparatus 10 employing pneumatic air cylinders, the control valve 85 may be provided as a pneumatic control valve.

Figure 11:
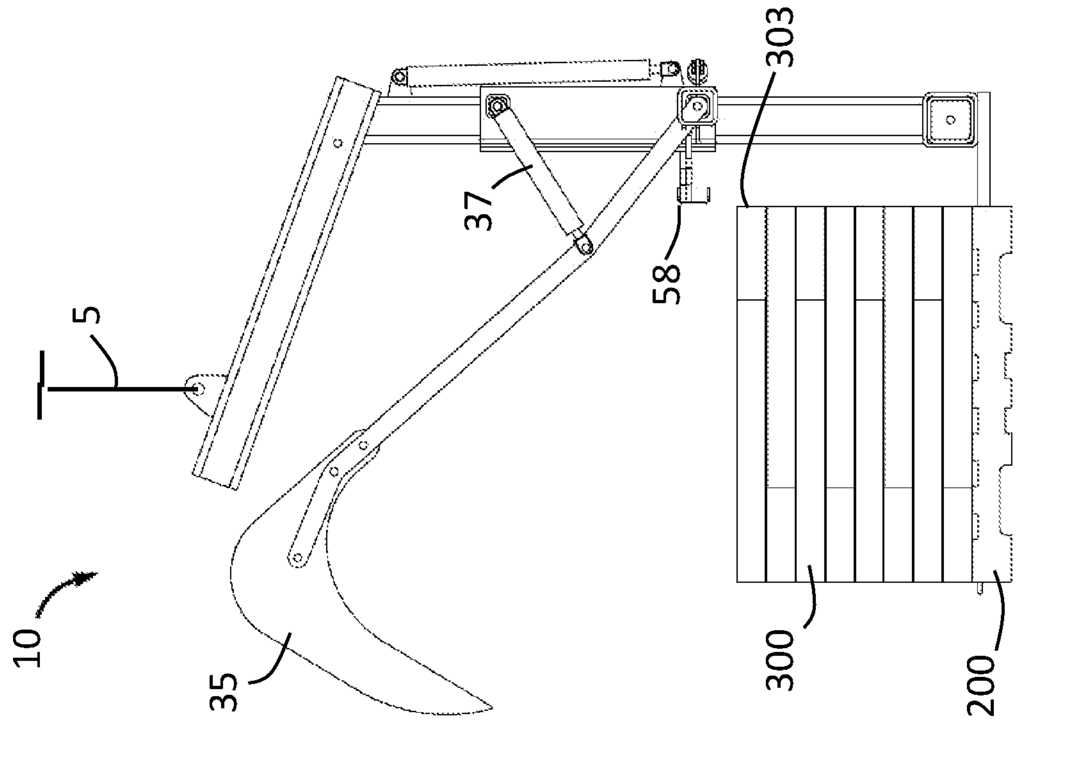
FIG. 11 is a side view of the apparatus of FIG. 9 in a lifted orientation.
Figure 14:
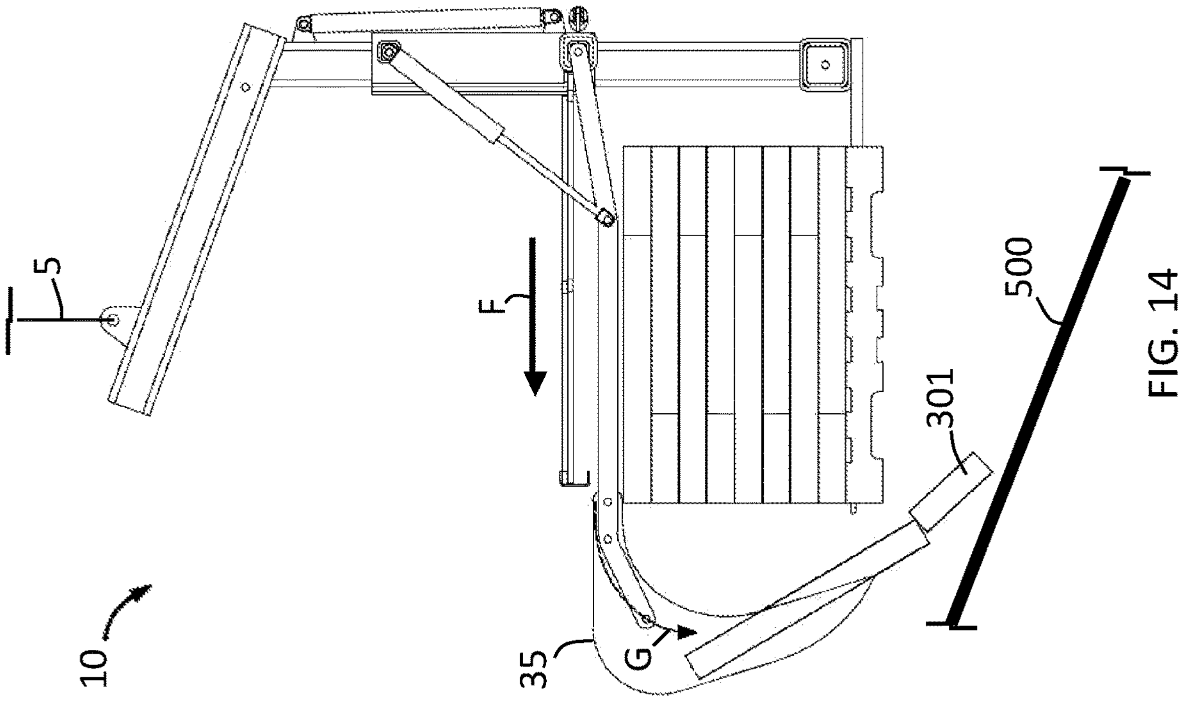
FIG. 14 is a side view of the apparatus of FIG. 3 in a lifted orientation located near a roof of a structure.
Figure 13:
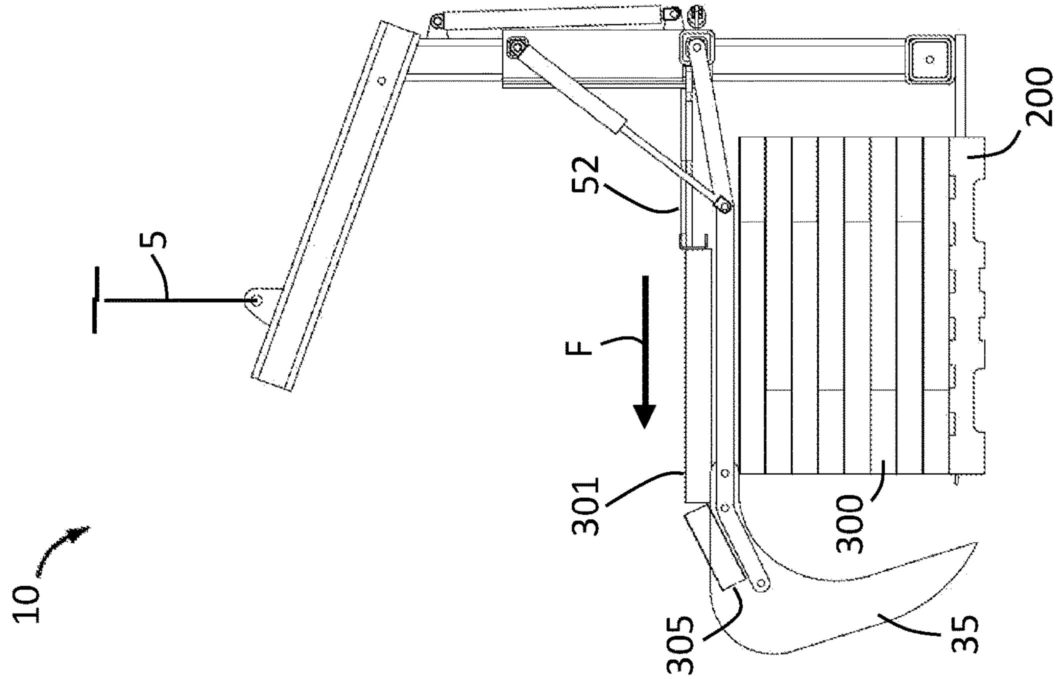
FIG. 13 is a side view of the apparatus of FIG. 3 in a lifted orientation with a portable platform and a unit load in communication with the apparatus.
Figure 16:
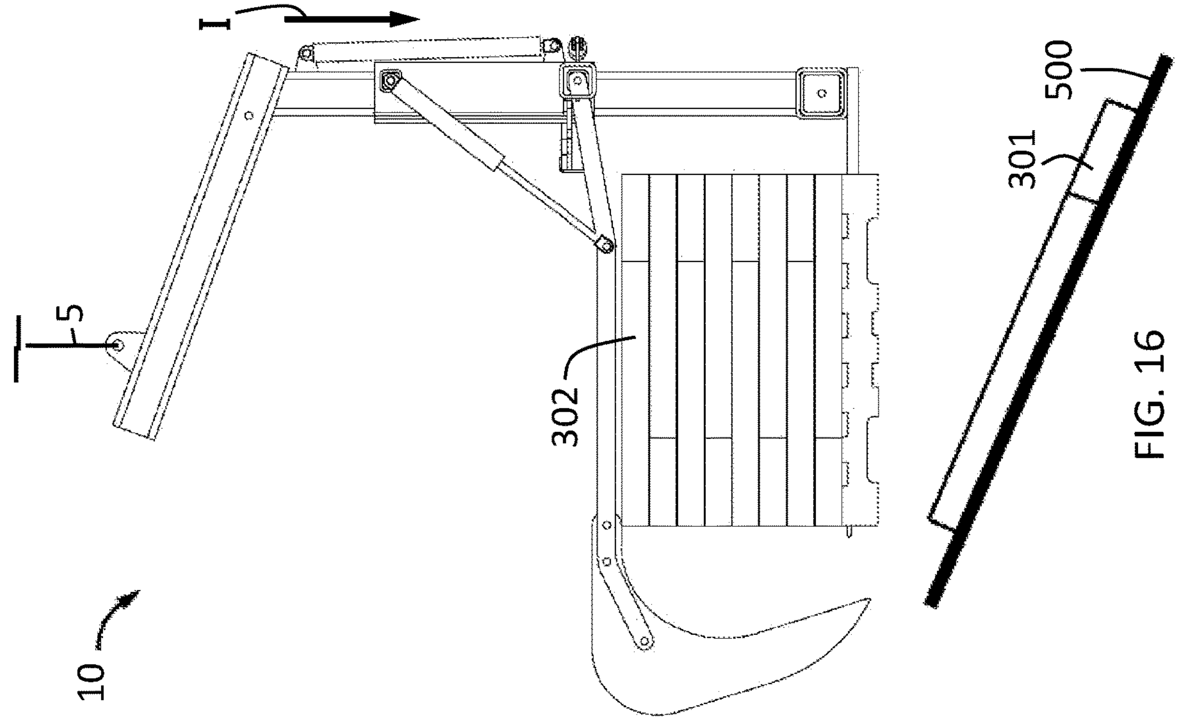
FIG. 16 is a side view of the apparatus of FIG. 3 illustrating part of a unit load removed from the apparatus and set atop a roof.
Figure 15:
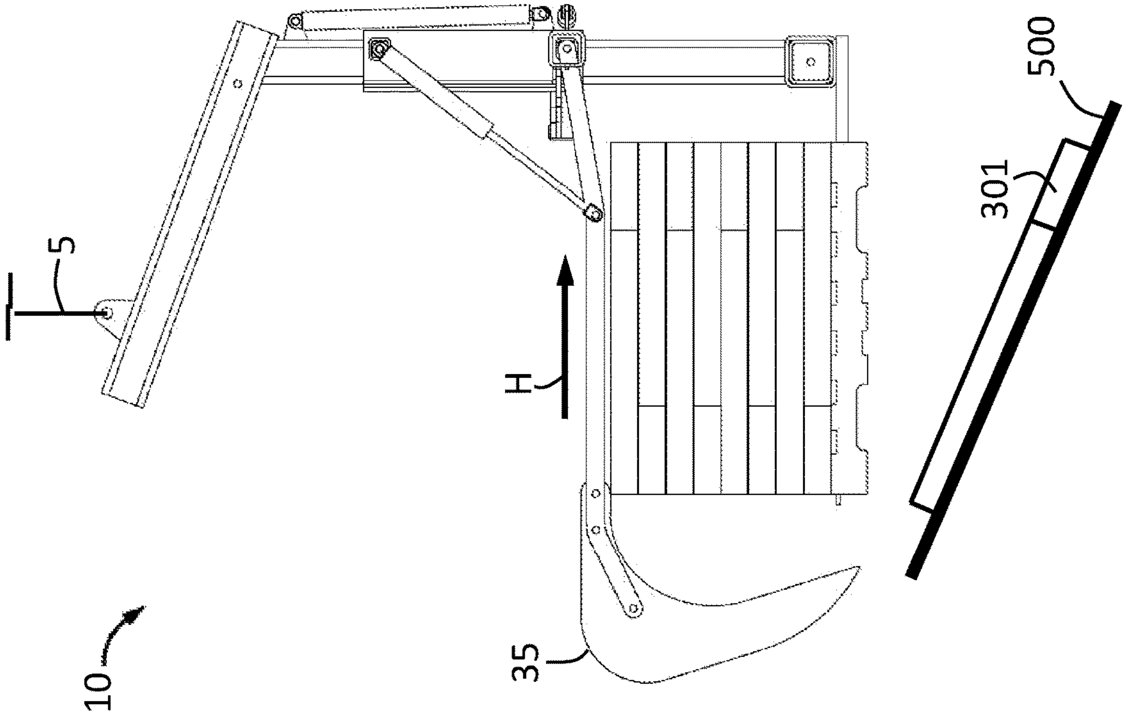
FIG. 15 is a side view of the apparatus of FIG. 3 illustrating part of a unit load removed from the apparatus and set atop a roof.
Figure 17:
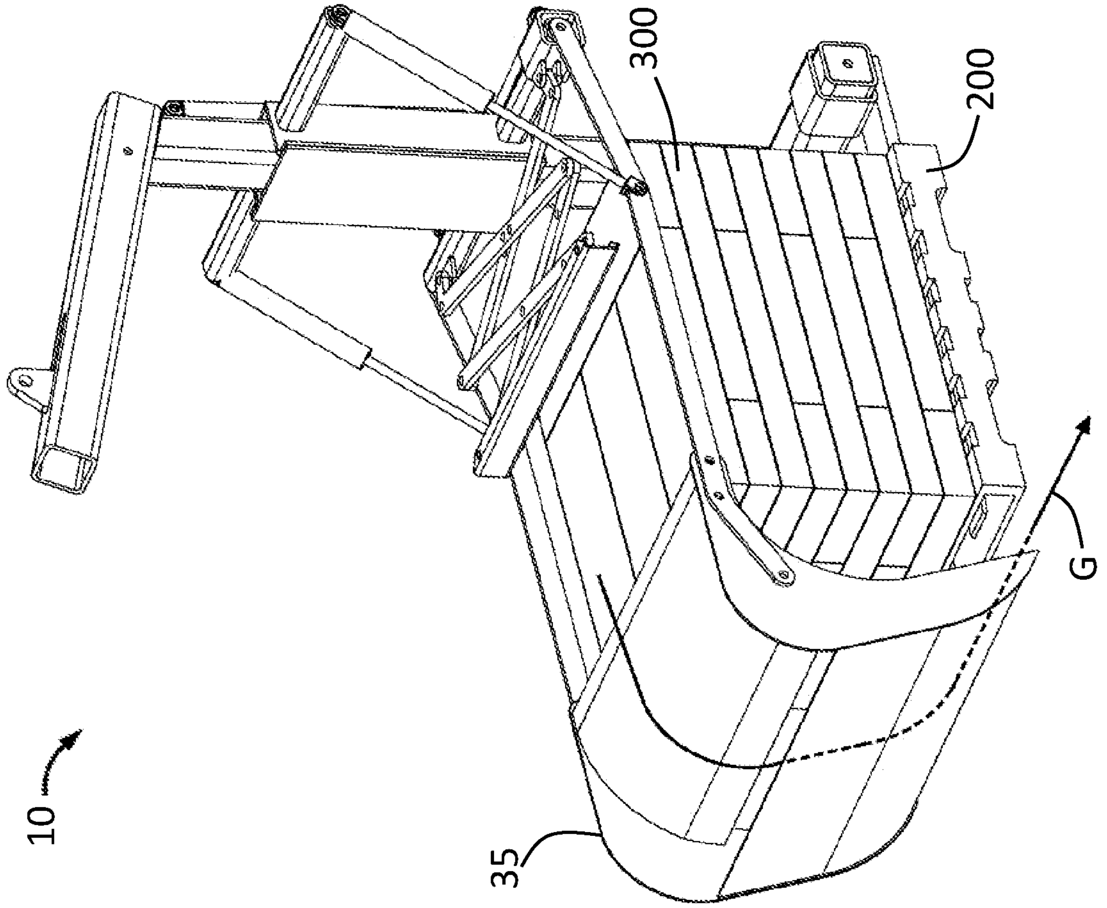
FIG. 17 is a front perspective view of the apparatus of FIG. 3 including a portable platform and a unit load in communication with the apparatus.

Referring to FIGS. 11-16, a simplified illustration of the apparatus 10 described above carrying a unit load 300 comprising a stack of bundles of shingles to a roof 500 is provided. As shown in FIG. 11, at initial operation of the apparatus 10 the guide member 35 may be set at an upper position as shown with the hydraulic cylinders 37 set to a fully retracted position. Once the fork tines 12 and 13 of the apparatus 10 are mated with openings of a pallet 200 carrying a stack of bundles of shingles of a unit load 300—shown here including a stack of eight rows of stacked bundles of shingles—the hydraulic cylinders 37 may be powered to an extended position thereby lowering the arm members 33 and guide member 35 to an operable position (see directional arrow E in FIG. 12).

Figure 12:
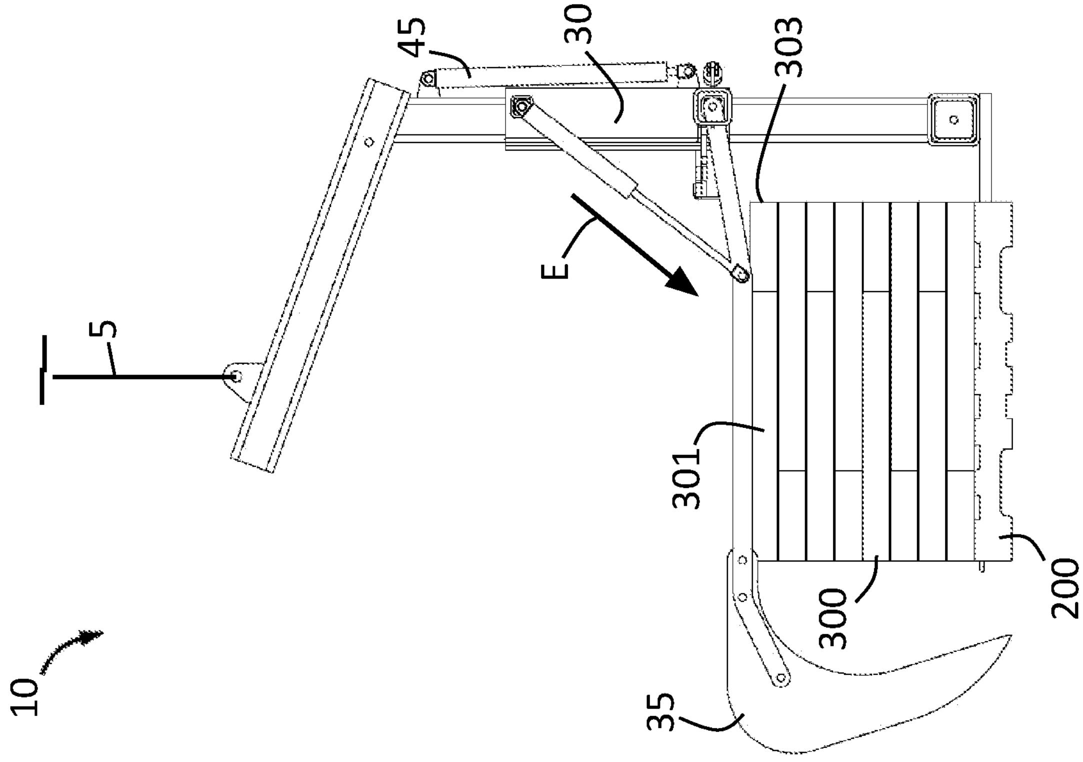
FIG. 12 is a side view of the apparatus of FIG. 9 in a lifted orientation.

Prior to transport of the apparatus 10 or once an apparatus 10 has arrived at a target location for removing the bundles of shingles of a unit load 300, the hydraulic cylinder 45 may be powered to direct the slide member 30 along the second frame section 20 until the forward pushing surface 59 of the faceplate 58 is aligned adjacent an upper row 301 of the stacked bundles of shingles of a unit load 300. Once the apparatus 10 reaches a target location adjacent a roof for unloading the bundles of shingles, the hydraulic cylinder 56 may be powered to extend the push assembly 52 from a retracted position as shown in FIGS. 11 and 12 to an extended position (see directional arrow F in FIG. 13).

With reference to FIGS. 12-17, as the push assembly 52 is directed to an extended position, the forward pushing surface 59 of the faceplate 58 contacts a proximal side 303 of the upper row 301 of bundles of shingles thereby directing or forcing the distal side 305 upper row 301 of bundles of shingles toward the guide member 35 where the first guide surface 70 redirects the upper row 301 of bundles of shingles toward the second guide surface 75 for exiting out through the bottom of the guide member 35 onto a roof 500 under gravity. Suitably, the shape and length of the first guide surface 70 is operationally configured for a controlled and/or continuous sliding motion of bundles of shingles 301 toward the second guide surface 75 under gravity (see directional arrow G in FIG. 14 and FIG. 17) whereby the bundles of shingles 301 contact the second guide surface 75 while the proximal side 303 of the bundles of shingles 301 is still located atop the remaining stack of bundles of shingles of the unit load 300 and still in contact with the forward pushing surface 59 of the faceplate 58. Similar as described above, the shape and length of the second guide surface 75 is operationally configured for a controlled and/or continuous transition of bundle of shingles from a unit load 300 to a target location on a roof 500 (or "rooftop 500"), e.g., see FIG. 18, or other surface by landing each bundle of shingles in an inverted or flipped orientation in a non-destructive and/or non-violent manner in regard to the outer packaging and shingles of the bundle of shingles, e.g., without tearing the outer packaging and/or without damaging individual shingles for their intended use. In particular, the configuration of the guide member 35 of this embodiment turns each row of bundles of shingles from an initial upright position on a pallet 200 to an inverted or upside down position on a roof 500 or other surface. As such, if a particular unit load 300 of bundles of shingles is to have a particular side contacting and/or facing a roof 500 or other surface (a "target side" of the bundles of shingles) once removed from the apparatus 10, the unit load 300 may be set atop a platform support 16, or in this embodiment atop a portable platform 200, with the target side of the bundles of shingles facing away from a target roof 500 or other surface whereby the guide member 35 is operationally configured to turn or flip the bundles of shingles of the unit load 300 over resulting in the target side of each bundle of shingles contacting and/or facing a roof 500 or other surface. As such, a guide member 35 as described in FIGS. 12-17 may be referred to as an inverting guide member 35, a turning guide member 35, and the like.

The apparatus 10 further includes a push assembly adjustment system operationally configured to adjust the location of pushing assembly 52 as desire. For example, once an upper row 301 of bundles of shingles is unloaded to a roof 500 or other surface, the hydraulic cylinder 56 may be powered to return the push assembly 52 to a fully retracted position (see directional arrow H in FIG. 15). Once the push assembly 52 is set at a fully retracted position, the hydraulic cylinder 45 may be powered to direct the slide member 30 along the second frame section 20 (see directional arrow I in FIG. 16) until the forward pushing surface 59 of the faceplate 58 is aligned adjacent the next resulting upper row 302 of the stacked bundles of shingles of a unit load 300. Once aligned with upper row 302 of bundles of shingles, the hydraulic cylinder 56 may be powered to extend the push assembly 52 to an extended position whereby the forward pushing surface 59 of the faceplate 58 contacts a near side of the upper row 302 of bundled shingles and directs the upper row 302 of bundled shingles off of the remaining unit load 300 via the first guide surface 70 and the second guide surface 75 of the guide member 35 under gravity as described above. The process is repeated until each of the rows of bundled shingles of a unit load 300 is removed from the pallet 200.

The slide member 30 may be aligned with the next resulting upper row 302 and each row thereafter by way of an operator in real time, e.g., manually or via a video system including one or more cameras mounted to the apparatus 10. Without limiting the invention, one suitable camera may include, but is not necessarily limited to an action camera as understood by persons of ordinary skill in the art. As of the time of this application, one non-limiting example of an action camera is commercially available from GoPro, Inc., San Mateo, California, U.S.A. A camera may be releasably secured to the apparatus 10 via one or more fasteners and/or magnetic connections.

In another embodiment, the apparatus 10 may include control circuitry whereby the slide member 30 may be programmed via the control circuitry to travel a programmed or controlled or operable distance according to a configuration and/or size of a particular unit load 300 or its rows of items. For example, in an embodiment of the apparatus 10 including a unit load 300 including bundles of shingles having the dimensions as described in Table 3 or Table 4, the adjustment system may be operationally configured to direct the slide member 30 toward the first frame section 15, which simultaneously directs the faceplate 58 and forward pushing surface 59 toward the fork tines 12, 13 an equal distance as the slide member 30 as necessary for alignment of the faceplate 58 with the next successive row or rows of bundled shingles 300. Without limiting the disclosure, the slide member 30 may include a mechanical, electrical, optical or other type of sensing device, or combinations thereof, operationally configured to detect when the slide member 30 and faceplate 58 have traveled along the second frame section 20 to an operable position whereby the forward pushing surface 59 may contact the near side of the upper row 302 of bundled shingles and direct the upper row 302 of bundled shingles off of the stacked bundles of shingles of a unit load 300 between first guide surface 70 and the second guide surface 75 of the guide member 35. In another embodiment, the forward pushing surface 59 may be positioned to contact two upper rows of bundled shingles to push off both rows of bundled shingles simultaneously.

In one embodiment, the apparatus 10 may include one or more sensors electronically communicated with a corresponding lifting member 400 whereby the lifting member 400 is operationally configured to provide an audible signal, a visible signal, or a combination of audible and visual signals to an operator of the apparatus 10. Suitable audible and visible signals, i.e., audible and visible alarms, may include those audible and visible signals as known in the art of heavy equipment and the like, for example, horns and/or sirens and/or lights located at one or more locations of a lifting member 400, e.g., in a cabin or cab, on a boom, on a carrier or other part of a lifting member 400.

In another embodiment, the apparatus 10 may include one or more sensors electronically communicated with an audible signal, one or more visible signals, or a combination thereof. In another embodiment, control circuitry of the apparatus 10 may be programmed to automatically shut-off according to one or more pre-programmed sensor feedback conditions.

In another embodiment, one or more sensors may be positioned as desired to sense when the forward pushing surface 59 of the faceplate 58 has reached a desired vertical position suitable to contact a predetermined number of rows of bundled shingles 300 to be directed off from the pallet 200, i.e., the "target rows"). The one or more sensors may have one or more predetermined operating positions that correspond to the target rows. In one suitable embodiment, a desired or programmed sensor feedback condition may trigger an audible signal, a visual signal, or other signal such as an electronic communication sent to a computer system, cloud system, smartphone, or a combination thereof. In operation, when the one or more sensors realize a desired feedback condition corresponding to the target rows, the sensing device may (1) send a signal to the control circuitry of the apparatus 10 to stop the motion of the slide member 30 and/or (2) trigger an audible signal, a visual signal, other signal, or combination thereof.

In one suitable embodiment of the apparatus 10 for use with a unit load 300 comprising bundles of shingles having the dimensions listed above, a forward pushing surface 59 in the form of a planar surface as shown in FIG. 3 may be provided with the minimum and maximum dimensions as shown in Table 5 effective for directing one or more rows of bundles of shingles of a unit load 300 through the guide member 35.

TABLE 5

| | |
|---|---|
| Minimum Length: | 93.98 cm (37.0 inches); |
| Maximum Length: | 127.0 cm (50.0 inches); |
| Minimum Height: | 10.16 cm (4.0 inches); |
| Maximum Height: | 121.92 cm (48.0 inches) |

In another embodiment, the forward pushing surface 59 may include two or more separate planar members rather than a single member. In still another embodiment, the forward pushing surface 59 may include one or more horizontal tines, spikes or points effective for directing items of a unit load 300 off from the apparatus 10 to one or more target locations.

As understood by persons of ordinary skill in the art of shingles, bundles of shingles may be stacked in rows of alternating arrangement wherein a first row of bundled shingles may be aligned lengthwise in one direction and a second row of bundled shingles may be aligned lengthwise ninety-degrees relative the bundled shingles of the first row. As shown in FIGS. 5-7, each row of bundled shingles may include multiple bundles of shingles aligned side by side, e.g., three bundles of shingles aligned lengthwise front to back, and have a single bundle of shingles aligned lengthwise left to right at the front of one row of bundled shingles and aligned lengthwise left to right at the back of an adjacent row of bundled shingles. Other stacked configurations of shingles are herein contemplated as is understood by a person of ordinary skill in the art of portable platforms and stackable unit loads 300, e.g., single stacked bundles of shingles in common alignment. Accordingly, it is further contemplated that the push assembly 52 may be directed a distance suitable for removing an entire row of bundles shingles from a unit load 300 according to its orientation and location in relation to the guide member 35 of the apparatus 10 carrying the unit load 300.

Figure 18:
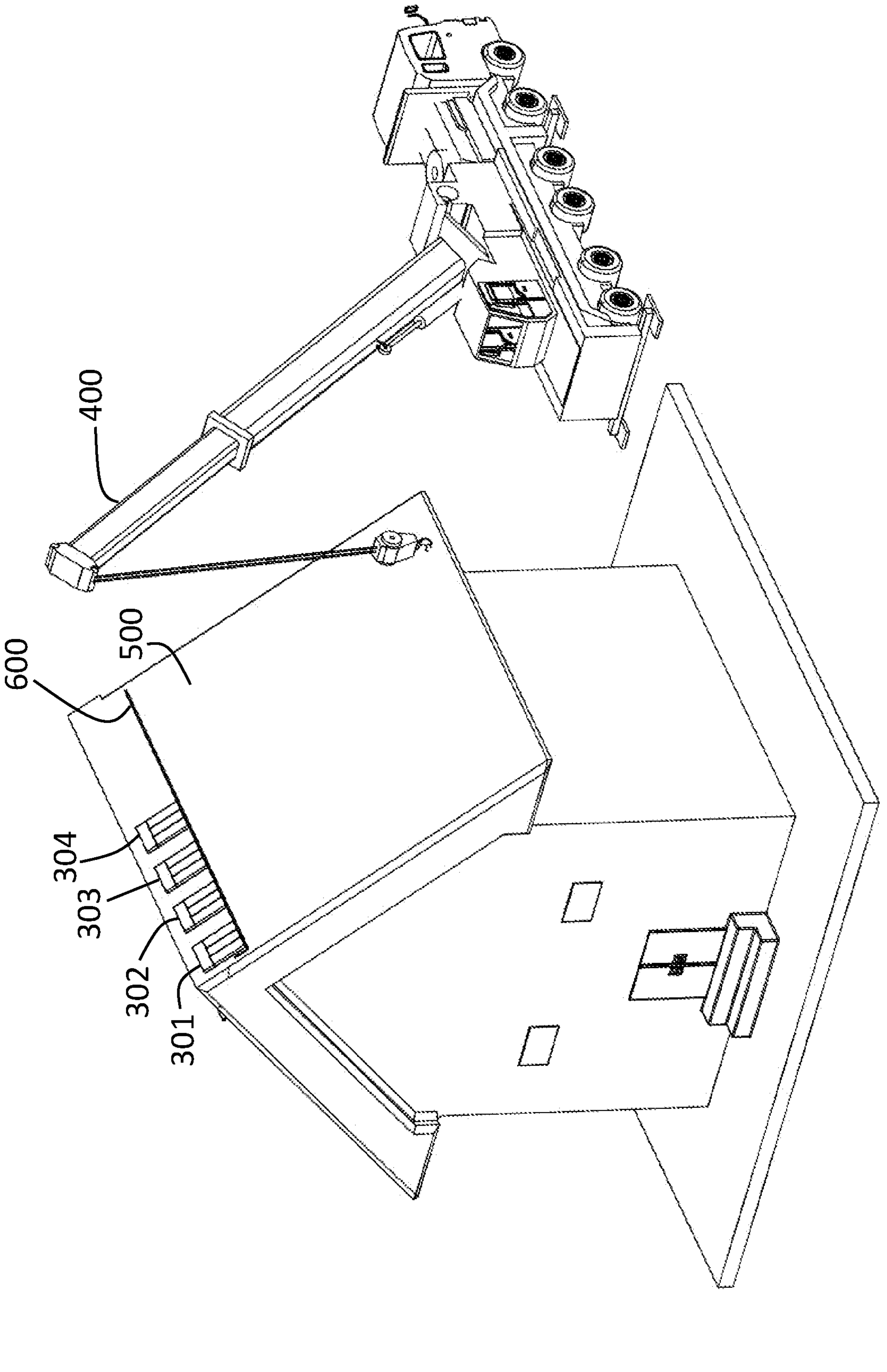
FIG. 18 is a simplified illustration of an arrangement of individual bundles of shingles located atop a roof of a structure in abutment with an elongated stop member in a side-by-side arrangement following removal of the individual bundles from an apparatus of the present disclosure.
Figure 47:
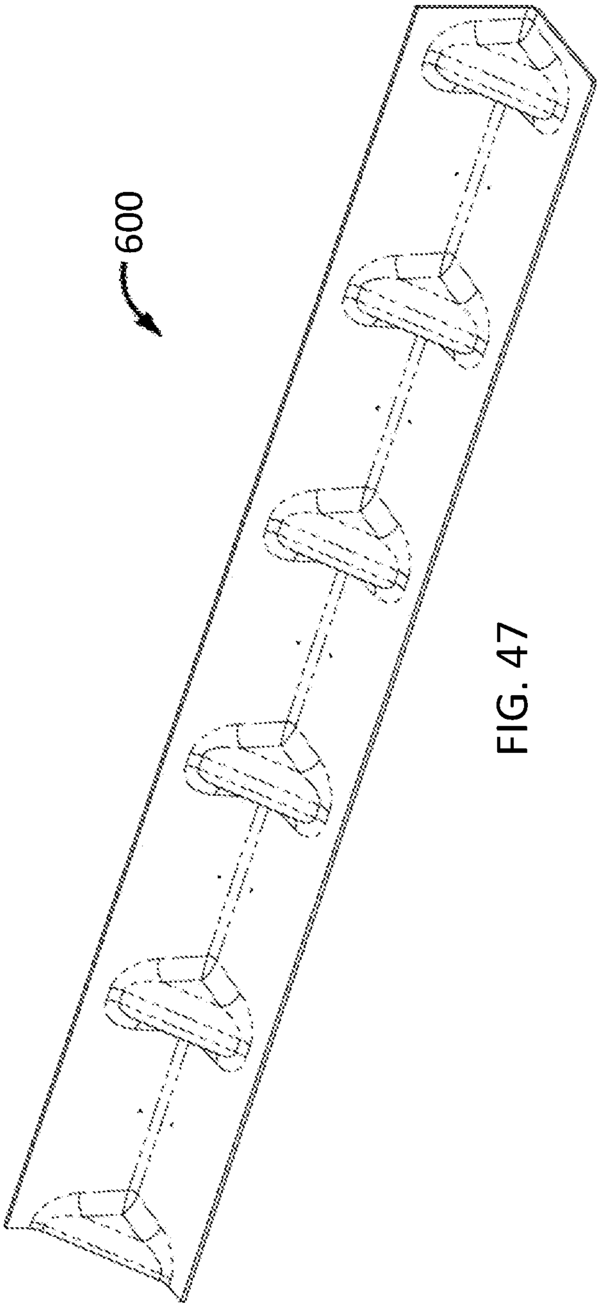
FIG. 47 is a rear perspective view of an embodiment of an elongated stop member of the present disclosure.
Figure 48:
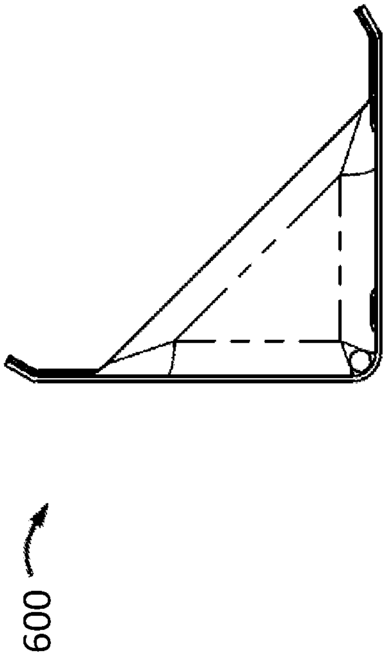
FIG. 48 is a side view of the elongated stop member of FIG. 47.

In one mode of operation, each successive row of bundles of shingles of a unit load 300 removed from the apparatus 10 may be set or otherwise placed adjacent the preceding row of bundled shingles as shown in the simplified illustration of FIG. 18—see rows 301-304 of bundles of shingles. In such embodiment, a lifting member 400 such as a crane or the like may reposition the apparatus 10 in space after each row of bundles of shingles is removed from the pallet 200 in a manner effective to unload each row 301-304 of bundles of shingles 300 as shown in FIG. 18. As further shown, an elongated stop member 600 such as a wood board or other elongated member, e.g., see FIGS. 47 and 48 illustrating a plastic elongated stop member 600 manufactured via an extrusion process or a mold process, may be fixed to a roof 500 via one or more fasteners and/or a portable support type member may be installed atop a roof 500 without the need of any fasteners providing for alignment of the rows 301-304 along the roof 500 during unloading of the bundles of shingles from a unit load 300 and acting as a stop preventing the bundles of shingles from sliding off of a roof 500 including a pitched roof 500 as shown in FIG. 18. Other configurations of elongated stop members are herein contemplated, e.g., systems including L-bracket type members operationally configured to hold wood board and/or planks for purposes of stopping bundles of shingles from sliding off a roof 500. As understood by persons of ordinary skill in the art in the roofing industry, fasteners used on roofs and other building and construction locations may include, but are not necessarily limited to nails, screws, staples, and combinations thereof.

Figure 19:
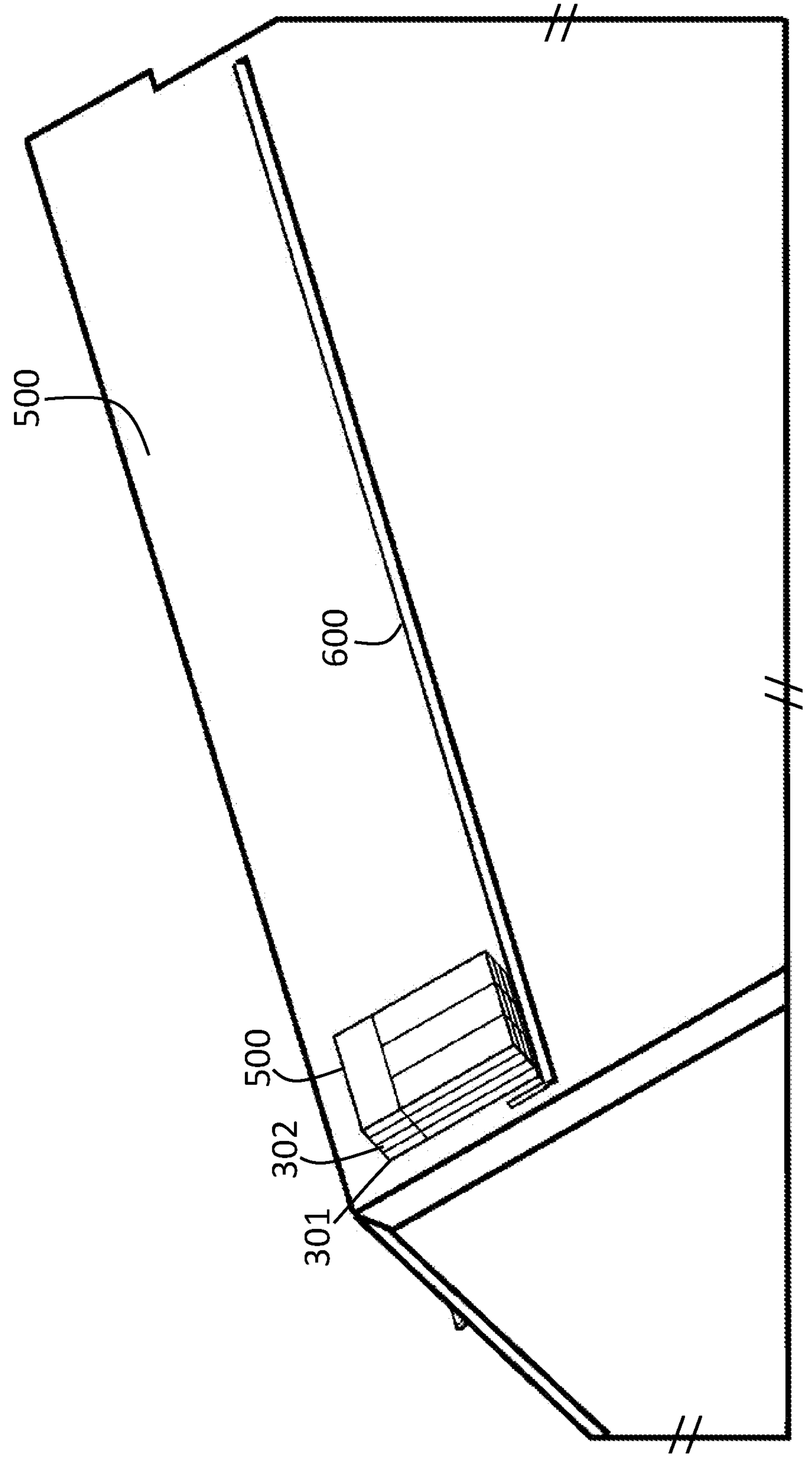
FIG. 19 is a simplified illustration of an arrangement of individual bundles of shingles located atop a roof of a structure in abutment with an elongated stop member in a stacked orientation following removal of the individual bundles from an apparatus of the present disclosure.

In another embodiment, one or more items comprising a unit load 300 including, but not necessarily limited to rows of bundles of shingles, may be stacked on a roof 500 as shown in FIG. 19. In such embodiment, a lifting member 400 can reposition the apparatus 10 at a different location after each row or rows of bundles of shingles is removed from a pallet 200.

As stated above, the apparatus 10 may also include one or more replaceable wear pads and the like (not shown) positioned between the slide member 30 and the second frame section 20 to minimize or prevent wearing of the slide member 30 and the second frame section 20 as a result of use over time. Similar wear pads and the like may also be positioned between the first horizontal attachment surface 21 and the horizontal slide member 50. Suitable wear pads may include, but are not necessarily limited to wear pads comprising plastic, filled nylon plastic, steel, bronze, brass, composite, ultra-high molecular weight ("UHMW") polyethylene, and combinations thereof. One exemplary wear pad is commercially available from Cope Plastics, Inc. Alton, Illinois, U.S.A., under the trademark Nylatron®. As understood by the skilled artisan, wear pads may also be custom manufactured by fabrication companies that machine wear pads from steel, aluminum, plastic, and other metals and non-metals as desired.

Another embodiment of an apparatus 10 of the present disclosure is provided in FIGS. 20-29. As shown, the apparatus 10 of this embodiment includes a frame 111, including a horizontal base section 115, an intermediate section including a first vertical section 117 and a second vertical section 118 located at opposite ends of the base section 115 and extending out from the base section 115 in parallel alignment. The frame 111 further includes an upper section 119 interconnecting the vertical sections 117 and 118 as shown. Suitably, the upper section 119 is operationally configured as a connector to communicate the apparatus 10 with a crane, hoist, wench, or other lifting equipment for moving the apparatus 10 during operation of the apparatus 10 to one or more locations. In one embodiment, the upper section 119 may be provided as a separate member releasably secured to the vertical sections 117 and 118 via clamps, locking pins, fasteners as described above, and combinations thereof, or permanently secured the vertical sections 117 and

118 via welds. In another embodiment, the frame 111 may be provided as a one-piece construction.

From a front view of the apparatus 10, the base section 115 is disposed along an X-axis, the vertical sections 117 and 118 are disposed along a Y-axis and the upper section 119 is disposed along a Z-axis. In this embodiment, the upper section 119 is provided as an inverted V-shape with a first leg 121 extending out from a distal end 124 of vertical section 117 and a second leg 122 extending out inward from a distal end 125 of vertical section 118 at an angle ranging from or about 20.0 degrees to 70.0 degrees wherein the distal ends of the legs 121, 122 converge at a midpoint of the frame 111 in a forward position as shown. In one particular embodiment, the legs 121, 122 extend out from the vertical sections 117 and 118 at an angle of 35.0 degrees (see angle 1A in FIG. 21).

In this embodiment, the upper section 119 includes a lift attachment member provided as a lift eye 127 located at the midpoint of the upper section 119, i.e., located at the point of convergence of the distal ends of the legs 121, 122. In another embodiment, the upper section 119 may include a lift attachment member in the form of a handle, hook, eye bolt, clevis fastener, hydraulic rotating unit, or other surface providing an attachment surface for a lift line 5 or other lifting or hoisting attachment or assembly for lifting and transport of the apparatus 10. In another embodiment, the upper section 119 may itself operate as an attachment surface, for example, tying off the apparatus 10 via the upper section 119 with rope, strapping, cable, chain, wire, and combinations thereof and/or hooking or latching the upper section 119 with a hook or sling hook as known in the art of hoists, cranes and other lifting devices.

As shown, the base section 115, the vertical sections 117 and 118 and the legs 121 and 122 of the upper section 119 are provided as elongated four sided members. In another embodiment, one or more of the base section 115, the vertical sections 117 and 118 and the legs 121 and 122 may be provided as cylindrical members or other multi-sided member, e.g., three-sided, hexagonal, and the like.

Figure 20:
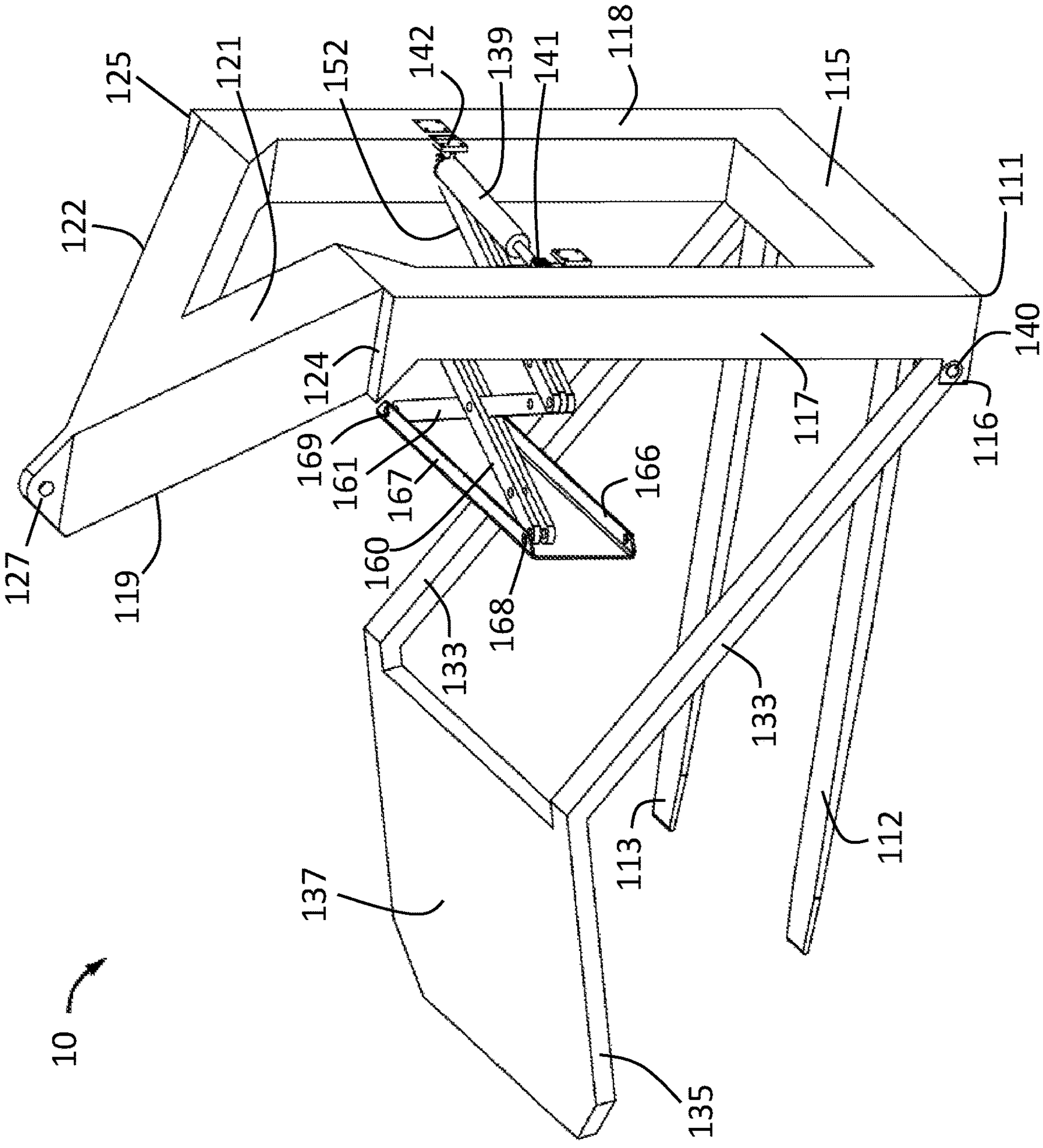
FIG. 20 is a rear perspective view of an embodiment of an apparatus of the present disclosure.
Figure 21:
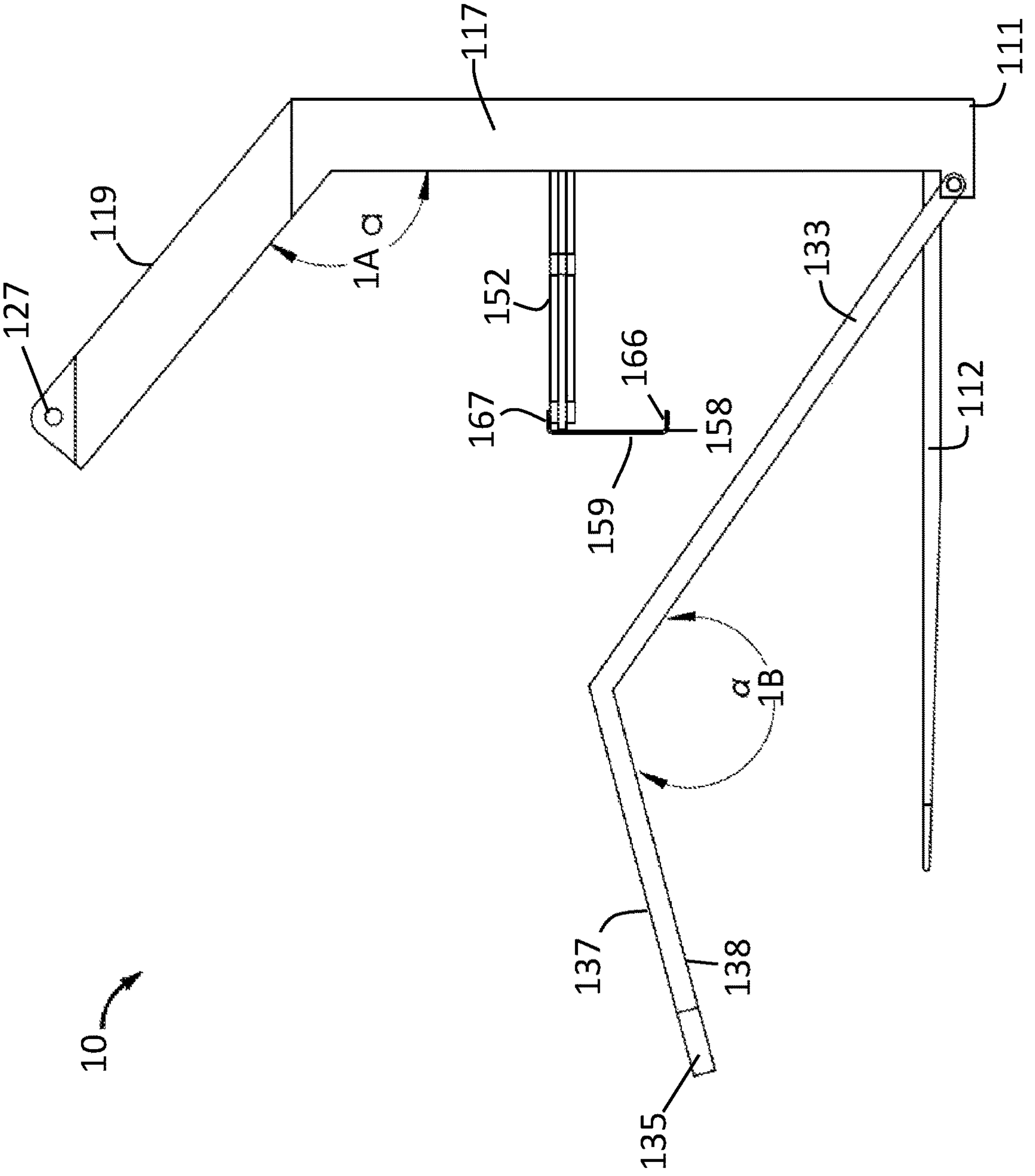
FIG. 21 is a side view of the apparatus of FIG. 20.

The apparatus 10 of this embodiment further includes an adjustable assembly comprising a guide assembly including (1) a guide member 135 and (2) one or more arm members 133 pivotally attached to the base section 115 or pivotally attached to an adjustable attachment surface 116 (see pivot point 140). With reference to FIG. 20, the one or more arm members 133 may be pivotally attached directly to the adjustable attachment surface 116 or pivotally attached to a mounting surface or attachment surface of the adjustable attachment surface 116 via pivot pins, fasteners such as hex bolts and hex nuts, shoulder bolts, and combinations thereof. In another embodiment, the one or more arm members 133 may be pivotally attached to the front side of the base section 115 via hinged connections. Suitably, the guide assembly may be directed between an upright position (see FIG. 24) and a down position as shown in FIG. 20 during operation of the apparatus 10.

Figure 45:
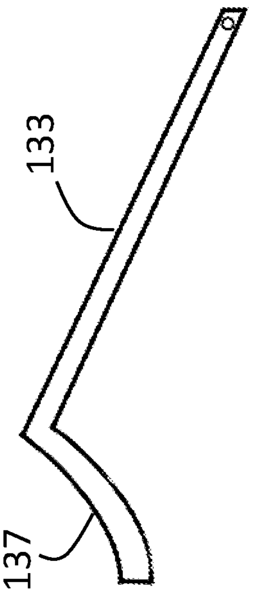
FIG. 45 is a side view of another embodiment of a guide member of an apparatus of the present disclosure.
Figure 46:
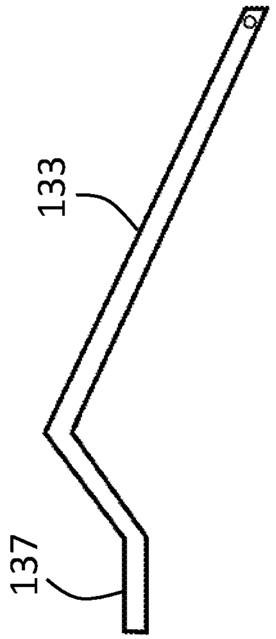
FIG. 46 is a side view of another embodiment of a guide member of an apparatus of the present disclosure.

As shown, the guide member 135 includes a planar first surface 137 and a planar second surface 138 extending out from the one or more arm members 133 at an angle ranging from 90.0 degrees to 170.0 degrees. In one particular embodiment, the planar second surface 138 of the guide member 135 extends out from the one or more arm members 133 at an angle of 150.0 degrees (see angle 1B in FIG. 21). As discussed below, the angle of the guide member 135 provides a sliding surface under gravity for one or more items of a unit load 300 as one or more items are directed off from the apparatus 10 as described below. In another embodiment, the first surface 137 may include a non-planar surface as shown in the simplified illustrations of FIGS. 45 and 46. In another embodiment, a guide member 135 may be provided as an enclosure or as a chute type member.

Figure 22:
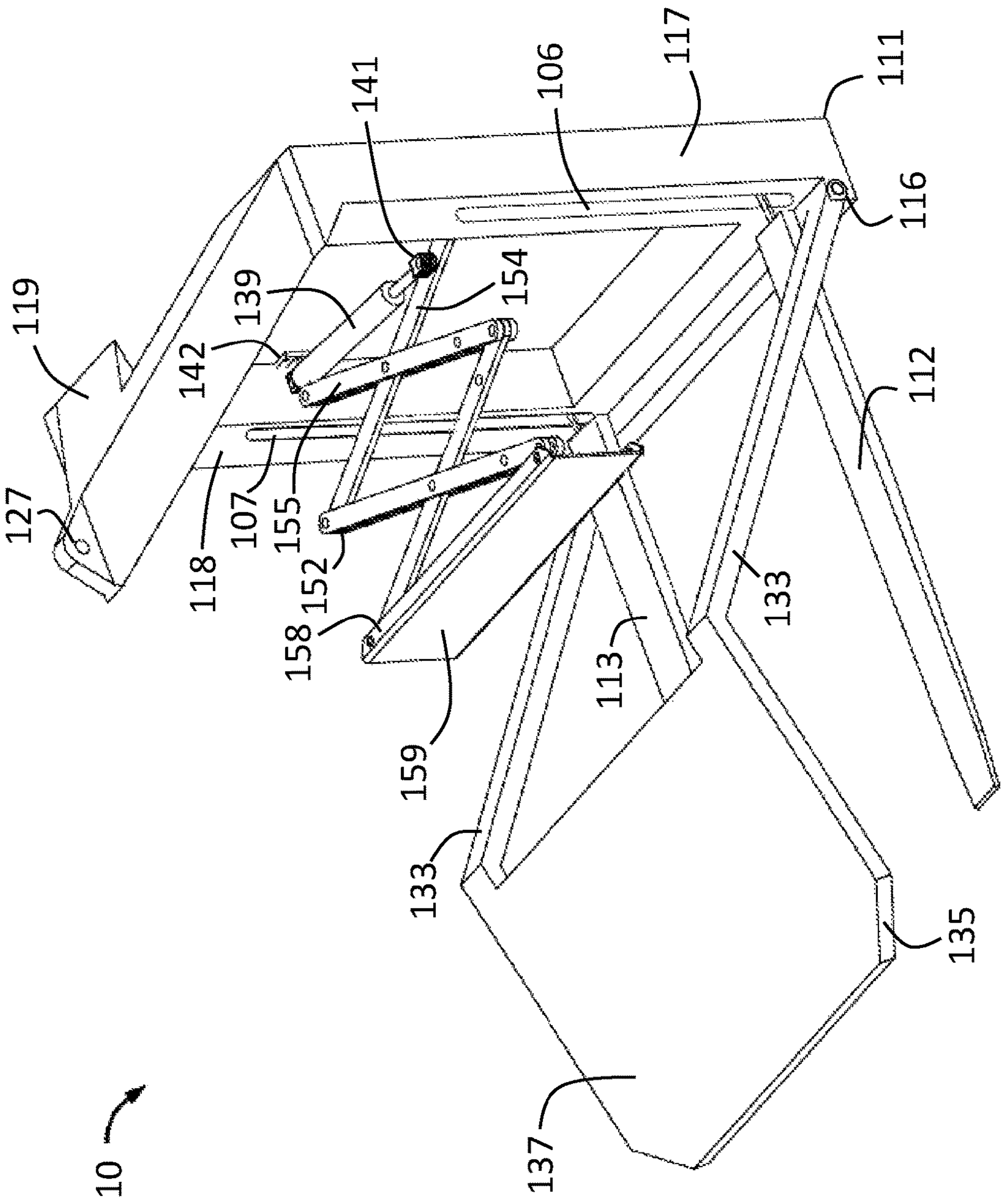
FIG. 22 is a front perspective view of the apparatus of FIG. 20.
Figure 23:
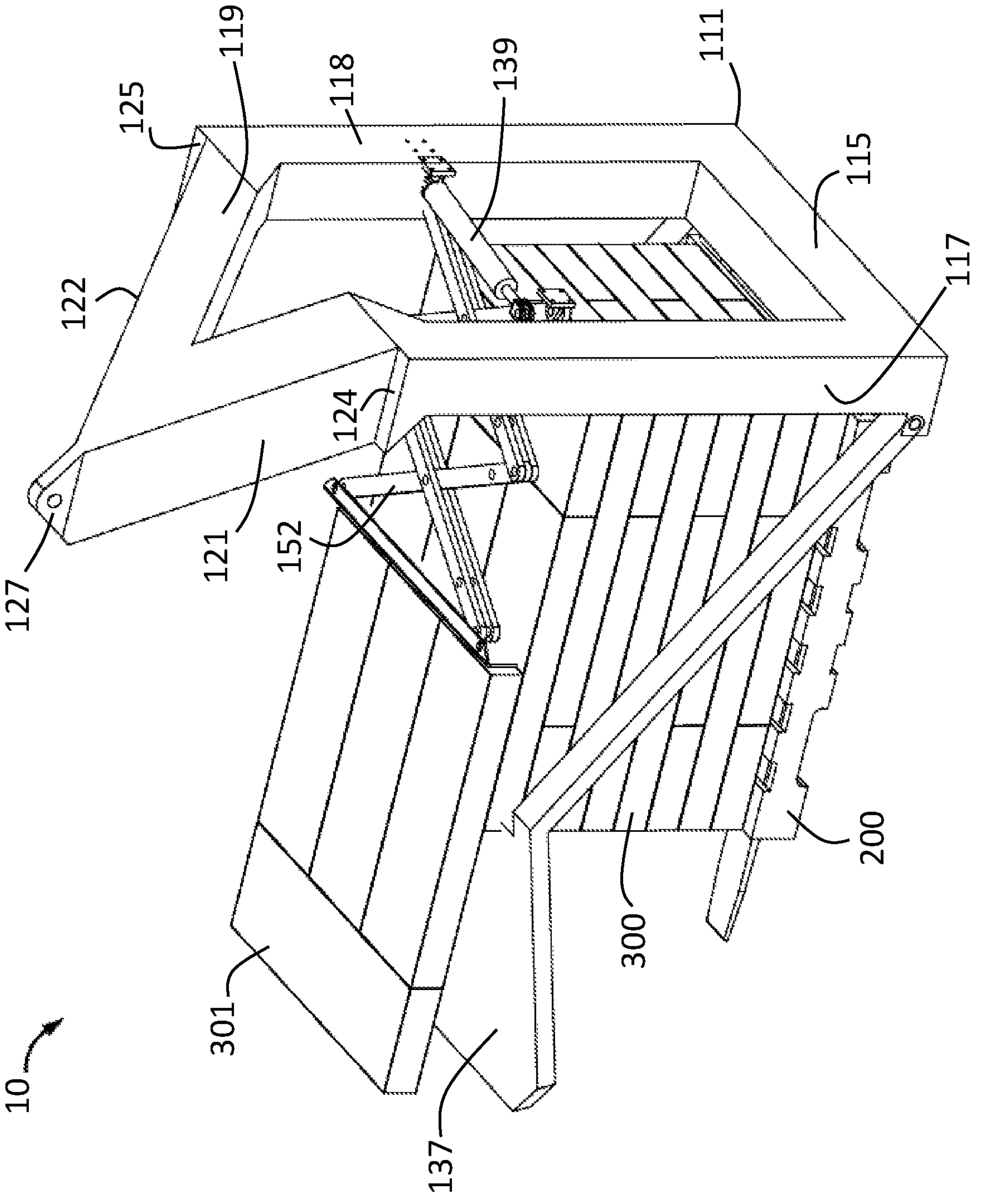
FIG. 23 is a rear perspective view of the apparatus of FIG. 20 including a portable platform and a unit load in communication with the apparatus.
Figure 25:
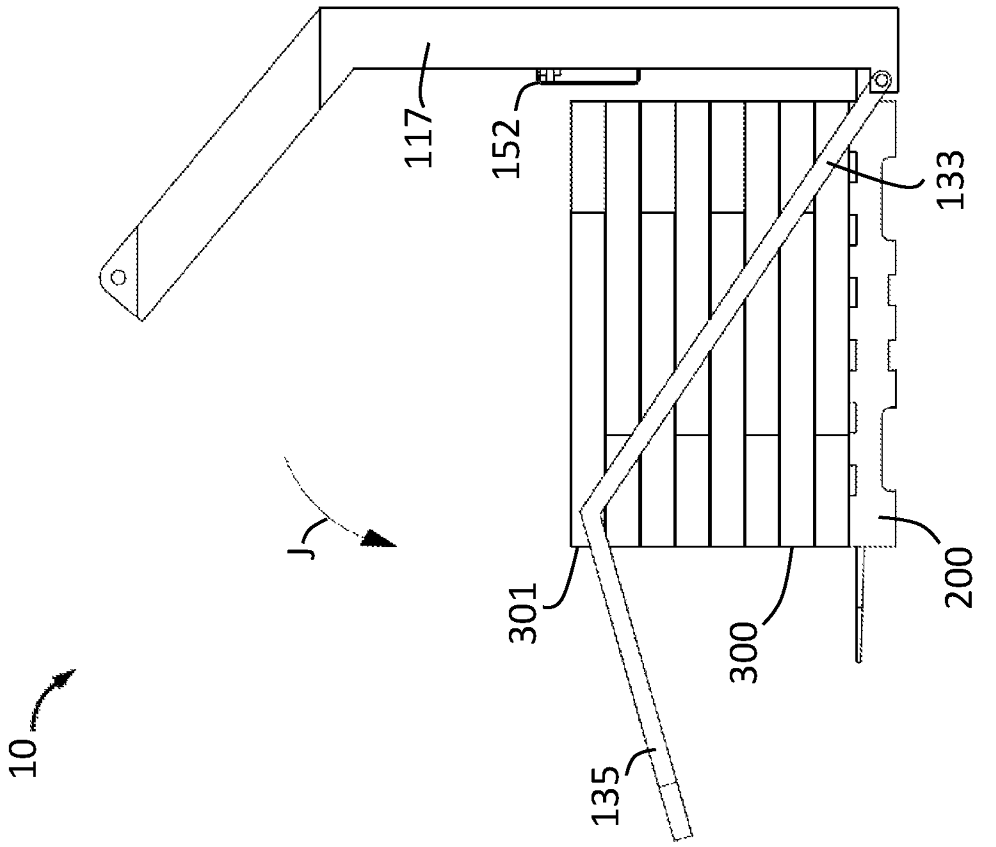
FIG. 25 is a side view of the apparatus of FIG. 20 including a portable platform and a unit load in communication with the apparatus.

In this embodiment, one or both of the vertical sections 117 and 118 are suitably provided as hollow members or partially hollow members housing one or more linear actuators therein. Suitable linear actuators may include, but are not necessarily limited to hydraulic cylinders, pneumatic cylinders, mechanical actuators, e.g., screw jacks, and combinations thereof. In one suitable embodiment, each of the vertical sections 117 and 118 may house a linear actuator in the form of a double acting hydraulic cylinder having a bore at a tail end secured to an inner surface of its corresponding vertical section 117 or 118 and a drive rod with a distal end attached to the adjustable attachment surface 116 via an attachment member disposed through linear vertical slots 106 and 107 running along the vertical sections 117 and 118 as shown in FIG. 22.

The apparatus 10 may include one or more support members including fork tines 112 and 113 as shown. In another embodiment, the apparatus 10 may include a support surface 11 as shown in FIGS. 1 and 2. In this embodiment, the fork tines 112 and 113 are attached to the adjustable attachment surface 116 and extend out from the adjustable attachment surface 116 in a parallel arrangement (see FIG. 22). In another embodiment, the fork tines 112 and 113 may be sized and spaced for operation with a particular portable platform 200 as described above. In operation, the one or more hydraulic cylinders housed within the vertical sections 117 and 118 may be powered to direct the adjustable attachment surface 116 and the fork tines 112, 113 along the vertical sections 117 and 118 according to the stroke of the hydraulic cylinder(s) and/or the length of the vertical slots 106 and 107.

The apparatus 10 of this embodiment also includes a mover assembly operationally configured to direct a unit load 300 or part of a unit load from a platform support 16 and/or a portable platform 200 carried by the apparatus 10. Similar as described above, the mover assembly of this embodiment of the apparatus 10 is operationally configured to remove a unit load 300 comprising one or more rows of stackable items from a portable platform 200 by removing each uppermost row of a unit load 300 from its stack (see FIG. 23) until each row of stacked items has been removed from the portable platform 200.

In this embodiment, the mover assembly includes a push assembly 152 operationally configured to be directed toward and apart from the vertical sections 117 and 118 along a horizontal plane. Similar as above, the push assembly 152 of this embodiment may include a horizontally aligned scissor linkage or lazy-tong configuration. The mover assembly may further include an actuation assembly including at least one linear actuator 139 in communication with the push assembly 152 for extending and retracting the push assembly 152. One suitable linear actuator 139 may include, but is not necessarily limited to a hydraulic cylinder, pneumatic cylinder, or a mechanical actuator, e.g., a screw jack, located between the vertical section 117 and 118 or other location. In one particular embodiment, the linear actuator 139 may include a double acting hydraulic cylinder with a bore at a tail end secured to a mounting surface or attachment surface 142 of the vertical section 118 via a fastener, e.g., a pivot pin, a shoulder bolt, machined pin, trunnion mount, and the like and a drive rod with a distal end attached to a first arm member 154 of the push assembly 152 via a fastener, e.g., a pivot pin, a shoulder bolt, machined pin, trunnion mount, and the like—see pivot point 141. As further shown in FIG. 22, the push assembly 152 also includes a second arm member 155 pivotally attached to the attachment surface 142 or the vertical section 118.

The push assembly 152 includes a faceplate 158 defined by a forward pushing surface 159 operationally configured to engage one or more items located on a portable platform 200. With reference to FIG. 20, the faceplate 158 may include opposing lip members 166 and 167 providing pivotal attachment points 168 and 169 for distal arms 160 and 161 of the scissor linkage push assembly 152. In this embodiment, the forward pushing surface 59 is provided as a planar type surface along a vertical plane having a width defining the width of the push assembly 152 similar as described above.

Figure 24:
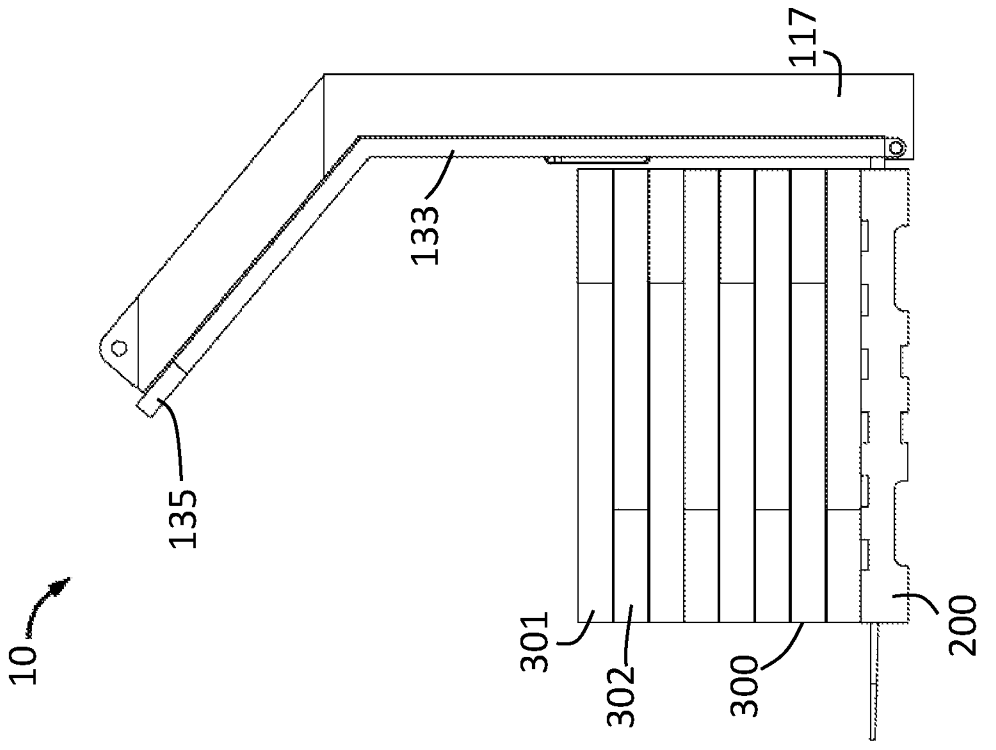
FIG. 24 is a side view of the apparatus of FIG. 20 including a portable platform and a unit load in communication with the apparatus.
Figure 27:
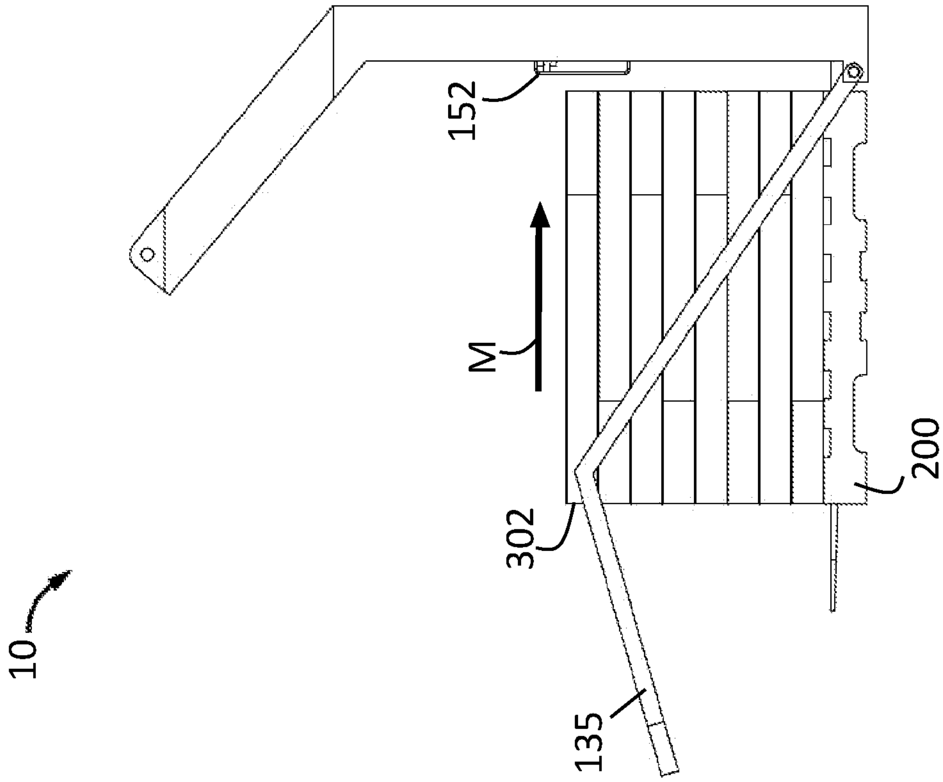
FIG. 27 is a side view of the apparatus of FIG. 20 including a portable platform and a unit load in communication with the apparatus.
Figure 26:
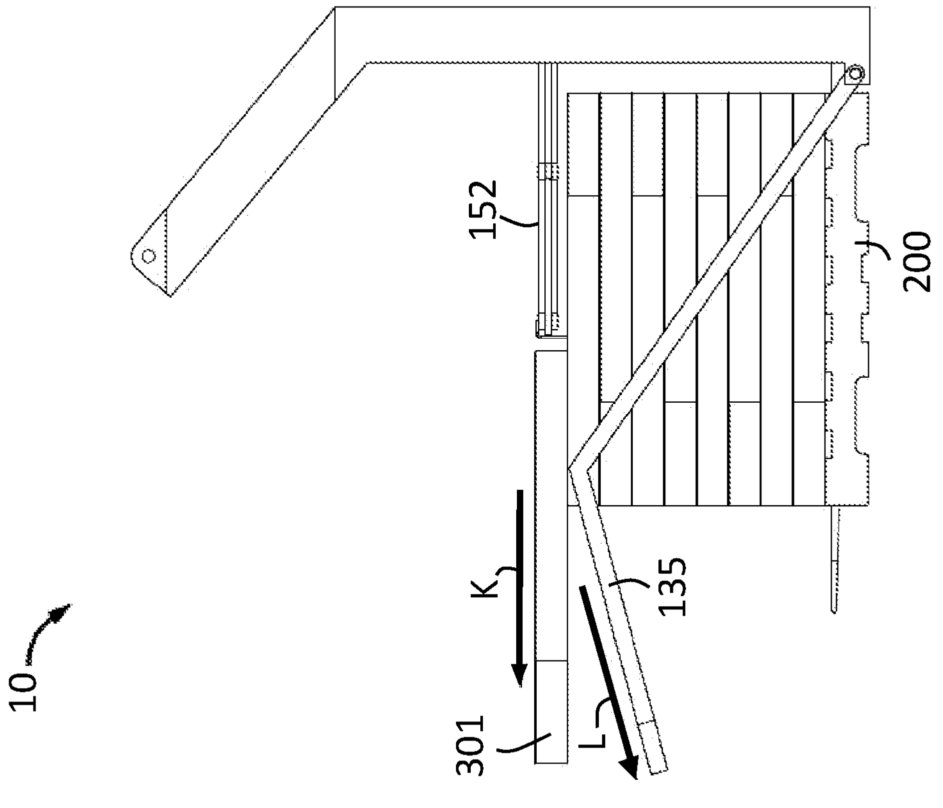
FIG. 26 is a side view of the apparatus of FIG. 20 including a portable platform and a unit load in communication with the apparatus.
Figure 28:
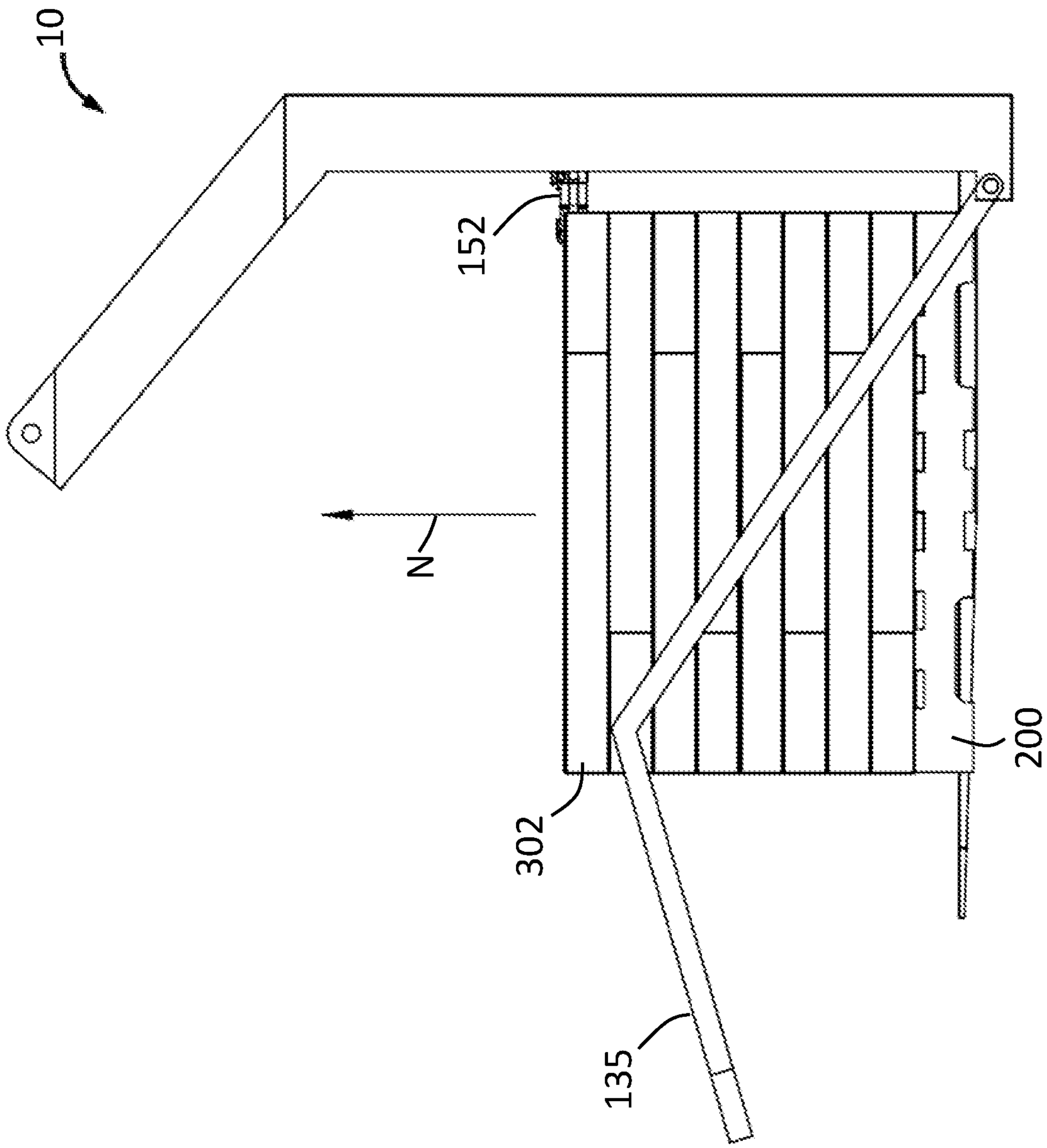
FIG. 28 is a side view of the apparatus of FIG. 20 including a portable platform and a unit load in communication with the apparatus.

With particular reference to the simplified example of FIGS. 24-28, at initial operation of the apparatus 10 the guide assembly, i.e., the arm members 133 and guide member 135 is suitably set at an upright fixed position (see FIG. 24) via one or more hydraulic cylinders and/or pneumatic cylinders or otherwise secured to the frame 111 via, one or more locking pins, one or more load holding valves, one or more clips, one or more springs, one or more clamps, one or more hooks, one or more latches, rope, chain, one or more magnets, and combinations thereof as the fork tines 112 and 113 of the apparatus 10 are mated with openings of a pallet 200 carrying unit load 300—shown in FIG. 24 as a stack of eight rows of bundles of shingles. Once the fork tines 112 and 113 engage the pallet 200, the guide assembly may be set to an unlocked position (see directional arrow J in FIG. 25) wherein the frame 111, arm members 133 and the guide member 135 enclose the unit load 300 and the apparatus 10 may be transported to a target location for removal of the unit load 300 from the pallet 200. Prior to transport or once the apparatus 10 has arrived at a target location, the one or more hydraulic cylinders housed within the vertical sections 117 and 118 may be powered to adjust the location of the adjustable attachment surface 116 and fork tines 12, 13 in relation to the location of the push assembly 152 in order to align the upper row 301 of the stacked bundles of shingles with the forward pushing surface 159 of the faceplate 158. The hydraulic cylinder 139 may then be powered to direct the push assembly 152 to an extended position (see directional arrow K), which directs or forces the upper row 301 of the bundles of shingles toward the guide member 135 (see FIG. 26) where the upper row 301 of the bundles of shingles slides down the guide member 135 under gravity (see directional arrow L). In order to remove the next resulting upper row 302 of the bundles of shingles, the hydraulic cylinder 139 is suitably powered to direct the push assembly 152 to a fully retracted position apart from the remaining stack of the bundles of shingles (see directional arrow M in FIG. 27). Once fully retracted, the one or more hydraulic cylinders housed within the vertical sections 117 and 118 may be powered to adjust the location of the adjustable attachment surface 116 and fork tines 12 and 13 in relation to the location of the push assembly 152 in order to align the upper row 302 of the bundles of shingles with the forward pushing surface 159 of the faceplate 158 (see directional arrow N in FIG. 28). The apparatus 10 may be powered to remove the upper row 302 similar as upper row 301 and the process may be repeated until each row of the bundles of shingles is removed from the pallet 200.

Figure 29:
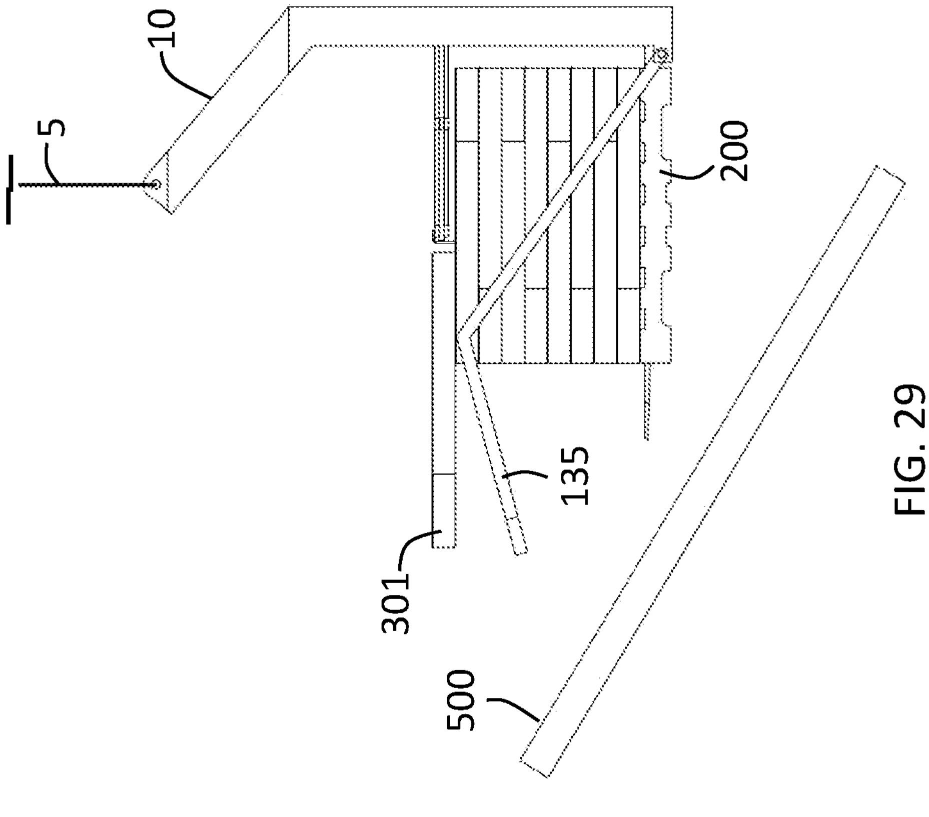
FIG. 29 is a side view of the apparatus of FIG. 20 in a lifted orientation located near a roof of a structure.
Figure 31:
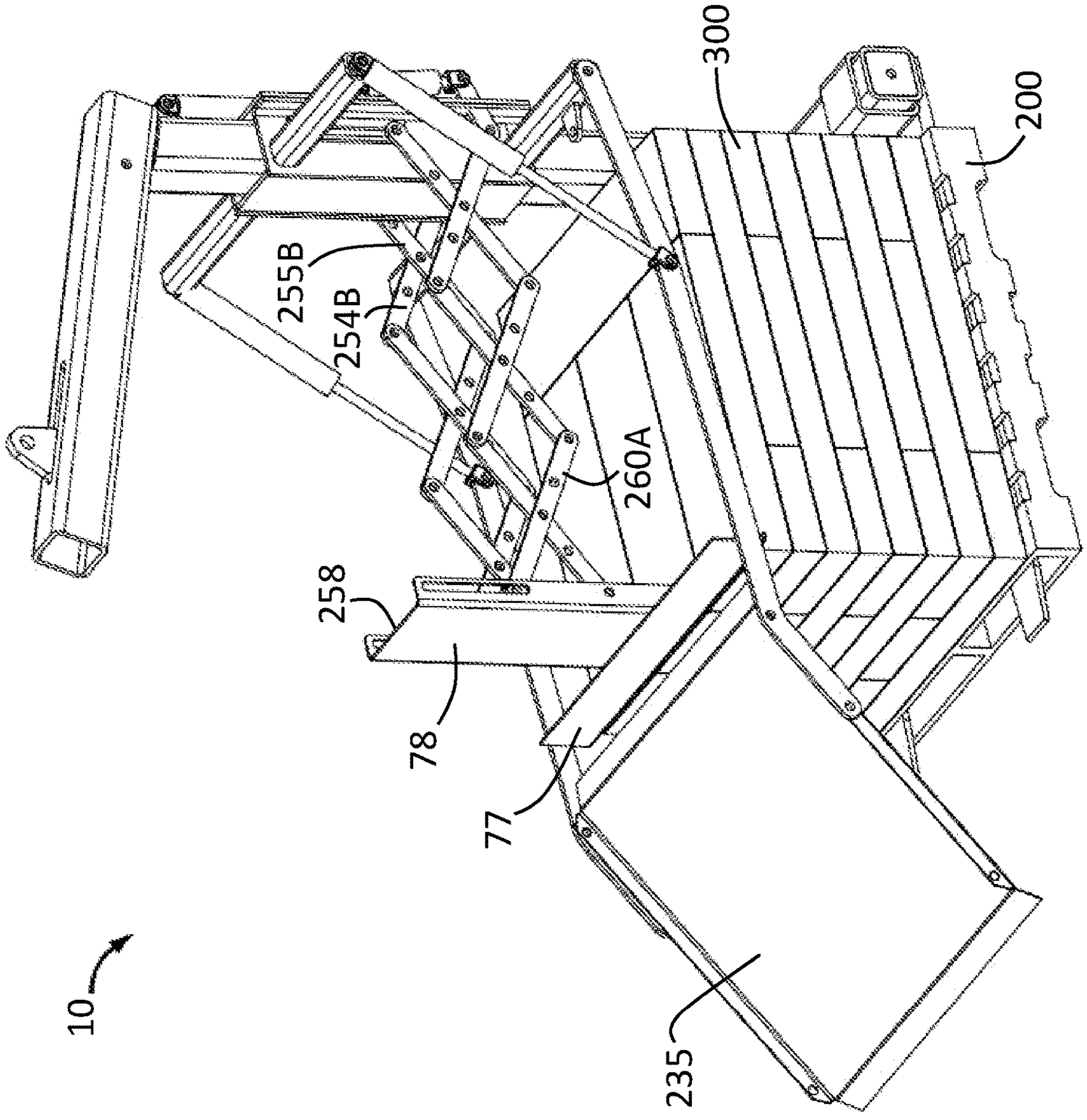
FIG. 31 is a front perspective view of an embodiment of an apparatus of the present disclosure including a portable platform and a unit load in communication with the apparatus.

In a scenario where the apparatus 10 is being used to unload bundles of shingles of a unit load 300 onto a pitched roof, the guide member 135 may be angularly aligned facing the roof 500 as shown in FIG. 29. In another embodiment, the guide member 135 may be angularly aligned or substantially aligned directionally according to the slope of roof 500, e.g., facing the apparatus 10 of FIG. 29 180.0 degrees in the opposite direction. If the slope of one or more target roofs 500 are known, an apparatus 10 may be provided with a guide member 135 having a planar second surface 138 that extends out from the one or more arm members 133 at a desired angle for optimum transfer of bundles of shingles onto one or more target roofs 500 and/or other target surfaces.

Figure 30:
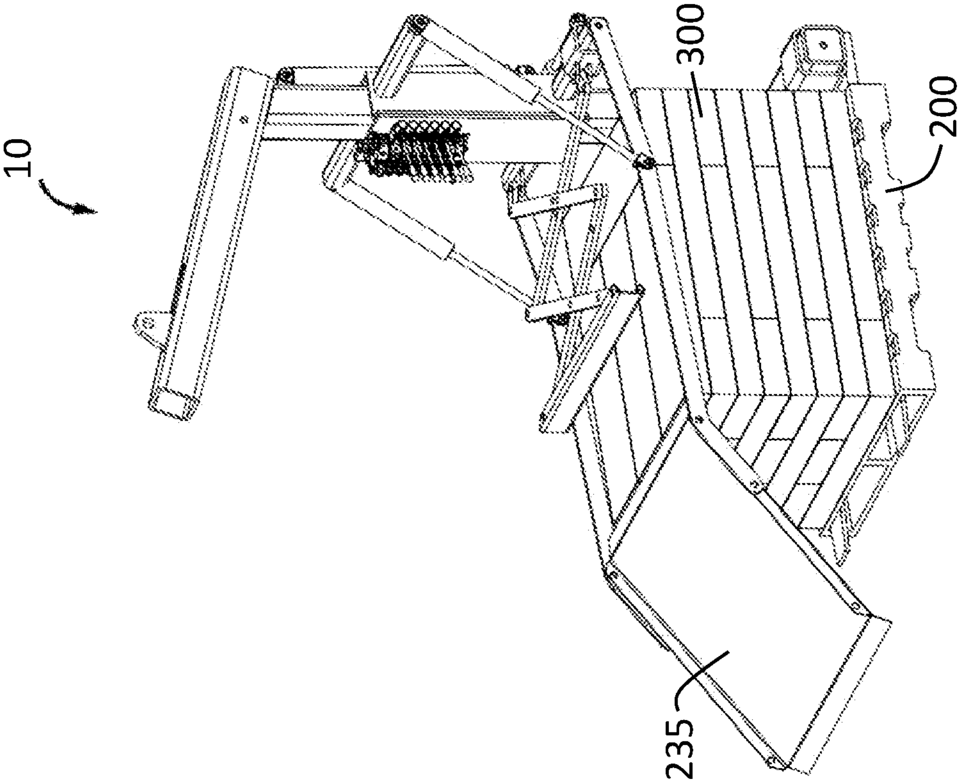
FIG. 30 is a front perspective view of an embodiment of an apparatus of the present disclosure including a portable platform and a unit load in communication with the apparatus.

In another embodiment, an apparatus 10 may be provided similar in design and construction as the embodiment of FIG. 3 but include a guide member similar in design as guide member 135 (see guide member 235 in FIG. 30). In still another embodiment as shown in FIGS. 31-34, an apparatus 10 may be provided with a faceplate 258 having a primary forward pushing surface 77 and a secondary forward pushing surface 78 operationally configured to maximize surface area for contacting part or all of a unit load 300. In this embodiment, the mover assembly of the apparatus 10 includes a push assembly with one or more vertically aligned scissor linkage or lazy tong configuration members 252A and 252B aligned in parallel and attached to the faceplate 258 on opposite sides as shown. The faceplate 258 of this embodiment includes opposing lip members 266 and 267 providing pivotal attachment points for a distal arm of each scissor linkage members of the scissor linkage members 252A, 252B (see distal arm 260A and attachment point 268 in FIG. 34). Each lip member 266 and 267 includes an open linear slot 91, 92 there through providing a mating surface for each of the distal arms 261A and 261B of each scissor linkage member 252A, 252B. As shown, each distal arm 261A and 261B may be provided as an elongated planar type member with a mating pin or other appendage extending out from the surface of each distal arm 261A, 261B at or near its distal end perpendicular to the plane of the distal arm 261A or 261B in a manner effective to mate with slots 91 and 92 (see mating pin 94 in FIG. 34). Each mating pin may be directed within its corresponding slot up to the length of the slot according to the retracted or extended position of each scissor linkage member 252A, 252B (see the location of the mating pin 94 within the slot 91 with scissor linkage member 252A set at an extended position). Without limiting the disclosure, one suitable mating pin 94 may include a nut and bolt combination such as a hex bolt and hex nut combination to maintain the mated position of the pin within slot.

Figure 34:
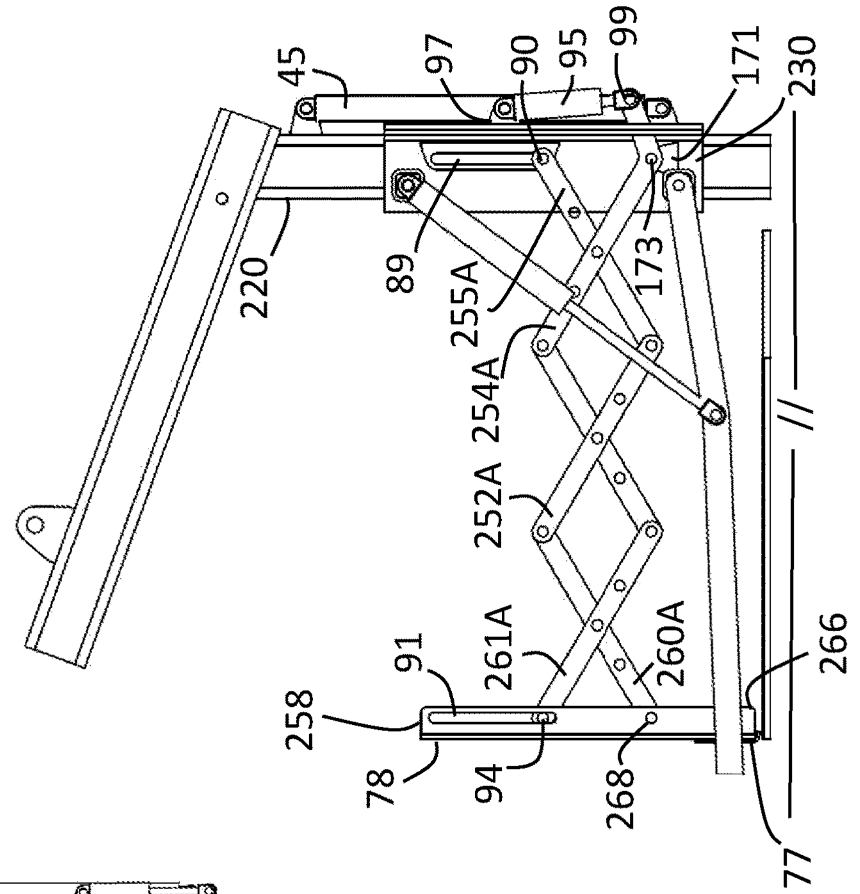
FIG. 34 is a side view of a portion of the apparatus of FIG. 31.
Figure 33:
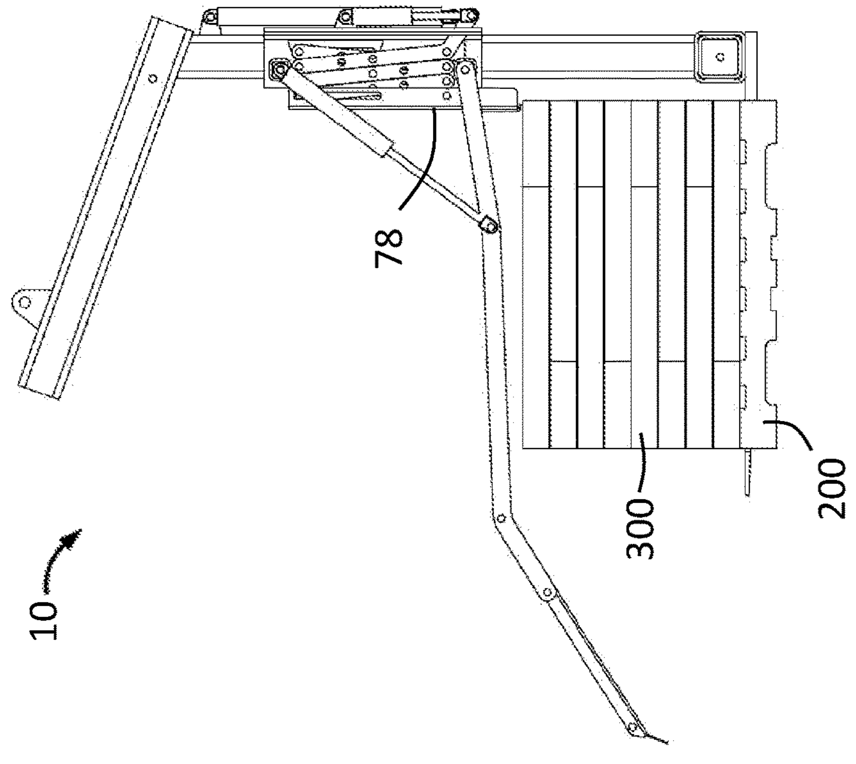
FIG. 33 is a side view of the apparatus of FIG. 31 including a portable platform and a unit load in communication with the apparatus.

With further reference to FIG. 34, the mover assembly of this embodiment includes an actuation assembly in communication with an adjustable assembly. Similar as described above, the adjustable assembly includes a slide member 230 secured to a vertical member 220 in a manner effective for the slide member 230 to travel along the vertical member 220 a distance equal to or less than the length of the vertical member 220.

Figure 32:
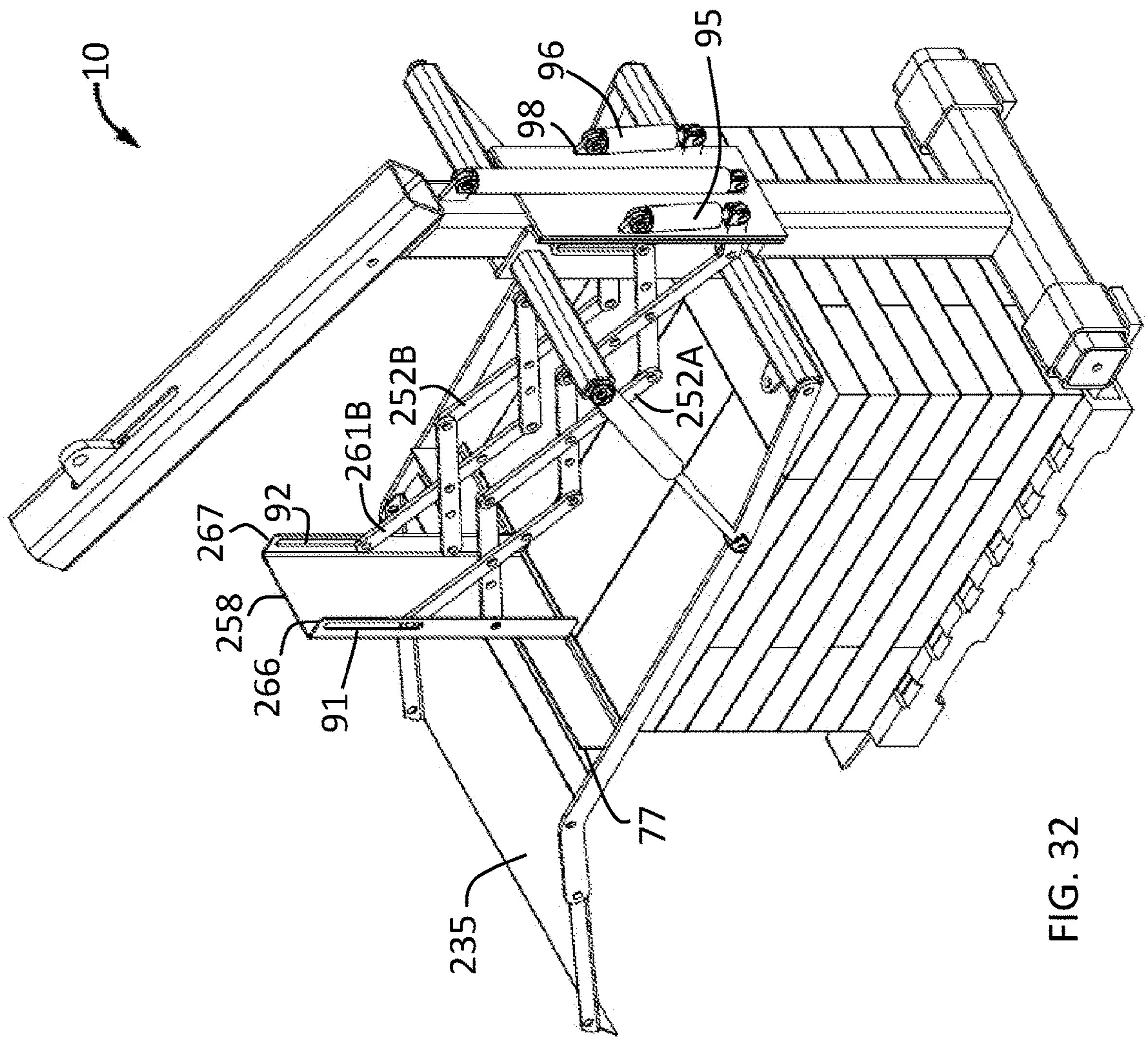
FIG. 32 is a rear perspective view of the apparatus of FIG. 31 including a portable platform and a unit load in communication with the apparatus.

With reference to FIGS. 32 and 34, the actuation assembly includes linear actuators 95 and 96 operationally configured to extend and retract corresponding scissor linkage members 252A and 252B. In this embodiment, the linear actuators 95 and 96 may include double acting hydraulic cylinders including a bore at a tail end for attachment to a mounting surface or attachment surface 97 and 98 of the slide member 230 and a drive rod having a distal end pivotally attached to a first arm member 254A or 254B (see pivot point 99). Herein, the attachment between the distal end of the drive rod and the first arm members 254A and 254B may be referred to as a "first attachment point" or "first pivot point"

of each of the first arm members 254A and 254B. Similar as described above, in another embodiment the linear actuators 95 and 96 may be provided as one or more pneumatic cylinders. In another embodiment, the linear actuators 95 and 96 may be provided as mechanical actuators, e.g., screw jacks.

The slide member 230 of this embodiment includes linear slots on opposite sides of the slide member 230 providing a mating surface for each of the second arm members 255A, 255B of each scissor linkage member 252A, 252B (see slot 89 in FIG. 34). Similar as described above, each of the second arm members 255A and 255B is provided as an elongated planar type member with a mating pin or other appendage extending out from the surface of each second arm member 255A and 255B at or near its distal end perpendicular to the plane of the distal arm 255A or 255B in a manner effective to mate with corresponding slots, e.g., slot 89. Each mating pin may be directed within its corresponding slot up to the length of the slot according to the retracted or extended position of each scissor linkage member 252A, 252B (see the location of the mating pin 90 within slot 89 with scissor linkage member 252A set at an extended position in FIG. 34).

As shown, each of the first arm members 254A and 254B of this embodiment is provided as a non-linear member with opposing planar surfaces providing a second attachment point or second pivot point of the first arm members 254A and 254B. In particular, the slide member 230 of this embodiment suitably includes a mounting surface or attachment surface for each of the first arm members 254A and 254B providing a second attachment point or second pivot point of each of the first arm members 254A and 254B at a bend of each first arm member (see attachment surface 171 and pivot point 173 in FIG. 34). A non-limiting bend angle range of each of the first arm members 254A and 254B is 30.0 to 60.0 degrees. Suitably, the attachment points of each of the first arm members 254A and 254B promotes extension and retraction of each scissor linkage member 252A, 252B according to the stroke of the hydraulic cylinders 95 and 96 in a manner effective to direct a unit load 300 or part of a unit load 300 from a platform support 16 or a portable platform 200 carried by the apparatus 10.

Figure 35:
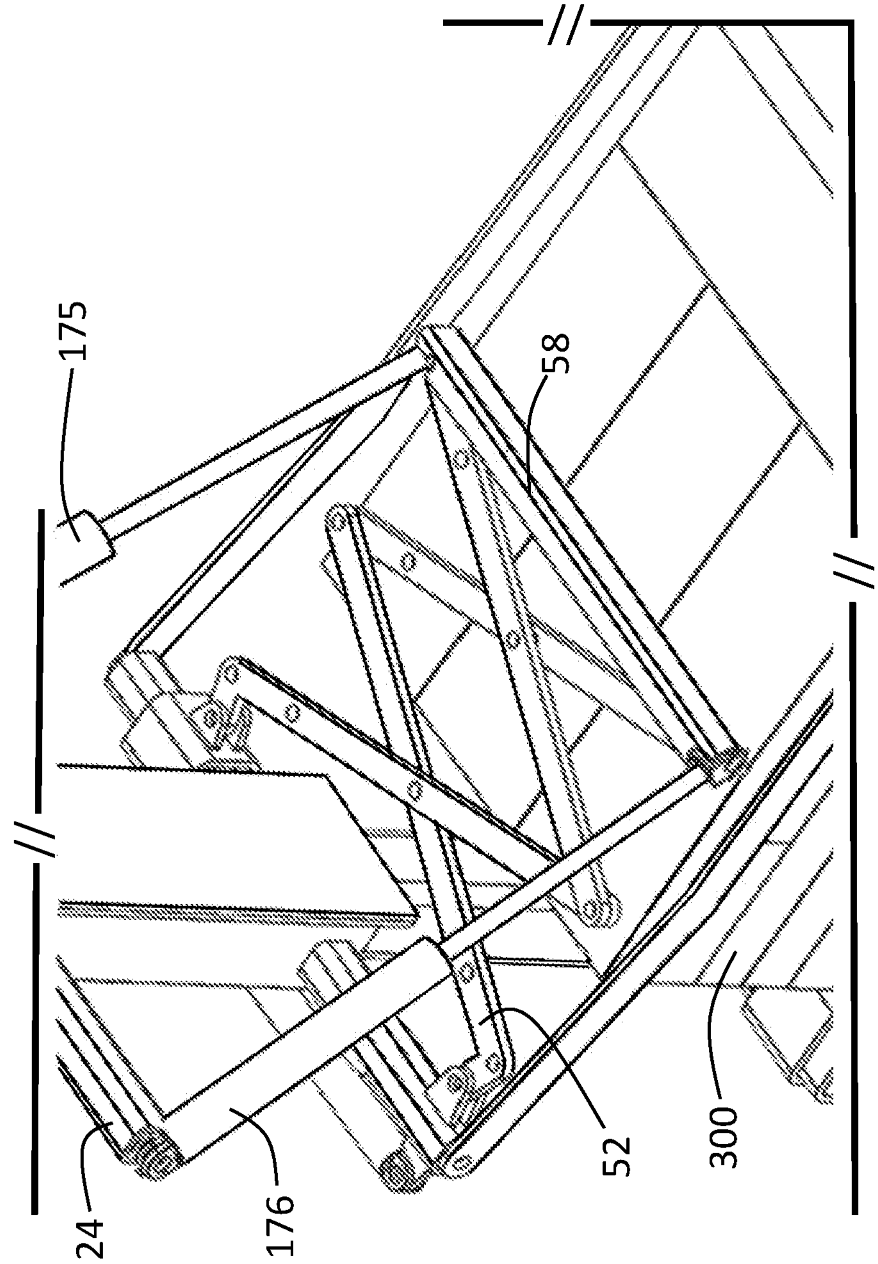
FIG. 35 is a front perspective view of a portion of an embodiment of an apparatus of the present disclosure including a portable platform and a unit load in communication with the apparatus.

With reference to FIG. 35, in another embodiment of the apparatus 10 extension and retraction of the push assembly 52 may be controlled by one or more linear actuators 175 and 176 pivotally attached to the faceplate 58 as shown. Similar as described above, the one or more linear actuators may be provided as double acting hydraulic cylinders 175, 176 each having a bore at a tail end for pivotal attachment to the distal ends of the third and fourth horizontal attachment surfaces 23 and 24 and a drive rod having a distal end pivotally attached at opposing ends of the faceplate 58.

Another embodiment of an apparatus 10 of the present disclosure is provided in FIGS. 49-71. With attention to FIGS. 49-52, the apparatus 10 of this embodiment includes a frame 411 including at least an elongated horizontal base section (hereafter "first frame section 415") defined by a longitudinal center line, an elongated vertical intermediate section (hereafter "second frame section 420") defined by a longitudinal center line including a proximal end 432 attached to the first frame section 415 in a fixed position, and an upper section (hereafter "third frame section 425") defined by a longitudinal center line extending out from a distal end 436 of the second frame section 420 in a fixed forward position of the apparatus 10. Similar as described above, from a front view of the apparatus 10 the first frame section 415 is disposed along an X-axis, the second frame section 420 is disposed along a Y-axis and the third frame section 425 is disposed along a Z-axis.

In one embodiment, the frame 411 may be provided as a one-piece construction. In another embodiment, the first frame section 415, the second frame section 420 and the third frame section 425 may be provided as independent members releasably assembled or permanently assembled. In one embodiment, the first frame section 415, the second frame section 420 and the third frame section 425 may be releasably secured together via fasteners such as nut/bolt type fasteners and/or other threaded fasteners. As shown in FIGS. 49-52, the first frame section 415, the second frame section 420 and the third frame section 425 may be secured together via welds providing a fixed frame of the apparatus 10. In this embodiment, the frame 411 may include one or more stiffener members such as gusset plates or the like operationally configured to reinforce the connections between the second frame section 420 and the first and third frame sections 415 and 425. For example, the apparatus 10 may include opposing stiffener members 426 and 427 and/or stiffener member 428, which are connected to the second frame section 420 and to the third frame section 425 and operationally configured to reinforce the welded connection between the second frame section 420 and the third frame section 425 and transfer loads from the third frame section 425 to second frame section 420. The apparatus 10 may also include opposing stiffener members 429 and 431 connected to the second frame section 420 and the first frame section 415 operationally configured to reinforce the welded connection between the second frame section 420 and the first frame section 415 and to transfer loads from the second frame section 420 to the first frame section 415.

Figure 51:
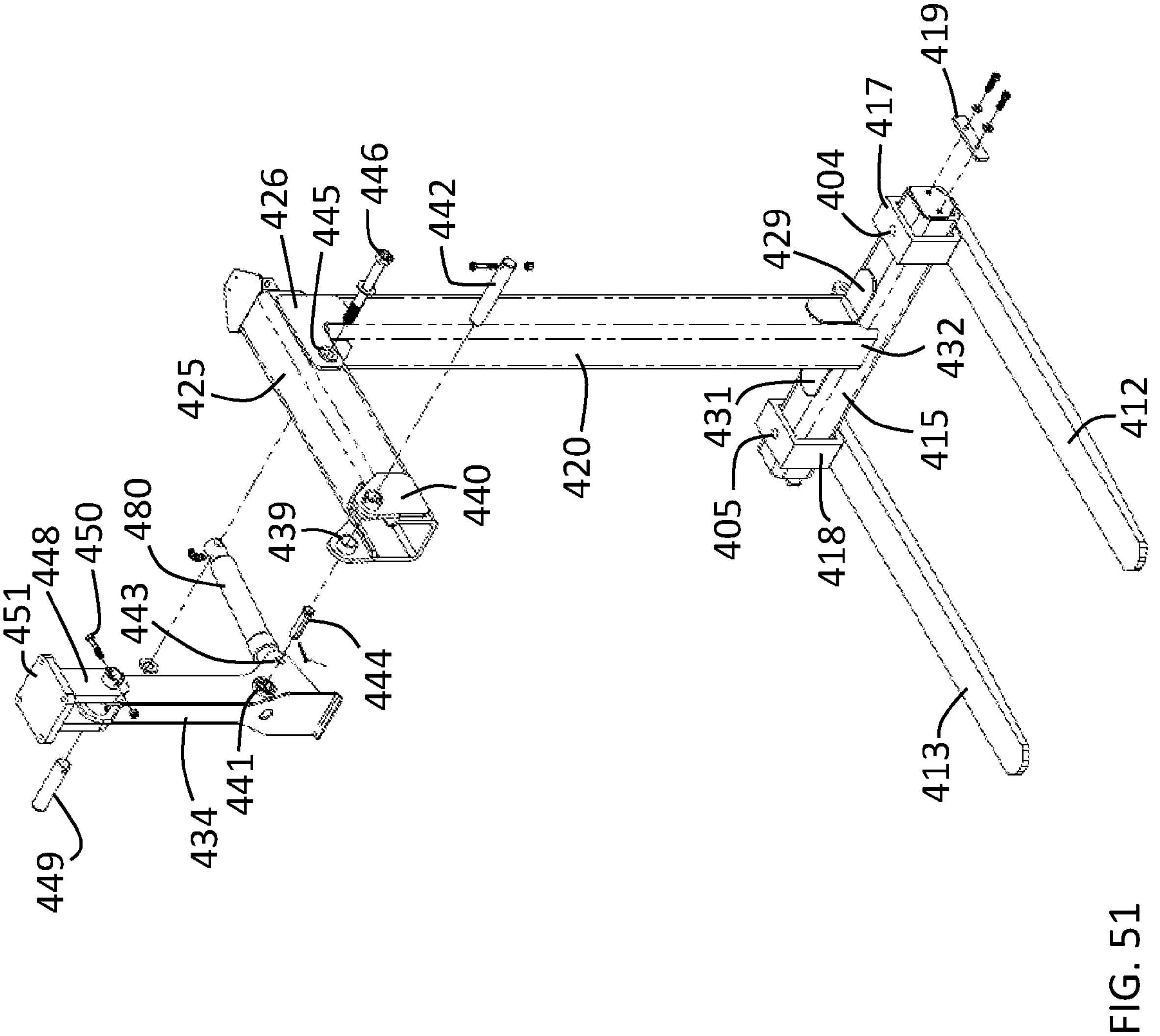
FIG. 51 is a front perspective partially exploded view of a frame and fork tines of the apparatus of FIG. 49.
Figure 52:
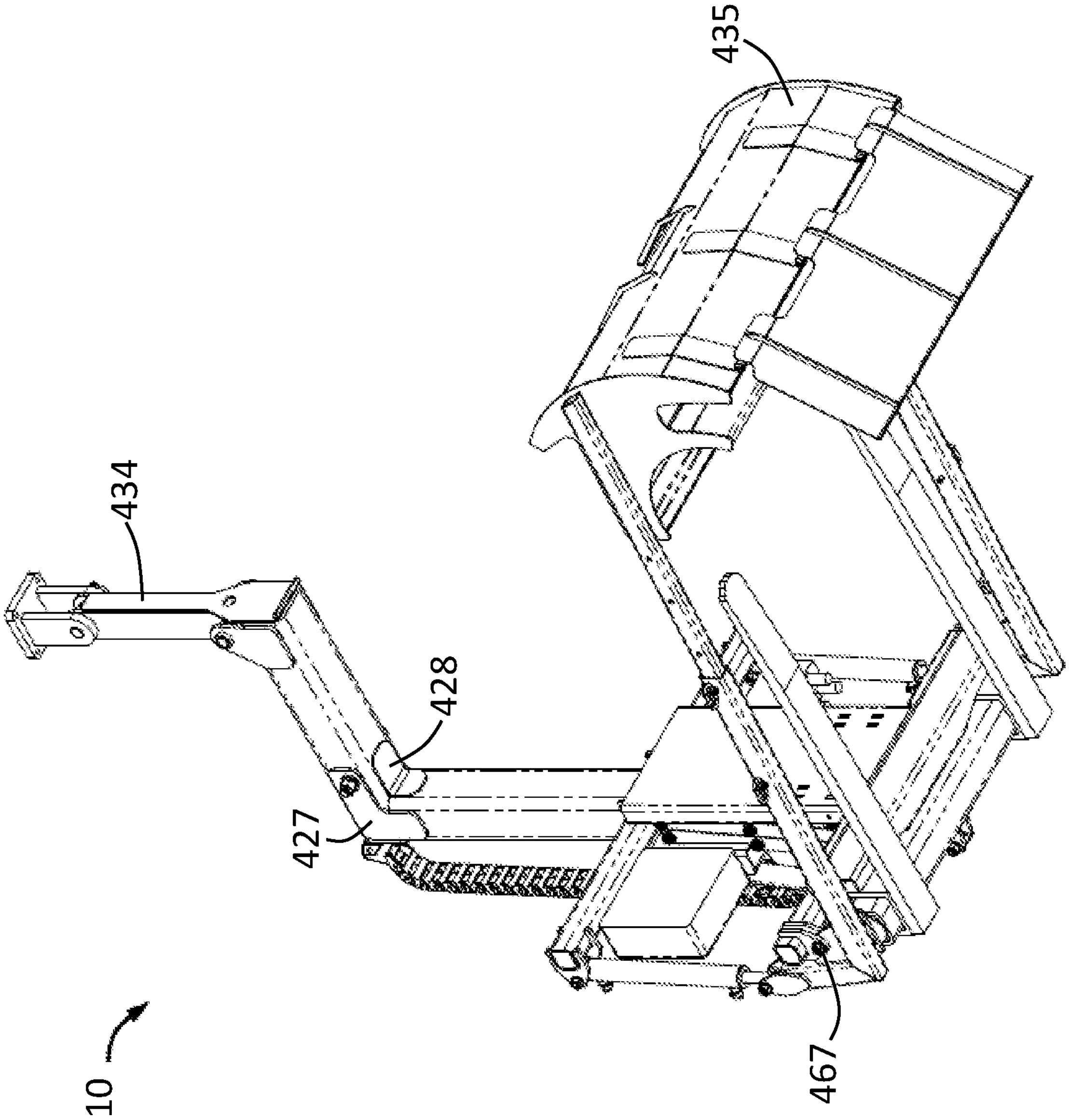
FIG. 52 is a bottom front perspective view of the apparatus of FIG. 49.
Figure 53:
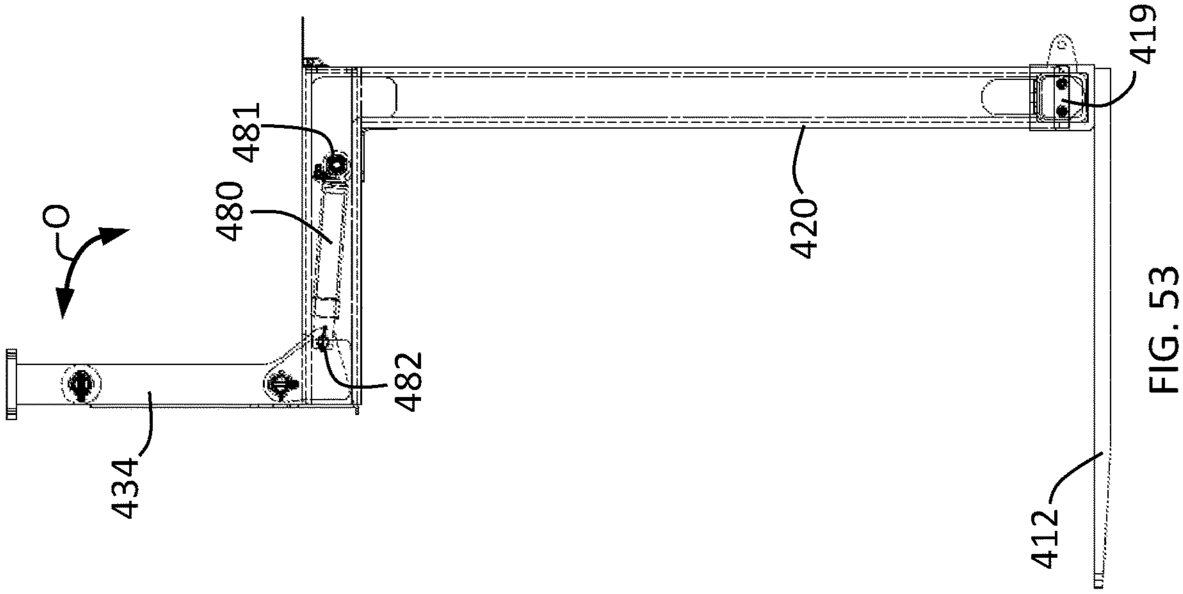
FIG. 53 is a partial phantom side view of a frame and fork tines of the apparatus of FIG. 49.
Figure 55:
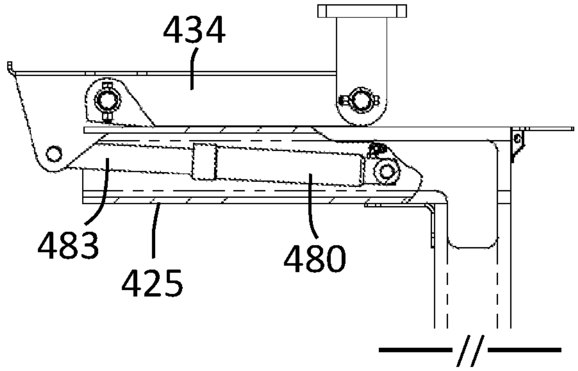
FIG. 55 is a partial phantom side view of a leveling assembly of the apparatus of FIG. 49.

As shown, the first frame section 415, the second frame section 420 and the third frame section 425 are provided as elongated four sided members. In another embodiment, one or more of the first frame section 415, the second frame section 420 and the third frame section 425 may be provided as cylindrical members or other multi-sided member, e.g., three-sided, hexagonal, and the like. Similar as described above, the apparatus 10 may include one or more support members in the form of a platform support 16 as described above or in the form of fork tines 412 and 413 attached to and extending out from opposing ends of the first frame section 15 in parallel or substantially parallel as described above. As shown in FIG. 51, each of the fork tines 412 and 413 may include an adjustable collar 417 and 418 similar as described above including apertures 404 and 405 for receiving a corresponding locking pin there through. As understood by the skilled artisan, the maximum width between the fork tines 412 and 413 is dictated according to the length of the first frame section 415. With reference to FIGS. 51 and 53, the first frame section 415 may also include fork tine keepers 419 releasably fastened to the distal ends of the first frame section 415 and operationally configured to prevent the fork tines 412, 413 from slipping off from the first frame section 415.

Similar as described above, in this embodiment the third frame section 425 extends out from an attachment point with the distal end 436 of the second frame section 420 forming an angle—shown in this embodiment as forming a ninety (90.0) degree angle with the second frame section 420. In another embodiment, the angle formed may be greater than or less than ninety degrees. In this embodiment, the distal end 436 of the second frame section 420 acts as a support surface or seat for the third frame section 425 wherein the surface configuration of the distal end 436 may establish the angle of the third frame section 425 in relation to the second frame section 420.

Figure 54:
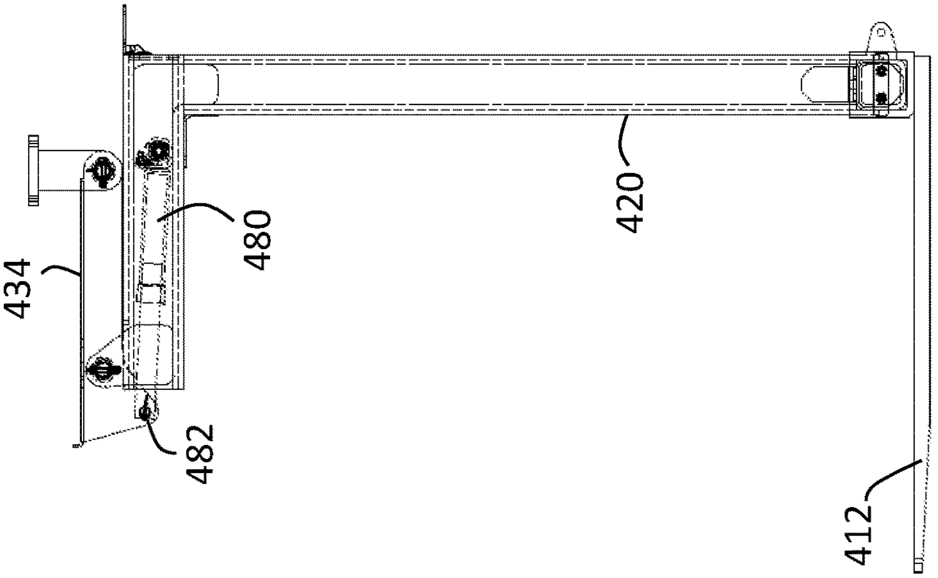
FIG. 54 is a partial phantom side view of a frame and fork tines of the apparatus of FIG. 49.

In this embodiment, the third frame section 425 is provided as part of a leveling assembly operationally configured as a connector to communicate the apparatus 10 with a lift line 5 for directing the apparatus 10 to one or more locations in a desired orientation. The leveling assembly is also operationally configured to maintain the second frame section 420 in a vertical or substantially vertical alignment with the earth's gravitational vector during operation. With reference to FIGS. 51, 53 and 54, in addition to the third frame section 425, the leveling assembly further includes a leveling arm member 434 pivotally attached to the third frame section 425 and one or more linear actuators 480 operationally configured to direct the leveling arm member 434 toward and away from the third frame section 425 according to directional arrow O. As shown, in one embodiment the third frame section 425 may be provided as a hollow or partially hollow member for receiving one or more linear actuators 480 therein. In addition, the distal end of the third frame section 425 includes a space or open area operationally configured to receive a proximal end of the leveling arm member 434 whereby the one or more linear actuators 480 are operationally configured to direct the leveling arm member 434 between a fully extended position as shown in FIG. 53 and a fully contracted position as shown in FIG. 54.

Suitably, the third frame section 425, the leveling arm member 434 and the one or more linear actuators 480 are operably connected via fasteners and corresponding apertures for receiving the apertures there through. In addition, the leveling arm member 434 is provided as a hollow member with a proximal end shaped to include linkage geometry operationally configured to rotate the leveling arm member 434 according to directional arrow O when the leveling arm member 434 is acted on by the one or more linear actuators 480. For example, as shown in FIG. 51, the distal end of the third frame section 425 includes opposing apertures 439 provided via mounting plates 440 secured to the third frame member 425, e.g., via welds and/or fasteners, the opposing apertures 439 corresponding to a first set of apertures 441 of the leveling arm member 434 for receiving a pivot pin 442 there through in a manner effective for the leveling arm member 434 to be directed according to directional arrow O. The leveling arm member 434 also includes a second set of apertures 443 for receiving a fastener such as pin 444 there through for securing the one or more linear actuators 480 to the leveling arm member 434—the pin 444 being secured during operation via a cotter pin or the like. In addition, the third frame member 425 also includes opposing apertures 445 provided via the opposing stiffener members 427 and 428 for receiving a fastener such as pin 446 there through in a manner effective to secure the one or more linear actuators 480 to the third frame member 425. In this embodiment, the one or more linear actuators 480 may include a double acting hydraulic cylinder as described above in which the bore at a tail end of the hydraulic cylinder is secured to the third frame section 425 at attachment point 481 via pin 446 and the distal end of the drive rod 483 of the hydraulic cylinder 480 is pivotally attached to the leveling arm member 434 at attachment point 482 via pin 444.

With further reference to FIG. 51, the leveling assembly further includes a lift attachment member or crane mount 448 pivotally attached to the third frame section 425 via a pin 449 and fastener 450, e.g. a bolt or the like, the crane mount 448 including a connection bracket 451 as shown operationally configured to be fastened, e.g., via bolts or the like, to a hydraulic rotation mechanism of a lifting member 400 such as a crane or the like providing for controlled rotation of the apparatus 10 as desired. In another embodiment, a different type of connection may be employed for use with different lifting equipment.

Figure 56:
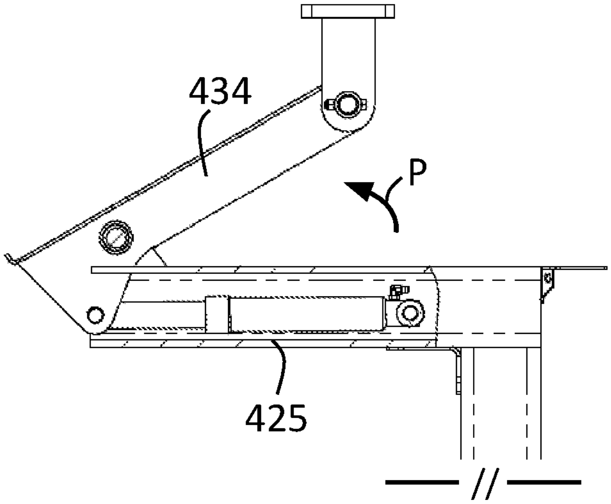
FIG. 56 is a partial phantom side view of a leveling assembly of the apparatus of FIG. 49.

Turning to FIGS. 53-57, when the apparatus 10 is empty, i.e., when there is no unit load 300 on the one or more support members, e.g., platform support 16, fork tines 412 and 413, and the apparatus 10 is in a resting position, the leveling arm member 434 is suitably set at a fully contracted position (FIG. 55) with the drive rod 483 of the hydraulic cylinder 480 set at a fully extended position. As the apparatus 10 is lifted to a suspended position via a lift line 5, the leveling arm member 434 is directed apart from the third frame section 425 according to directional arrow P as shown in FIG. 56. This rotational movement of the leveling arm member 434 translates to linear movement of the drive rod 483 of the hydraulic cylinder 480 in a retracted direction. Linear movement of the drive rod in a retracted direction causes hydraulic fluid, e.g., oil, to pressurize within the hydraulic cylinder 480. As understood by the skilled artisan, a hydraulic relief valve may be positioned in line with a hydraulic fluid port of the hydraulic cylinder 480 that is operationally configured to trap the hydraulic fluid and allow the fluid pressure to build inside the hydraulic cylinder 480. As also understood by the skilled artisan, hydraulic fluid is not compressible, as such, the hydraulic fluid acts like a solid and the drive rod 483 of the hydraulic cylinder 480 cannot move in a retracted direction any further until the pressure within the hydraulic cylinder 480 builds high enough to open the corresponding hydraulic relief valve. Once the hydraulic relief valve opens, the hydraulic fluid exits a base part of the hydraulic cylinder 480 directing the drive rod in a retracted direction allowing the leveling arm member 434 to rotate until the apparatus 10 reaches a level position, e.g., the one or more support members are oriented in a horizontal or substantially horizontal position.

Figure 57:
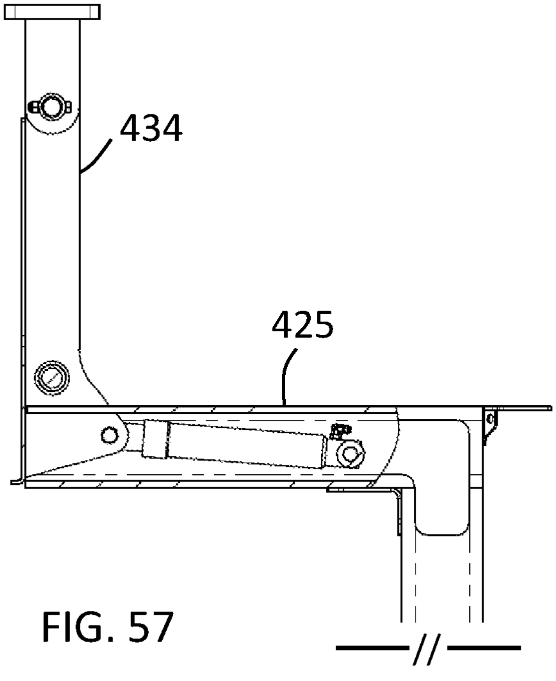
FIG. 57 is a partial phantom side view of a leveling assembly of the apparatus of FIG. 49.

Once a level position of the apparatus 10 is realized, the hydraulic relief valve pressure setting is equal or substantially equal to the pressure within the hydraulic cylinder 480 whereby the hydraulic relief valve is directed to a closed position. When the apparatus 10 is carrying a unit load 300, e.g., a full pallet of bundles of shingles, a level position of the apparatus 10 is realized when the leveling arm member 434 is in a vertical position or near vertical position as shown in FIG. 57. In such an operation, as bundles of shingles are removed from the apparatus 10, the center of gravity of the apparatus 10 changes thereby directing the apparatus 10 to a non-level position. During removal of the bundles of shingles, i.e., during the unloading phase, an operator of the apparatus 10 may pressurize the hydraulic cylinder 480 via controls, e.g., a joystick, which directs the drive rod of the hydraulic cylinder 480 in an extended direction. In particular, as the volume of hydraulic fluid within the hydraulic cylinder 480 increases, i.e., as the fluid pressure within the hydraulic cylinder 480 increases, the drive rod is directed linearly in an extended direction and directs the leveling arm member 434 toward a contracted position as desired. As stated above, leveling of the apparatus 10 is operator controlled, however, if the apparatus 10 is directed beyond its level position, the natural effect of the fluid pressure in the hydraulic cylinder 480 and the setting of the hydraulic relief valve are operationally configured to take effect to suspend the apparatus 10 from the lift line 5 in a level orientation.

Figure 58:
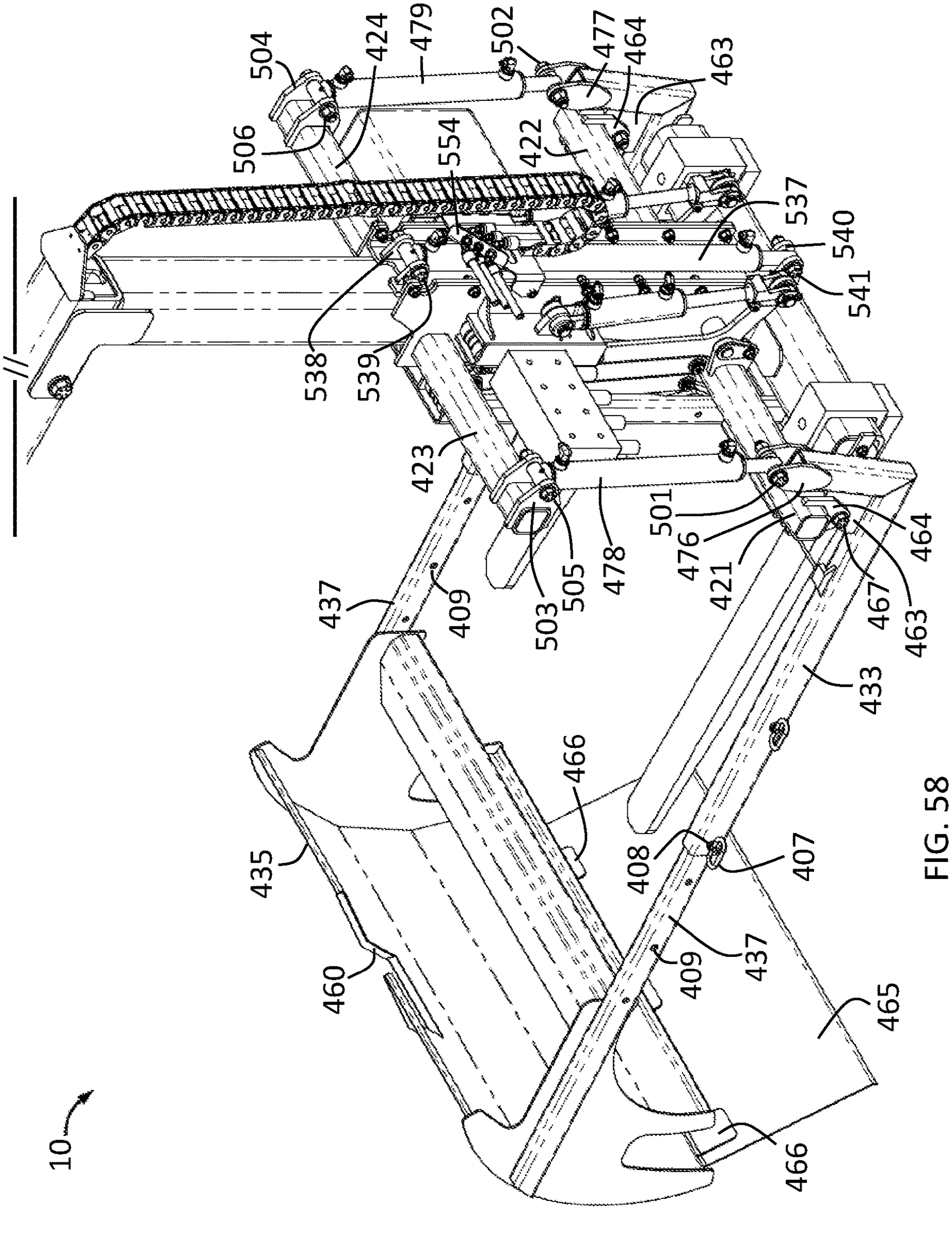
FIG. 58 is a rear perspective view of a portion of the apparatus of FIG. 49.

Similar as described above, the apparatus 10 of this embodiment includes an adjustable assembly and a guide assembly. For example, the apparatus 10 includes a slide member 430 secured to the second frame section 420 in a manner effective for the slide member 430 to travel along the second frame section 420 a distance equal to or less than the length of the second frame section 420. The apparatus 10 of this embodiment also includes first and second horizontal attachment surfaces 421, 422 and third and fourth horizontal attachment surfaces 423, 424 extending out perpendicular from the slide member 430 as shown. In addition, the guide assembly of this embodiment includes one or more arm members 433 and an adjustable non-planar guide member 435 releasably secured to the one or more arm members 433. In particular, the guide member 435 includes one or more adjustable male type mating arm members 437 corresponding with the one or more female type arm members 433. As shown in FIG. 58, the one or more arm members 433 and corresponding mating arm members 437 include a plurality of apertures 408 and 409 operationally configured to adjust the length of the guide member 435 in relation to the second frame section 420 via one or more removable set pins 407. Seeing that the apparatus 10 may be built to scale, the size and number of apertures 408, 409 and the spacing between apertures 408, 409 may vary as desired or as otherwise required for one or more particular unit loads 300. For purposes of a unit load 300 comprising bundles of shingles, the distal ends of the one or more arm members 433 and the corresponding one or more mating arm members 437 may include apertures 408, 409 spaced apart to accommodate a plurality of sizes of bundles of shingles and stacking arrangements—often referred to as how bundles of shingles are palletized when stacked on a pallet. As understood by persons of ordinary skill in the art of shingles, economy type shingles are often palletized with three bundles of shingles per row (see FIG. 59) and architectural bundles of shingles are often palletized with four bundles of shingles per row (see FIG. 31). Apertures 408 and 409 of this embodiment of the apparatus 10 may include spacing measurements as described in Example 2 below.

Figure 59:
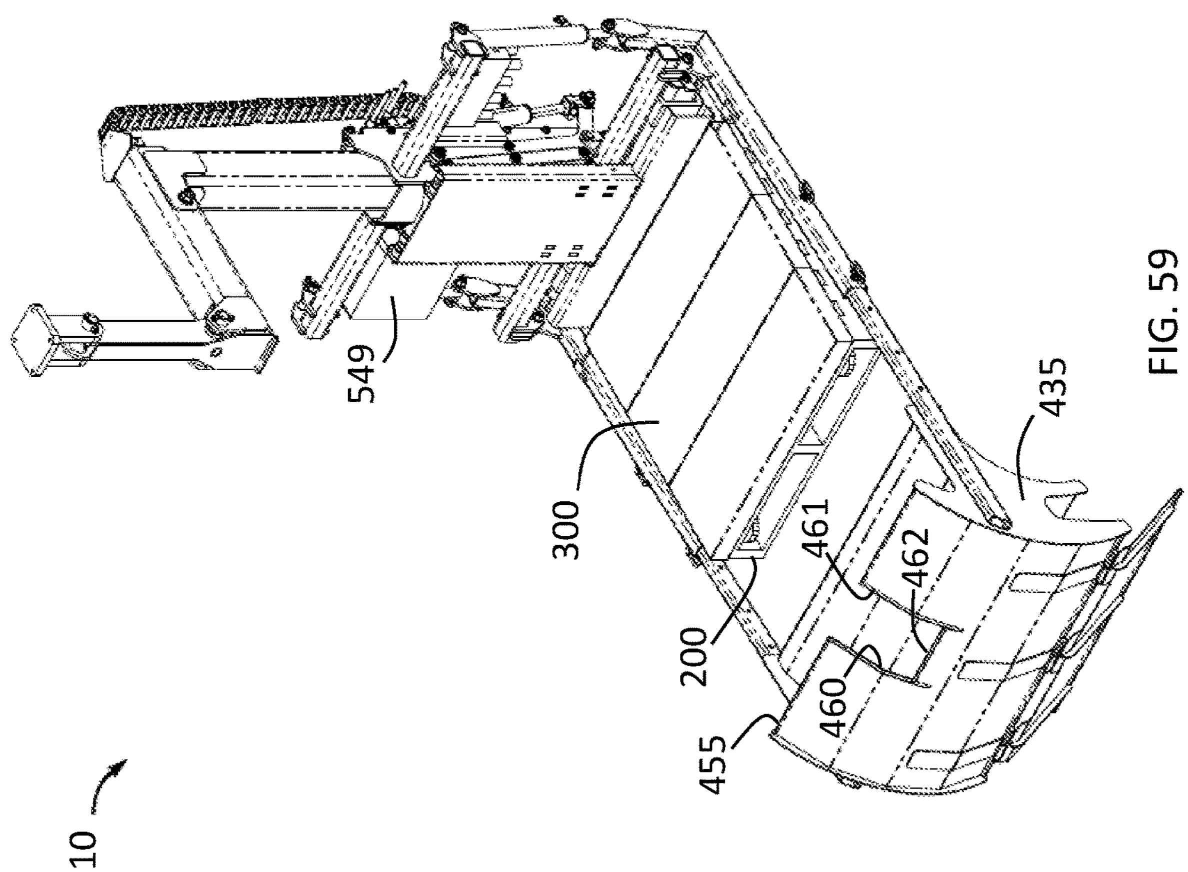
FIG. 59 is a front perspective view of the apparatus of FIG. 49 with a portable platform and a unit load in communication with the apparatus.
Figure 62:
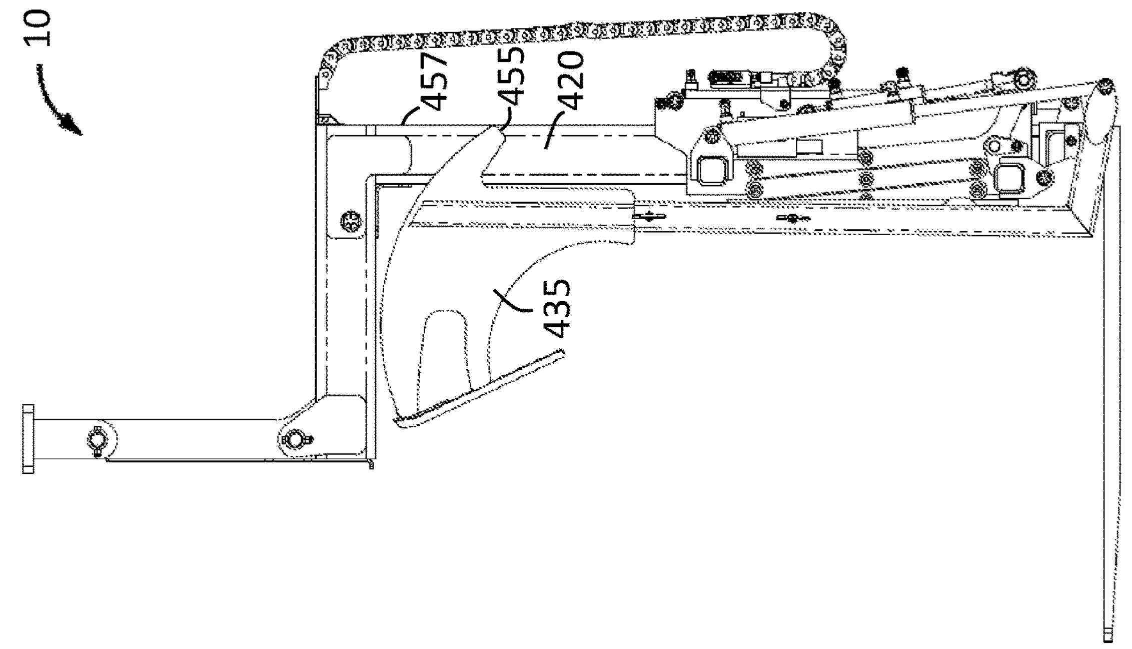
FIG. 62 is a side view of the apparatus of FIG. 49.
Figure 61:
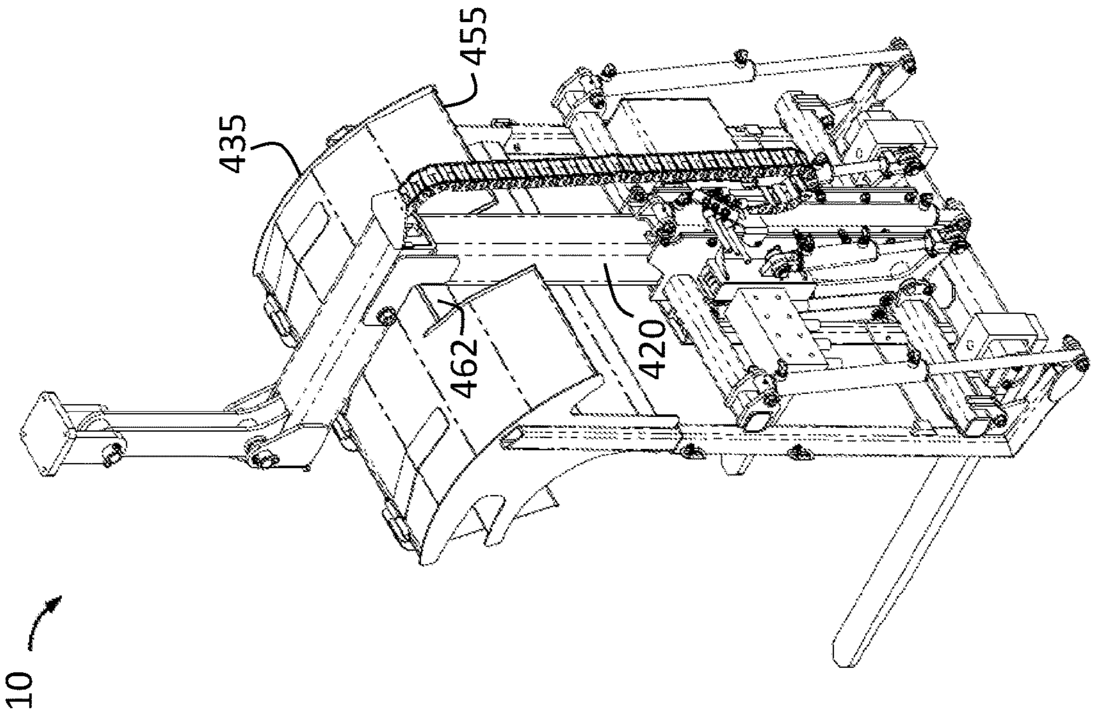
FIG. 61 is a rear perspective view of the apparatus of FIG. 49.
Figure 64:
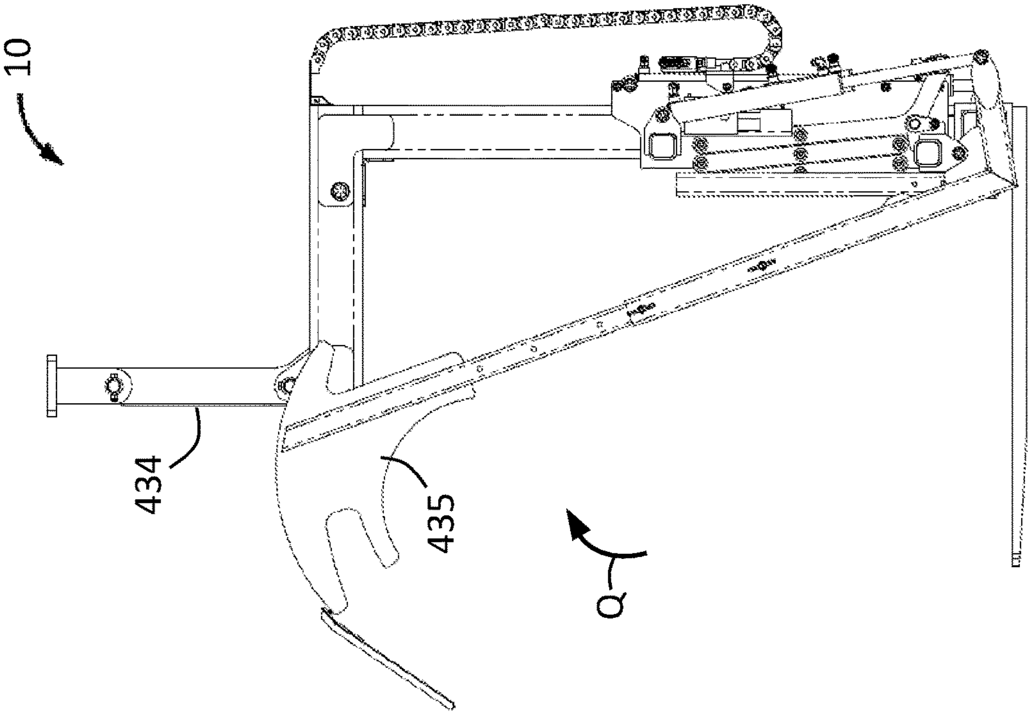
FIG. 64 is a side view of the apparatus of FIG. 49.
Figure 63:
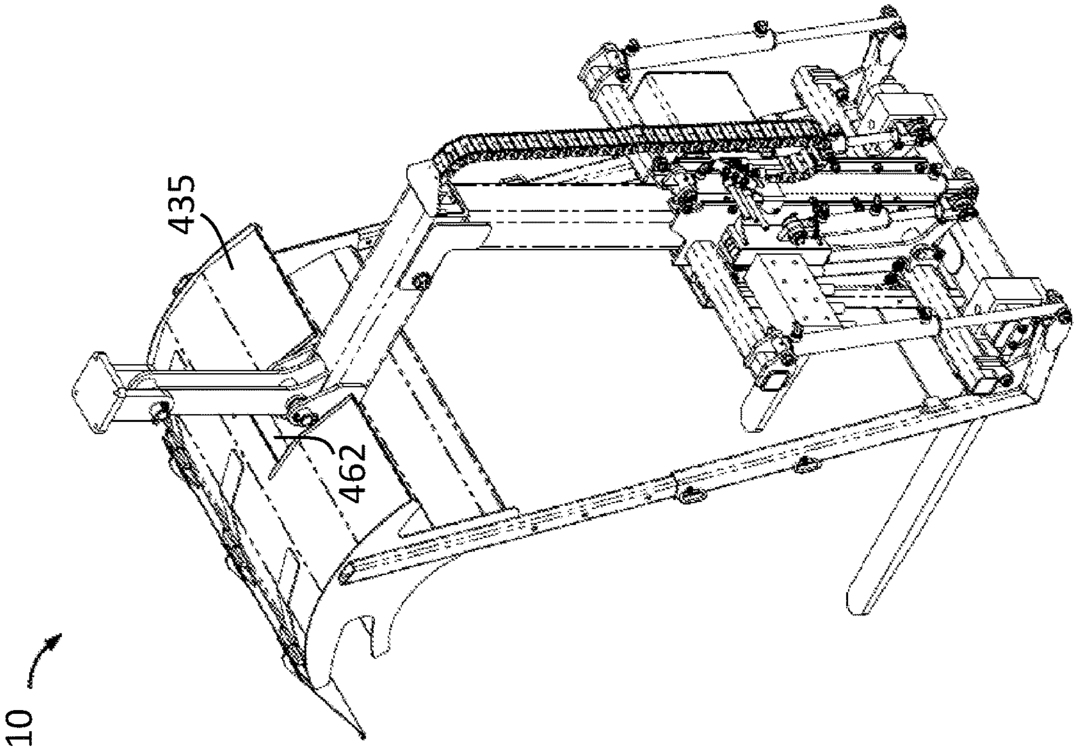
FIG. 63 is a rear perspective view of the apparatus of FIG. 49.
Figure 65:
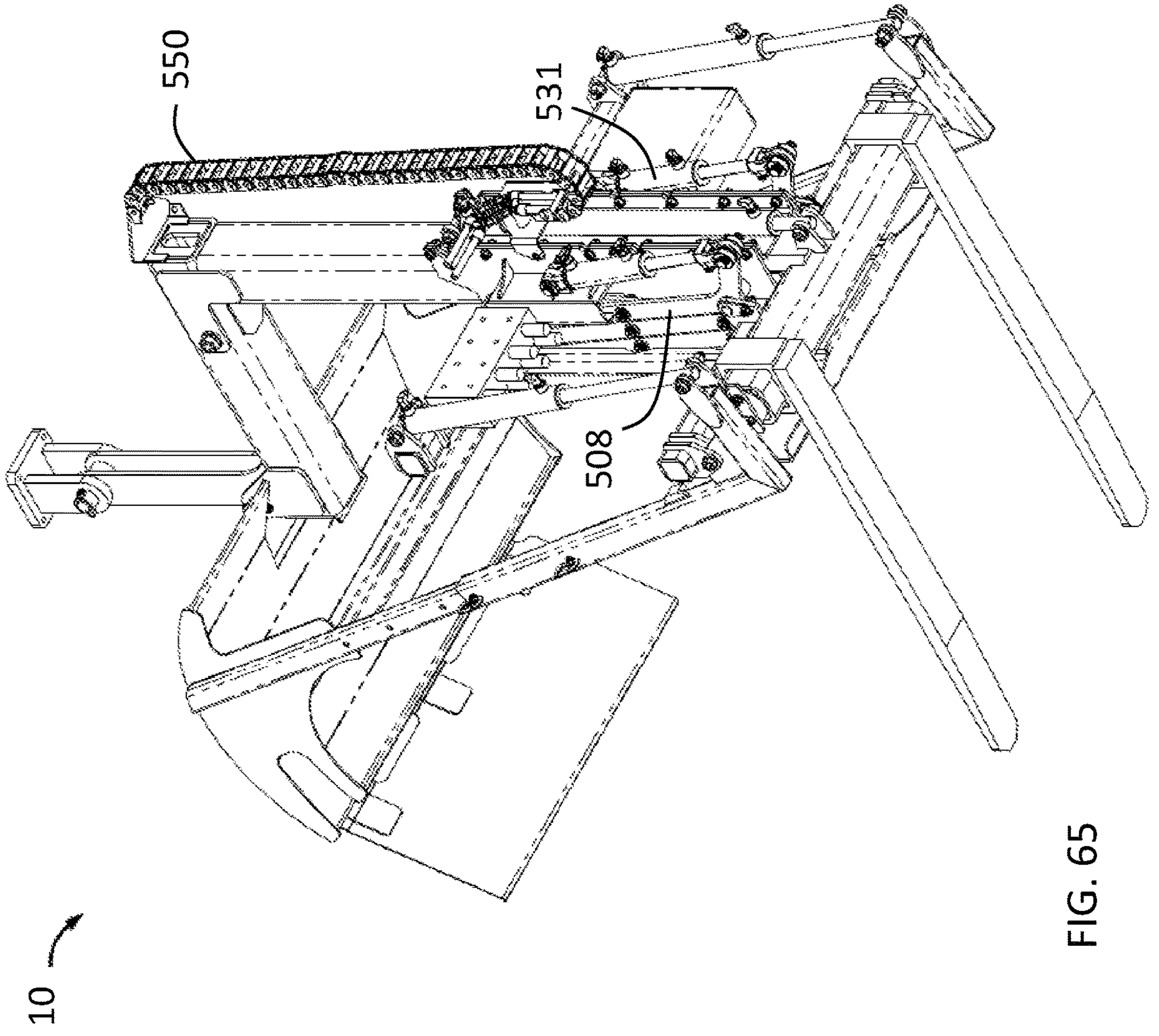
FIG. 65 is a bottom rear perspective view of the apparatus of FIG. 49.

Referring to FIGS. 58-59, the guide member 435 of this embodiment includes a proximal side 455 with a cutout section providing an open space at a midpoint of the proximal side 455—see inner edges 460, 461 and 462 defining the size and shape of the cutout section. Suitably, the size and shape of the cutout section is effective for the guide member 435 to be set to an upright position or folded position as shown in FIGS. 61-62 when the guide member 435 is set to a retracted position of the mating arm members 437 within the one or more arm members 433. In particular, the cutout section provides an open space along proximal side 455 of the guide member 435 allowing the guide member 435 to be directed to an upright vertical position whereby the cutout section of the guide member 435 provides clearance for receiving the second frame section 420 therein, which allows the guide member 435 to be set at a vertical position, which reduces the space required to store the apparatus 10 during storage and/or transport. As shown in FIG. 62, in one suitable embodiment the proximal side 455 is aligned with the rear portion 457 of the second frame section 420 when a retracted guide member 435 is set to a vertical position. When the guide member 435 is set to an extended position thereby increasing the length of the guide member 435, the guide member 435 may be directed toward a vertical position (see directional arrow Q) until the inner most surface of the cutout section, e.g., edge 462, contacts or draws near to the front side of the leveling arm member 434 as shown in FIGS. 63 and 64. In an embodiment of the apparatus 10 operationally configured for use with bundles of shingles, a minimum distance between inner edges 460 and 461 may include 25.4 cm (10.0 inches).

Figure 50:
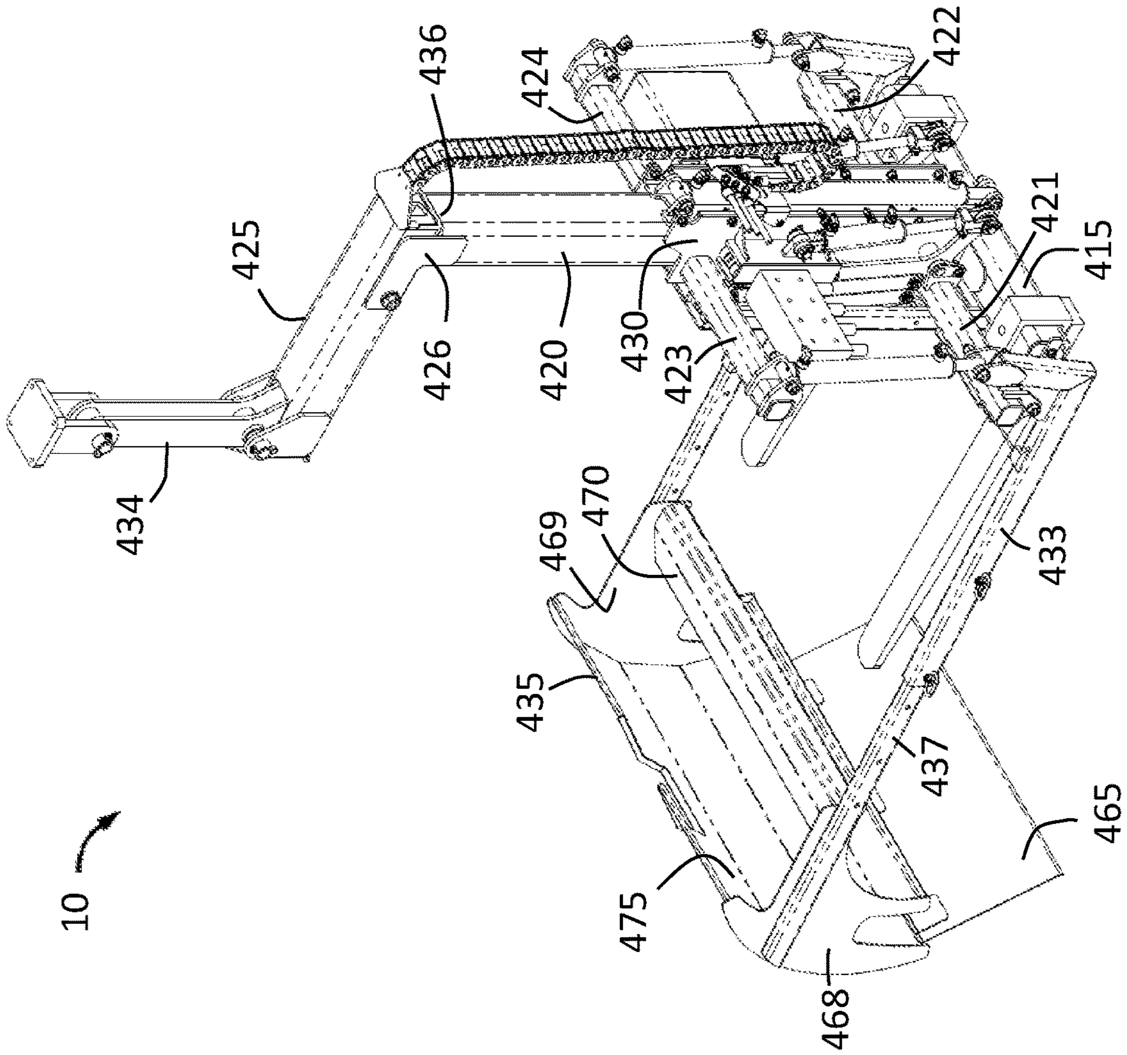
FIG. 50 is a rear perspective view of the apparatus of FIG. 49.

Referring to FIG. 50, the guide member 435 of this embodiment includes opposing side supports 468, 469 with a non-planar first guide surface 470 disposed there between at a first location and a non-planar second guide surface 475 disposed between the side supports 468, 469 at a second location and spaced apart from the first guide surface 470 defining an opening between the first guide surface 470 and the second guide surface 475 as shown. Suitably, the opening between the guide surfaces 470 and 475 is large enough to receive items of a unit load 300 there through similar as described above. The guide member 435 of this embodiment may also include an extension member 465 (or "kick plate") hingedly attached thereto and/or resiliently attached thereto (see hinge 459 in FIG. 60) and operationally configured as a third guide surface to extend the effective travel surface of the second guide surface 470. Suitably, the hinged connection of the extension member 465 also allows the extension member 465 to pivot about the guide member 435 to conform to various inclined surfaces including one or more roof pitches for ease of removing items from the apparatus 10 and to protect against damaging target surfaces upon contact with the extension member 465. In one embodiment, the extension member 465 may be directly hingedly attached to the guide member 435. As shown in FIG. 58, in another embodiment the extension member 465 may include one or more mounting plates 466 for hingedly attaching the extension member 465 to the guide member 435. The one or more mounting plates 466 also suitably act as stiffener members providing structural support for corresponding hinged connections and clearance for pivotal movement of the extension member 465. The extension member 465 may be comprised of one or more planar members, one or more non-planar members, and combinations thereof.

Referring to FIG. 58, each of the one or more arm members 433 includes a hinge plate assembly comprising a plate member 463 and a seat member 464 pivotally attached to the plate member 463 via a hinge pin (see pivot point 467). As shown, each seat member 464 includes a U-shape type configuration or the like operationally configured as a support surface for part of the first and second horizontal attachment surfaces 421 and 422 as shown. As understood by the skilled artisan, the shape of the seat member 464 may vary according to the outer shape of a corresponding first and second horizontal attachment surfaces 421 and 422. The one or more arm members 433 of this embodiment are provided in an L-shape configuration with proximal ends including pairs of mounting plates 476, 477 attached thereto, e.g., via welds, that are pivotally communicated to one or more linear actuators 478, 479, e.g., double acting hydraulic cylinders, via pin type fasteners 501, 502 disposed through apertures of each pair of mounting plates 476, 477 and the corresponding drive rods of the one or more linear actuators 478, 479. As shown, the third and fourth horizontal attachment surfaces 423, 424 include a pair of mount plates 503, 504 attached thereto, e.g., via welds, for securing the opposite ends of the one or more linear actuators 478, 479, e.g., securing the bores at the tail ends of each of the hydraulic cylinders via pin type fasteners 505, 506. Accordingly, linear movement of the drive rods of the one or more linear actuators 478, 479 acts on the one or more arm members 433 whereby the one or more arm members 433 may be pivoted to one or more positions about the first and second horizontal attachment surfaces 421 and 422 (see pivot point 467) from a horizontal position as shown in FIGS. 49 and 50 to a vertical position as shown in FIGS. 61 and 62.

Figure 49:
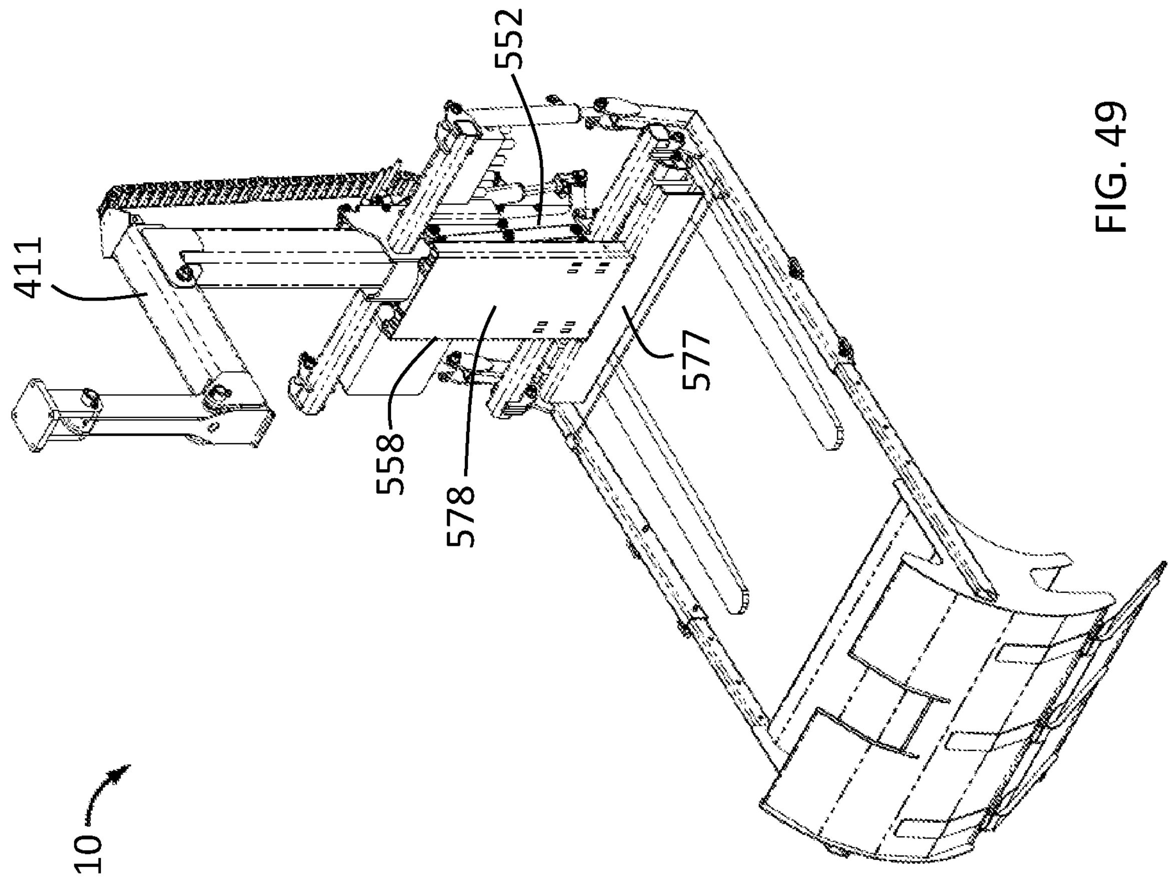
FIG. 49 is a front perspective view of an embodiment of an apparatus of the present disclosure.
Figure 69:
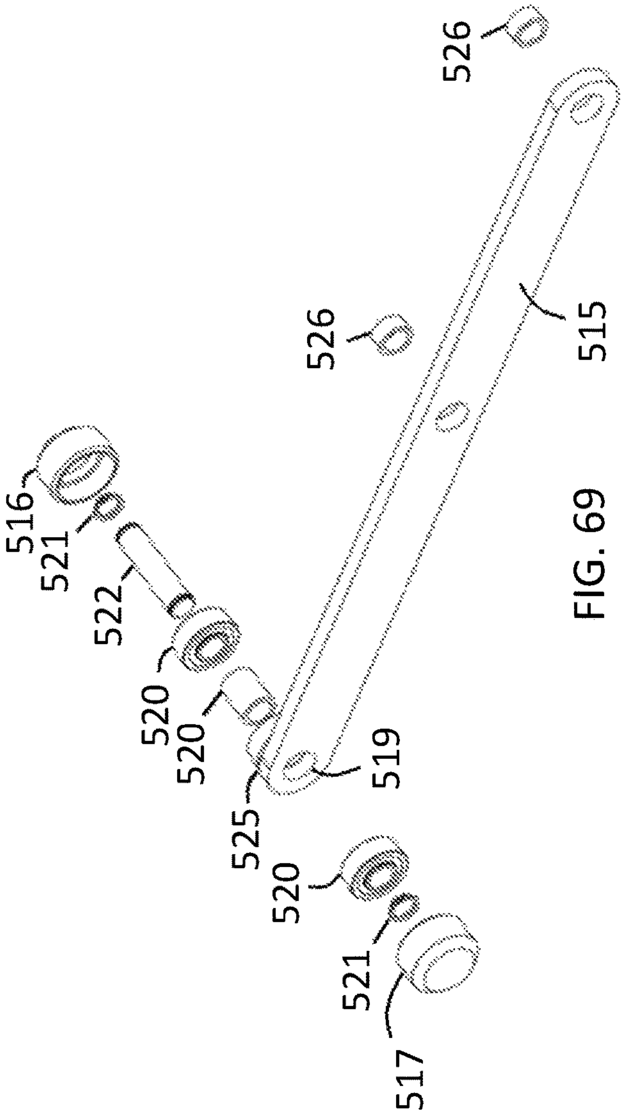
FIG. 69 is a perspective view of an arm member of a linkage assembly of the apparatus of FIG. 49.
Figure 70:
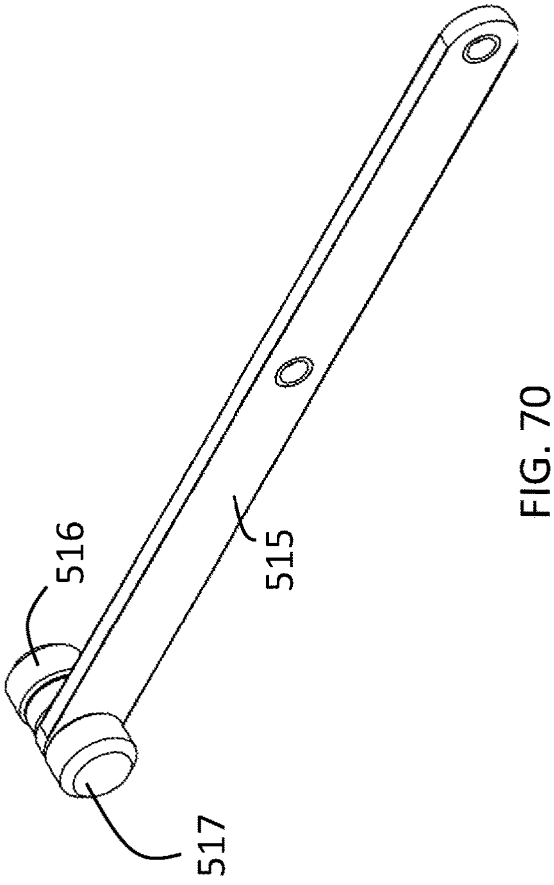
FIG. 70 is a perspective view of an arm member of a linkage assembly of the apparatus of FIG. 49.

As shown in FIG. 49, the apparatus of this embodiment includes a push assembly 552 including opposing horizontally oriented scissor linkages and a faceplate 558 including a primary forward pushing surface 577 and a secondary forward pushing surface 578 similar as discussed above. In this embodiment, a first arm member 508 of each scissor linkage is pivotally connected to each of the first and second horizontal attachment surfaces 421 and 422 via an attachment surface 509 or mounting plate, a pivot pin 510 and a pin boss 511 assembly (see FIGS. 66-68). A second arm member 515 of each scissor linkage is provided as a linkage assembly including one or more roller type members 516 maintained within a linear track or track type housing 518 attached to the slide member 430 via welds or fasteners (see FIGS. 67 and 68). As shown in FIGS. 69 and 70, a suitable linkage assembly includes a second arm member 515 with an aperture 519 located near its proximal end including a cylindrical member 525 mounted about the aperture 519 operationally configured to receive an assembly of bearings 520, rings 521, and an elongated pin 522 for holding roller type members 516 and 517 on either side of the second arm member 515 in a turnable manner. As shown, the second arm member 515 includes one or more additional apertures operationally configured for linking with another arm member. Such apertures may be provided with oil embedded sleeve bearings 526 or the like to promote extension and retraction of the push assembly 552.

Figure 66:
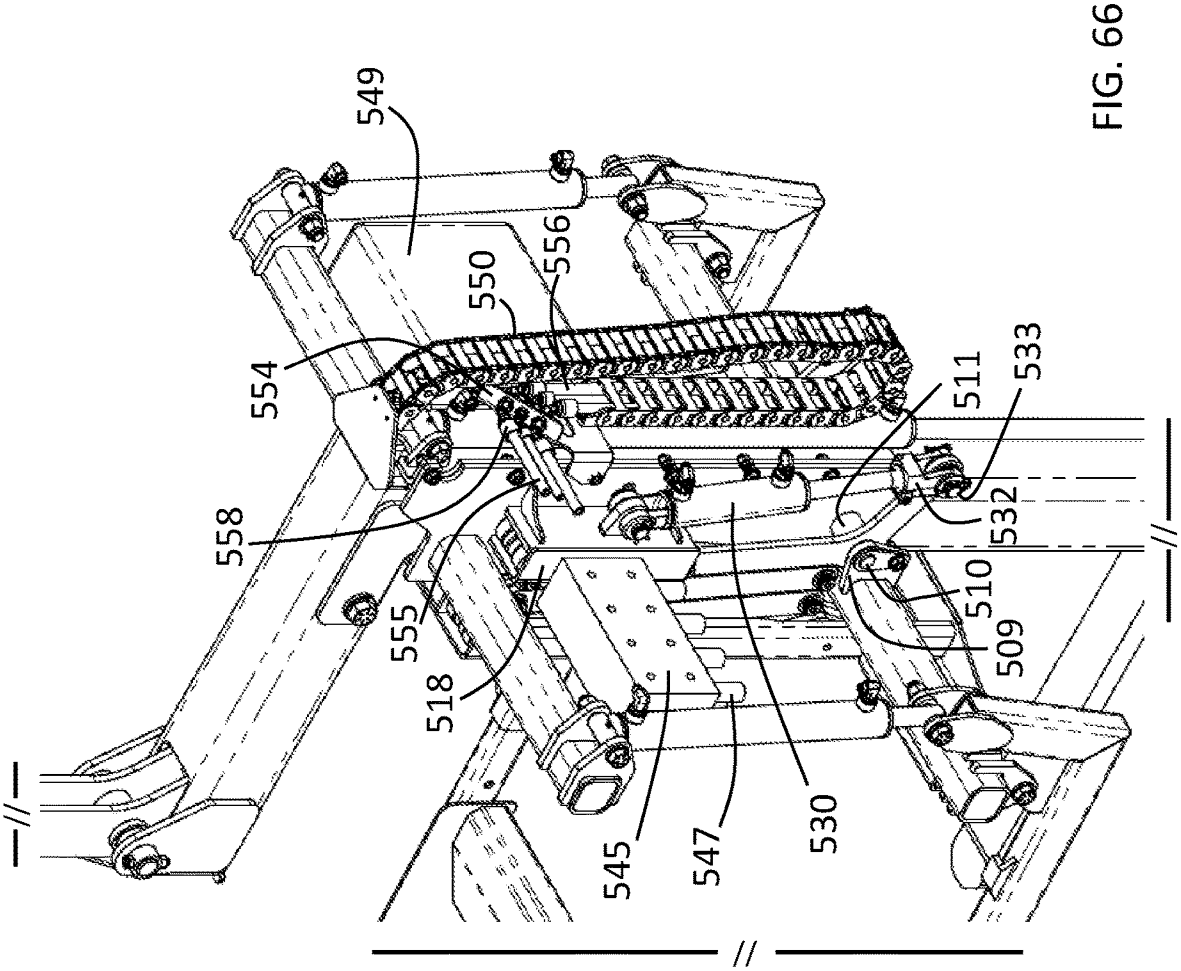
FIG. 66 is a rear view of a portion of the apparatus of FIG. 49.
Figure 67:
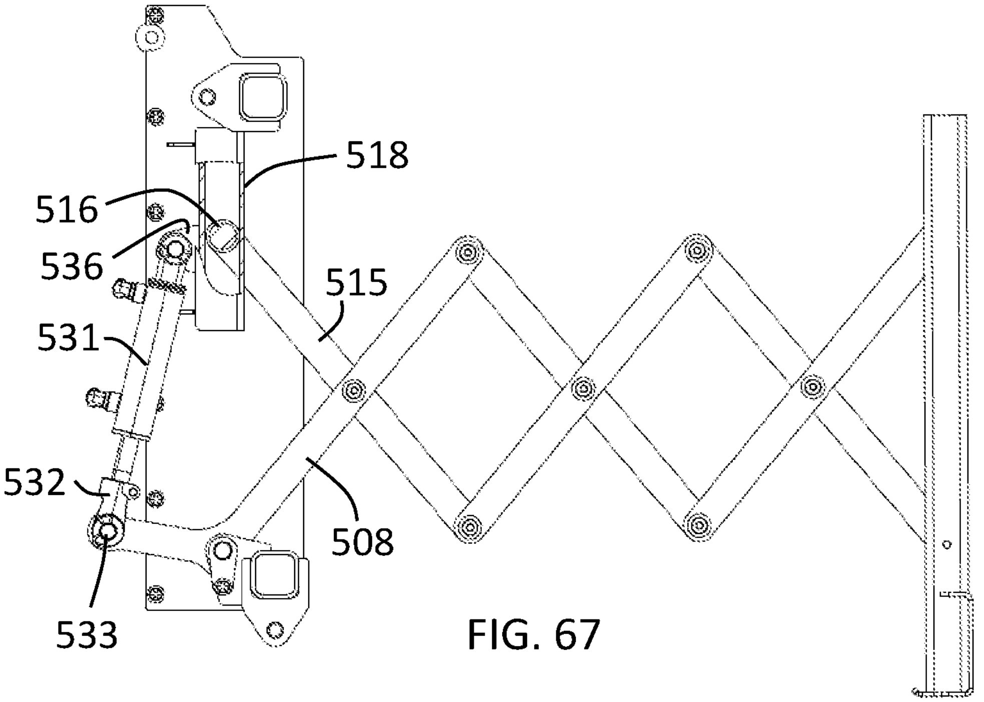
FIG. 67 is a side view of a push assembly of the apparatus of FIG. 49.
Figure 68:
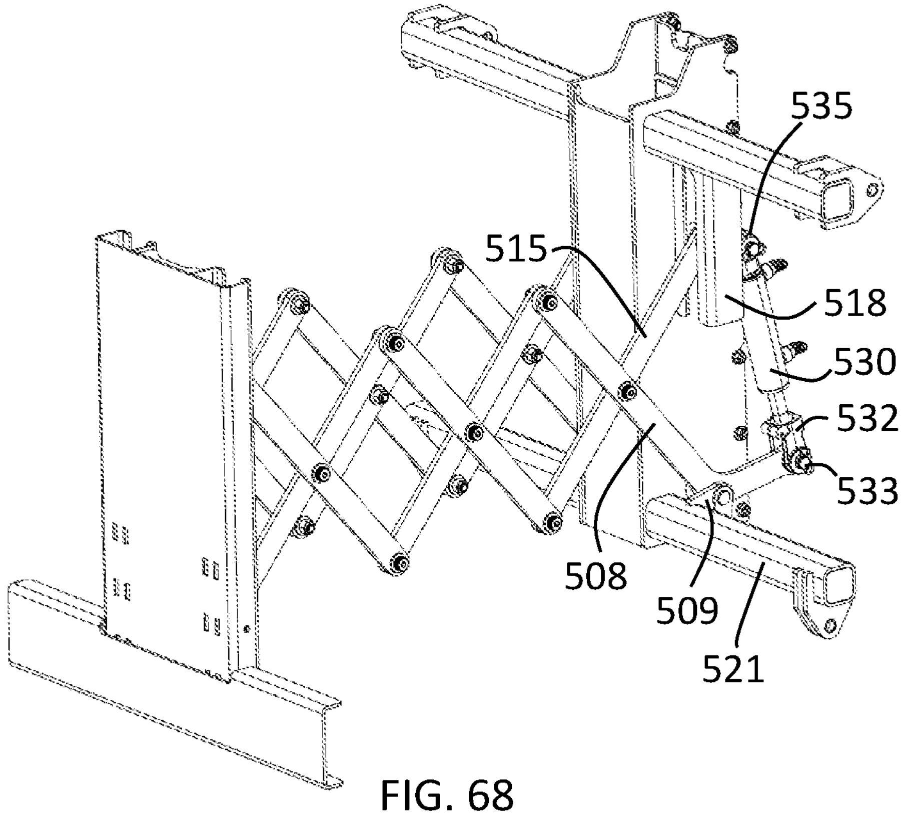
FIG. 68 is a front perspective view of a push assembly of the apparatus of FIG. 49.

With further reference to FIGS. 66-68, each first arm member 508 includes an L-shape configuration including a proximal end that extends out beyond its attachment point with the attachment surface 509 and pivotally connects to a corresponding linear actuator 530, 531 e.g., a double acting hydraulic cylinder, that are operationally configured to act on the first arm members 508 to extend and retract the push assembly 552. In particular, the proximal end of the first arm members 508 and a distal end of the drive rods are pivotally communicated via a pivot coupling 532 and corresponding pivot pin assembly 533 and the bore at a tail end of the linear actuators 530, 531 are connected to attachment surfaces, e.g., a mounting plates 535, 536, located on the housing 518 via a fastening pin or the like.

Referring to FIG. 58, linear movement of the slide member 430 along the second frame section 420 is accomplished via at least one linear actuator 537, e.g., a double acting hydraulic cylinder, including a bore at its tail end attached to the slide member 430 and a drive rod with a distal end attached to the first frame section 415. In particular, a bore at the tail end of the linear actuator 537 is secured to the slide member 430 via one or more attachment surfaces, e.g., a pair of mount plates 538 and a pin type fastener 539 and the distal end of the drive rod of the linear actuator 537 is secured to the first frame section 415 via one or more attachment surfaces, e.g., a pair of mount plates 540 and a pin type fastener 541. In one suitable embodiment, mount plates 538 are attached to the slide member via welds and mount plates 540 are attached to the first frame section via welds.

Turning to FIG. 66, the apparatus 10 further includes a hydraulic manifold 545 operationally configured to provide and regulate hydraulic power to each of the hydraulic cylinders 478, 479, 530, 531, 537 of the apparatus 10. As described above, one or more hydraulic supply lines of a lifting member 400 may be fluidly communicated with the hydraulic manifold 545 whereby pressurized fluid may be conveyed to one or more of the hydraulic cylinders 478, 479, 530, 531, 537 as desired during operation of the apparatus 10. As further shown, the hydraulic manifold 545 may include an electric solenoid 547 operationally configured to actuate the hydraulic manifold 545. As understood by the skilled artisan, as DC electrical current is applied, the solenoid 547 suitably shifts and opens a fluid flow passage within the hydraulic manifold 545 thereby directing pressurized hydraulic fluid to a desired hydraulic cylinder of the apparatus 10. Without limiting the disclosure, one suitable hydraulic manifold 545 may be secured to the third horizontal attachment surface 423.

With further reference to FIG. 66, the apparatus 10 also includes a hose mount 554 (also referred to herein as a "bulkhead plate") releasably secured to the slide member 430 and operationally configured as a point of attachment between hydraulic hoses 555 fluidly communicated with the hydraulic manifold 545 and hydraulic hoses 556 fluidly communicated with the hydraulic cylinders 478, 479, 530, 531, 537 (see threaded hydraulic hose crimp fittings 558 operationally configured to fluidly interconnect hydraulic hoses 555 and 556). The apparatus 10 may also include a hose track member 550 operationally configured to hold one or more hydraulic hoses 556 in a secure manner free from damage, entanglement and undesired disconnect from corresponding hydraulic cylinders 478, 479, 530, 531, 537.

With further reference to FIG. 66, the apparatus 10 may also include a weather tight or weatherproof electrical enclosure 549 operationally configured to house electrical equipment, including, but not necessarily limited to electric control circuitry or controller, one or more radio receivers, relays, fuses, wire harnesses, batteries, and combinations thereof, as may be required for operation of the apparatus 10 and its various functions for operation as described herein. Without limiting the disclosure, one suitable electrical enclosure 549 may be secured to the fourth horizontal attachment surfaces 424.

Figure 71:
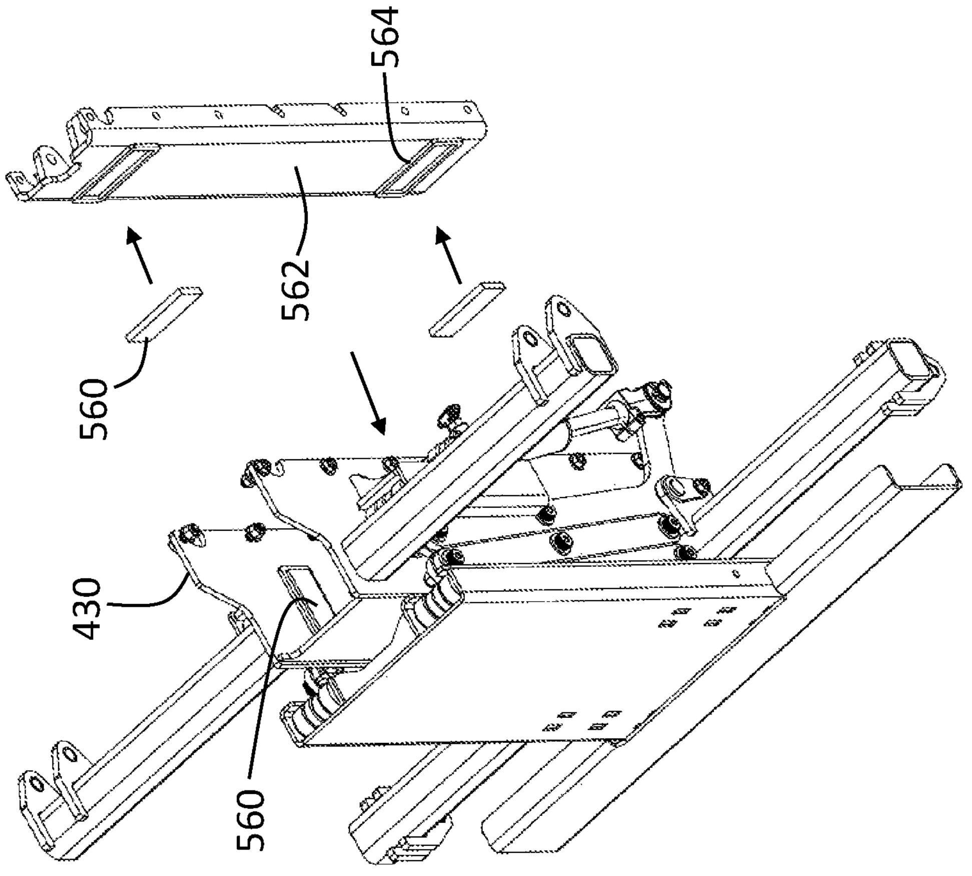
FIG. 71 is a front perspective view of a push assembly of the apparatus of FIG. 49.

As discussed above, the inner dimensions of the slide member 430 may be greater than the outer dimensions of the second frame section 420 providing spacing for one or more wear pads 560. As shown in FIG. 71, the inner surface 562 of the slide member 430 may include one or more frame members 564 attached, e.g., welded, to the inner surface 562 operationally configured to hold corresponding wear pads 560 therein in a fixed manner during apparatus 10 operation. In one embodiment, the one or more wear pads 560 may be secured to the one or more frame members 564 via a snap-fit type mating. In another embodiment, adhesive material may be used to secure the one or more wear pads 560 to the inner surface 562 of the slide member 430 when mated with corresponding frame members 564. In another embodiment, one or more wear pads 560 may be adhered to the inner surface 562 of the slide member 430 without frame members 564. Suitable wear pads 560 may be constructed from nylon, ultra-high molecular weight plastic, metal, polyethylene, high density polyethylene, and combinations thereof. Suitable frame members 564 may be constructed from one or more metals including, but not necessarily limited to steel, aluminum, titanium, tungsten, other metals having strength properties high enough to withstand forces transmitted through the wear pads 560, and combinations thereof, such that the one or more frame members 564 hold the wear pads 560 in a fixed position during linear travel of the slide member 430 along the second frame section 420.

It is further contemplated that the apparatus 10 of the present disclosure may carry other items other than portable platforms 200. For example, items housed within bags, sacks, pouches, caging, netting, and the like, may be secured to the apparatus 10 via ropes, cables, elastic cords, chains, straps, and combinations thereof as understood by the skilled artisan. Although the apparatus 10 is described above in relation to a lifting member 400 such as a crane, hoist, or other lifting device, in another embodiment, the apparatus 10 of this disclosure may be lifted and/or transported via a pulley system via manual operation. In another embodiment, the apparatus 10 may include a push assembly 752 operationally configured to remove a unit load 300 off from a side of the apparatus 10 as shown in the simplified illustration of FIG. 112. In this embodiment, the apparatus 10 includes a support member or support arm 760 for pivotal attachment of the push assembly 752. The apparatus 10 also includes one or more linear actuators 762, e.g., one or more double acting hydraulic cylinders, attached to the support arm 760 and communicated with the push assembly 752 via a sleeve 765 that may directed along the support arm 760 via the one or more linear actuators 762 in a manner effective to direct the push assembly 752 between an extended position as shown in FIG. 112 and a retracted position. In another embodiment of the apparatus 10, a push assembly may include a swing arm pivotally attached thereto that is operationally configured to be directed about its pivot point on the apparatus 10 in a manner effective to remove a unit load 300 from the apparatus 10. One or more linear actuators, one or more double acting hydraulic cylinders, may be used to direct movement of a swing arm type push assembly. In still another embodiment, a pull assembly may be used as part of the apparatus 10 in place of a push assembly.

In still another embodiment, an apparatus 10 of this disclosure may be operationally configured for use with one or more commercially available telehandlers. Examples of commercial sources of telehandlers include, but are not necessarily limited to Pettibone Traverse Lift, L.L.C., Baraga, Michigan, U.S.A.; and JLG Industries, Inc., McConnellsburg, Pennsylvania, U.S.A.

In still another embodiment, an apparatus 10 of this disclosure may be operationally configured so that unit loads 300 may be removed from the apparatus 10 manually if and when desired. An apparatus 10 of this disclosure may also be operated remotely, i.e., operated from a remote location.

Variations in the apparatus 10 may be provided as desired or as may be otherwise required for a particular operation. In addition, one or more component parts comprising the apparatus 10 may be constructed from one or more materials suitable for providing operative structural support in connection with one or more particular operations. Suitable materials of construction for one or more component parts comprising the apparatus 10 may include, but are not necessarily limited to, those materials resistant to chipping, cracking, excessive bending and reshaping as a result of weathering, heat, moisture, other outside mechanical and chemical influences, as well as impacts to the apparatus 10. Particular materials of construction may include, but are not necessarily limited to one or more metals, plastics, rubbers, filled composite materials, woods, and combinations thereof depending on the performance requirements for one or more particular operations of the apparatus 10. Suitable metals include ferrous metals and non-ferrous metals. Suitable ferrous metals may include steel, carbon steel, alloy steel including stainless steel, and combinations thereof. Suitable non-ferrous metals include aluminum, tin, and combinations thereof. Metals such as titanium are contemplated but may not be feasible based on material cost. Suitable plastics include thermoplastics such as polyvinyl chloride ("PVC"), chlorinated polyvinyl chloride ("CPVC"), UHMW polyethylene, high density polyethylene ("HDPE"), low density polyethylene ("LDPE"), polypropylene, and combinations thereof. An apparatus 10 as described in FIGS. 49-71 may include a frame 411 constructed from minimum 344737.86 kPa (50000 psi) yield strength carbon steel, e.g., tubing according to ASTM A500 Grade B carbon steel and steel plate according to ASTM A572 Grade 50, and one embodiment of an apparatus 10 for use with bundles of shingles may have a total weight of or about 771.11 kg (1700.00 pounds).

The apparatus 10 of this disclosure may also be provided as part of a system for carrying one or more items to one or more target surfaces and placing one or more items carried by the apparatus 10 onto one or more target surfaces, the system including one or more portable supports installed onto one or more target surfaces in a manner effective to hold and maintain the one or more items removed from the apparatus 10 on the one or more target surfaces. As described above, items may be removed from the apparatus 10 and placed onto one or more target surfaces without the need to manually remove the one or more items from the apparatus 10. Likewise, one or more portable supports may be installed onto one or more target surfaces without any manual assistance of individuals being located on or near the one or more target surfaces. In one embodiment, one or more portable supports may be delivered to one or more target surfaces via an apparatus 10 or via a lift line 5 of the apparatus 10 or other lifting or hoisting attachment or assembly of lifting equipment without use of the apparatus 10. As such, the present disclosure provides a system and method for the automated installation of one or more portable supports onto one or more target surfaces and the automated carrying of one or more items to the one or more target surfaces, including elevated surfaces, and placing items carried by the apparatus 10 onto one or more of the target surfaces in a manner effective to be retained on the one or more target surfaces by the one or more portable supports without the presence of individuals on or near the one more target surfaces during the process.

Figure 72:
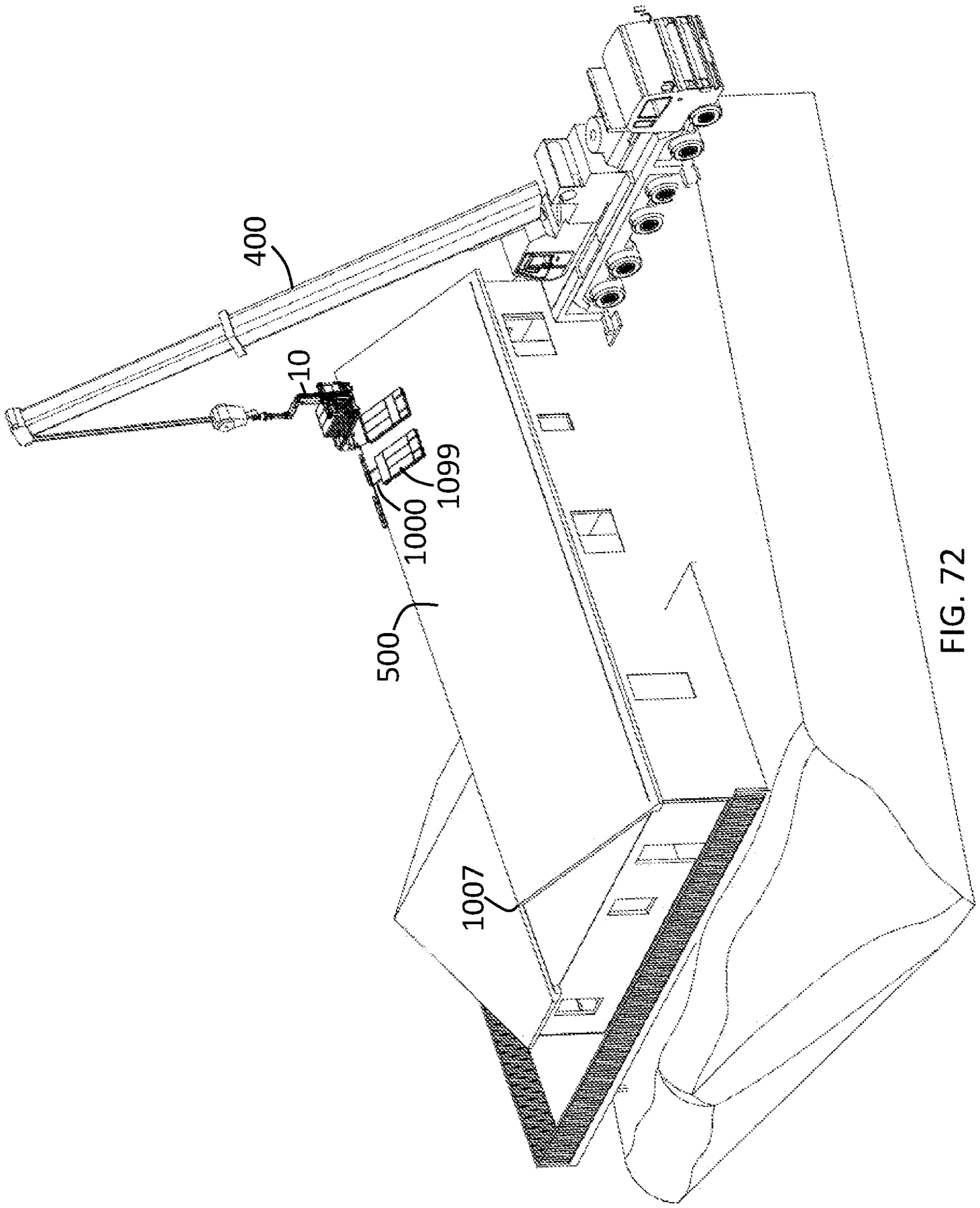
FIG. 72 is an illustration of a system for delivering one or more bundles of shingles to a person free roof of a structure.

In one embodiment including one or more target surfaces comprising one or more roofs 500 of one or more houses, buildings or other structures, items such as one or more building materials 1099 and/or other items may be removed from the apparatus 10 and placed onto the one or more roofs 500 without any individuals being located on the one or more roofs 500 during removal of one or more items from the apparatus 10—a roof 500 in this scenario may be referred to as a "person free roof 500." One simplified illustration of a system for delivering one or more bundles of shingles 1099 to a person free roof 500 is shown in FIG. 72. In this embodiment, the system may include an apparatus 10 lifted by a lifting member 400 and one or more portable supports 1000 installed on the roof 500 and operationally configured to hold or retain the one or more bundles of shingles 1099 on the roof 500 for an extended period of time as desired. In one embodiment, the one or more supports 1000 may be delivered to one or more target surfaces and installed thereon via the apparatus 10. In another embodiment, the one or more supports 1000 may be delivered to one or more target surfaces and installed thereon via a lift line 5 of the apparatus 10 or other lifting or hoisting attachment or assembly of lifting equipment without use of the apparatus 10. In still another embodiment, the one or more supports 1000 may be delivered to one or more target surfaces and installed thereon manually as may be desired or otherwise required for one or more particular operations.

Figure 73:
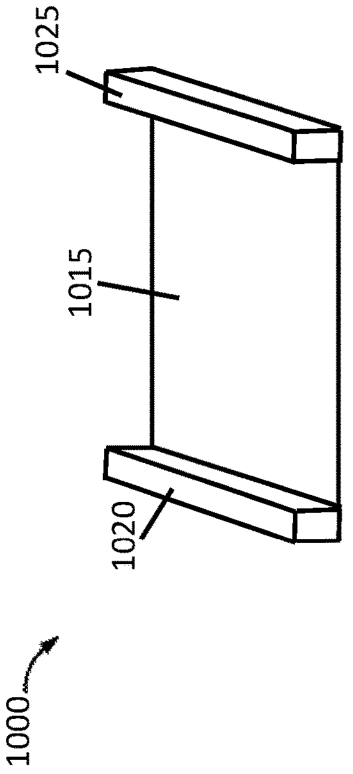
FIG. 73 is a perspective view of a portable support of the present disclosure.
Figure 76:
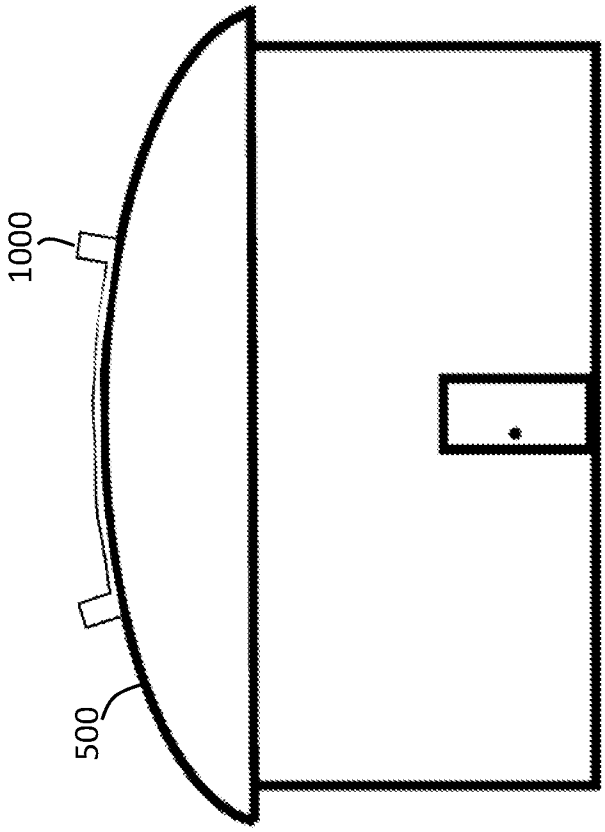
FIG. 76 is a side view of an embodiment of a portable support on a roof surface.

One embodiment of a portable support 1000 of this disclosure is depicted in FIG. 73. The portable support 1000 of this embodiment includes a main section 1015 and two opposing raised sections 1020 and 1025 defining a first end and a second end of the portable support 1000. In one implementation, the portable support 1000 may be constructed from one or more rigid materials operation configured to maintain a fixed orientation of the portable support 1000. As such, the portable support 1000 may be provided in a size and/or shape for installation onto one or more particular surfaces of particular sizes and/or surface shapes. For example, a portable support 1000 as shown in FIG. 73 may be provided with a planar or substantially planar main section 1015 for installation upon a planar or substantially planar target surface (see roof 500 in FIG. 74). In another embodiment, the main section 1015 may be defined by an angle for installation upon a target surface 1005 defined by a peak, e.g., a roof defined by a ridge as shown in FIG. 75. In another embodiment, the main section 1015 may include a curved shape for installation upon a curved target surface 1005 as shown in FIG. 76. Referring again to FIG. 73, a portable support 1000 constructed from one or more rigid materials may be provided as a single one-piece construction, or in the alternative, a portable support 1000 may be provided as an assembly of individual parts. For example, the two opposing raised sections 1020 and 1025 may be permanently or releasably secured to the main section 1015.

Figure 74:
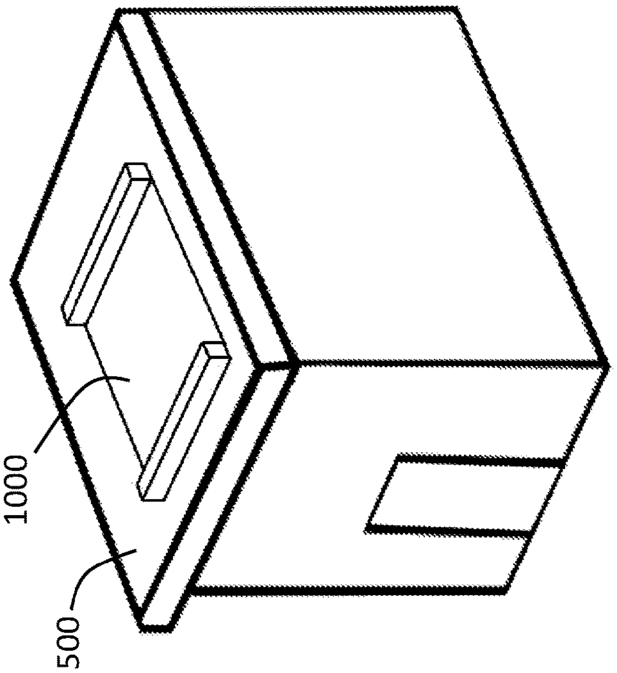
FIG. 74 is a perspective view of portable support of FIG. 72 on a roof surface.
Figure 75:
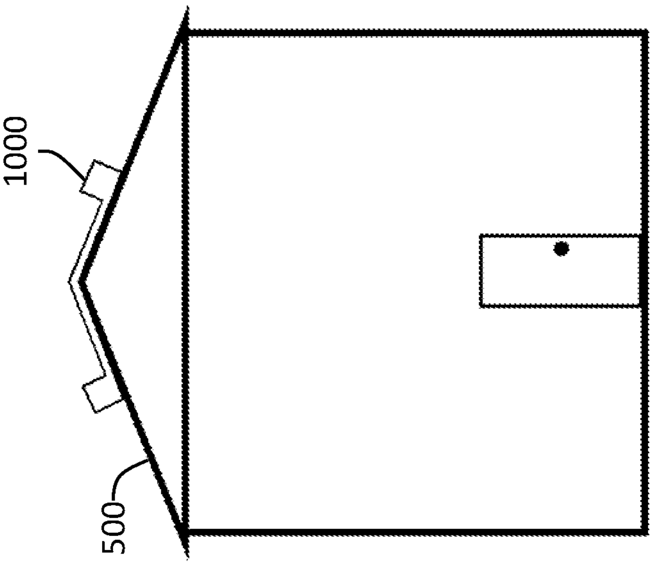
FIG. 75 is a side view of an embodiment of a portable support on a roof surface.
Figure 77:
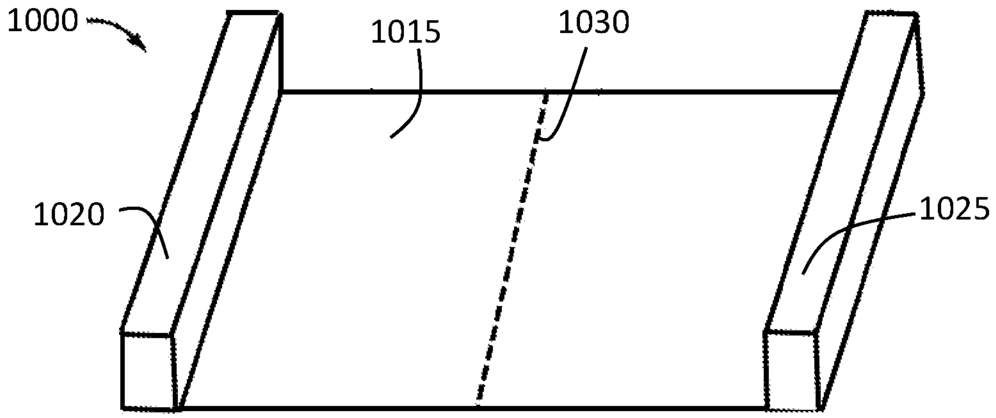
FIG. 77 is a perspective view of an embodiment of a portable support of the present disclosure.

As shown in FIG. 77, in another embodiment of a portable support 1000 constructed from one or more rigid materials, the main section 1015 may include two parts connected by a hinge member 1030 operationally configured for installation on planar or substantially planar target surfaces and/or target surfaces defined by a peak ("peaked surfaces")—depicted as roofs 500 in FIGS. 74 and 75. In another embodiment, a portable support 10 may include two or more hinge members 30 (see FIG. 78) whereby the portable support 10 may be operationally configured for installation upon planar or substantially planar target surfaces, peaked target surfaces, and curved target surfaces 5—see the curved roof 500 in FIG. 76.

Figure 78:
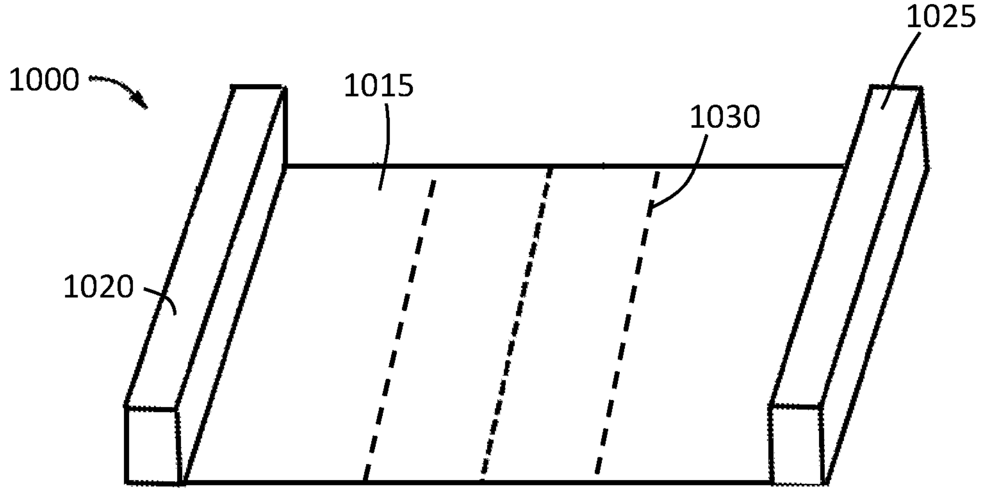
FIG. 78 is a perspective view of an embodiment of a portable support of the present disclosure.
Figure 79:
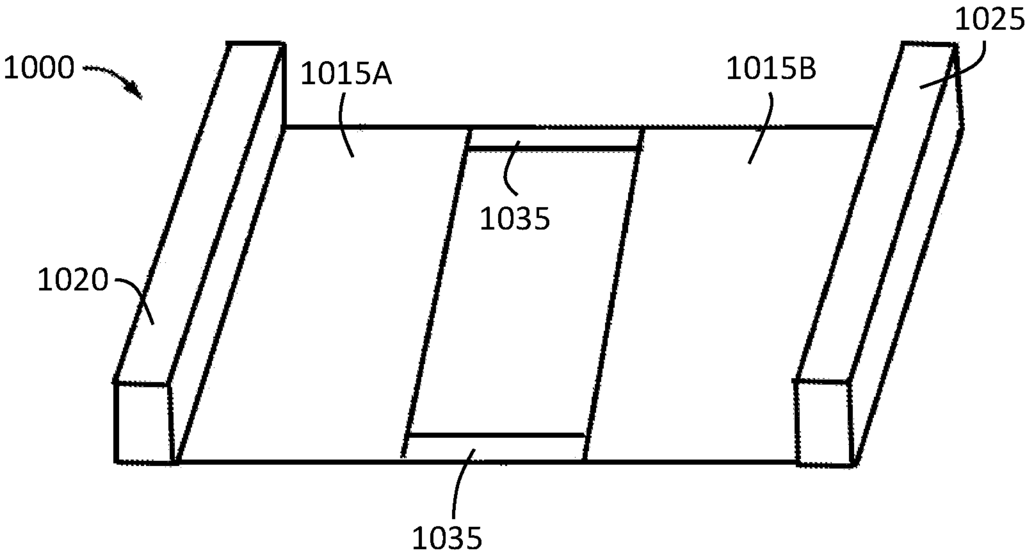
FIG. 79 is a perspective view of an embodiment of a portable support of the present disclosure.

Turning to FIG. 79, in another embodiment, the main section 1015 may be provided as a rigid first section 1015A and a rigid second section 1015B interconnected by one or more elongated linking members 1035. In one embodiment, the one or more elongated linking members 1035 may be constructed from one or more rigid materials. In one embodiment, the rigid materials may be bent or otherwise shaped for installation of the portable support 1000 on a particular shaped target surface, e.g., see roof 500 as shown in FIGS. 74-76. In another embodiment, the one or more elongated linking members 1035 may be constructed from one or more flexible materials effective for the portable support 1000, to conform, substantially conform or otherwise operably conform to target surfaces as shown in FIGS. 74-76. Another feature of a portable support 1000 as shown in FIGS. 77-79 that is provided with hinge members 1030 or one or more flexible linking members 1035 is that the portable support 1000 may be folded for storage and/or transportation and/or disposal, thereby, minimizing the footprint of the portable support 1000.

Figure 80:
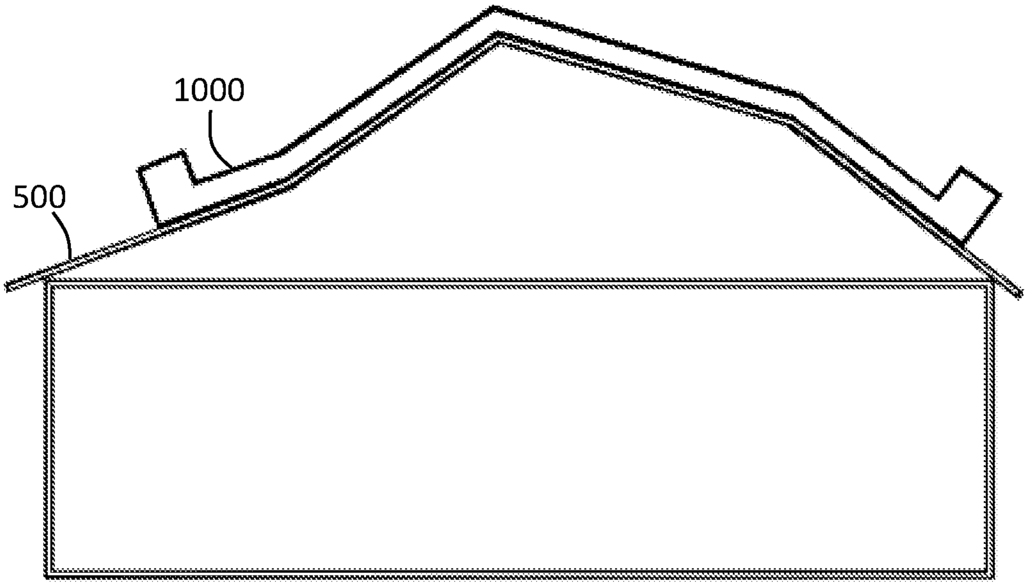
FIG. 80 is a side view of an embodiment of a portable support on a roof surface.

In another embodiment, a portable support 1000 of this disclosure may include a main section 1015 constructed from one or more flexible materials effective for the portable support 1000 to conform, substantially conform or otherwise operably conform to a target surface as shown in FIGS. 74-76 or other shapes. For example, a portable support 1000 constructed from one or more flexible materials is suitably operationally configured for installation and operable use on irregular surfaces such as multiple humped target surfaces and non-uniform target surfaces—see roof 500 in FIG. 80, which includes different angled surfaces on either side of the peak of the roof 500.

Figure 81:
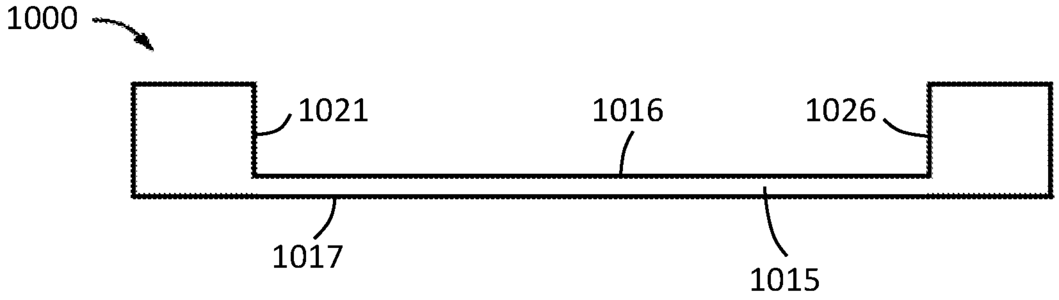
FIG. 81 is a side view of an embodiment of a portable support of the present disclosure.
Figure 82:
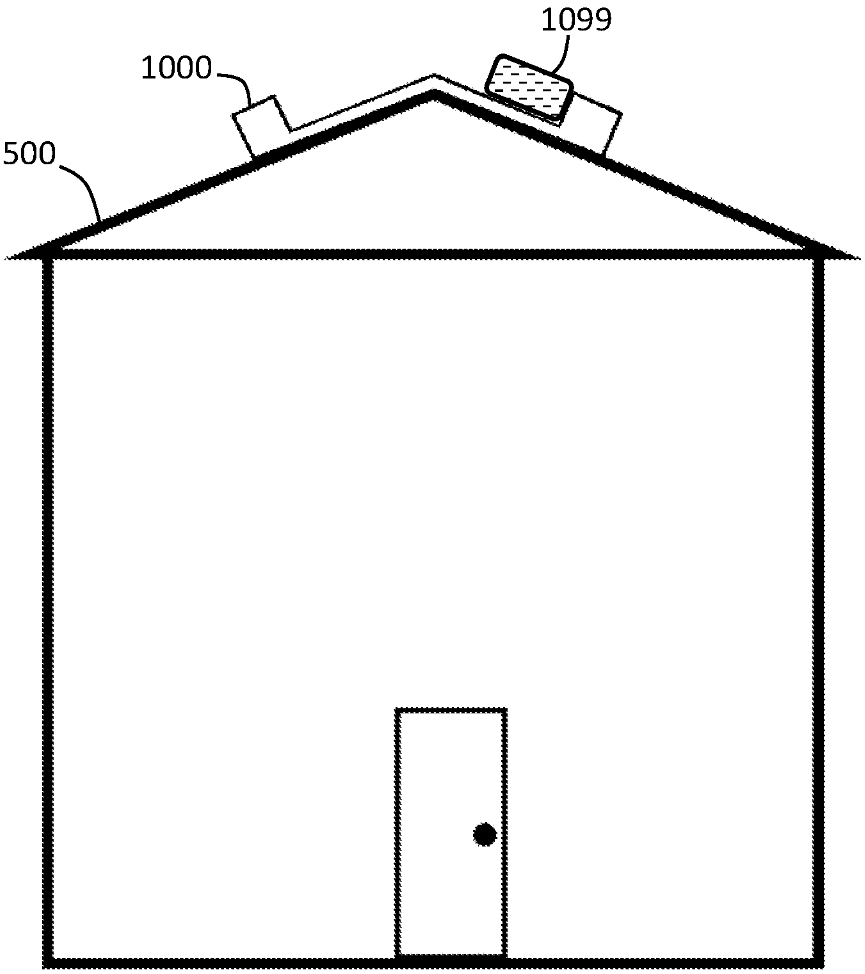
FIG. 82 is a side view of the portable support of FIG. 81 on a roof surface.

Turning to FIG. 81, a portable support 1000 as shown in FIGS. 73-80 includes a main section 1015 defined by an upper surface(s) 1016 and a bottom surface(s) 1017. As shown in FIG. 82, the bottom surface 1017 is operationally configured to contact one or more target surfaces such as a roof 500 surface and the upper surface 1016 is operationally configured to receive and support one or more building materials and/or other items thereon including, but not necessarily limited to one or more bundles of shingles of a unit load 300. In this embodiment, each of the raised sections 1020, 1025 includes an inner surface 1021 and 1026 operationally configured to act as a stop type surface for holding one or more building materials 1099 and/or other items on pitched roofs 500 and other surfaces where one or more building materials 1099 and/or other items may be directed in a downward direction as a result of gravitational force exerted on the one or more building materials 1099 and/or other items.

In one embodiment, the bottom surface 1017 of the main section 1015 may be operationally configured to engage one or more target surfaces in a manner effective to maintain the position of the portable support 1000 on one or more target surfaces during operation of the portable support 1000. In an embodiment of a portable support 1000 constructed from one or more rigid materials, the bottom surface 1017 may include one or more adhesive materials and/or adhesive coated members operationally configured to maintain a portable support 1000 in a fixed position on one or more target surfaces. In another embodiment, the bottom surface 1017 may include one or more spikes or teeth type members extending out from the bottom surface 1017 in a manner effective to engage one or more target surfaces. In another embodiment, the bottom surface 1017 may include one or more non-slip materials defining the bottom surface 1017. In another embodiment, the bottom surface 1017 may include one or more fiber based materials operationally configured to engage one or more target surfaces. The upper surface 1016 may also include one or more non-slip materials or friction materials operationally configured to stop and/or slow the movement of one or more building materials 1099 and/or other items thereon in real time as one or more building materials 1099 are removed from the apparatus 10 onto the portable support 1000.

Herein, suitable rigid materials of construction of the main section 1015 and the raised sections 1020 and 1025 may include, but are not necessarily limited to materials resistant to chipping, cracking, excessive bending and reshaping as a result of ozone, weathering, heat, moisture, other outside mechanical and chemical influences, as well as physical impacts. Exemplary rigid materials of construction include, but are not necessarily limited to metals, plastics, rubbers, woods, filled composite materials, and combinations thereof. Suitable metals may include, but are not necessarily limited to stainless steel, hardened steel, mild steel, aluminum, copper, nickel, brass, and combinations thereof. Metals such as titanium are contemplated but may not be feasible based on material cost. Suitable plastics may include, but are not necessarily limited to acrylic or polymethyl methacrylate ("PMMA"), polycarbonate ("PC"), polyethylene ("PE"), polypropylene ("PP"), polyethylene terephthalate ("PETE"), polyvinyl chloride ("PVC"), acrylonitrile-butadiene-styrene ("ABS"), and combinations thereof. In an embodiment of the portable support 1000 including an assembly of individual parts, the raised sections

1020 and 1025 may be secured to the main section 1015 in a manner effective to operate as stop type members effective to hold one or more building materials 1099 and/or other items (see the resting position of the one or more building materials 1099 as shown in FIG. 82). In this type of embodiment, the raised sections 1020 and 1025 may also be referred to as stop members 1020 and 1025. In one embodiment, each of the stop members 1020 and 1025 may be releasably secured to the main section 1015 via one or more fasteners. In an embodiment including threaded fasteners such as threaded bolts, the main section 1015 may include apertures and the stop members 1020 and 1025 may include corresponding threaded holes for receiving threaded fasteners to secure the main section 1015 to the stop members 1020 and 1025. In an embodiment including threaded fasteners such as threaded screws, the stop members 1020 and 1025 may be secured to the main section 1015 by directly screwing each of the stop members 1020 and 1025 to the main section 1015. In another embodiment, the stop members 1020 and 1025 may be secured to the main section 1015 via one or more adhesives. In an embodiment of a portable support constructed from one or more metals, the stop members 1020 and 1025 may be welded to the main section 1015 or the stop members 1020 and 1025 and the main section 1015 may be held together via magnets. In still another embodiment, the stop members 1020 and 1025 may be constructed from closed cell foam, open cell foam, and combinations thereof.

In an embodiment of the main section 1015 constructed from one or more flexible materials, the one or more flexible materials may be operationally configured to engage one or more target surfaces, e.g., one or more roofs 500. In one embodiment, the main section 1015 may be constructed from one or more flexible rubber materials providing a non-slip bottom surface 1017. In another embodiment, the main section 1015 may be constructed from one or more textiles with fibers effective to engage one or more target surfaces, e.g., textile fibers operation configured to catch and hold to parts of the one or more target surfaces. Suitable textiles may include, but are not necessarily limited to animal-based fibers, plant-based fibers, synthetic fibers, and combinations thereof. Suitable animal-based include, but are not necessarily limited to alpaca, wool, silk, yak, and combinations thereof. Suitable plant-based fibers include, but are not necessarily limited to bamboo, coir, cotton, flax, hemp, rayon, and combinations thereof. Suitable synthetic fibers may include, but are not necessarily limited to nylon, polyester, spandex, rayon, and combinations thereof. One particular textile may include felt made from wool and/or animal for and/or synthetic fibers, such as petroleum based acrylic and/or acrylonitrile or wood pulp-based rayon.

Figure 83:
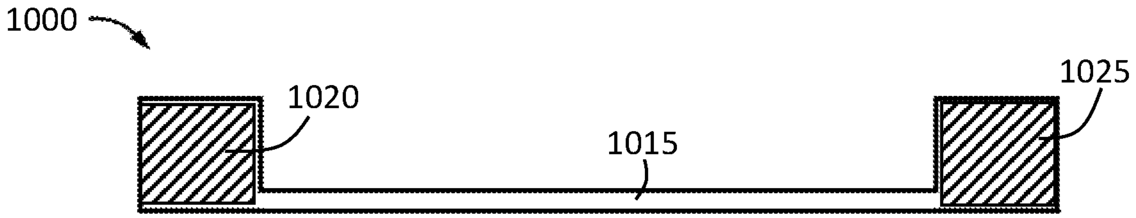
FIG. 83 is a side partial sectional view of an embodiment of a portable support of the present disclosure.

In an embodiment of a portable support 1000 including a flexible main section 1015, each of the stop members 1020 and 1025 may be constructed from one or more materials as described above in regard to a portable support 1000 constructed from one or more rigid materials. In addition, each of the stop members 1020 and 1025 may be releasably secured to the main section 1015 via one or more fasteners similar as described above. In another embodiment, the distal ends of the main section 1015 may cover or wrap around the stop members 1020 and 1025 wherein the distal ends are secured to the inner surfaces 1021 and 1026 of the stop members 1020 and 1025 and/or the upper surface 1016 of the main section 1015 as shown in FIG. 83—or vice versa.

In another embodiment, a portable support 1000 as described above may include a main section 1015 with one or more adhesives as described above on the upper surface 1016 of the main section 1015 operationally configured to stop and/or hold one or more building materials 1099 and/or other items upon contact. In another embodiment, a portable support 1000 may include a main section 1015 constructed from one or more sticky or tacky type materials and/or non-skid materials wherein the upper surface 1016 of the main section 1015 is operationally configured to stop and/or hold one or more building materials 1099 and/or other items upon contact. In such embodiments, the portable support 1000 may be provided without stop members 1020, 1025. Suitable non-skid materials include, but are not necessarily limited to vinyl latex, neoprene, silicone, pumice based materials, spray-on polyurea, polyurethane and polyurea formulations, thermoplastic polyolefins ("TPO"), cork, and combinations thereof. In still another embodiment, hook and loop fasteners may be added to one or more building materials 1099 and/or other items and to an upper surface 1016 of a portable support 1000, and/or to the inner surface 1021 and 1026 stop members 1020, 1025, in a manner effective to stop and hold ("capture") the one or more building materials 1099 and/or other items on the upper surface 1016 in a fixed position.

In another embodiment a portable support 1000 may be constructed from plastic and/or metal wire and/or mesh material. In one embodiment, a portable support 1000 may be constructed from welded metal wire including (1) a planar or substantially planar main section 1015 or sections 1015A and 1015B and (2) distal end portions operationally configured as stop members. In this embodiment, the angle formed between the second section 1015B and the stop member 1025 may range from or about 70.0 degrees to or about 110.0 degrees or other range effective for operation as a stop member. In this embodiment, the first section 1015A and the second section 1015B may be connected via one or more linking members 1035 and the one or more linking members 1035 may include angled linking members similar as described below disposed across a ridge 1007 of a target surface.

Figure 84:
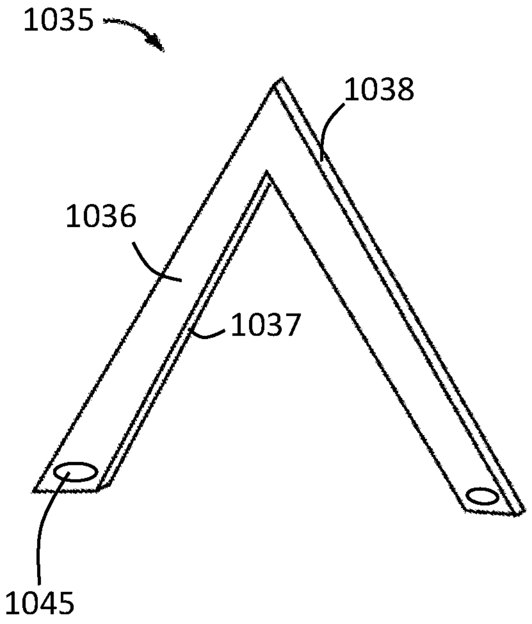
FIG. 84 is a perspective view of an embodiment of an angled linking member.
Figure 85:
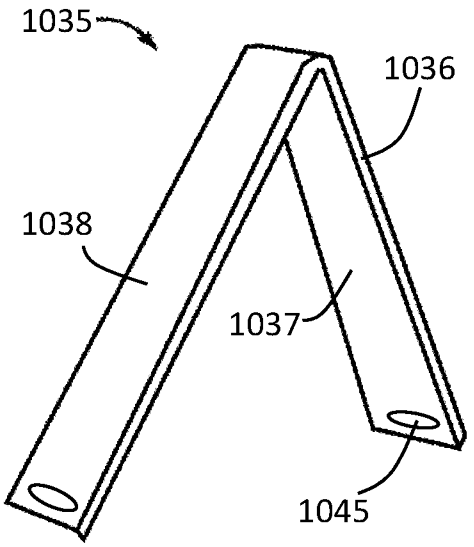
FIG. 85 is a perspective view of an embodiment of an angled linking member.

In one embodiment, the angled linking members 1035 may be provided as shown in FIG. 84 having vertically arranged sidewalls 1036 during operation. In another embodiment as shown in FIG. 85, the angled linking members 1035 may include a width defined by horizontally arranged bottom 1037 and top 1038 surfaces during operation. Suitably, the angled linking members 1035 may include fixed or adjustable angle. In an embodiment including a fixed angled linking member 1035, any one particular angled linking member 1035 may be provided having an angle operationally configured for use on one or more angled target surfaces defined by a peak. In one adjustable embodiment of an angled linking member 1035, the angled linking member 1035 may be constructed from one or more flexible or resilient materials. In another embodiment of an angled linking member 1035, the angled linking member 1035 may include a plurality of adjustable parts operationally configured to adjust the angle of the angled linking member 1035 and fix the angle for operation via one or more set pins, clamps, and the like.

Figure 87:
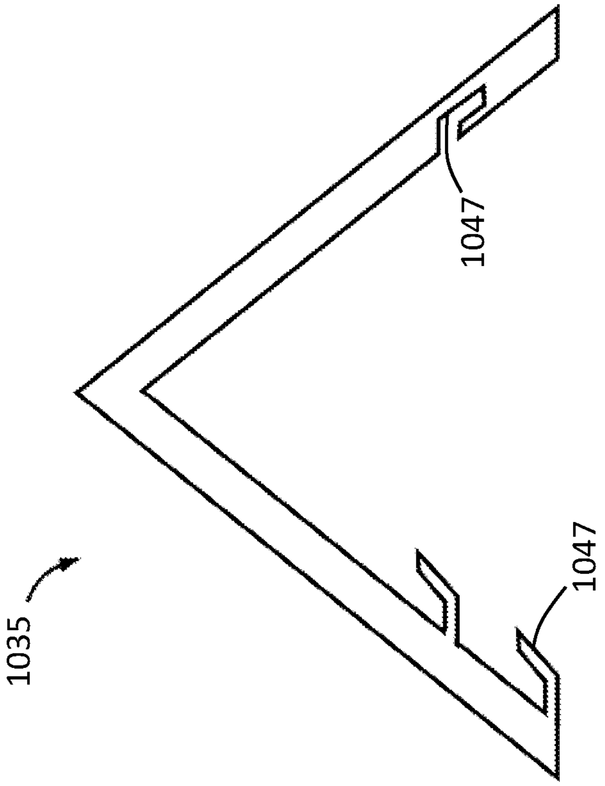
FIG. 87 is a perspective view of an embodiment of an angled linking member of the present disclosure.
Figure 86:
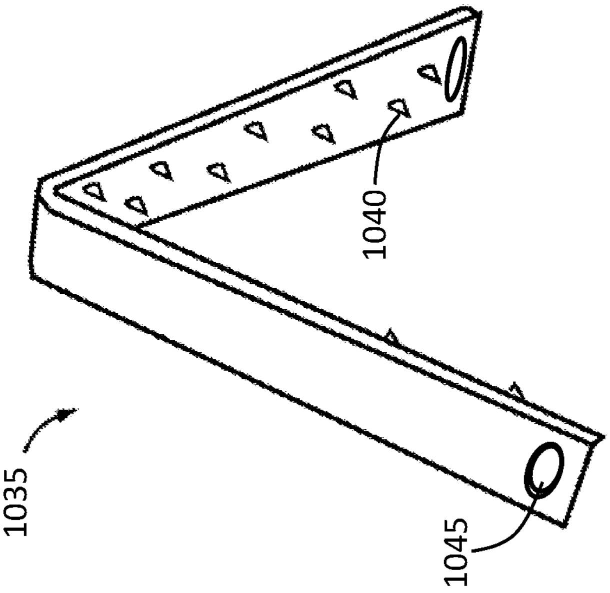
FIG. 86 is a perspective view of an embodiment of an angled linking member of the present disclosure.
Figure 100:
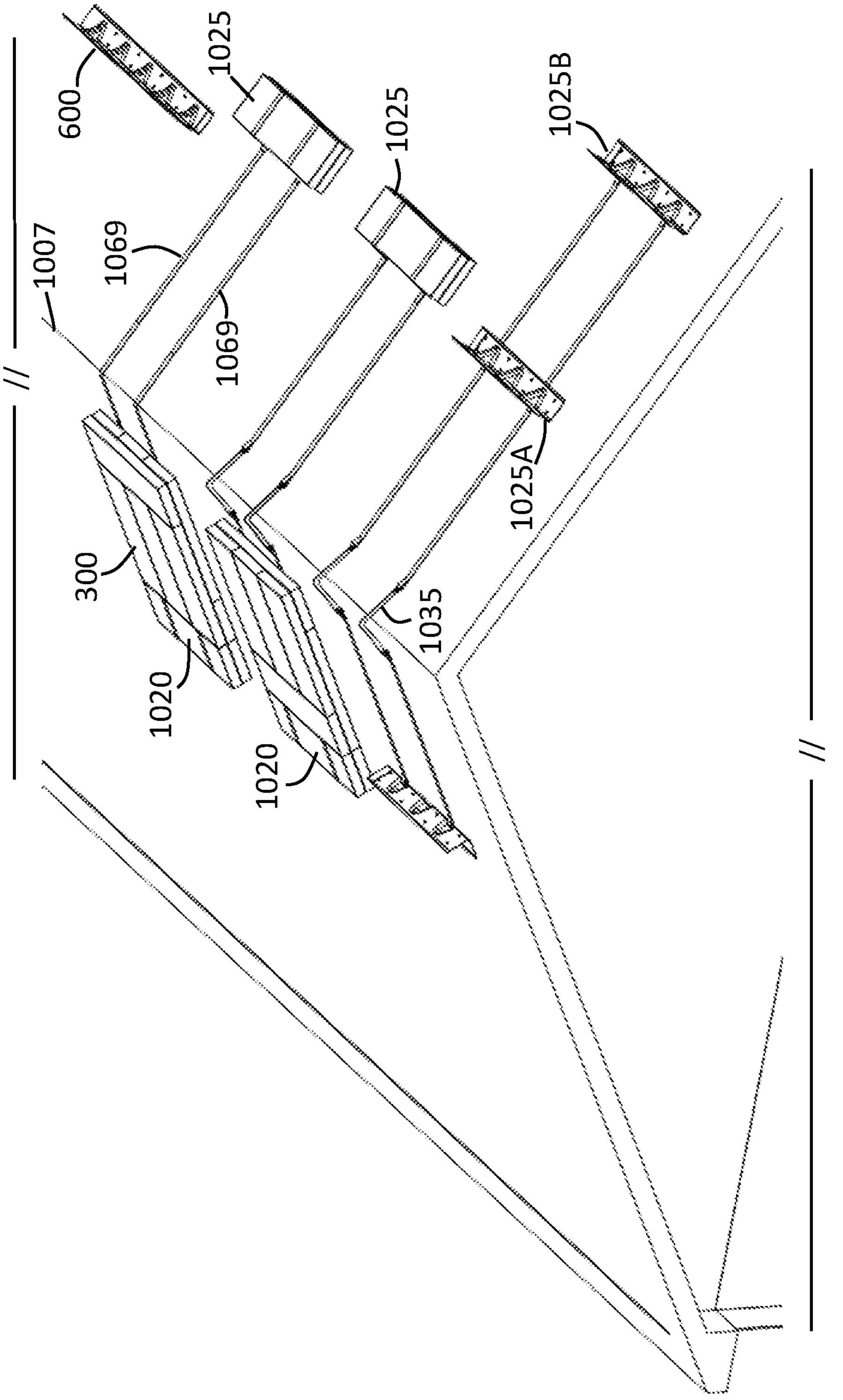
FIG. 100 is a perspective view depicting a roof surface including embodiments of portable supports and an elongated stop member thereon.

As depicted in FIG. 100, angled linking members 1035 may be provided as ridge engagement members of a portable support 1000 disposed atop a ridge 1007 of the target surface such as a roof 500 in a manner effective to hold the portable support 1000 in a fixed or substantially fixed position on the target surface. As such, in one embodiment the bottom surface 1037 of the angled linking member 1035 may include one or more protruding members 1040 for engaging one or more target surfaces, including, but not necessarily limited to spikes, teeth, and the like (see FIG. 86). As also shown in FIGS. 84-86, the angled linking member 35 may include opposing apertures 1045 providing attachment surfaces of the angled linking member 1035 with other parts of the portable support 1000. As shown in FIG. 87, in another embodiment an angled linking member 35 may include one or more hook type surfaces 1047 as attachment surfaces.

Figure 88:
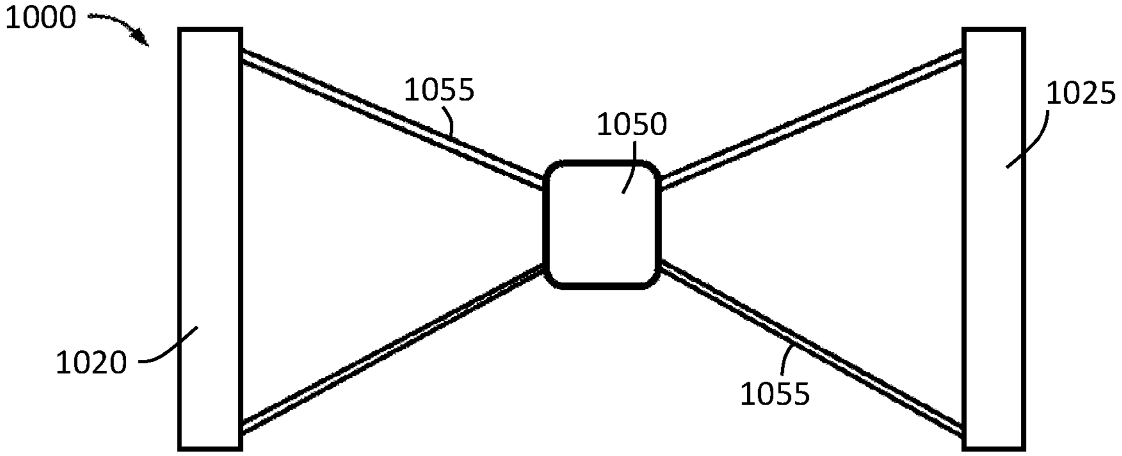
FIG. 88 is a top view of an embodiment of a portable support of the present disclosure.
Figure 89:
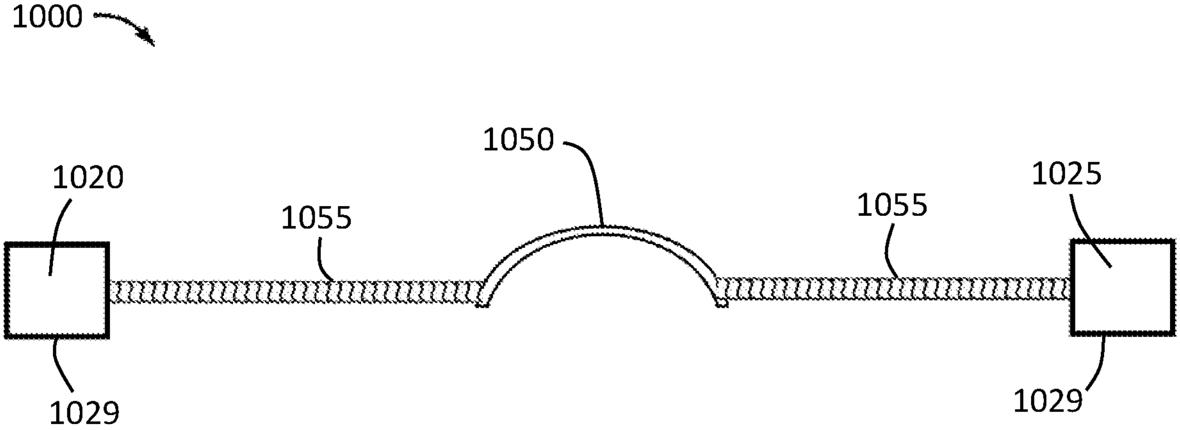
FIG. 89 is a side view of an embodiment of a portable support of the present disclosure.
Figure 90:
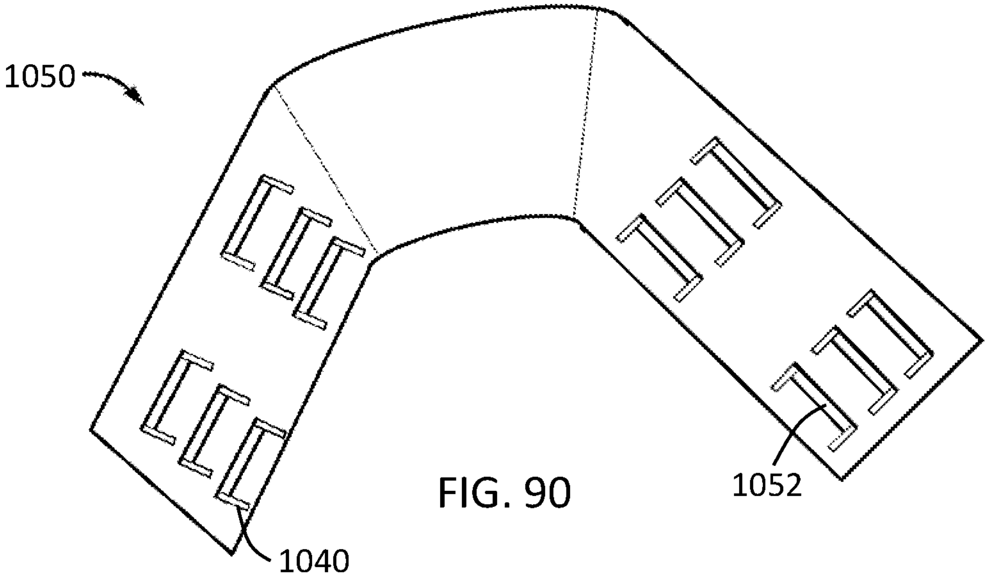
FIG. 90 is a bottom perspective view of a catch member of the present disclosure.
Figure 91:
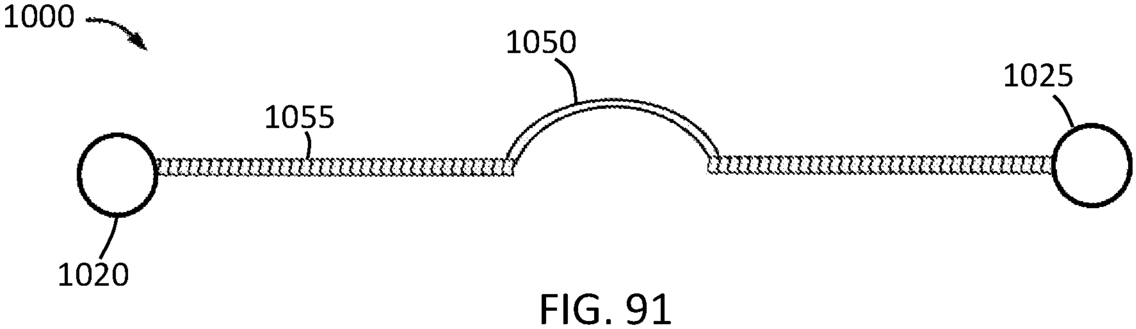
FIG. 91 is a side view of an embodiment of a portable support of the present disclosure.
Figure 92:
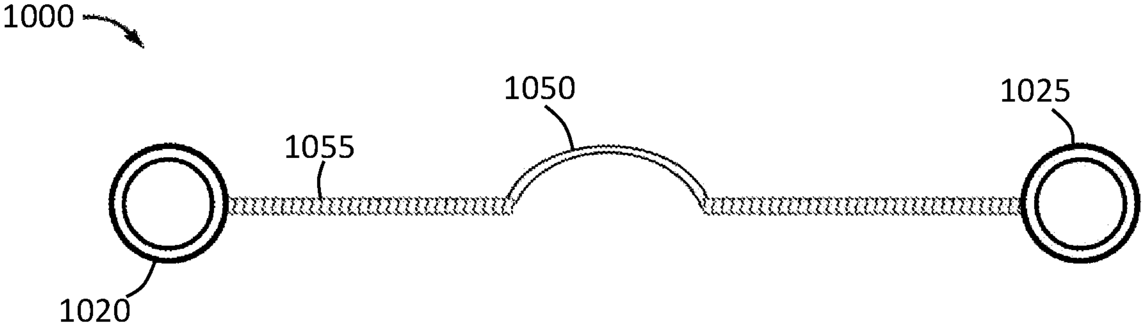
FIG. 92 is a side view of an embodiment of a portable support of the present disclosure.

Turning to FIG. 88, in another embodiment a portable support 1000 may include (1) one or more ridge engagement members or catch members 1050 operationally configured to engage a target surface at or near a ridge or peak of the target surface, e.g., a ridge 1007 of a roof 500, and (2) opposing stop members 1020 and 1025 tethered to the one or more catch members 1050 via one or more attachment lines 1055. In one embodiment, the one or more catch members 1050 may include an angled member similar as an angled linking member 1035 as described in reference to FIGS. 84-87. In another embodiment, the one or more catch members 1050 may include a non-linear shape as shown in FIG. 89 operationally configure to engage opposing sides of a target surface at its peak, e.g., a ridge 1007 of a roof 500. Similar as discussed above, a catch member 1050 as shown in FIG. 89 may also include one or more protruding members 1040 for engaging one or more target surfaces 5. In one particular embodiment, one or more catch members 1050 of a portable support 1000 may include stamped or pressed out protruding members 1040 similar as a truss plate, mending plate, or the like (see FIG. 90). In this embodiment, one or more attachment lines 1055 may attach to the catch member 1050 via one or more apertures 1052 of the catch member 1050. In another embodiment, one or more additional apertures and/or one or more loop or handle type members may be provided as part of the catch member 1050 effective as a connection for the one or more attachment lines 1055. As shown in the embodiments of FIGS. 88 and 89, the stop members 1020 and 1025 may include plank type members or other multi-sided members. In another embodiment, the stop members 1020 and 1025 may be provided as cylindrical members as shown in FIGS. 91 and 92. In one embodiment, the cylindrical stop members 1020 and 1025 may include solid members as shown in FIG. 91 or tubular stop members 1020 and 1025 as shown in FIG. 92. In one embodiment, tubular stop members 1020, 1025 may include end caps thereon as known by persons skilled in tubulars.

Figure 93:
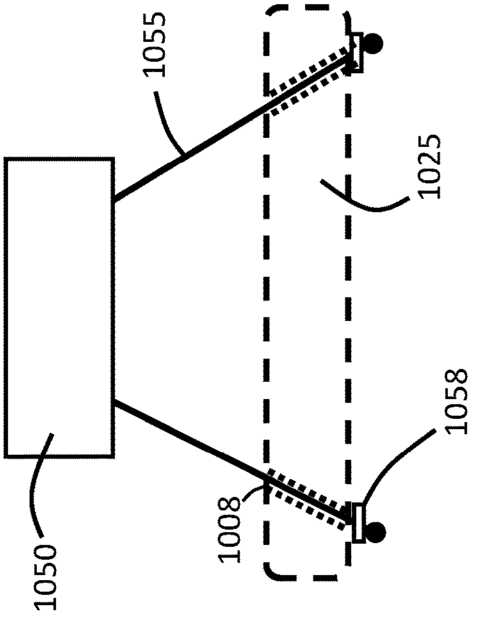
FIG. 93 is a top view of part of an embodiment of a portable support of the present disclosure.
Figure 94:
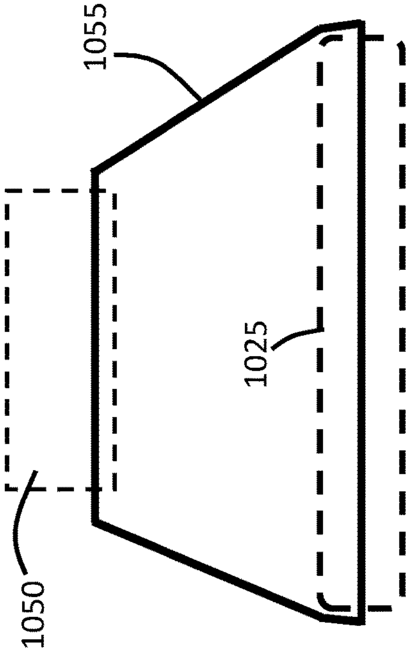
FIG. 94 is a top view of part of an embodiment of a portable support of the present disclosure.

Turning to FIG. 93, the stop members 1020, 1025 may include apertures 1008 for receiving distal ends of separate attachment lines 1055 crosswise through the stop members 1020, 1025—the attachment lines 1055 be adhered to the stop members 1020, 1025 and/or linked to the stop members 1020, 1025 via washers 1058 or the like. As shown in FIG. 94, in another embodiment a single attachment line 1055 may be employed for connecting the catch member 50 to the stop members 1020, 1025. In this embodiment, an aperture may be provided lengthwise through each of the stop members 1020, 1025 or an attachment line 1055 may be run through an opening of tubular stop members 1020, 1025. In another embodiment, distal ends of attachment lines 1055 may be adhered to and/or fastened to the outer surface of the stop members 1020, 1025. For example, attachment lines 1055 may be adhered to the outer surface of the stop members 1020, 1025 via one or more adhesive materials, e.g., one or more of epoxies, polyurethanes, polyimides, and/or removable adhesive materials such as tape and the like. The attachment lines 1055 may be fastened to the outer surface of the stop members 1020, 1025 via fasteners such as staples and the like.

Suitable attachment lines 1055 may include, but are not necessarily limited to elongated members operationally configured to maintain the position and/or orientation of the stop members 1020, 1025 in relation to the one or more catch members 1050 under load, e.g., when stopping and/or retaining one or more building materials 1099 and/or other items. In another embodiment, attachment lines 1055 may be constructed from one or more flexible materials allowing the attachment lines 1055 to bend, fold, stretch or lengthen a desired distance under load. Suitable attachment lines 1055 may include, but are not necessarily limited to rope, cable, strap material, wire, cord, twine, elastic tubing, chain, netting material, and combinations thereof. Suitable rope may be constructed from hemp, linen, cotton, coir, jute, straw, sisal, synthetic fibers such as polypropylene, nylon, polyesters, polyethylene, aramids, acrylics, and combinations thereof. Suitable strap material may be constructed from plastic, metal, paper, rubber, fabric, and combinations thereof. Cable and wire may be constructed from one or more metals. Suitable cable and wire metals include, but are not necessarily limited to steel, copper, and aluminum, e.g., aluminum hot rolled wire. One non-limiting example of chain includes passing link chain, e.g., metal chain, plastic chain.

As stated above, a portable support 1000 is suitably operationally configured to be installed on one or more target surfaces without working personnel and/or other individuals being located on the one or more target surfaces for installation purposes. For example, in an embodiment for installing one or more portable supports 1000 onto a pitched roof 500 the one or more portable supports 1000 may be installed via a lifting member 400 alone or via an apparatus 10 secured to the lifting member 400 as described above. In another embodiment, one or more portable supports 1000 may be installed onto a pitched roof 500 using another type of lift mechanism described herein and placed atop the ridge of the roof 500 in an operable position as shown in FIG. 82. Manual installation of one or more portable supports 1000 is also contemplated herein.

Figure 95:
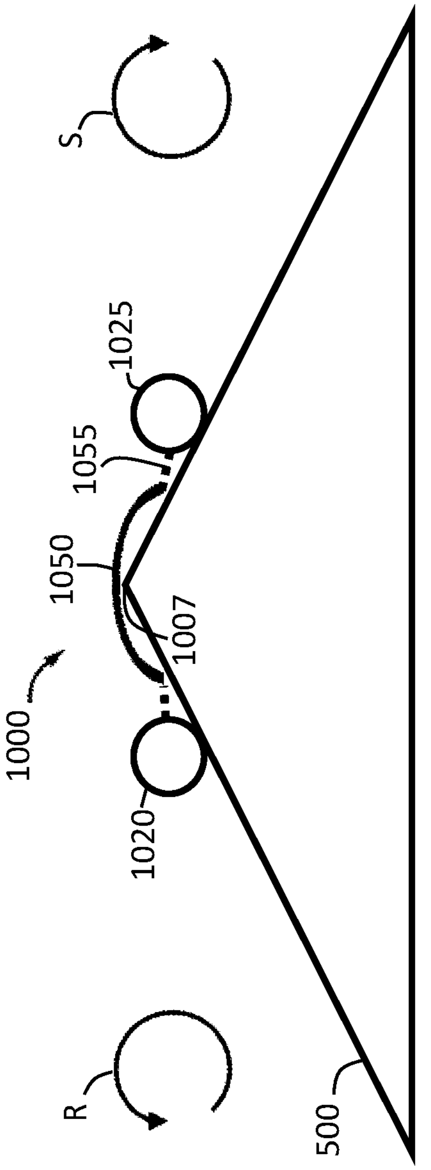
FIG. 95 is a side view of an embodiment of a portable support on a ridge of a roof surface in a non-operating position.
Figure 96:
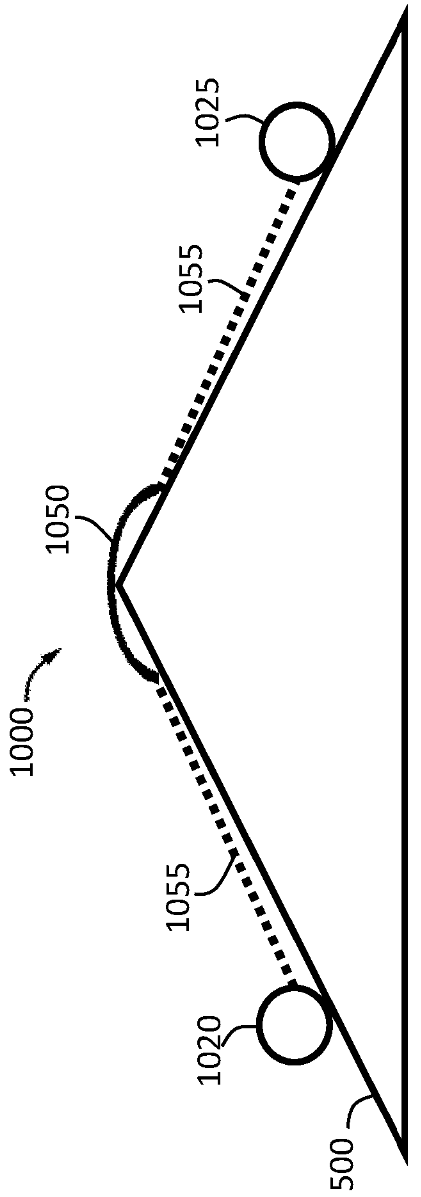
FIG. 96 is a side view of the portable support of FIG. 95 in an installed position.
Figure 97:
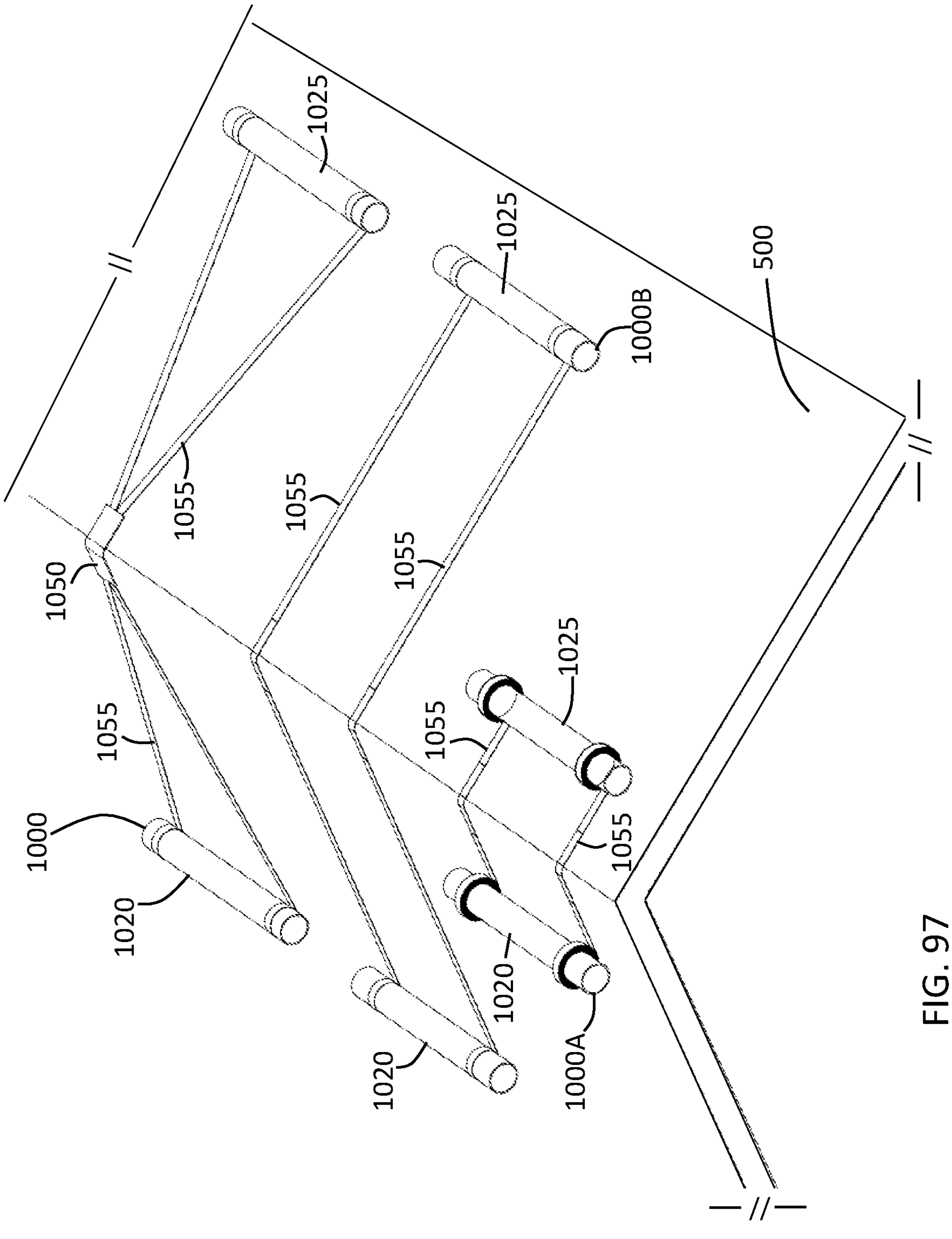
FIG. 97 is a perspective view depicting a roof surface including embodiments of portable supports thereon.

In an embodiment of the portable support 1000 as shown in FIGS. 91 and 92, self-installation of the portable support 1000 when set atop a target surface defined by a peak may be accomplished as a result of gravitational force exerted on the stop members 1020, 1025. With reference to FIG. 95, a portable support 1000 having cylindrical or tubular stop members 1020, 1025 may be delivered to a peak of a target surface such as a peaked roof 500 in a rolled up position (or "storage position," "non-operating position," or "pre-install position") in a manner effective for the catch member 1050 to engage the ridge 1007 of the roof 500 and for each of the stop members 1020 and 1025 to roll down the roof 500 (see directional arrows R and S) to a fully installed position as shown in FIG. 96. Also see FIG. 97, which depicts another embodiment of a portable support 1000 comprising a catch member 1050 in an installed position on a peaked roof 500. FIG. 97 further depicts another embodiment of a portable support including stop members 1020 and 1025 interconnected via one or more attachment lines 1055 without the use of one or more catch members. In particular, FIG. 97 depicts a portable support 1000A shown in a rolled up position and a similar portable support 1000B shown in a fully installed position. As shown, the portable supports 1000A, 1000B include two separate attachment lines 1055 in parallel interconnecting the stop members 1020 and 1025. As understood by the skilled artisan, the two attachment lines 1055 of each of the portable supports 1000A, 1000B are equal or about equal in length.

Figure 98:
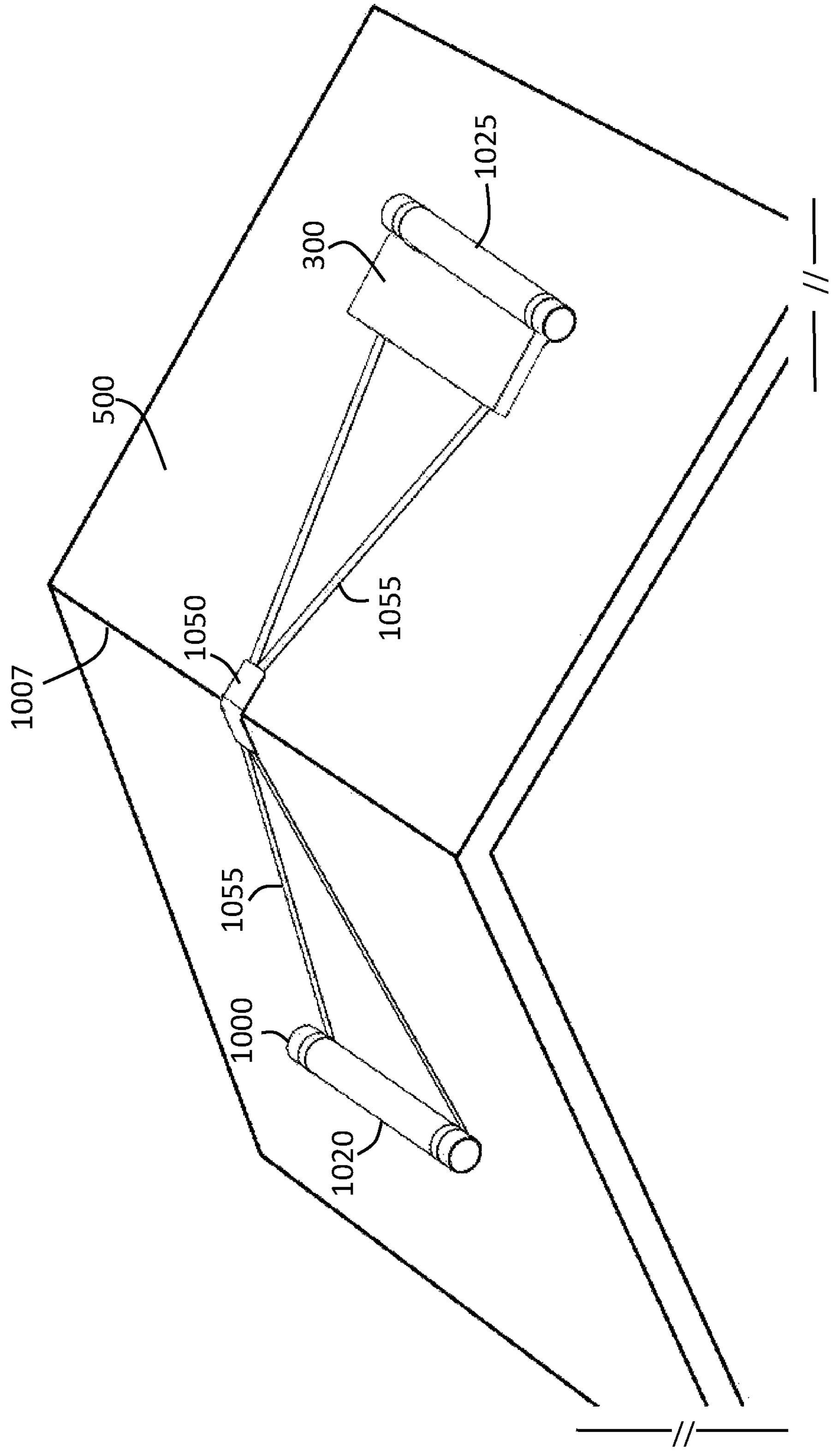
FIG. 98 is a perspective view depicting a roof surface including an embodiment of a portable support thereon.

In an embodiment of the portable support 1000 including stop members 1020, 1025 provided as elongated plank type members or other multi-sided members (see FIG. 89), the stop members 1020, 1025 may slide down a target surface such as a peaked roof 500 to a fully installed position, or an apparatus 10 secured to a lifting member 400 or a lifting member 400 alone or other equipment may be used to direct or maneuver stop members 1020, 1025 to a fully installed position. In one embodiment, a bottom surface 1029 of the stop members 1020, 1025 may include slick material(s) attached thereto and/or slick coatings to promote sliding of the stop members 1020, 1025 to a fully installed position. Examples of slick materials and/or coatings include, but are not necessarily limited to polytetrafluoroethylene ("PTFE"), polyoxymethylene, aluminum magnesium boride, industrial grease, and combinations thereof. Suitably, the one or more attachment lines 1055 are secured to the stop members 1020, 1025 in a manner effective for one or more building materials 1099 and/or other items to rest on part of the attachment line 1055 without disturbing desired operation of the stop members 1020, 1025—see the bundle of roofing shingles 300 resting on attachment line 1055 in FIG. 98.

In the embodiments of the portable support 10 as described in FIGS. 88-98, the stop members 1020, 1025 are suitably constructed from one or more materials operationally configured so that the stop members 1020, 1025 are effective to act as contact surfaces for stopping and/or holding or retaining one or more building materials 1099 and/or other items on pitched and/or peaked roofs 500 and other inclined surfaces where one or more building materials 1099 and/or other items may be directed in a particular direction as a result of gravitational force exerted on the one or more building materials 1099 and/or other items. Suitable materials of construction of the stop members 1020, 1025 may include, but are not necessarily limited to metals, plastics, rubbers, cardboard, composite material, fiber reinforced plastic, wood, bamboo, rock and/or other earth based materials such as brick and/or concrete, and/or clay, textiles, sponge material, cork, polycarbonate, and combinations thereof. In another embodiment, the stop members 1020 and 1025 may be constructed from closed cell foam, open cell foam, and combinations thereof. In still another embodiment, the stop member 1020, 1025 and/or the other parts of the portable support 1000 may be constructed from one or more environmentally friendly biodegradable materials.

Figure 99:
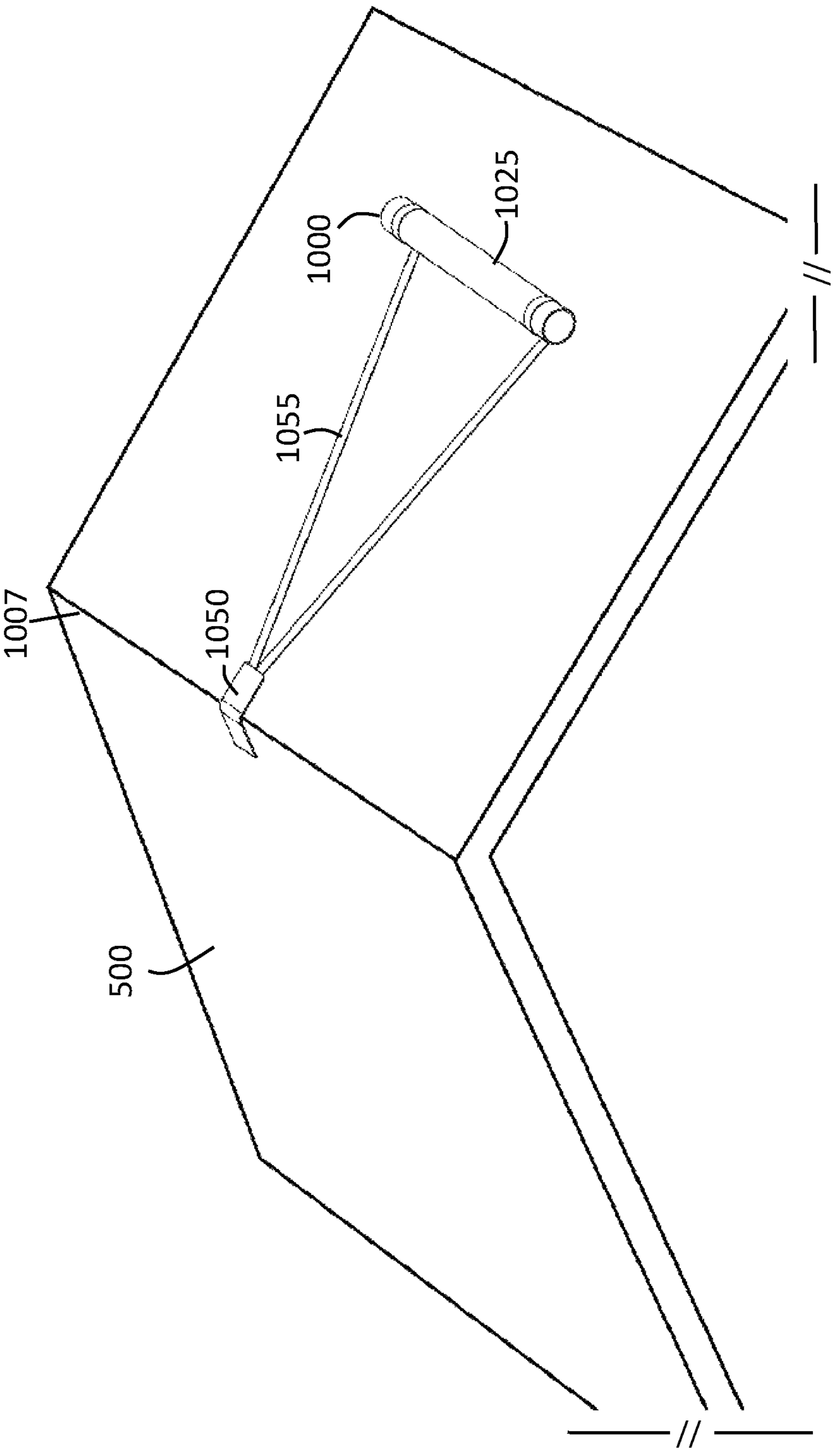
FIG. 99 is a perspective view depicting a roof surface including an embodiment of a portable support thereon.

In another embodiment, the portable support 1000 may be provided with a catch member 1050 as described above and a single stop member 1025 as shown in FIG. 99. In another embodiment, the portable support 1000 may include two or more stop members 1025A and 1025B on one or more sides of the portable support 1000, e.g., see FIG. 100.

Figure 101:
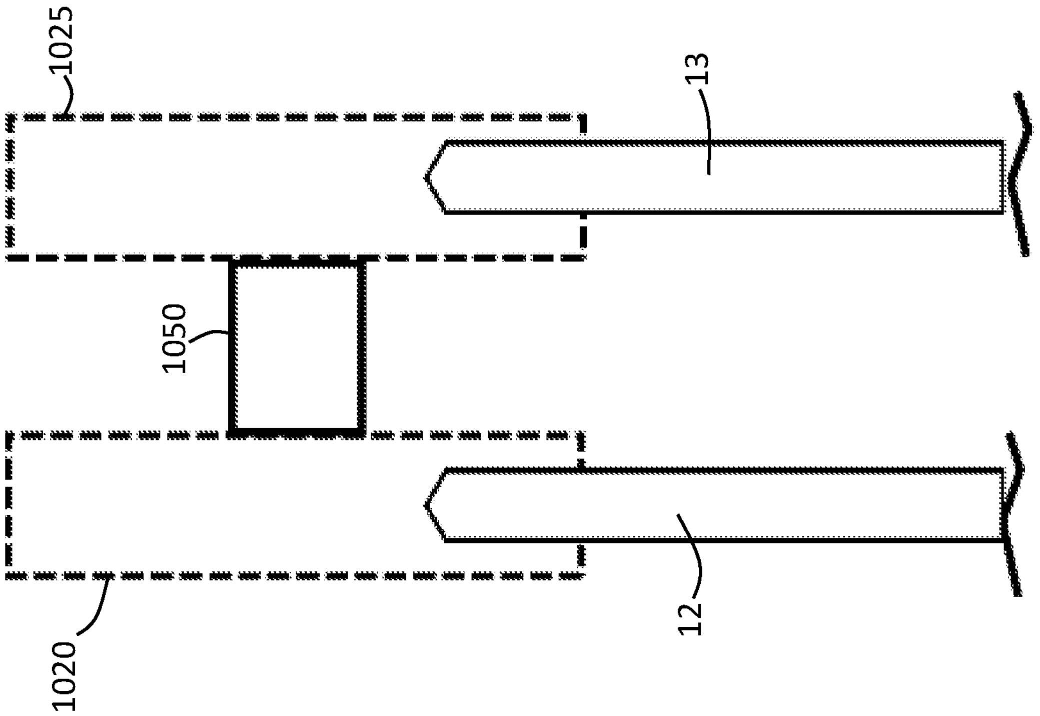
FIG. 101 is a simplified top view showing fork tines of the present disclosure in a mated position with a portable support.

Regarding the embodiments as shown in FIGS. 88-100, one or more portable supports 1000 may be transported to a location of installation on a target surface such as a roof 500 via an apparatus 10 secured to a lifting member 400, via the lifting member 400, or via another type of lift mechanism as described herein. In one embodiment, a lifting hook of a crane, hoist or the like may grab at least part of the portable support 1000 for delivery of the portable support 1000 to a desired target surface such as a roof 500 or other elevated surface, e.g., a lifting hook may grab one or more attachment lines 1055 or a lift eye or a handle type member attached to a catch member 1050 or angled linking members 1035 in a manner effective to install the portable support 1000 onto a target surface in an operable position. In another embodiment, a portable support 1000 may rest atop one or both fork tines 12 and 13 of an apparatus 10 or similar fork tines of a lifting member 400. In another embodiment, a portable support 1000 may be suspended from one or both fork tines 12 and 13 of an apparatus 10 or similar fork tines of a lifting member 400. In an embodiment of a portable support 1000 including tubular stop members 1020, 1025, the portable support 1000 may be set to a rolled up position whereby fork tines 12 and 13 of the apparatus 10 or similar fork tines of a lifting member 400 may mate with the openings of the stop members 1020, 1025 for delivery of the portable support 1000 onto an elevated target surface such as a roof 500 or other elevated surface (see FIG. 101). In another embodiment, a portable support 1000 may be carried in a pouch type member (not shown) transported by a lifting member 400 and removed from the pouch type member or other carrier at an intended location on a target surface.

Figure 102:
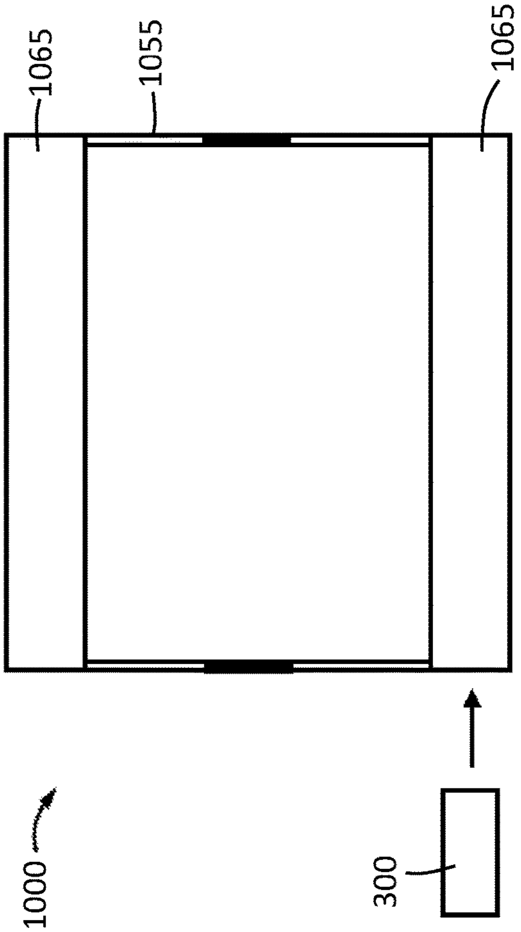
FIG. 102 is a top view of an embodiment of a portable support of the present disclosure.
Figure 103:
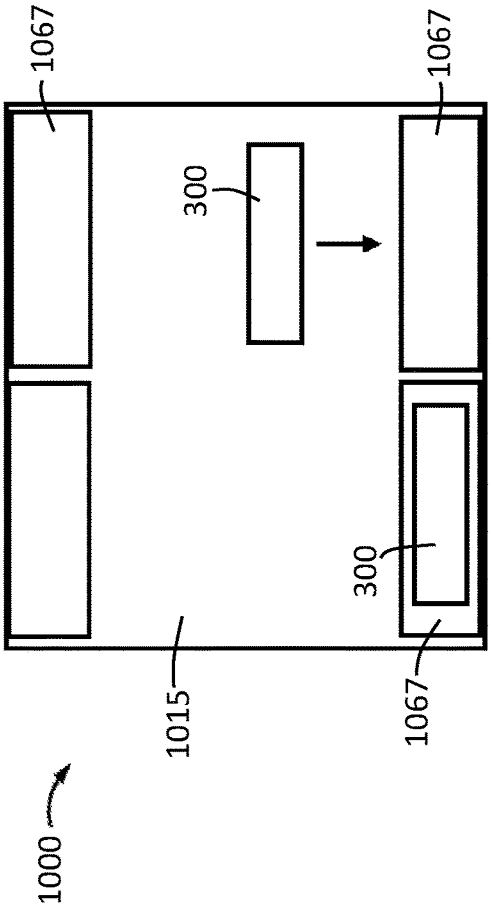
FIG. 103 is a top view of an embodiment of a portable support of the present disclosure.

In another embodiment, one or more building materials 1099 and/or other items to be delivered to a target surface, e.g., a peaked roof 500, may be employed as stop members 1020, 1025. As an example, in an embodiment where the one or more building materials 1099 includes bundles of shingles 300 to be delivered to a roof 500, one or more bundles of shingles 300 may be used as stop members 1020, 1025 of a portable support 1000 and thereafter used as roofing shingles on the roof 500. In another embodiment, lumber and/or plastic planks and/or foam planks may be used as stop members 1020, 1025. Herein, such an embodiment of a portable support 1000 may also be referred to as a portable support system. As shown in FIG. 102, in one embodiment a portable support system may include a portable support 1000 with one or more sleeves 1065 whereby one or more building materials 1099, e.g., one or more bundles of shingles 300, and/or other items may be inserted into the sleeves 1065 and positioned for operable use as stop members 1020, 1025. In one embodiment, sleeves 1065 may include one open end and one closed end as shown in FIG. 102. In another embodiment, sleeves 1065 may include two open ends. As shown in FIG. 103, in another embodiment a portable support 1000 may include one or more pockets 1067 whereby one or more building materials 1099 and/or other items may be inserted into the one or more pockets 1067 for operable use as stop members 1020, 1025.

In another embodiment, straps 1069 or the like may be used to secure building materials 1099, e.g., one or more bundles of shingles 300, and/or other items for use as stop members 1020, 1025—see FIG. 100, which depicts straps 1069 for holding bundles of roofing shingles 300 in a manner effective as stop members 1020, 1025. Straps 1069 may include hook and loop fasteners, latches, hooks, buckles and other strap securing members effective to maintain the straps 1069 in an operating position for securing building materials 1099. Straps may also be maintained in an operation position via one or more adhesives, tape, stitching, staples, and combinations thereof.

Figure 104:
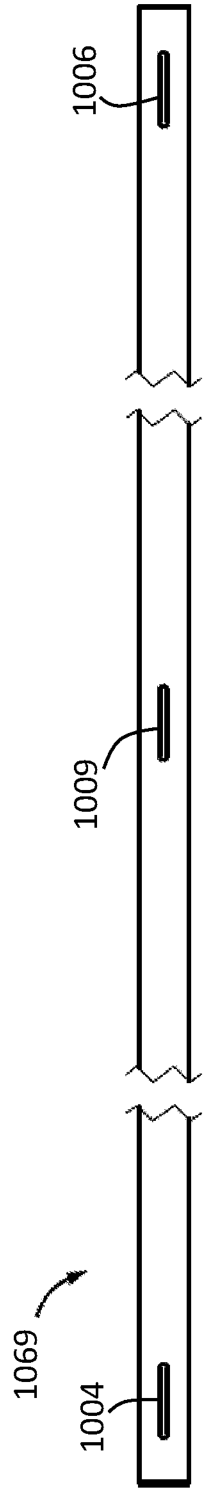
FIG. 104 is a top view of an embodiment of a strap of a portable support of the present disclosure.
Figure 105:
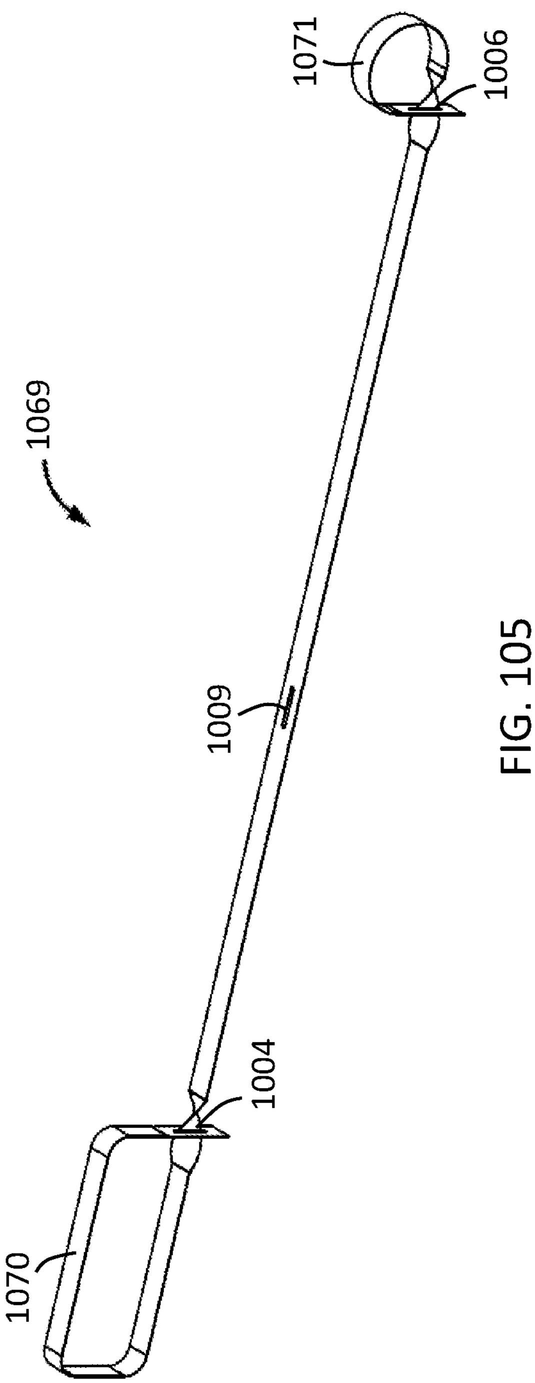
FIG. 105 is a perspective view of the strap of FIG. 104.

In another embodiment, a portable support 1000 or portable support system may include one or more straps 1069, e.g., one or more flexible or bendable straps, as shown in FIG. 104. In this embodiment, a strap 1069 includes openings 1004 and 1006 located near opposing ends of the strap 1069 as shown. The strap 1069 may also include an opening 1009 at or near the midpoint of the strap 1069 as shown. In another embodiment, the strap 1069 may be provided without an opening 1009 at or near the midpoint of the strap 1069. In this embodiment, the openings 1004 and 1006 are not limited to a particular size and/or shape, however, overall size of the openings 1004 and 1006 may be dictated according to the length and width of the strap 1069. Suitably, the openings 1004 and 1006 include a size and shape operationally configured to receive part of the strap 1069 through the openings 1004 and 1006 in a manner effective to form one or more loops 1070, 1071 at one or more distal ends of the strap 1069 as shown in FIG. 105. In other words, the one or more loops 1070, 1071 may be formed by feeding part of the strap 1069 through its openings 1004 and 1006.

Depending on the material(s) of construction of the one or more straps 1069, the openings 1004, 1006 and 1009 may be formed during manufacturing of the one or more straps 1069, or users of the one or more straps 1069 may form the openings 1004, 1006 and 1009 in the one or more straps 1069 at the time of use or prior to use via a cutting instrument such as scissors, a knife, a razor blade, and the like. As understood by the skilled artisan, suitable strap material may be provided in bulk such as in rolls whereby persons can cut off one or more desired lengths of the strap material and form the openings 1004, 1006 and 1009 in the strap material to produce one or more straps 1069. Such straps 1069 may be produced and stored at a first location and used at a second location. In another embodiment, users of an apparatus 10 and lifting member 400 may transport strap material, e.g., one or more rolls of strap material, to one or target locations for the delivery of one or more building materials 1099 and/or other items and produce the one or more straps 1069 on location as desired or as otherwise required for workable installation of the portable support 1000 or portable support system on one or more target surfaces such as one or more roofs 500, e.g., calculate the length of the one or more straps 1069 to be produced according to the surface area and/or layout of the one or more target surfaces. In another embodiment, users of the apparatus 10 and the lifting member 400 may be provided guidelines as to the length of one or more straps 1069 prior to assembly of the portable support 1000 or portable support system. Depending on the material(s) of construction of the one or more straps 1069, the openings 1004, 1006 and 1009 may be reinforced for added strength to protecting against ripping or tearing of the one or more straps 1069 at the openings 1004, 1006 and 1009 by including tape and/or stitching along the perimeter of the openings 1004, 1006 and 1009 and/or by sealing the perimeter of the openings 1004, 1006 and 1009 via flame treatment as understood by the skilled artisan.

As understood by the skilled artisan, the size of each loop 1070, 1071 is dictated according to the length of the strap 1069 directed through each of the openings 1004 and 1006, e.g., loop 1070 is depicted larger than loop 1071 as the length of the strap 1069 directed through opening 1004 is greater than the length of the strap 1069 directed through opening 1006. The strap 1069 of this embodiment may be referred to as a "self-looping strap" because one or two loops 1070, 1071 may be formed in the strap 1069 as shown without having to tie knots in the strap 1069 to form and maintain the one or two loops 1070, 1071 and without having to use hook and loop fasteners, latches, hooks, buckles, one or more adhesives, tape, stitching, staples, or other strap securing members to form and maintain the one or two loops 1070, 1071. Examples of strap material for the one or more straps 1069 of this embodiment include, but are not necessarily limited to nylon webbing, polyester webbing, seatbelt webbing, and combinations thereof.

Figure 106:
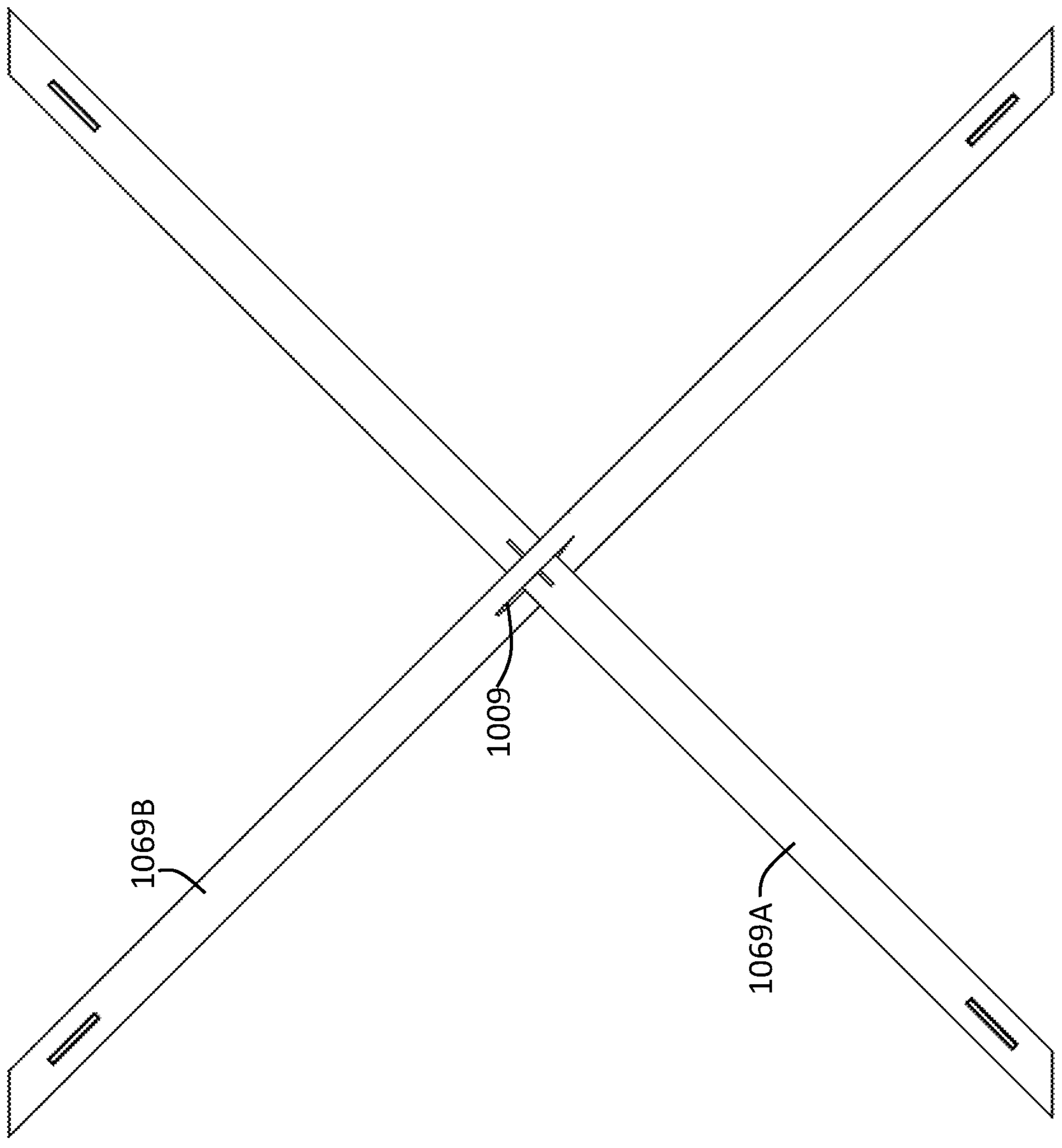
FIG. 106 is a top view of straps interconnected.

Once loops 1070 and 1071 are formed, one or more building materials 1099 and/or other items operationally configured as stop members 1020, 1025 may be set within the loops 1070 and 1071 of one or more straps 1069 and the one or more straps 1069 may be manipulated in a manner effective to tighten each loop 1070, 1071 around its corresponding one or more building materials 1099 and/or other items in a manner effective to hold or secure the one or more building materials 1099 and/or other items during installation of the portable support system, e.g., when carried by the apparatus 10 or other lifting member 400, and during operation of the portable support system. In one embodiment of a portable support system, the one or more building materials 1099 may include bundles of shingles 300 for use as stop members 1020, 1025 on a roof 500 (see FIG. 100). As shown in FIG. 100, one portable support system may comprise two straps 1069 aligned in parallel. In another embodiment, one or more rungs, e.g., strap material, may be employed to interconnect parallel straps 1069. In still another embodiment, a first strap 1069A may be inserted through an opening 1009 of a second strap 1069B interconnecting the first and second straps 1069A, 1069B providing an X-shape or cross-shape pair of straps 1069 for use as part of a portable support system as shown in the simplified illustration of FIG. 106. Although the strap 1069 of FIG. 104 is depicted in the form of a commercially available strap material, other shapes and/or configures of straps 1069 are herein contemplated.

Depending on the total number of bundles of shingles to be delivered to a target roof 500 and/or the size of the roof 500, one or more portable support systems may be installed on a common roof 500 as shown in FIG. 100. In operation, a desired number of individual bundles of shingles may be removed from a unit load 300 and connected to each of the loops 1070 and 1071 of one or more straps 1069 for use as stop members 1020, 1025 of a portable support system—see FIG. 100, which depicts stop members 1020, 1025 having a stack of two bundles of shingles oriented left to right parallel or substantially parallel to the ridge 1007 of a roof 500 as shown providing a maximum surface contact area of the bundles of shingles for stopping bundles of shingles removed from the apparatus 10 onto the roof 500. The total number of bundles of shingles used as stop members 1020, 1025 may include one or more bundles of shingles as desired or as may otherwise be required for a particular operation. In one embodiment, each stop member 1020, 1025 may include a total of three bundles of shingles in a stacked configuration. In another embodiment, each stop member 1020, 1025 may include a total of four bundles of shingles in a stacked configuration. Moreover, two or more portable support systems may be installed on a common roof 500 with at least one portable support system having stop members 1020, 1025 with a different total number of bundles of shingles compared to one or more other portable support systems installed on the same roof 500. In such embodiment, once bundles of shingles are removed from a unit load 300 to form stop members 1020, 1025 of a desired number of portable support systems, the apparatus 10 may carry and remove the remaining bundles of shingles for that particular unit load 300 onto the roof 500 in addition to one or more additional unit loads 300 as desired.

Figure 107:
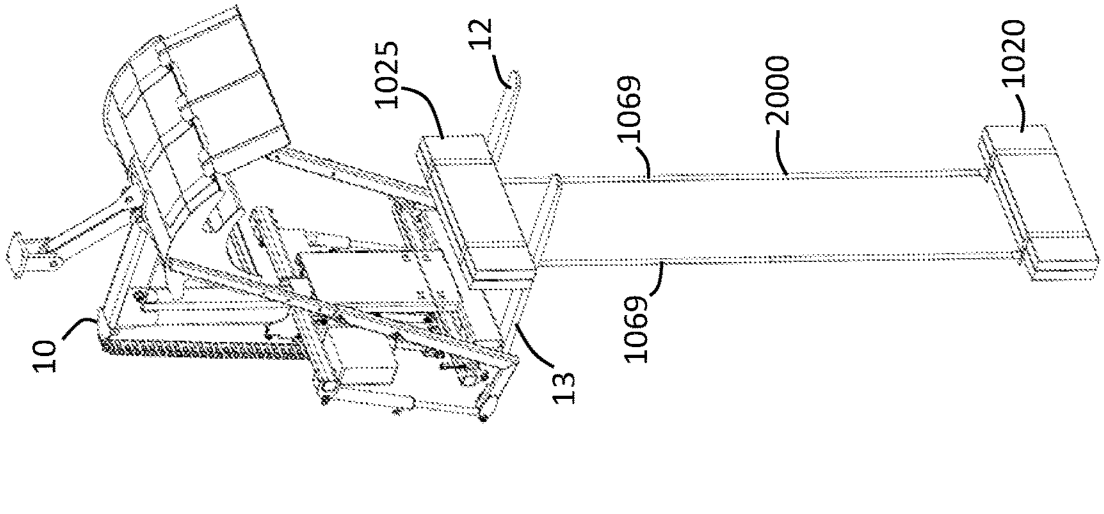
FIG. 107 is a front perspective view of the apparatus of FIG. 49 carrying a portable support of the present disclosure.

Similar as a portable support 1000 as described above, a portable support system may also be suspended from one or both fork tines 12 and 13 of an apparatus 10 or similar fork tines of a lifting member 400 and transported to a target surface, e.g., a roof 500, for purposes of installation as part of the automated shingle delivery and/or person free shingle delivery of this disclosure. In one non-limiting example as shown in FIG. 107, a portable support system 2000 may be suspended from the apparatus 10 during transport by resting a single stop member on the fork tines 12 and 13 of the apparatus 10 (see stop member 1025) with the opposing stop member being suspended below the fork tines 12 and 13 via one or more straps 1069. In another non-limiting example as shown in FIG. 108, a portable support system 2000 may be suspended from the apparatus 10 during transport by placing the one or more straps 1069 across the fork tines 12 and 13 of the apparatus 10 with both stop members 1020, 1025 suspending below the fork tines 12 and 13.

Figure 110:
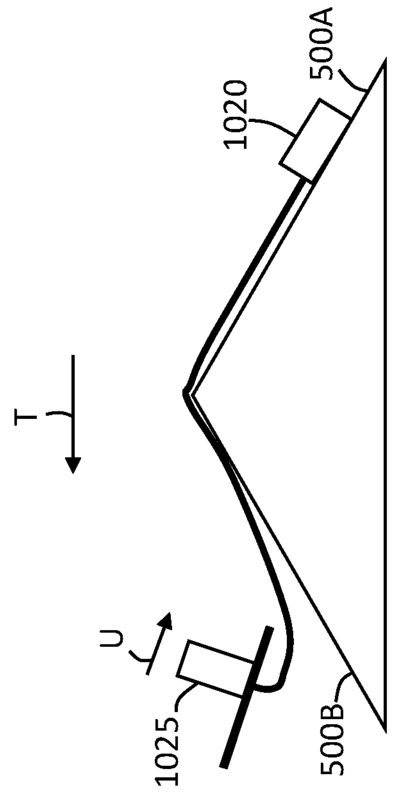
FIG. 110 is a simplified side view illustrating part of the installation of the portable support of FIG. 109.
Figure 109:
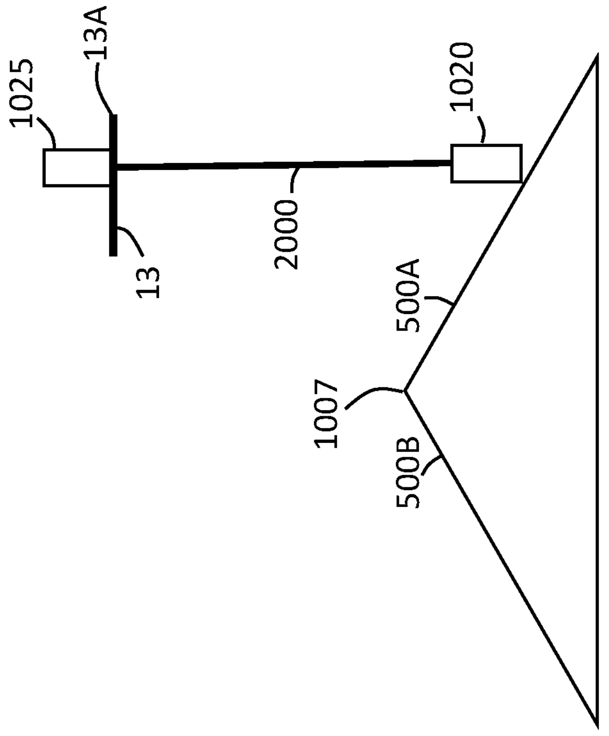
FIG. 109 is a simplified side view illustrating part of an installation of the portable support of FIG. 107.

As shown in the simplified illustrations of FIGS. 109 and 110, a portable support system 2000 carried by an apparatus 10 in a manner as shown in FIG. 107 may be installed on a roof 500 by directing the front side 13A of the fork tines 12 and 13 toward a first surface 500A of a roof in a manner effective to set stop member 1020 on the first surface 500A at a desired installation location, i.e., a transverse direction in relation to the ridge 1007. Next, the apparatus 10 may be directed in a reverse direction according to directional arrow T whereby stop member 1025 may be directed off from the fork tines 12 and 13 onto a second surface 500B of the roof at a desired installation location according to directional arrow U. In another embodiment, the portable support system 200 may be installed in the opposite direction including placement of stop member 1020 on the second surface 500B and then placement of stop member 1025 on the first surface 500A.

Figure 108:
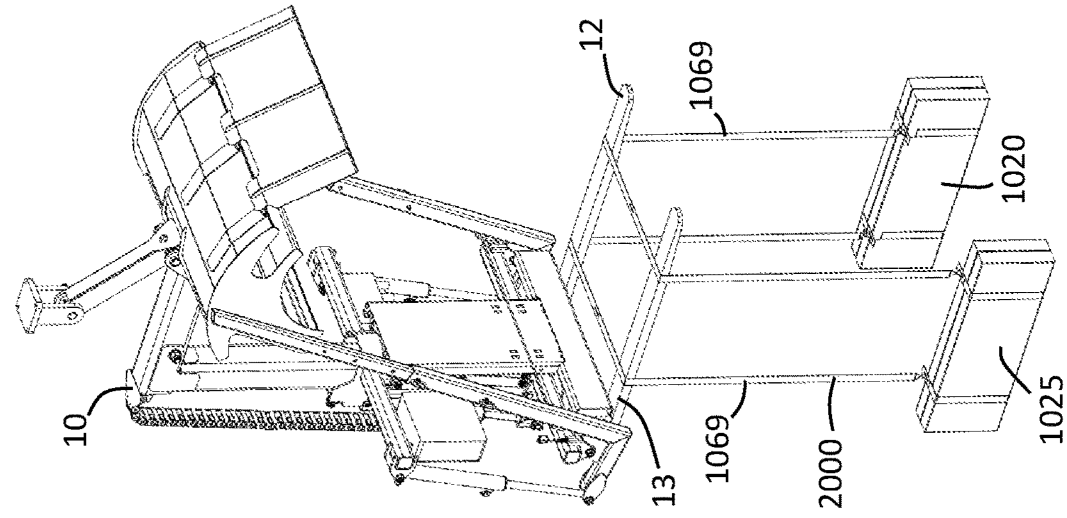
FIG. 108 is a front perspective view of the apparatus of FIG. 49 carrying a portable support of the present disclosure.
Figure 111:
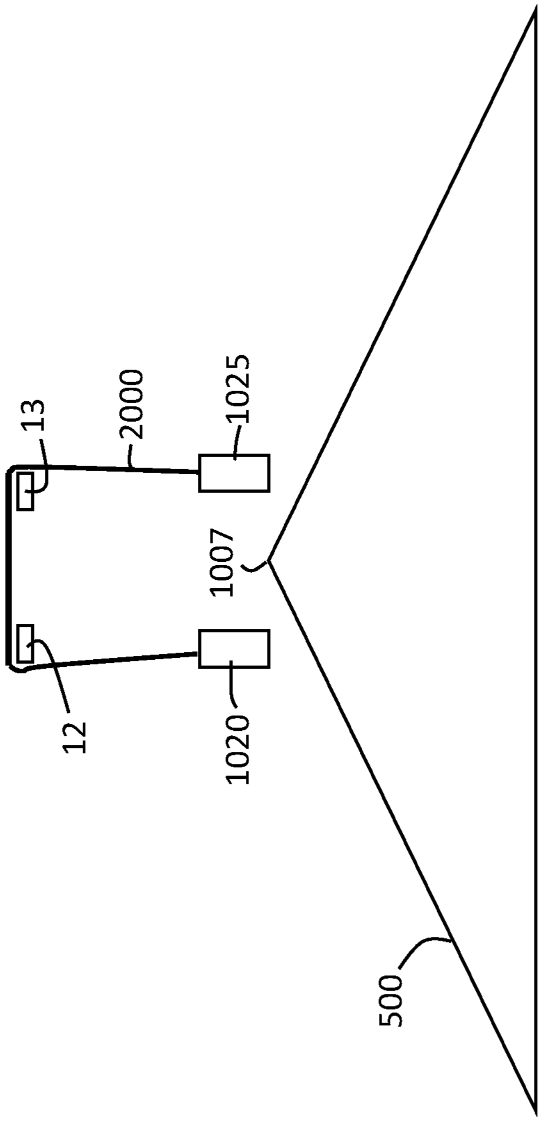
FIG. 111 is a simplified view illustrating part of an installation of the portable support of FIG. 108.

As shown in the simplified illustration of FIG. 111, a portable support system 2000 carried by an apparatus 10 in a manner as shown in FIG. 108 may be installed on a roof 500 by approaching a ridge 1007 of a roof 500 longitudinally whereby the apparatus 10 may be lowered until the stop members 1020, 1025 are set on the roof 500. As shown, in this embodiment the distance between the stop members 1020, 1025 when suspended from the apparatus 10 is determined according to the outer width of the fork tines 12 and 13. As such, as the apparatus 10 is lowered, one or both stop members 1020, 1025 may be located on the roof 500 on either side of the ridge at a distance less than an installation distance between the 1020, 1025, i.e., one or both of the 1020, 1025 may be set on the roof 500 at a location(s) closer to the ridge 1007 than desired. Depending on the pitch of the roof 500, the stop members 1020, 1025 may slide to an installed position under gravity, i.e., slide away from the ridge 1007. Otherwise, the fork tines 12 and/or 13 may be used to direct one or both of the stop members 1020, 1025 to an installed position on the roof 500. In another embodiment, as bundles of shingles 300 are removed from the apparatus 10 onto the roof 500, momentum of one or more bundles of shingles 300 exiting the apparatus 10 may be used to push one or both of the stop members 1020, 1025 away from the ridge 1007 to an installed position.

Figure 114:
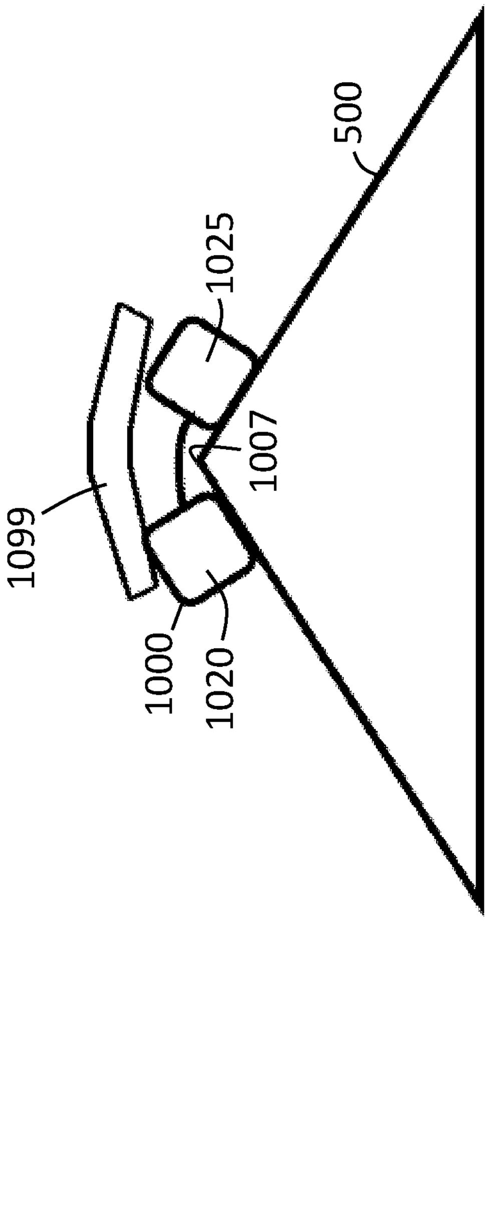
FIG. 114 is a side view of a portable support of the present disclosure installed on a target surface.

In another embodiment of a portable support 1000, the stop members 1020 and 1025 may be operationally configured to support one or more building materials 1099 and/or other items on top of the stop members 1020 and 1025 separated apart from a target surface. In one non-limiting example as shown in FIG. 114 including a target surface comprising a ridge of a roof 500, the portable support 1000 is operationally configured to hold one or more building materials 1099 and/or other items at or near the peak of the roof 500 apart from the ridge 1007. In another embodiment it is contemplated that each stop member 1020 and 1025 may be located a different distance from a ridge 1007 of a roof 500 as may be desired or otherwise required for one or more particular operations.

The disclosure will be better understood with reference to the following non-limiting examples, which are illustrative only and not intended to limit the present disclosure to a particular embodiment.

Example 1

Figure 36:
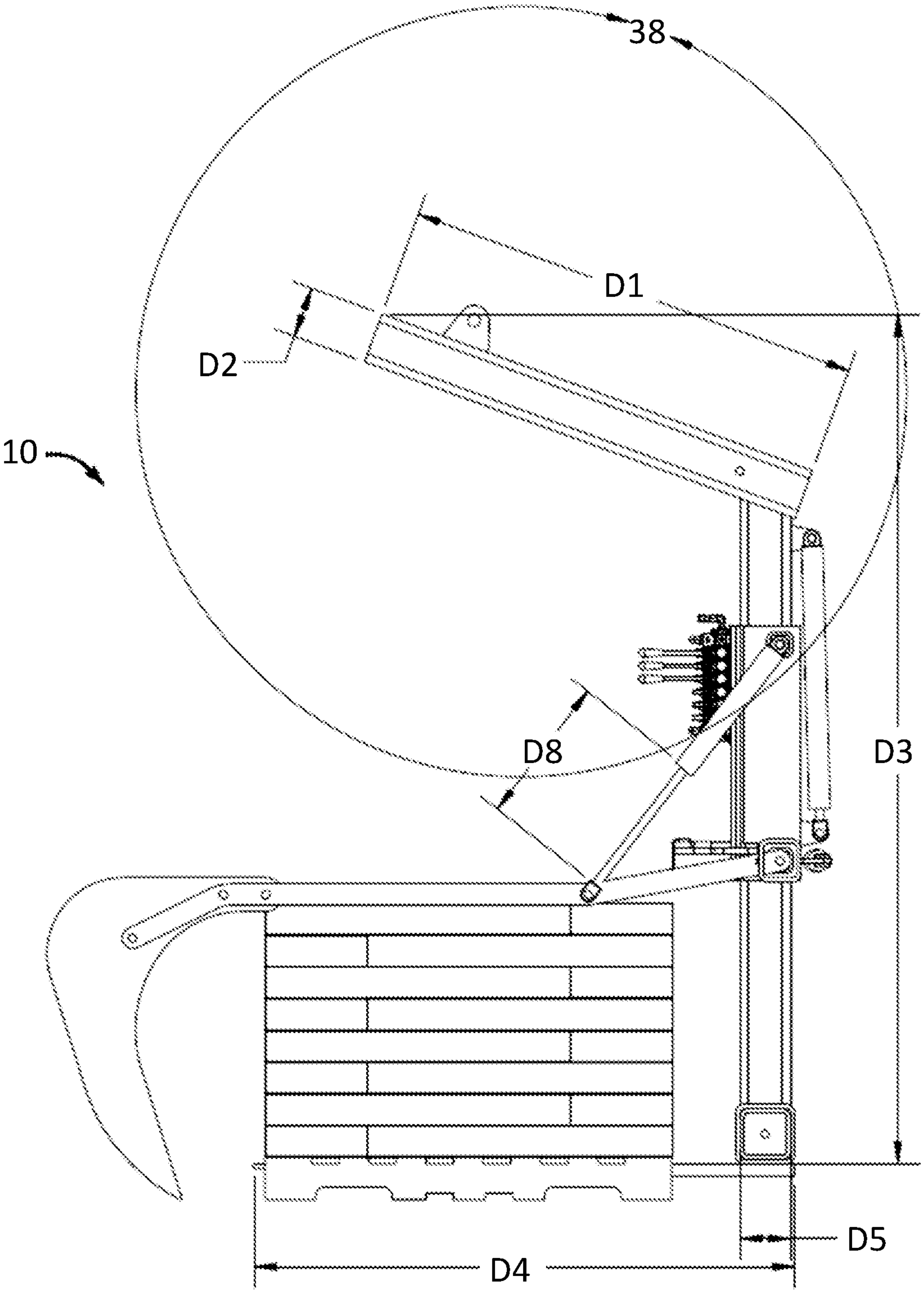
FIG. 36 is a side view of the apparatus of FIG. 3 including a portable platform and a unit load in communication with the apparatus.
Figure 37:
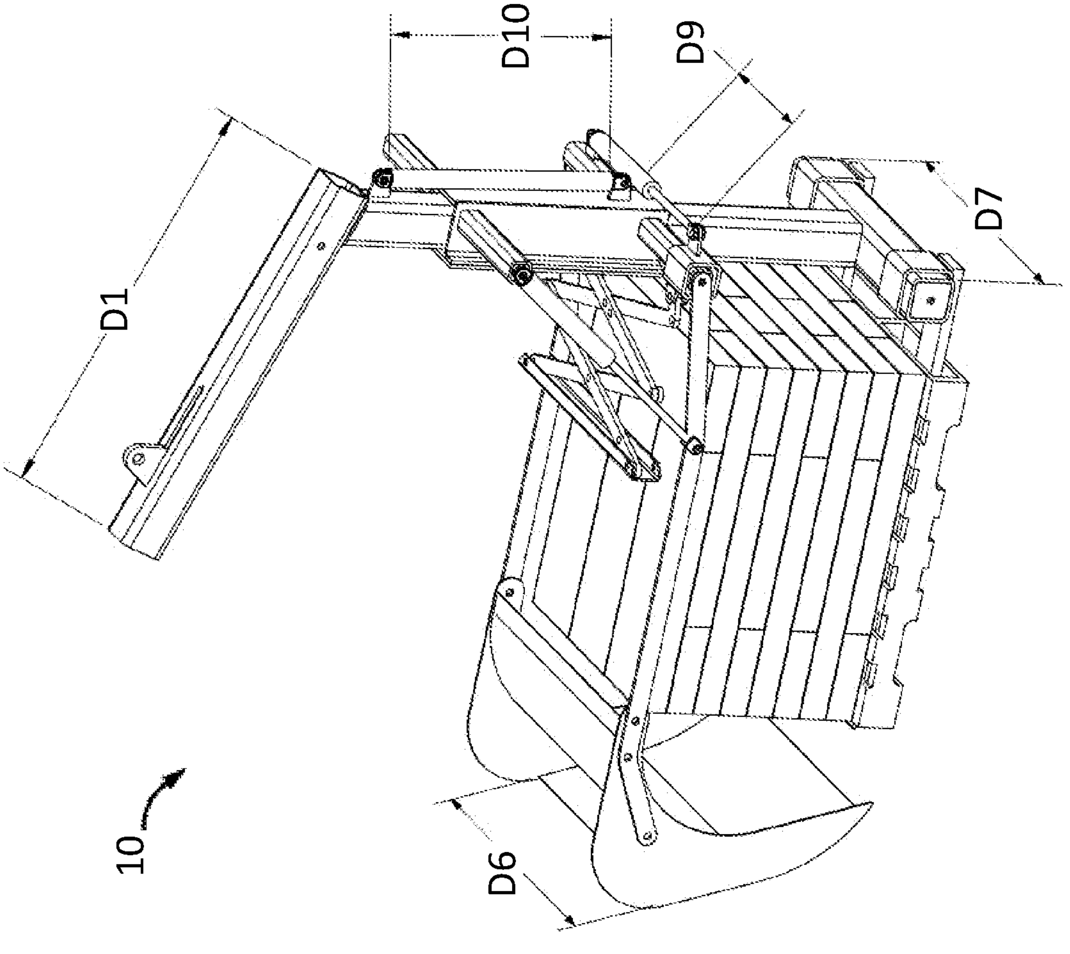
FIG. 37 is a rear perspective view of the apparatus of FIG. 3 including a portable platform and a unit load in communication with the apparatus.
Figure 38:
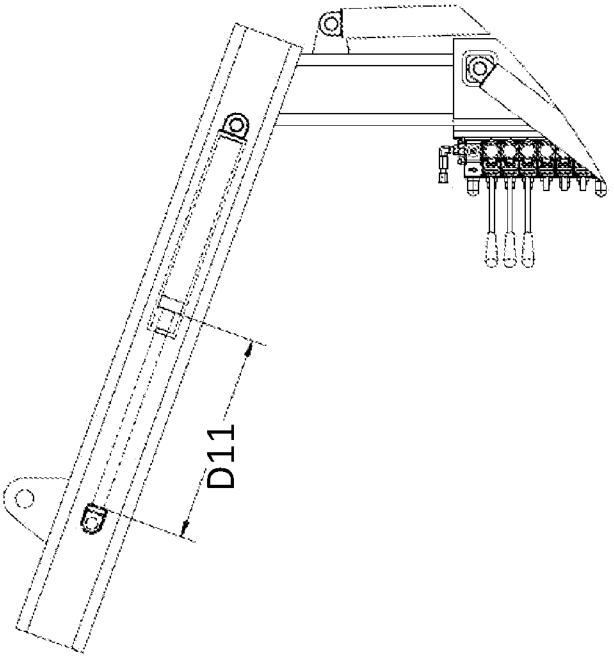
FIG. 38 is a detailed view of the apparatus of FIG. 36.

In a first non-limiting example, an apparatus 10 as depicted in FIG. 3 and operationally configured for carrying and unloading construction materials from the apparatus 10 including bundles of shingles 300 may be provided according to the dimensions listed below and as shown in FIGS. 36-38:

D1: 121.9 cm (48.0 inches) to 152.4 cm (60.0 inches);
D2: 15.24 cm (6.0 inches);
D3: 152.4 cm (60.0 inches) to 228.6 cm (90.0 inches);
D4: 121.9 cm (48.0 inches) to 182.9 cm (72.0 inches);
D5: 15.24 cm (6.0 inches);
D6: 91.4 cm (36.0 inches) to 121.9 cm (48.0 inches);
D7: 91.4 cm (36.0 inches) to 121.9 cm (48.0 inches);
D8: 30.5 cm (12.0 inches) to 50.8 cm (20.0 inches);
D9: 30.5 cm (12.0 inches) to 50.8 cm (20.0 inches);
D10: 76.2 cm (30.0 inches) to 127.0 cm (50.0 inches); and
D11: 30.5 cm (12.0 inches) to 50.8 cm (20.0 inches).

Example 2

Figure 60:
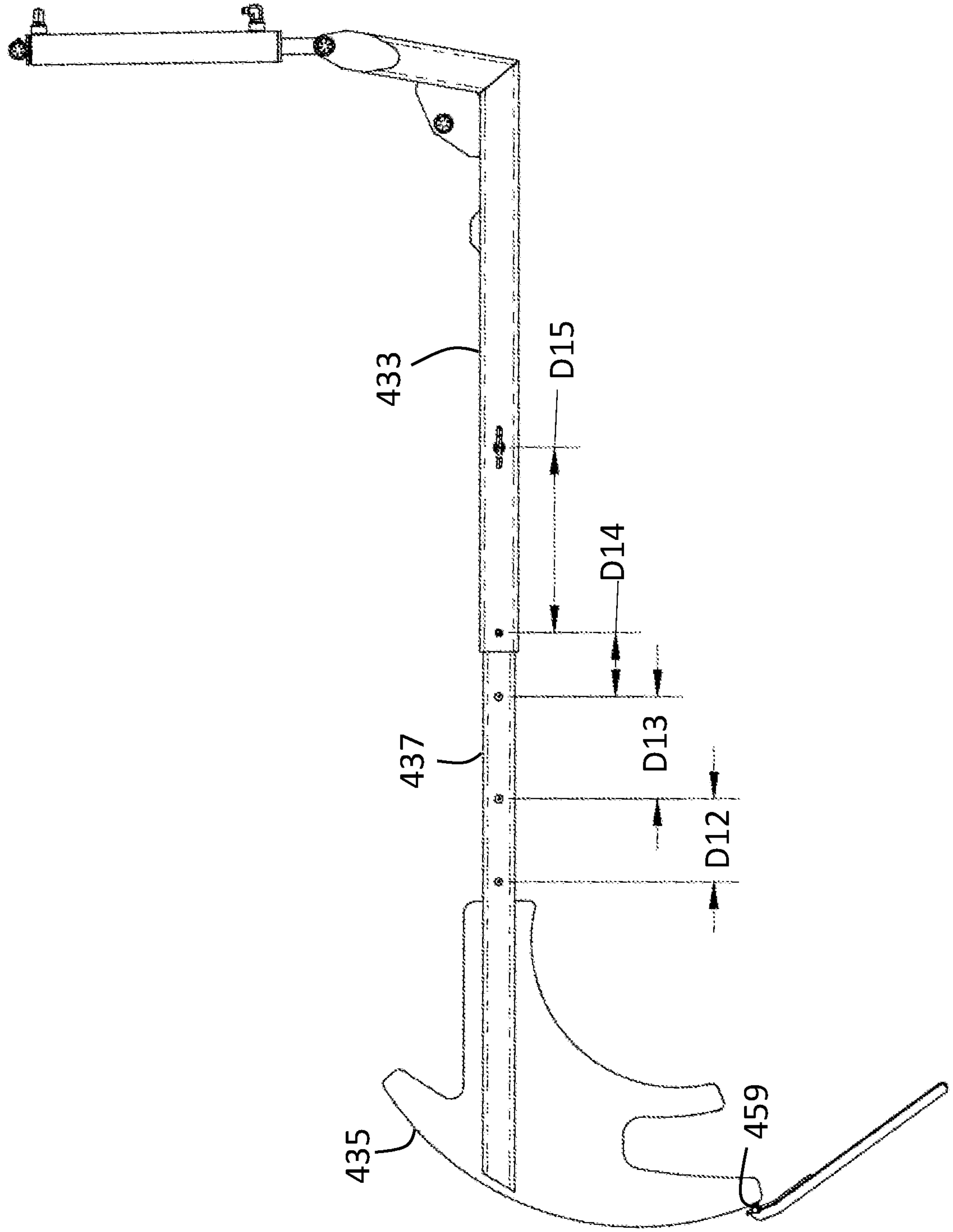
FIG. 60 is a side view of a guide member of the apparatus of FIG. 49.

With reference to FIG. 58, in a second non-limiting example an apparatus 10 may include one or more arm members 433 and one or more mating arm members 437 with apertures 408 and 409 spacing measurements listed below and as shown in FIG. 60:

D2: 16.51 cm (6.50 inches);
D13: 20.32 cm (8.00 inches);
D14: 12.7 cm (5.00 inches); and
D15: 36.83 cm (14.50 inches).

Example 3

In a third non-limiting example, an apparatus 10 as shown in FIG. 53 may include a height of 2.81 meters (110.75 inches) at a fully extended position and a height of 2.31 meters (90.75 inches) at a fully contracted position as shown in FIG. 54.

Although the disclosure is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosure, whether or not such embodiments are described and whether or not such features are presented as being a part of a described embodiment. Thus, the breadth and scope of the disclosure should not be limited by any of the above-described embodiments.

Terms and phrases used in this disclosure, and variations thereof, unless otherwise expressly stated, should be construed as open-ended as opposed to limiting. As examples of the foregoing: the term “including” should be read as meaning “including, without limitation” or the like, the term “example” is used to provide exemplary instances of the item in discussion, not an exhaustive or limiting list thereof, and adjectives such as “conventional,” “traditional,” “normal,” “standard,” “known” and terms of similar meaning should not be construed as limiting the item described to a given time period or to an item available as of a given time.

Persons of ordinary skill in the art will recognize that many modifications may be made to the present disclosure without departing from the spirit and scope of the disclosure. The embodiment(s) described herein are meant to be illustrative only and should not be taken as limiting the disclosure, which is defined in the claims.

We claim:

1. An apparatus for delivering one or more items onto one or more target surfaces, including:
 one or more supports attached to a frame of the apparatus, the one or more supports being operationally configured to carry a unit load including one or more rows of the one or more items;
 an adjustable assembly moveable along part of the frame and operationally configured to direct the one or more items of the unit load off from the apparatus onto the one or more target surfaces;
 a mover assembly attached to the adjustable assembly and operationally configured to direct the one or more items off from the one or more supports; and
 a leveling assembly operationally configured to attach the apparatus with a lifting equipment and maintain the apparatus in a vertical alignment during operation of the apparatus;
 the apparatus including a control circuitry operationally configured to program a travel distance of the adjustable assembly according to a configuration of the one or more items comprising the one or more rows of the unit load.

2. The apparatus of claim 1, wherein the adjustable assembly includes (1) a slide member secured to the frame in a manner effective to travel along part of the frame and (2) a guide assembly comprising one or more guide surfaces operationally configured to direct the one or more items of the unit load off from the apparatus onto the one or more target surfaces.

3. The apparatus of claim 2, wherein the slide member includes a plurality of linear attachment surfaces extending out from the slide member and wherein the guide assembly includes one or more arm members pivotally attached to the attachment surfaces.

4. The apparatus of claim 3, wherein the guide assembly includes a non-planar guide member releasably secured to the one or more arm members.

5. The apparatus of claim 2, further including one or more linear actuators operationally configured to move the adjustable assembly along part of the frame.

6. The apparatus of claim 1, wherein the frame comprises part of the leveling assembly, the leveling assembly further including one or more linear actuators and a lift attachment member, wherein operation of the one or more linear actuators is operationally configured to change the position of the lift attachment member in relation to the frame.

7. The apparatus of claim 1, wherein the one or more supports are operationally configured to carry a portable platform and the unit load on the portable platform.

8. An apparatus for delivering one or more items onto one or more target surfaces, including:
 one or more supports attached to a frame of the apparatus, the one or more supports being operationally configured to carry the one or more items;
 an adjustable assembly moveable along part of the frame and operationally configured to direct the one or more items off from the apparatus onto the one or more target surfaces;
 a mover assembly attached to the adjustable assembly and operationally configured to direct the one or more items off from the one or more supports; and
 a leveling assembly operationally configured to attach the apparatus with a lifting equipment and maintain the apparatus in a vertical alignment during operation of the apparatus;
 wherein the frame comprises part of the leveling assembly; and
 wherein the leveling assembly further includes one or more linear actuators and a lift attachment member, wherein operation of the one or more linear actuators is operationally configured to change the position of the lift attachment member in relation to the frame.

9. The apparatus of claim 8, wherein the adjustable assembly includes (1) a slide member secured to the frame in a manner effective to travel along part of the frame and (2) a guide assembly comprising one or more guide surfaces operationally configured to direct the one or more items off from the apparatus onto the one or more target surfaces.

10. The apparatus of claim 9, wherein the slide member includes a plurality of linear attachment surfaces extending out from the slide member and wherein the guide assembly includes one or more arm members pivotally attached to the attachment surfaces.

11. The apparatus of claim 10, wherein the guide assembly includes a non-planar guide member releasably secured to the one or more arm members.

12. The apparatus of claim 9, further including one or more linear actuators operationally configured to move the adjustable assembly along part of the frame.

13. The apparatus of claim 8, wherein the apparatus includes a control circuitry operationally configured to program a travel distance of the adjustable assembly.

14. An apparatus for delivering one or more items onto one or more target surfaces, including:
 one or more supports attached to a frame of the apparatus, the one or more supports being operationally configured to carry the one or more items;
 an adjustable assembly moveable along part of the frame and operationally configured to direct the one or more items off from the apparatus onto the one or more target surfaces;
 a mover assembly attached to the adjustable assembly and operationally configured to direct the one or more items off from the one or more supports;
 a leveling assembly operationally configured to attach the apparatus with a lifting equipment and maintain the apparatus in a vertical alignment during operation of the apparatus; and
 one or more linear actuators operationally configured to move the adjustable assembly along part of the frame;
 wherein the adjustable assembly includes (1) a slide member secured to the frame in a manner effective to travel along part of the frame and (2) a guide assembly comprising one or more guide surfaces operationally configured to direct the one or more items off from the apparatus onto the one or more target surfaces.

15. The apparatus of claim 14, wherein the slide member includes a plurality of linear attachment surfaces extending out from the slide member and wherein the guide assembly includes one or more arm members pivotally attached to the attachment surfaces.

16. The apparatus of claim 15, wherein the guide assembly includes a non-planar guide member releasably secured to the one or more arm members.

17. The apparatus of claim 14, wherein the frame comprises part of the leveling assembly, the leveling assembly further including one or more linear actuators and a lift attachment member, wherein operation of the one or more linear actuators is operationally configured to change the position of the lift attachment member in relation to the frame.

18. The apparatus of claim 14, wherein the apparatus includes a control circuitry operationally configured to program a travel distance of the adjustable assembly.

* * * * *